US012522142B2

(12) United States Patent
Komatsu et al.

(10) Patent No.: US 12,522,142 B2
(45) Date of Patent: Jan. 13, 2026

(54) DISPLAY SYSTEM, DISPLAY DEVICE, DISPLAY METHOD, AND MOBILE APPARATUS

(71) Applicant: Sony Group Corporation, Tokyo (JP)

(72) Inventors: Hidehiro Komatsu, Tokyo (JP); Satoshi Akagawa, Tokyo (JP); Keishi Tsuchiya, Tokyo (JP); Shinichi Iriya, Tokyo (JP); Takuya Motoishi, Tokyo (JP); Junichi Nagahara, Tokyo (JP); Daisuke Ishii, Tokyo (JP); Henrik Erbeus, Weybridge (GB)

(73) Assignee: SONY GROUP CORPORATION, Tokyo (JP)

( * ) Notice: Subject to any disclaimer, the term of this patent is extended or adjusted under 35 U.S.C. 154(b) by 371 days.

(21) Appl. No.: 17/768,488

(22) PCT Filed: Oct. 23, 2020

(86) PCT No.: PCT/JP2020/039849

§ 371 (c)(1),
(2) Date: Apr. 13, 2022

(87) PCT Pub. No.: WO2021/079975

PCT Pub. Date: Apr. 29, 2021

(65) Prior Publication Data

US 2024/0294115 A1 Sep. 5, 2024

(30) Foreign Application Priority Data

Oct. 23, 2019 (JP) ................................ 2019-192615
Dec. 26, 2019 (JP) ................................ 2019-235746

(51) Int. Cl.
*B60R 1/25* (2022.01)
*B60K 35/10* (2024.01)
(Continued)

(52) U.S. Cl.
CPC ................ *B60R 1/25* (2022.01); *B60K 35/10* (2024.01); *B60K 35/215* (2024.01); *B60K 35/22* (2024.01);
(Continued)

(58) Field of Classification Search
CPC ................ B60R 1/25; B60R 2300/308; B60R 2300/8046; B60R 1/22; B60R 1/26;
(Continued)

(56) References Cited

U.S. PATENT DOCUMENTS 10,999,559 B1 * 5/2021 Pertsel .................. H04N 7/183
2007/0273638 A1 * 11/2007 Nohno ...................... B60R 1/26
345/156
(Continued)

FOREIGN PATENT DOCUMENTS

CN 104691418 A 6/2015
CN 204573056 U 8/2015
(Continued)

OTHER PUBLICATIONS

International Search Report and Written Opinion mailed on Jan. 19, 2021, received for PCT Application PCT/JP2020/039849, Filed on Oct. 23, 2020, 18 pages including English Translation.

*Primary Examiner* — Xuemei Zheng
(74) *Attorney, Agent, or Firm* — XSENSUS, LLP

(57) ABSTRACT

The present technology relates to a display system, a display device, a display method, and a mobile apparatus capable of improving convenience for an occupant of the mobile apparatus.

The display system includes a first display that extends in a left-right direction in front of a first seat of a mobile apparatus, in which a left end portion of the first display faces diagonally backward right as viewed from the first seat, a center portion of the first display faces backward as
(Continued)

viewed from the first seat, and a right end portion of the first display faces diagonally backward left as viewed from the first seat. The present technology can be applied to, for example, an in-vehicle display system.

34 Claims, 104 Drawing Sheets

(51) Int. Cl.

| | |
|---|---|
| ***B60K 35/215*** | (2024.01) |
| ***B60K 35/22*** | (2024.01) |
| ***B60K 35/23*** | (2024.01) |
| ***B60K 35/28*** | (2024.01) |
| ***B60K 35/60*** | (2024.01) |
| ***B60K 35/81*** | (2024.01) |
| ***B60K 37/20*** | (2024.01) |
| *B60K 35/25* | (2024.01) |
| *B60K 35/26* | (2024.01) |
| *G06V 20/58* | (2022.01) |

(52) U.S. Cl.

CPC .............. *B60K 35/23* (2024.01); *B60K 35/28* (2024.01); *B60K 35/60* (2024.01); *B60K 35/81* (2024.01); *B60K 37/20* (2024.01); *B60K 35/25* (2024.01); *B60K 35/265* (2024.01); *B60K 2360/1434* (2024.01); *B60K 2360/176* (2024.01); *B60K 2360/1868* (2024.01); *B60K 2360/774* (2024.01); *B60K 2360/782* (2024.01); *B60R 2300/308* (2013.01); *B60R 2300/8046* (2013.01); *G06V 20/58* (2022.01)

(58) Field of Classification Search

CPC ................ B60R 1/27; B60R 2300/105; B60R 2300/802; B60R 2300/306; B60R 1/28; B60K 35/22; B60K 35/654; B60K 35/81; B60K 35/28; B60K 35/29; B60K 35/23; B60K 35/213; B60K 2360/178; B60K 2360/1438; B60K 2360/149; B60K 2360/173; B60K 2360/175; B60K 2360/166; B60K 2360/18; B60K 2360/1868; B60K 2360/785; B60K 2360/179; B60K 2360/1876; B60K 20/06; B60K 28/10; B60K 35/00; B60K 2360/11; B60K 35/10; B60K 2360/176; B60K 2360/21; B60K 35/60; B60K 35/20; B60K 35/233; B60K 35/234; B60K 37/20; G06F 2203/04803

See application file for complete search history.

(56) References Cited

U.S. PATENT DOCUMENTS

| | | | | |
|---|---|---|---|---|
| 2009/0132130 | A1* | 5/2009 | Kumon | G01C 21/365 701/49 |
| 2016/0137126 | A1* | 5/2016 | Fürsich et al. | B60R 1/26 348/148 |
| 2017/0347067 | A1* | 11/2017 | Bostrom | B60K 35/00 |
| 2018/0154831 | A1* | 6/2018 | Spencer | H04N 5/2628 |
| 2018/0178729 | A1* | 6/2018 | Festerling, Jr. | G06V 20/59 |
| 2018/0190323 | A1 | 7/2018 | De Jong | |
| 2018/0265002 | A1* | 9/2018 | Kawamoto | H04N 23/698 |
| 2019/0031102 | A1 | 1/2019 | Kishimoto | |
| 2019/0135180 | A1* | 5/2019 | Watatsu | B60R 1/12 |
| 2020/0218443 | A1* | 7/2020 | Narayan | B60K 35/60 |
| 2020/0238826 | A1* | 7/2020 | Mizobata | G06F 3/1446 |
| 2021/0026590 | A1* | 1/2021 | Nam | H04R 9/06 |
| 2021/0056328 | A1* | 2/2021 | Pomytkin | B60K 35/60 |
| 2021/0070177 | A1* | 3/2021 | Nitze-Nelson | B60K 35/60 |
| 2021/0188177 | A1* | 6/2021 | Egashira | B60R 1/26 |

FOREIGN PATENT DOCUMENTS

| | | | | |
|---|---|---|---|---|
| CN | 108602465 | A | 9/2018 | |
| CN | 108621937 | A | 10/2018 | |
| CN | 109747539 | A | 5/2019 | |
| CN | 109937158 | A | 6/2019 | |
| CN | 216331768 | U | 4/2022 | |
| DE | 102007057725 | A1 | 6/2008 | |
| DE | 102011121392 | A1 | 6/2013 | |
| DE | 102013215176 | A1 * | 2/2015 | B60K 35/00 |
| DE | 102013225033 | A1 | 6/2015 | |
| DE | 102016001180 | A1 | 8/2017 | |
| EP | 2607141 | A | 6/2013 | |
| JP | 7-223487 | A | 8/1995 | |
| JP | 2001-513911 | A | 9/2001 | |
| JP | 2004-240154 | A | 8/2004 | |
| JP | 2005-516263 | A | 6/2005 | |
| JP | 2006-115758 | A | 5/2006 | |
| JP | 2008227860 | A | 9/2008 | |
| JP | 2008-230558 | A | 10/2008 | |
| JP | 2011-145856 | A | 7/2011 | |
| JP | 2012-514358 | A | 6/2012 | |
| JP | 2013-112193 | A | 6/2013 | |
| JP | 2015230519 | A | 12/2015 | |
| JP | 2016-136115 | A | 7/2016 | |
| JP | 2016121945 | A * | 7/2016 | |
| JP | 2017-514360 | A | 6/2017 | |
| JP | 2017-196911 | A | 11/2017 | |
| JP | 2017-196913 | A | 11/2017 | |
| JP | 2019-10929 | A | 1/2019 | |
| JP | 2019-31199 | A | 2/2019 | |
| JP | 2019-43317 | A | 3/2019 | |
| JP | 2019-75638 | A | 5/2019 | |
| JP | 2019-84991 | A | 6/2019 | |
| JP | 2019-113720 | A | 7/2019 | |
| WO | 2015/152304 | A1 | 10/2015 | |
| WO | 2015/186304 | A1 | 12/2015 | |
| WO | 2016/042733 | A1 | 3/2016 | |
| WO | 2018/230738 | A1 | 12/2018 | |
| WO | 2019/044536 | A1 | 3/2019 | |
| WO | WO-2019116519 | A1 | 6/2019 | |
| WO | WO-2019134845 | A1 | 7/2019 | |

* cited by examiner

DISPLAY SYSTEM, DISPLAY DEVICE, DISPLAY METHOD, AND MOBILE APPARATUS

CROSS-REFERENCE TO RELATED APPLICATIONS

The present application is based on PCT filing PCT/JP2020/039849, filed Oct. 23, 2020, which claims priority to JP 2019-192615, filed Oct. 23, 2019, and JP 2019-235746, filed Dec. 26, 2019, the entire contents of each are incorporated herein by reference.

TECHNICAL FIELD

The present technology relates to a display system, a display device, a display method, and a mobile apparatus, and more particularly to a display system, a display device, a display method, and a mobile apparatus capable of improving convenience for an occupant of the mobile apparatus.

BACKGROUND ART

In recent years, introduction of augmented reality (AR) technology into vehicles has been progressing (see, for example, Patent Document 1).

CITATION LIST

Patent Document

Patent Document 1: WO 2019/044536

SUMMARY OF THE INVENTION

Problems to be Solved by the Invention

As described above, it is desired to improve convenience for an occupant such as a driver of a vehicle by using AR technology and the like.

The present technology has been made in view of such a situation, and makes it possible to improve convenience for an occupant of a mobile apparatus such as a vehicle.

Solutions to Problems

A display system of a first aspect of the present technology includes a first display that extends in a left-right direction in front of a first seat of a mobile apparatus, in which a left end portion of the first display faces diagonally backward right as viewed from the first seat, a center portion of the first display faces backward as viewed from the first seat, and a right end portion of the first display faces diagonally backward left as viewed from the first seat.

A display device of a second aspect of the present technology includes a display that extends in a left-right direction in front of a seat of a mobile apparatus, in which a left end portion of the display faces diagonally backward right as viewed from the seat, a center portion of the display faces backward as viewed from the seat, and a right end portion of the display faces diagonally backward left as viewed from the seat.

A display method of a third aspect of the present technology includes, in a display that extends in a left-right direction in front of a seat of a mobile apparatus and has a left end portion facing diagonally backward right as viewed from the seat, a center portion facing backward as viewed from the seat, and a right end portion facing diagonally backward left as viewed from the seat, displaying an image of diagonally backward left of the mobile apparatus by the left end portion of the display, and displaying an image of diagonally backward right of the mobile apparatus by the right end portion of the display.

A mobile apparatus of a fourth aspect of the present technology includes a display that extends in a left-right direction in front of a seat and has a left end portion facing diagonally backward right as viewed from the seat, a center portion facing backward as viewed from the seat, and a right end portion facing diagonally backward left as viewed from the seat.

A mobile apparatus of a fifth aspect of the present technology includes a metadata addition unit that adds metadata to captured moving image data captured while moving, and an image processing unit that edits the captured moving image data on the basis of the metadata and generates edited moving image data.

A mobile apparatus of a sixth aspect of the present technology includes a camera that is installed on a rearview mirror for checking a rear or in a periphery of the rearview mirror and images a direction of a driver seat.

A mobile apparatus of a seventh aspect of the present technology includes an operating body that is rod-shaped used to change a shift position, and has an indicator provided on a side surface with a color that changes depending on a set shift position.

A mobile apparatus of an eighth aspect of the present technology includes a steering wheel that has an illumination having a ring shape with at least one of color, brightness, or a light emitting area being variable and being provided in a center portion, and a light control unit that controls the illumination.

A mobile apparatus of a ninth aspect of the present technology includes a device for a plurality of user interfaces arranged along a loop line that surrounds a periphery of an interior approximately horizontally.

A mobile apparatus of a tenth aspect of the present technology includes a plurality of seat speakers, which are speakers individually provided in seats, and an output control unit that individually controls output of a sound from each of the seat speakers.

A mobile apparatus of an eleventh aspect of the present technology includes a camera module that is installed on a dashboard and captures an image in a direction of a driver seat diagonally from a front.

In the first aspect of the present technology, a left end portion of a first display that extends in a left-right direction in front of a first seat of a mobile apparatus faces diagonally backward right as viewed from the first seat, a center portion of the first display faces backward as viewed from the first seat, and a right end portion of the first display of the first display faces diagonally backward left as viewed from the first 5 seat.

In the second or fourth aspect of the present technology, a left end portion of a display that extends in a left-right direction in front of a seat of a mobile apparatus faces diagonally backward right as viewed from the seat, a center portion of the display faces backward as viewed from the seat, and a right end portion faces diagonally backward left of the mobile apparatus as viewed from the seat.

In the third aspect of the present technology, in a display that extends in a left-right direction in front of a seat of a mobile apparatus and has a left end portion facing diagonally backward right as viewed from the seat, a center portion facing backward as viewed from the seat, and a right end portion facing diagonally backward left as viewed from the seat, an image of diagonally backward left of the mobile apparatus is displayed by the left end portion of the display, and an image of diagonally backward right of the mobile apparatus is displayed by the right end portion of the display.

In the fifth aspect of the present technology, metadata is added to captured moving image data captured while moving, the captured moving image data is edited on the basis of the metadata, and edited moving image data is generated.

In the sixth aspect of the present technology, an image in the direction of the driver seat is captured by a rearview mirror for checking the rear or a camera installed around the rearview mirror.

In the seventh aspect of the present technology, a color of an indicator provided on a side surface of an operating body that is rod-shaped used to change a shift position changes depending on a set shift position.

In the eighth aspect of the present technology, an illumination provided in a ring shape in a center portion of a steering wheel with at least one of color, brightness, or a light emitting area being variable is controlled.

In the ninth aspect of the present technology, a device for a plurality of user interfaces is arranged along a loop line that surrounds a periphery of an interior approximately horizontally.

In the tenth aspect of the present technology, output of a sound from a plurality of seat speakers that are speakers individually provided in seats is individually controlled.

In the eleventh aspect of the present technology, an image in a direction of a driver seat is captured diagonally from a front by a camera module that is installed on a dashboard.

BRIEF DESCRIPTION OF DRAWINGS

FIG. 38 is a diagram illustrating an example of a light emission pattern at a time of power-on.

FIG. 39 is a diagram illustrating an example of a light emission pattern at a time of power-on.

FIG. 41 is a diagram illustrating an example of a light emission pattern during operation and when the headlight is on.

FIG. 70 is a view illustrating a display example of the display unit for CMS when the direction indicator is on.

MODE FOR CARRYING OUT THE INVENTION

Hereinafter, a mode for carrying out the present technology will be described. The description will be made in the following order.

1. Configuration example of vehicle control system
2. First Embodiment
3. Modification example of first embodiment
4. Second Embodiment
5. Modification example of second embodiment
6. Third Embodiment
7. Modification example of third embodiment
8. Others

1. Configuration Example of Vehicle Control System

Figure 1:
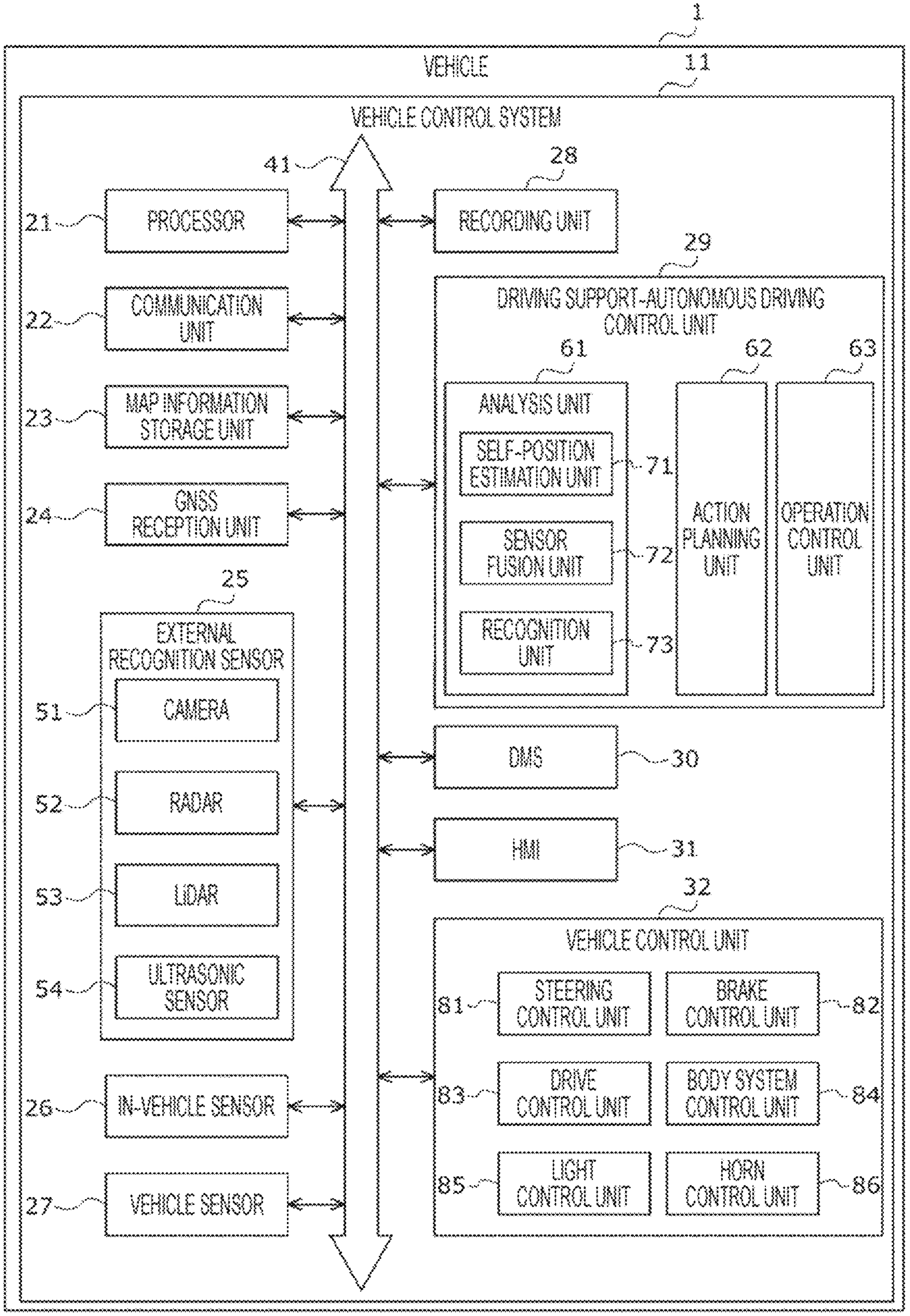
FIG. 1 is a block diagram illustrating a configuration example of a vehicle control system.

FIG. 1 is a block diagram illustrating a configuration example of a vehicle control system 11 that is an example of a mobile apparatus control system to which the present technology is applied.

The vehicle control system 11 is provided in a vehicle 1 and performs processing related to driving support and autonomous driving of the vehicle 1.

The vehicle control system 11 includes a processor 21, a communication unit 22, a map information storage unit 23, a global navigation satellite system (GNSS) receiver 24, an external recognition sensor 25, an in-vehicle sensor 26, a vehicle sensor 27, a recording unit 28, a driving support-autonomous driving control unit 29, a driver monitoring system (DMS) 30, a human machine interface (HMI) 31, and a vehicle control unit 32.

The processor 21, the communication unit 22, the map information storage unit 23, the GNSS reception unit 24, the external recognition sensor 25, the in-vehicle sensor 26, the vehicle sensor 27, the recording unit 28, the driving support-autonomous driving control unit 29, the driver monitoring system (DMS) 30, the human machine interface (HMI) 31, and the vehicle control unit 32 are connected to each other via the communication network 41. The communication network 41 is formed by, for example, an in-vehicle communication network, a bus, or the like that conforms to any standard such as controller area network (CAN), local interconnect network (LIN), local area network (LAN), FlexRay (registered trademark), Ethernet (registered trademark), or the like. Note that each part of the vehicle control system 11 may be directly connected by, for example, short-range wireless communication (Near Field Communication (NFC)) or Bluetooth (registered trademark) or the like without going through the communication network 41.

Note that, hereinafter, in a case where each unit of the vehicle control system 11 performs communication via the communication network 41, description of the communication network 41 is omitted. For example, in a case where the processor 21 and the communication unit 22 communicate with each other via the communication network 41, it is described that the processor 21 and the communication unit 22 simply communicate with each other.

The processor 21 is formed by various processors such as a central processing unit (CPU), a micro processing unit (MPU), and an electronic control unit (ECU), for example. The processor 21 controls the entire vehicle control system 11.

The communication unit 22 communicates with various devices inside and outside the vehicle, other vehicles, servers, base stations, and the like, and transmits and receives various data. As for communication with the outside of the vehicle, for example, the communication unit 22 receives a program for updating software for controlling the operation of the vehicle control system 11, map information, traffic information, information of surroundings of the vehicle 1, and the like from the outside. For example, the communication unit 22 transmits information regarding the vehicle 1 (for example, data indicating the state of the vehicle 1, a recognition result by a recognition unit 73, or the like), information of surroundings of the vehicle 1, and the like to the outside. For example, the communication unit 22 performs communication corresponding to a vehicle emergency call system such as eCall.

Note that the communication method of the communication unit 22 is not particularly limited. Furthermore, a plurality of communication methods may be used.

As for communication with the inside of the vehicle, for example, the communication unit 22 wirelessly communicates with a device in the vehicle by a communication method such as wireless LAN, Bluetooth, NFC, or Wireless USB (WUSB). For example, the communication unit 22 may perform wired communication with a device in the vehicle by a communication method such as Universal Serial Bus (USB), High-Definition Multimedia Interface (HDMI, registered trademark), or Mobile High-definition Link (MHL) via a connection terminal (and a cable if necessary) that is not illustrated.

Here, the device in the vehicle is, for example, a device that is not connected to the communication network 41 in the vehicle. For example, a mobile apparatus and a wearable device possessed by an occupant such as a driver, an information device brought into the vehicle and temporarily installed, and the like are assumed.

For example, the communication unit 22 communicates, by a wireless communication system such as 4th generation mobile communication system (4G), 5th generation mobile communication system (5G), Long Term Evolution (LTE), or dedicated short range communications (DSRC), with a server or the like existing on an external network (for example, the Internet, a cloud network, or a network peculiar to a business operator) via a base station or an access point.

For example, the communication unit 22 uses peer-to-peer (P2P) technology to communicate with a terminal (for example, a terminal of a pedestrian or a store, or a machine-type communication (MTC) terminal) that exists near the own vehicle. For example, the communication unit 22 performs V2X communication. The V2X communication is, for example, vehicle-to-vehicle communication with other vehicles, vehicle-to-infrastructure communication with a roadside device or the like, communication with a home (vehicle-to-home), and vehicle-to-pedestrian communication with a terminal or the like possessed by a pedestrian.

For example, the communication unit 22 receives electromagnetic waves transmitted by the Vehicle Information and Communication System (VICS, a registered trademark) using a radio wave beacon, an optical beacon, FM multiplex broadcasting, and the like.

The map information storage unit 23 stores a map acquired from the outside and a map created by the vehicle 1. For example, the map information storage unit 23 stores a three-dimensional high-precision map, a global map that is less accurate than the high-precision map and covers a wide area, and the like.

High-precision maps include, for example, dynamic maps, point cloud maps, vector maps (also referred to as Advanced Driver Assistance System (ADAS) maps), and the like. The dynamic map is, for example, a map including four layers of dynamic information, quasi-dynamic information, quasi-static information, and static information, and is provided from an external server or the like. The point cloud map is a map formed by a point cloud (point cloud data). The vector map is a map in which information such as lanes and signal positions is associated with the point cloud map. The point cloud map and the vector map may be provided from, for example, an external server or the like or may be created in the vehicle 1 and stored in the map information storage unit 23 as a map for matching with a local map as described later on the basis of a sensing result by a radar 52, a LiDAR 53, or the like. Furthermore, in a case where a high-precision map is provided from an external server or the like, in order to reduce the communication capacity, for example, map data of several hundred meters square, relating to a planned route on which the vehicle 1 will travel from now on is acquired from the server or the like.

The GNSS reception unit 24 receives a GNSS signal from a GNSS satellite and supplies the signal to the driving support-autonomous driving control unit 29.

The external recognition sensor 25 includes various sensors used for recognizing an external situation of the vehicle 1, and supplies sensor data from each sensor to each part of the vehicle control system 11. The type and number of sensors included in the external recognition sensor 25 are arbitrary.

For example, the external recognition sensor 25 includes a camera 51, a radar 52, a Light Detection and Ranging, Laser Imaging Detection and Ranging (LiDAR) 53, and an ultrasonic sensor 54. The numbers of cameras 51, radars 52, LiDARs 53, and ultrasonic sensors 54 are arbitrary, and examples of a sensing area of each sensor will be described later.

Note that as the camera 51, for example, a camera of an arbitrary imaging method such as a Time Of Flight (ToF) camera, a stereo camera, a monocular camera, and an infrared camera is used as needed.

Furthermore, for example, the external recognition sensor 25 includes an environment sensor for detecting weather, climate, brightness, and the like. The environment sensor includes, for example, a raindrop sensor, a fog sensor, a sunshine sensor, a snow sensor, an illuminance sensor, and the like.

Moreover, for example, the external recognition sensor 25 includes a microphone used for detecting the position of a sound, a sound source, and the like around the vehicle 1.

The in-vehicle sensor 26 includes various sensors for detecting information in the vehicle, and supplies sensor data from each sensor to each part of the vehicle control system 11. The types and number of sensors included in the in-vehicle sensor 26 are arbitrary.

For example, the in-vehicle sensor 26 includes a camera, a radar, a seating sensor, a steering wheel sensor, a microphone, a biosensor, and the like. As the camera, for example, a camera of any imaging method such as a ToF camera, a stereo camera, a monocular camera, and an infrared camera can be used. The biosensor is provided on, for example, a seat, a steering wheel, or the like, and detects various biometric information of an occupant such as a driver.

The vehicle sensor 27 includes various sensors for detecting the state of the vehicle 1, and supplies sensor data from each sensor to each part of the vehicle control system 11. The type and number of sensors included in the vehicle sensor 27 are arbitrary.

For example, the vehicle sensor 27 includes a speed sensor, an acceleration sensor, an angular velocity sensor (gyro sensor), and an inertial measurement unit (IMU). For example, the vehicle sensor 27 includes a steering angle sensor that detects the steering angle of the steering wheel, a yaw rate sensor, an accelerator sensor that detects the operation amount of the accelerator pedal, and a brake sensor that detects the operation amount of the brake pedal. For example, the vehicle sensor 27 includes a rotation sensor that detects the rotation speed of an engine or a motor, an air pressure sensor that detects tire pressure, a slip ratio sensor that detects a tire slip ratio, and a wheel speed sensor that detects wheel rotation speed. For example, the vehicle sensor 27 includes a battery sensor that detects the remaining amount and temperature of a battery, and an impact sensor that detects an external impact.

The recording unit 28 includes, for example, a read only memory (ROM), a random access memory (RAM), a magnetic storage device such as a hard disc drive (HDD), a semiconductor storage device, an optical storage device, a magneto-optical storage device, and the like. The recording unit 28 records various programs, data, and the like, used by each unit of the vehicle control system 11. For example, the recording unit 28 records a rosbag file including messages sent and received by a robot operating system (ROS) in which an application program related to autonomous driving operates. For example, the recording unit 28 includes an Event Data Recorder (EDR) and a Data Storage System for Automated Driving (DSSAD), and records information on the vehicle 1 before and after an event such as an accident.

The driving support-autonomous driving control unit 29 controls the driving support and autonomous driving of the vehicle 1. For example, the driving support-autonomous driving control unit 29 includes an analysis unit 61, an action planning unit 62, and an operation control unit 63.

The analysis unit 61 analyzes the vehicle 1 and a situation of the surroundings. The analysis unit 61 includes a self-position estimation unit 71, a sensor fusion unit 72, and a recognition unit 73.

The self-position estimation unit 71 estimates the self-position of the vehicle 1 on the basis of sensor data from the external recognition sensor 25 and the high-precision map stored in the map information storage unit 23. For example, the self-position estimation unit 71 estimates the self-position of the vehicle 1 by generating a local map on the basis of the sensor data from the external recognition sensor 25 and matching the local map with the high-precision map. The position of the vehicle 1 is based on, for example, the center of a rear wheel-to-axle.

The local map is, for example, a three-dimensional high-precision map created by using a technique such as simultaneous localization and mapping (SLAM), an occupancy grid map, or the like. The three-dimensional high-precision map is, for example, the above-described point cloud map or the like. The occupancy grid map is a map that divides the three-dimensional or two-dimensional space around the vehicle 1 into grids (lattice) of a predetermined size and illustrates an occupied state of an object in grid units. The occupied state of an object is indicated by, for example, presence or absence or existence probability of the object. The local map is also used, for example, in the detection processing and the recognition processing of the external situation of the vehicle 1 by the recognition unit 73.

Note that the self-position estimation unit 71 may estimate the self-position of the vehicle 1 on the basis of the GNSS signal and sensor data from the vehicle sensor 27.

The sensor fusion unit 72 performs sensor fusion processing to obtain new information by combining a plurality of different types of sensor data (for example, image data supplied from the camera 51 and sensor data supplied from the radar 52). The method for combining different types of sensor data includes integration, fusion, association, and the like.

The recognition unit 73 performs detection processing and recognition processing of the external situation of the vehicle 1.

For example, the recognition unit 73 performs detection processing and recognition processing of the external situation of the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like of an object around the vehicle 1. The object detection processing is, for example, processing of detecting presence or absence, size, shape, position, movement, and the like of an object. The recognition processing of an object is, for example, processing of recognizing an attribute such as an object type or identifying a specific object. However, the detection processing and the recognition processing are not always clearly separated and may overlap.

For example, the recognition unit 73 detects an object around the vehicle 1 by performing clustering that classifies a point cloud based on sensor data of a LiDAR, a radar, or the like into each mass of the point cloud. Thus, the presence or absence, size, shape, and position of an object around the vehicle 1 are detected.

For example, the recognition unit 73 detects movement of an object around the vehicle 1 by performing tracking to follow movement of the mass of the point cloud classified by clustering. Thus, the velocity and the traveling direction (movement vector) of the object around the vehicle 1 are detected.

For example, the recognition unit 73 recognizes the type of an object around the vehicle 1 by performing object recognition processing such as semantic segmentation on the image data supplied from the camera 51.

Note that as the object to be detected or recognized, for example, a vehicle, a person, a bicycle, an obstacle, a structure, a road, a traffic light, a traffic sign, a road sign, or the like is assumed.

For example, the recognition unit 73 performs recognition processing of traffic rules around the vehicle 1 on the basis of the map stored in the map information storage unit 23, an estimation result of the self-position, and a recognition result of an object around the vehicle 1. By this processing, for example, a position and state of a signal, contents of traffic signs and road markings, contents of traffic regulations, lanes in which the vehicle can travel, and the like are recognized.

For example, the recognition unit 73 performs recognition processing of a surrounding environment of the vehicle 1. The surrounding environment as a detection target includes, for example, weather, temperature, humidity, brightness, and road surface conditions, and the like.

The action planning unit 62 creates an action plan for the vehicle 1. For example, the action planning unit 62 creates an action plan by performing route planning and route tracking processing.

Note that the route planning (Global path planning) is a process of planning a rough route from a start to a goal. This route planning is called track planning, and also includes processing of track generation (Local path planning) that allows safe and smooth traveling near the vehicle 1 in consideration of motion characteristics of the vehicle 1 in the route planned by the route planning.

The route following is a process of planning an operation for safely and accurately traveling on the route planned by the route planning within a planned time. For example, the target speed and target angular velocity of the vehicle 1 are calculated.

The operation control unit 63 controls operation of the vehicle 1 in order to achieve the action plan created by the action planning unit 62.

For example, the operation control unit 63 controls a steering control unit 81, a brake control unit 82, and a drive control unit 83 to perform acceleration and deceleration control and direction control so that the vehicle 1 travels on the track calculated by the track planning. For example, the operation control unit 63 performs coordinated control for the purpose of achieving ADAS functions such as collision avoidance or impact mitigation, follow-up traveling, vehicle speed maintained traveling, collision warning of own vehicle, and lane deviation warning of the own vehicle. For example, the operation control unit 63 performs coordinated control for the purpose of autonomous driving or the like to autonomously travel without an operation by the driver.

The DMS 30 performs driver authentication processing, driver status recognition processing, and the like on the basis of sensor data from the in-vehicle sensor 26 and input data input to the HMI 31. As the state of the driver to be recognized, for example, physical condition, alertness, concentration, fatigue, line-of-sight direction, degree of drunkenness, driving operation, posture, and the like are assumed.

Note that the DMS 30 may perform authentication processing for an occupant other than the driver and recognition processing for the state of the occupant. Furthermore, for example, the DMS 30 may perform recognition processing of a condition inside the vehicle on the basis of sensor data from the in-vehicle sensor 26. As the condition inside the vehicle to be recognized, for example, temperature, humidity, brightness, odor, and the like are assumed.

The HMI 31 is used for inputting various data, instruction, and the like, generates an input signal on the basis of the input data, instruction, and the like, and supplies the input signal to each part of the vehicle control system 11. For example, the HMI 31 includes an operation device such as a touch panel, a button, a microphone, a switch, and a lever, and an operation device that allows input by a method other than manual operation by a voice, a gesture, or the like. Note that the HMI 31 may be, for example, a remote control device using infrared rays or other radio waves, or an externally connected device such as a mobile device or a wearable device corresponding to operation of the vehicle control system 11.

Furthermore, the HMI 31 performs output control that controls generation and output of visual information, auditory information, and tactile information for an occupant or the outside of the vehicle, as well as output content, output timing, output method, and the like. The visual information is, for example, information indicated by an image or light of an operation screen, a status display of the vehicle 1, a warning display, a monitor image illustrating a surrounding situation of the vehicle 1, or the like. The auditory information is, for example, information indicated by voice such as guidance, a warning sound, and a warning message. The tactile information is information given to tactile sensation of the occupant by, for example, force, vibration, movement, or the like.

As a device that outputs visual information, for example, a display device, a projector, a navigation device, an instrument panel, a camera monitoring system (CMS), an electronic mirror, a lamp, or the like is assumed. The display device may be a device that displays visual information in a visual field of an occupant, such as a head-up display, a transmissive display, and a wearable device having an augmented reality (AR) function, for example, in addition to a device having a normal display.

As a device that outputs auditory information, for example, an audio speaker, headphones, earphones, or the like is assumed.

As a device that outputs tactile information, for example, a haptics element using haptics technology or the like is assumed. The haptic element is provided on, for example, a steering wheel, a seat, or the like.

The vehicle control unit 32 controls each part of the vehicle 1. The vehicle control unit 32 includes a steering control unit 81, a brake control unit 82, a drive control unit 83, a body system control unit 84, a light control unit 85, and a horn control unit 86.

The steering control unit 81 performs detection and control of a state of a steering system of the vehicle 1, and the like. The steering system includes, for example, a steering mechanism including a steering wheel and the like, electric power steering, and the like. The steering control unit 81 includes, for example, a control unit such as an ECU that controls the steering system, an actuator that drives the steering system, and the like.

The brake control unit 82 performs detection and control of a state of a brake system of the vehicle 1, and the like. The brake system includes, for example, a brake mechanism including a brake pedal and the like, an antilock brake system (ABS), and the like. The brake control unit 82 includes, for example, a control unit such as an ECU that controls the brake system, an actuator that drives the brake system, and the like.

The drive control unit 83 performs detection and control of a state of a drive system of the vehicle 1, and the like. The drive system includes, for example, an accelerator pedal, a drive force generator for generating a drive force, such as an internal combustion engine, a drive motor, or the like, a drive force transmission mechanism for transmitting the drive force to the wheels, and the like. The drive control unit 83 includes, for example, a control unit such as an ECU that controls the drive system, an actuator that drives the drive system, and the like.

The body system control unit 84 performs detection and control of a state of a body system of the vehicle 1, and the like. The body system includes, for example, a keyless entry system, a smart key system, a power window device, a power seat, an air conditioner, an airbag, a seat belt, a shift lever, and the like. The body system control unit 84 includes, for example, a control unit such as an ECU that controls the body system, an actuator that drives the body system, and the like.

The light control unit 85 performs detection and control of states of various lights of the vehicle 1, and the like. As the lights to be controlled, for example, headlights, backlights, fog lights, turn signals, brake lights, projections, bumper displays, and the like are assumed. The light control unit 85 includes a control unit such as an ECU that controls the lights, an actuator that drives the lights, and the like.

The horn control unit 86 performs detection and control of a state of a car horn of the vehicle 1, and the like. The horn control unit 86 includes, for example, a control unit such as an ECU that controls the car horn, an actuator that drives the car horn, and the like.

Figure 2:
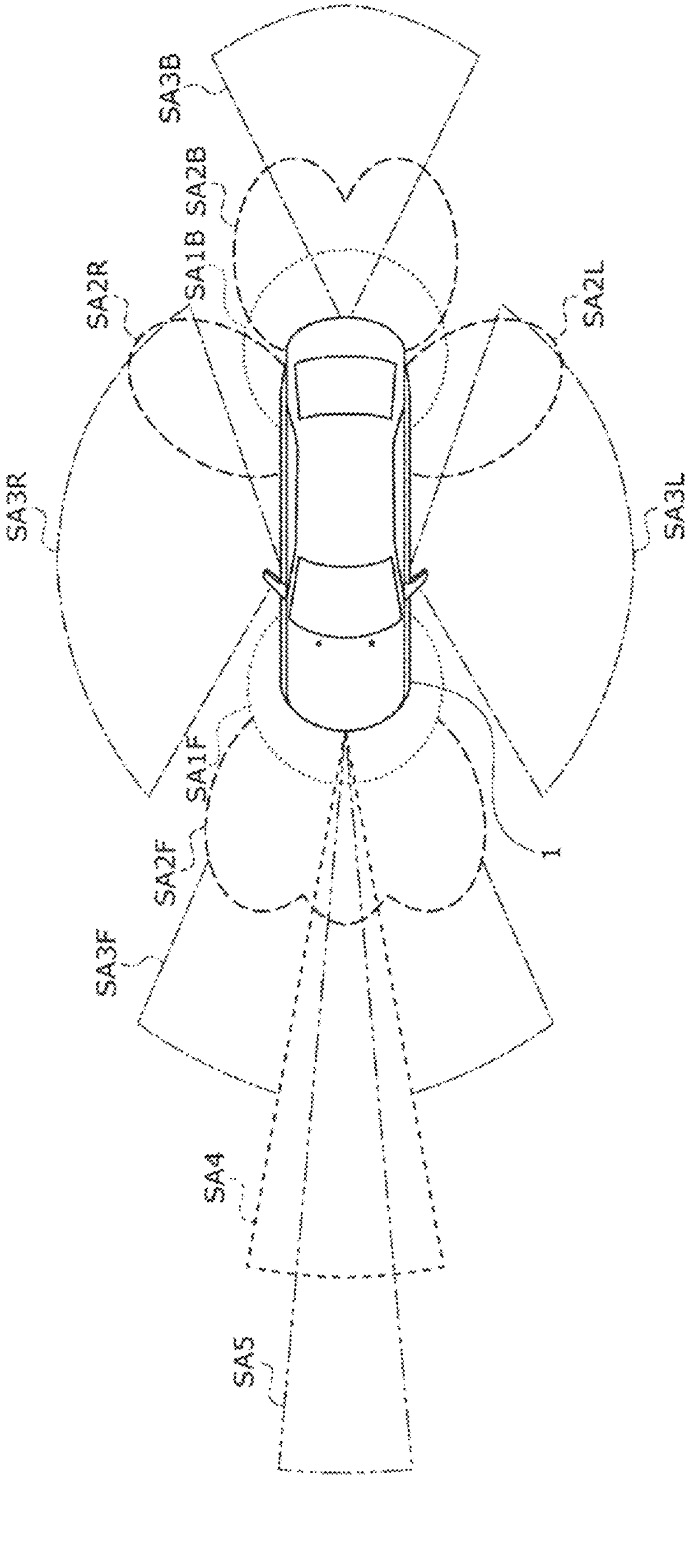
FIG. 2 is a view illustrating examples of sensing areas.

FIG. 2 is a view illustrating examples of sensing areas by the camera 51, the radar 52, the LiDAR 53, and the ultrasonic sensor 54 of the external recognition sensor 25 of FIG. 1.

A sensing area SAIF and a sensing area SA1B illustrate examples of sensing areas of the ultrasonic sensor 54. The sensing area SAIF covers a periphery of a front end of the vehicle 1. The sensing area SA1B covers a periphery of a rear end of the vehicle 1.

Sensing results in the sensing area SAIF and the sensing area SA1B are used, for example, for parking support of the vehicle 1, and the like.

A sensing area SA2F to a sensing area SA2B illustrate examples of sensing areas of the radar 52 for short range or medium range. The sensing area SA2F covers a position farther than the sensing area SAIF in front of the vehicle 1. The sensing area SA2B covers a position farther than the sensing area SA1B in rear of the vehicle 1. A sensing area SA2L covers a rear periphery of a left side surface of the vehicle 1. A sensing area SA2R covers a rear periphery of a right side surface of the vehicle 1.

A sensing result in the sensing area SA2F is used, for example, for detecting a vehicle, a pedestrian, or the like existing in front of the vehicle 1. A sensing result in the sensing area SA2B is used, for example, for a collision prevention function behind the vehicle 1, or the like. Sensing results in the sensing area SA2L and the sensing area SA2R are used, for example, for detecting an object in blind spots on the sides of the vehicle 1, and the like.

A sensing area SA3F to a sensing area SA3B illustrate an example of sensing areas by the camera 51. The sensing area SA3F covers a position farther than the sensing area SA2F in front of the vehicle 1. The sensing area SA3B covers a position farther than the sensing area SA2B in rear of the vehicle 1. The sensing area SA3L covers a periphery of the left side surface of the vehicle 1. The sensing area SA3R covers a periphery of the right side surface of the vehicle 1.

A sensing result in the sensing area SA3F is used, for example, for recognition of traffic lights and traffic signs, lane departure prevention support systems, and the like. A sensing result in the sensing area SA3B is used, for example, in parking support, surround view systems, and the like. Sensing results in the sensing area SA3L and the sensing area SA3R are used, for example, in a surround view system or the like.

A sensing area SA4 illustrates an example of a sensing area of the LiDAR 53. The sensing area SA4 covers a position farther than the sensing area SA3F in front of the vehicle 1. On the other hand, the sensing area SA4 has a narrower range in a left-right direction than the sensing area SA3F.

A sensing result in the sensing area SA4 is used, for example, for emergency braking, collision avoidance, pedestrian detection, and the like.

A sensing area SA5 illustrates an example of a sensing area of the radar 52 for long range. The sensing area SA5 covers a position farther than the sensing area SA4 in front of the vehicle 1. On the other hand, the sensing area SA5 has a narrower range in the left-right direction than the sensing area SA4.

The sensing result in the sensing area SA5 is used for, for example, adaptive cruise control (ACC) and the like.

Note that the respective sensing areas of the sensors may have various configurations other than those illustrated in FIG. 2. Specifically, the ultrasonic sensor 54 may also sense the side of the vehicle 1, or the LiDAR 53 may sense the rear of the vehicle 1.

2. First Embodiment

Next, a first embodiment of the present technology will be described with reference to FIGS. 3 to 19.

<Example of Installation Position of External Recognition Sensor 25 and In-Vehicle Sensor 26>

Figure 3:
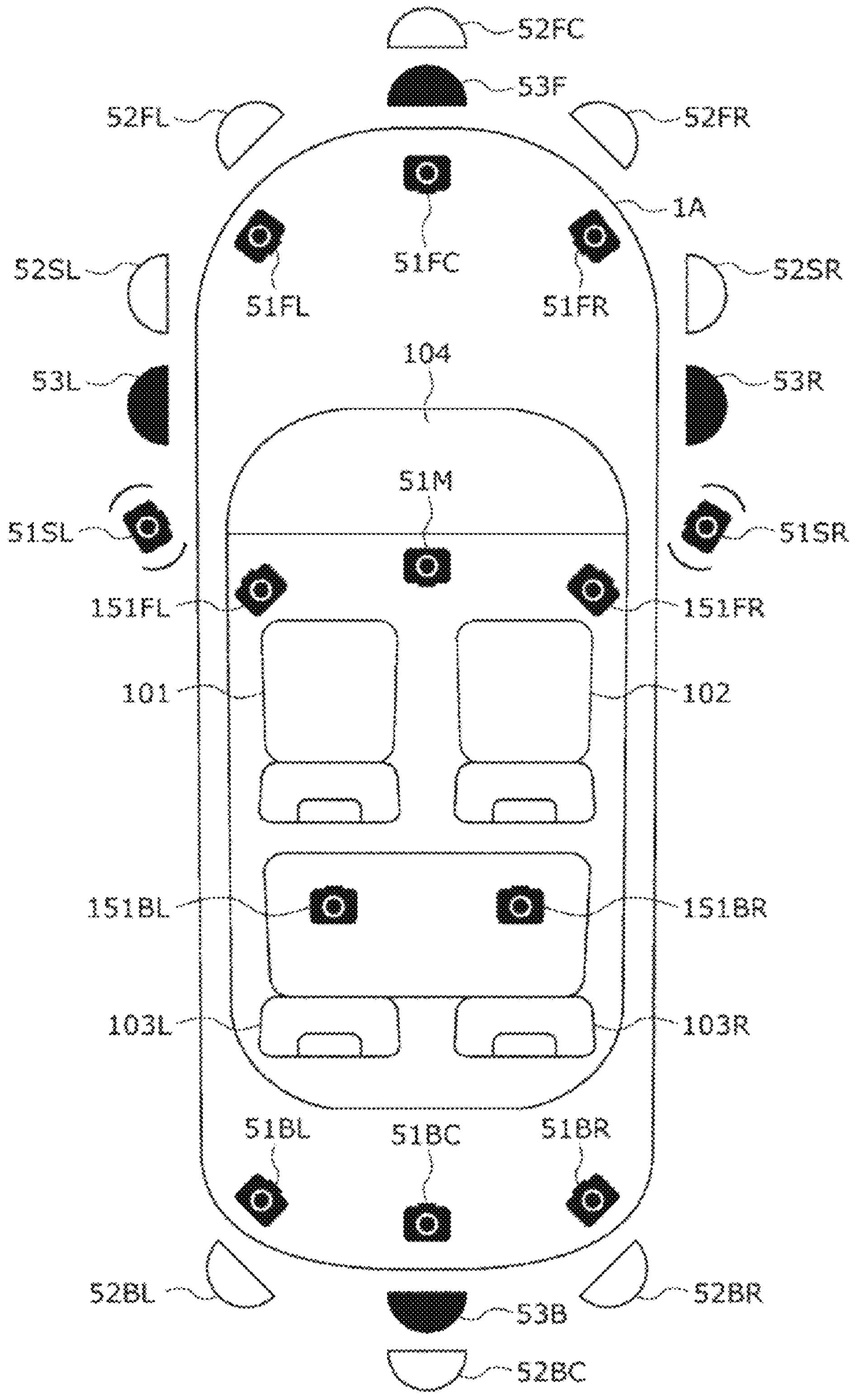
FIG. 3 is a view illustrating an example of installation positions of cameras, LiDARs, and radars.

FIG. 3 illustrates an example of installation positions of the cameras 51, the radars 52, and the LiDARs 53 included in the external recognition sensor 25 of a vehicle 1A, which is a first embodiment of the vehicle 1 to which the present technology is applied, and the cameras provided in the in-vehicle sensor 26. In this example, the external recognition sensor 25 includes a camera 51FC to a camera 51BR, a radar 52FC to a radar 52BR, and a LiDAR 53F to a LiDAR 53B. The in-vehicle sensor 26 includes a camera 151FL to a camera 151BR.

The camera 51FC is provided near a center of a distal end of the vehicle 1A. The camera 51FC captures a forward image of the vehicle 1A.

The camera 51FL is provided near a left end of the distal end of the vehicle 1A. The camera 51FL captures an image of diagonally forward left of the vehicle 1A.

The camera 51FR is provided near a right end of the distal end of the vehicle 1A. The camera 51FR captures an image of diagonally forward right of the vehicle 1A.

The camera 51M is provided near a front center of the interior of the vehicle 1A. The camera 51M captures a forward image of the vehicle 1A through a windshield 104.

The camera 51SL is provided near a front end of a door of a driver seat 101 on a left side surface of the vehicle 1A. The camera 51SL captures an image of diagonally backward left of the vehicle 1A (left side and back).

The camera 51SR is provided near a front end of a door of a passenger seat 102 arranged next to the driver seat 101 on a right side surface of the vehicle 1A. The camera 51SR captures an image of diagonally backward right of the vehicle 1A (right side and back).

The camera 51BC is provided near a center of a rear end of the vehicle 1A. The camera 51BC captures a backward image of the vehicle 1A.

The camera 51BL is provided near a left end of the rear end of the vehicle 1A. The camera 51BL captures an image of diagonally backward left of the vehicle 1A.

The camera 51BR is provided near a right end of the rear end of the vehicle 1A. The camera 51BR captures an image of diagonally backward right of the vehicle 1A.

The radar 52FC is provided near the center of the distal end of the vehicle 1A. The radar 52FC senses forward of the vehicle 1A.

The radar 52FL is provided near the left end of the distal end of the vehicle 1A. The radar 52FL senses diagonally forward left of the vehicle 1A.

The radar 52FR is provided near the right end of the distal end of the vehicle 1A. The radar 52FR senses diagonally forward right of the vehicle 1A.

The radar 52SL is provided on a front side of the left side surface of the vehicle 1A. The radar 52SL senses the left side of the vehicle 1A.

The radar 52SR is provided on a front side of the right side surface of the vehicle 1A. The radar 52SL senses the right side of the vehicle 1A.

The radar 52BC is provided near the center of the rear end of the vehicle 1A. The radar 52BC senses the rear of the vehicle 1A.

The radar 52BL is provided near the left end of the rear end of the vehicle 1A. The radar 52BL senses diagonally backward left of the vehicle 1A.

The radar 52BR is provided near the right end of the rear end of the vehicle 1A. The radar 52BR senses diagonally backward right of the vehicle 1A.

The LiDAR 53F is provided near the center of the distal end of the vehicle 1A. The LiDAR 53F senses forward of the vehicle 1A.

The LiDAR 53L is provided on the front side of the left side surface of the vehicle 1A. The LiDAR 53L senses the left side of the vehicle 1A.

The LiDAR 53R is provided on the front side of the right side surface of the vehicle 1A. The LiDAR 53R senses the right side of the vehicle 1A.

The LiDAR 53B is provided near the center of the rear end of the vehicle 1A. The LiDAR 53B senses the rear of the vehicle 1A.

The camera 151FL is provided near a front left of the driver seat 101 in the vehicle. The camera 151FL captures an image of a periphery of a driver (a person sitting on the driver seat 101).

The camera 151FR is provided near a front right of the passenger seat 102 in the vehicle. The camera 151FR captures an image of a periphery of an occupant sitting on the passenger seat 102.

The camera 151BL is provided near a front of a rear seat 103L on the left side in the vehicle. The camera 151BL captures an image of a periphery of an occupant sitting on the rear seat 103L.

The camera 151BR is provided near a front of a rear seat 103R on the right side in the vehicle. The camera 151BR captures an image of a periphery of an occupant sitting on the rear seat 103R.

Hereinafter, in a case where it is not necessary to individually distinguish the rear seat 103L and the rear seat 103R, they are simply referred to as the rear seat 103.

<Configuration Example of Display in Vehicle>

Figure 4:
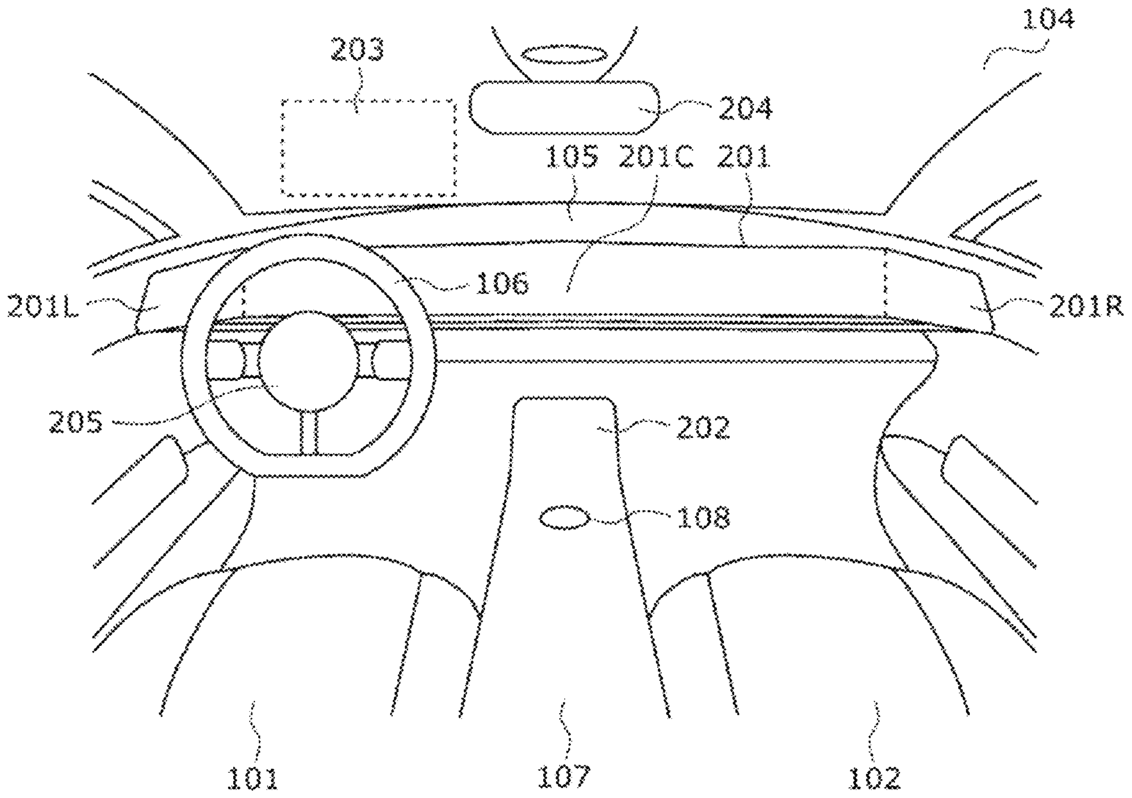
FIG. 4 is a schematic view illustrating a front in the vehicle.
Figure 5:
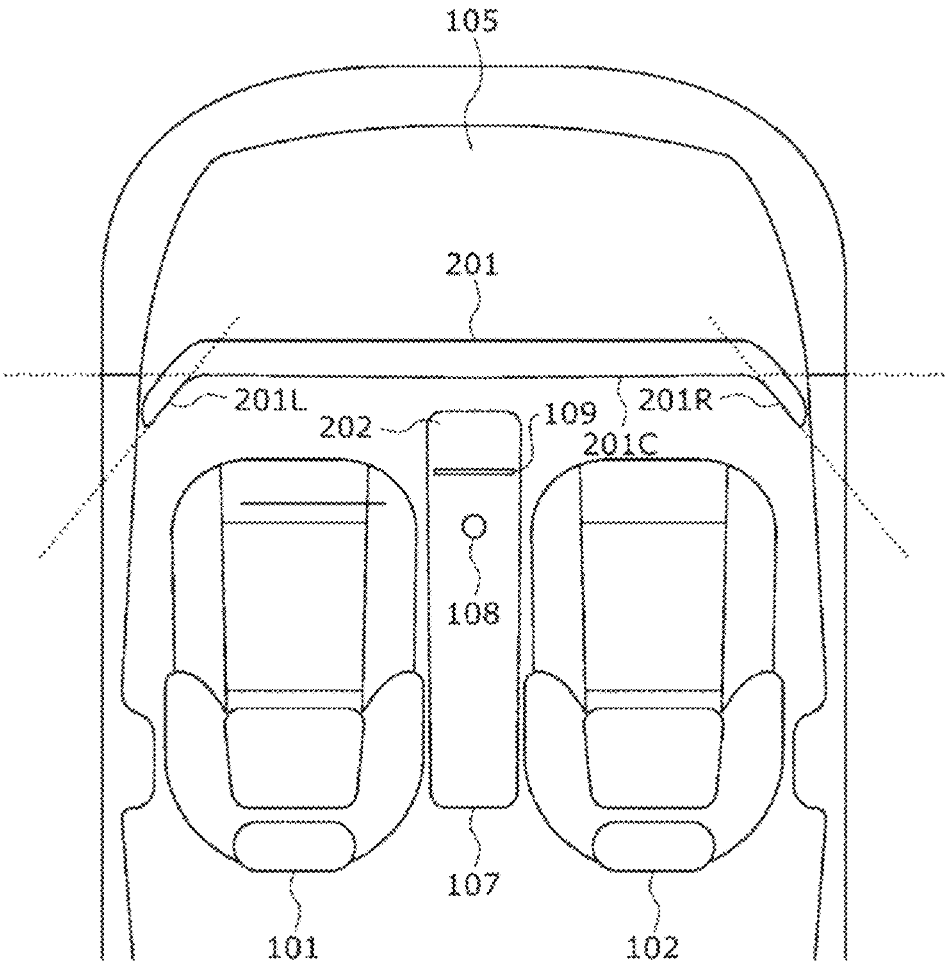
FIG. 5 is a schematic view of a periphery of a driver seat and a passenger seat as viewed from above.
Figure 6:
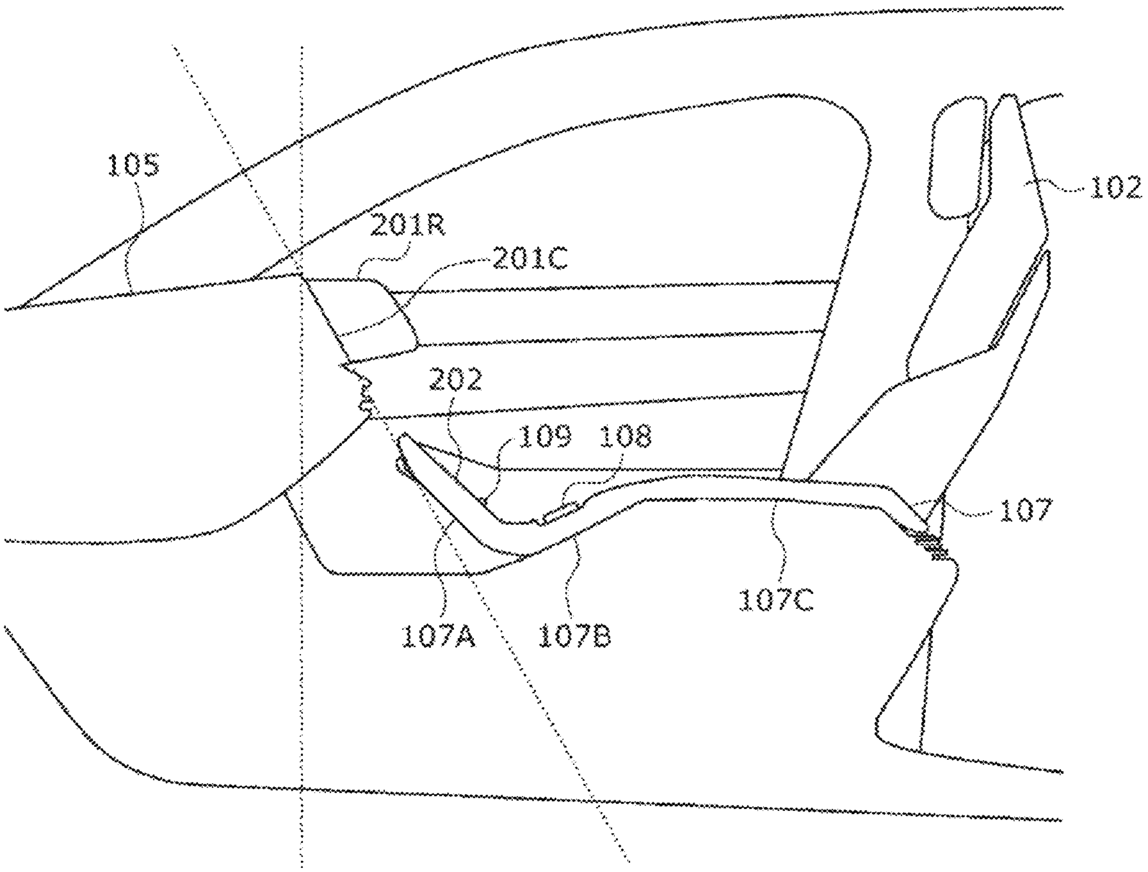
FIG. 6 is a schematic view of the passenger seat as viewed from a left side.
Figure 7:
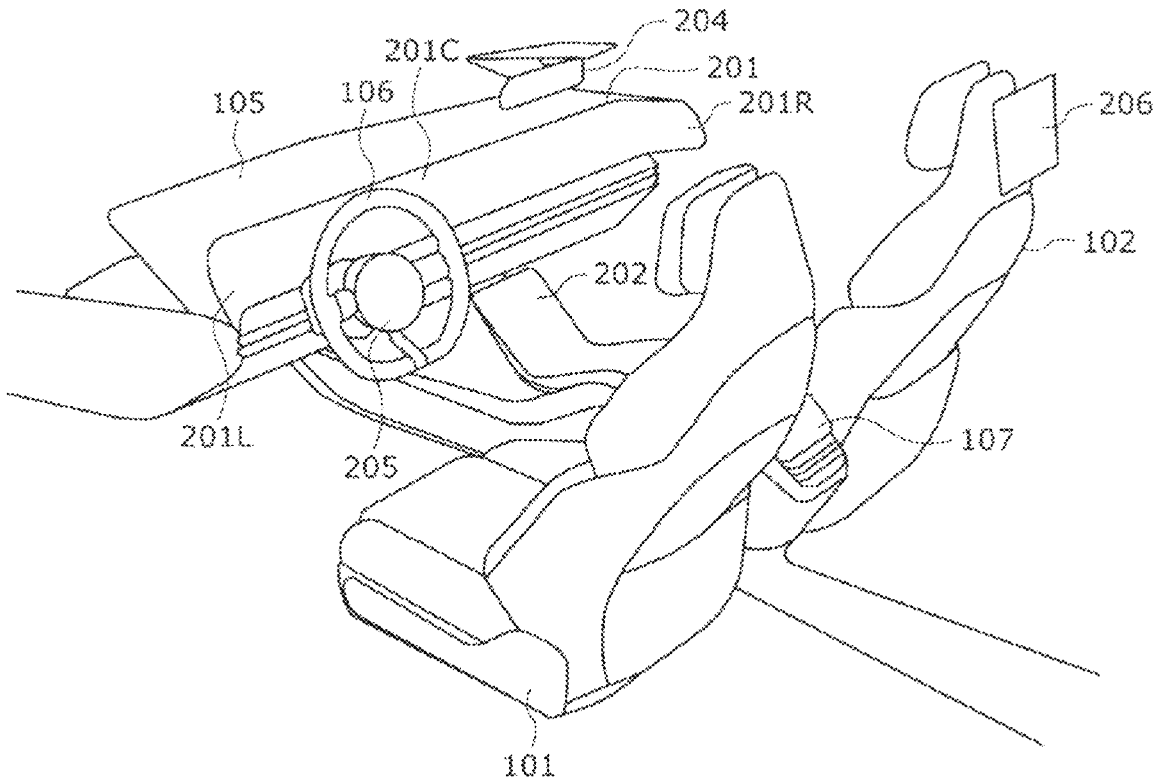
FIG. 7 is a schematic view of the periphery of the driver seat and the passenger seat as viewed from rear left.
Figure 8:
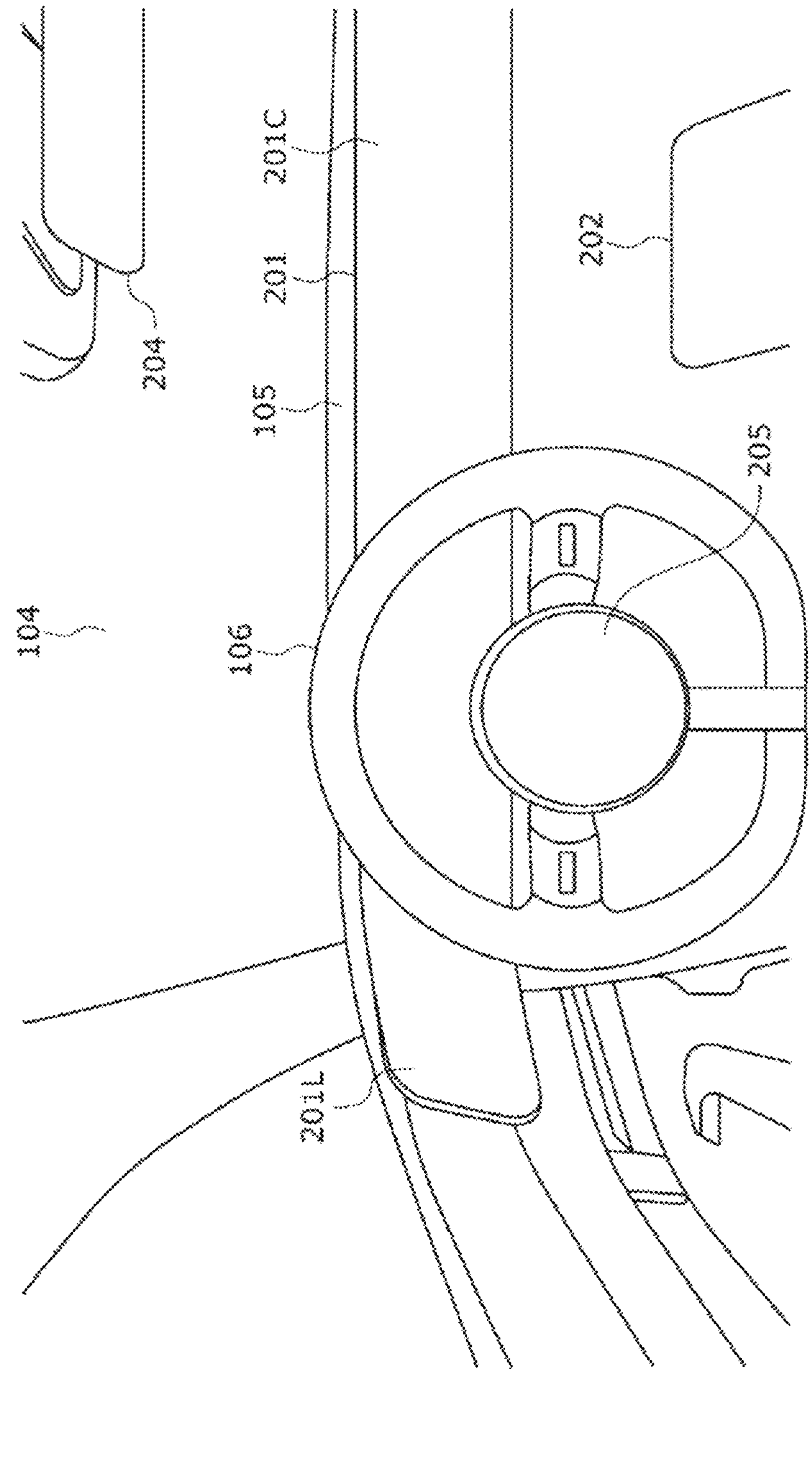
FIG. 8 is a schematic view of the front in the vehicle as viewed from the driver seat.
Figure 9:
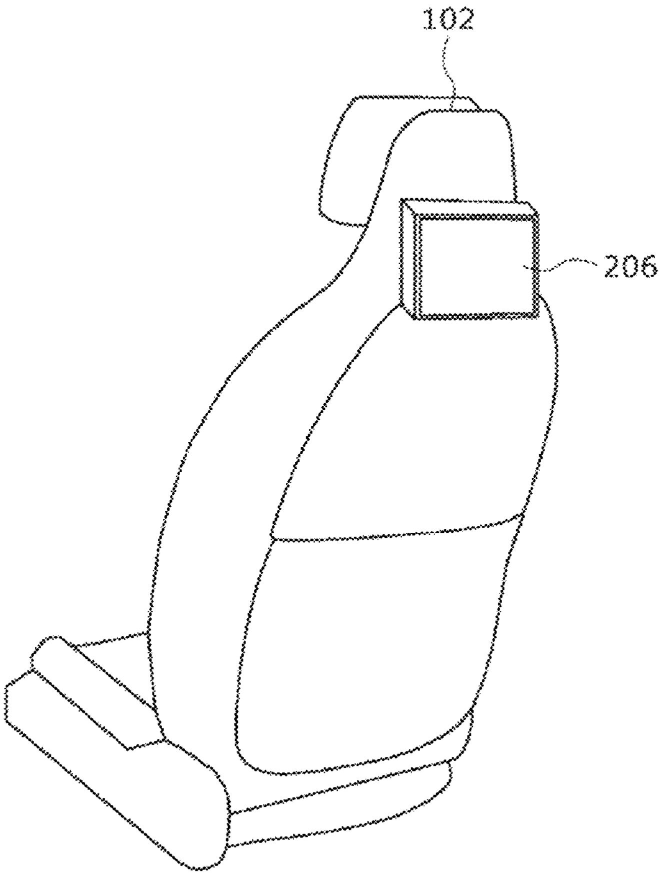
FIG. 9 is a schematic view of the passenger seat as viewed from rear left.

Next, a configuration example of a display (display unit) provided inside the vehicle 1A, forming a part of the HMI 31, and forming a display system of the vehicle 1A will be described with reference to FIGS. 4 to 9. FIG. 4 is a schematic view illustrating the front in the vehicle. FIG. 5 is a schematic view of a periphery of the driver seat 101 and the passenger seat 102 as viewed from above. FIG. 6 is a schematic view of the passenger seat 102 as viewed from the left side. FIG. 7 is a schematic view of the periphery of the driver seat 101 and the passenger seat 102 as viewed from rear left. FIG. 8 is a schematic view of the front in the vehicle 1A as viewed from the driver seat 101. FIG. 9 is a schematic view of the passenger seat 102 as viewed from rear left.

Inside the vehicle, a center display 201, a console display 202, a head-up display (only a display 203 is illustrated), a digital rearview mirror 204, a steering wheel display 205, and a rear entertainment display 206 are provided.

The center display 201 is provided in front of the driver seat 101 and the passenger seat 102 so as to extend to the left and right in front of the dashboard 105. The center display 201 is roughly divided into a left end portion 201L, a center portion 201C, and a right end portion 201R depending on the direction of the display. That is, the center display 201 has a configuration in which the left end portion 201L, the center portion 201C, and the right end portion 201R having different directions are continuous in a left-right direction and integrated. The left end portion 201L, the center portion 201C, and the right end portion 201R can individually display independently, or can display integrally.

The center portion 201C extends left and right in front of the driver seat 101 and the passenger seat 102 from the vicinity of a left end of the driver seat 101 to the vicinity of a right end of the passenger seat 102, and faces rearward as viewed from the driver seat 101 or the passenger seat 102 (rear of the vehicle 1A). Furthermore, the center portion 201C faces diagonally upward as illustrated in FIG. 6. Thus, in a case where the driver sitting on the driver seat 101 and the occupant sitting on the passenger seat 102 look at the center portion 201C, an incident angle of the line of sight approaches vertical, and visibility is improved.

The left end portion 201L and the right end portion 201R are provided substantially symmetrically at both left and right ends of the center display 201. The left end portion 201L bends inward (inside the vehicle) at the left end of the center display 201, is angled inward with respect to the center portion 201C, and faces diagonally backward right (diagonally backward right of the vehicle 1A) as viewed from the driver seat 101 or passenger seat 102. The right end portion 201R bends inward (inside the vehicle) at the right end of the center display 201, is angled inward with respect to the center portion 201C, and faces diagonally backward left (diagonally backward left of the vehicle 1A) as viewed from the driver seat 101 or passenger seat 102.

The angle of the left end portion 201L with respect to the center portion 201C is adjusted so that, for example, the angle of reflection of a standard line of sight of the driver with respect to the angle of incidence on the left end portion 201L is to face an appropriate direction diagonally backward left of the vehicle 1A. The angle of the right end portion 201R with respect to the center portion 201C is adjusted so that, for example, the angle of reflection of a standard line of sight of the driver with respect to the angle of incidence on the right end portion 201R is to face an appropriate direction diagonally backward right of the vehicle 1A.

The console display 202 is provided on the console 107 provided between the driver seat 101 and the passenger seat 102, and is arranged below the center portion 201C of the center display 201.

The console 107 extends in a front-rear direction between the driver seat 101 and the passenger seat 102. As illustrated in FIG. 6, the console 107 is roughly divided into a distal end portion 107A, an intermediate portion 107B, and a rear end portion 107C in order from the front.

The distal end portion 107A of the console 107 is inclined diagonally upward toward the front of the vehicle 1A. The console display 202 is provided at a distal end of the distal end portion 107A. Furthermore, in the distal end portion 107A, behind (below) the console display 202, for example, an operation unit 109 including a plurality of physical switches, keys, and the like (not illustrated) is provided.

The console display 202 includes, for example, a two-dimensional or three-dimensional touch panel, and can be operated by touching or approaching a finger or the like. The console display 202 faces the rear of the vehicle 1A. Furthermore, the console display 202 faces diagonally upward at an angle substantially similar to that of the center portion 201C of the center display 201. Thus, a sense of unity is created in which the center display 201 and the console display 202 are connected in succession. Furthermore, visibility of the console display 202 is improved as in the center portion 201C of the center display 201.

The intermediate portion 107B of the console 107 is inclined diagonally downward toward the front of the vehicle 1A, contrary to the distal end portion 107A. A circular controller 108 is provided near the center of the intermediate portion 107B. The inclination angle of the intermediate portion 107B is set to an angle at which the driver can easily place his or her hand, which improves operability of the controller 108.

The rear end portion 107C of the console 107 is approximately horizontal, for example, so that the driver can easily place his or her arm.

The head-up display includes a display 203 provided in front of the driver seat 101, as illustrated in FIG. 4. For example, the display 203 may be formed by a part of the windshield 104, or may be provided separately from the windshield 104. In the latter case, for example, the display 203 is attached to the windshield 104. Then, by projecting the visual information on the display 203 using the AR technology, the visual information is superimposed and displayed in the field of view of the driver.

Note that the position of the display 203 is set higher than that of the conventional in-vehicle head-up display, for example. This makes it possible to superimpose visual information of a vehicle or the like farther in front of the vehicle 1A (for example, 100 m ahead).

The digital rearview mirror 204 is used in place of the conventional rearview mirror and is also called a smart room mirror. Like the conventional rearview mirror, the digital rearview mirror 204 is provided near an upper end of the windshield 104 and slightly before a center thereof, and is arranged above the center portion 201C of the center display 201.

The steering wheel display 205 is provided in a center portion of the steering wheel 106.

The rear entertainment display 206 is provided on a back surface of the passenger seat 102, more specifically, on a back surface of a headrest of the passenger seat 102, as illustrated in FIG. 7 or 9.

Note that the rear entertainment display 206 can be provided on back surfaces of both the driver seat 101 and the passenger seat 102, or can be provided only on the back surface of the driver seat 101, for example.

Note that the display of the center display 201, the console display 202, the head-up display, the digital rearview mirror 204, the steering wheel display 205, and the rear entertainment display 206 is controlled by, for example, a display control unit that is a part of the functions of the HMI 31.

<Example of Display Contents of Each Display in Vehicle>

Next, an example of display contents of each display in the vehicle will be described with reference to FIGS. 10 to 17.

<Example of Display Contents of Center Display 201>

First, an example of display contents of the center display 201 will be described.

The center portion 201C of the center display 201 displays, for example, information supporting driving, an image of the surroundings of the vehicle 1A, and the like.

Figure 10:
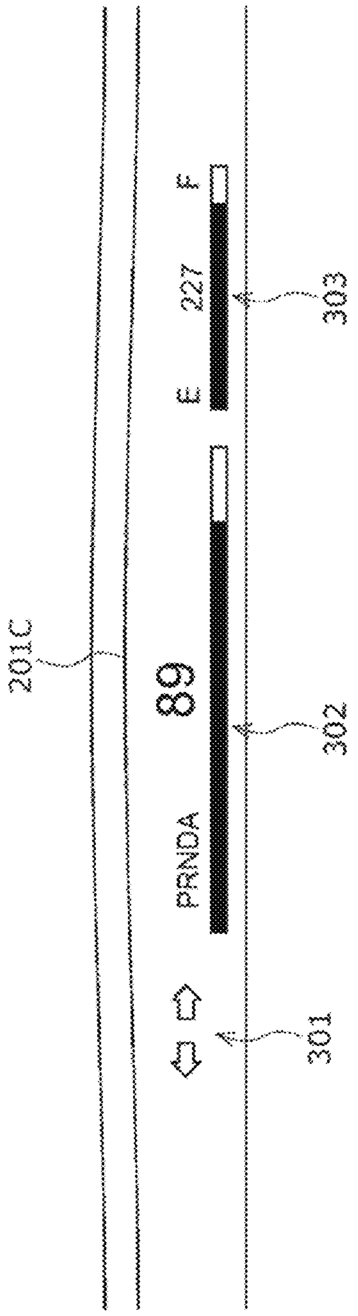
FIG. 10 is a view illustrating an example of display contents in a center portion of a center display.

For example, the center portion 201C displays information regarding a traveling state and the like of the vehicle 1A. For example, as illustrated in FIG. 10, a direction indicator information 301, a speed information 302, and a battery information 303 are displayed side by side.

The direction indicator information 301 indicates an operating state of the direction indicator of the vehicle 1A. The left and right arrows in the direction indicator information 301 blink or light in conjunction with the direction indicators in left-right directions, respectively.

The speed information 302 indicates the speed and shift position of the vehicle 1A. The speed of the vehicle 1A is indicated by bars extending in the left-right direction and numbers. Note that, for example, the speed information 302 may further indicate a speed limit.

The battery information 303 indicates a remaining battery level of the vehicle 1A. The remaining battery level is indicated by bars extending in the left-right direction and numbers.

For example, the center portion 201C displays an image illustrating the situation of the road in front of the vehicle 1A in a case where there is a road extending in the left-right direction in front of the vehicle 1A at a T-junction, a crossroad, or the like. For example, a composite image of images from the camera 51FL, the camera 51FC, and the camera 51FR, that is, an image in a direction of about 180 degrees C. entered on the front of the vehicle 1A as viewed from the vicinity of the distal end of the vehicle 1A is displayed. Thus, the driver can easily recognize a vehicle or the like approaching from the left or right direction on the road ahead.

Note that the T-junction, crossroad, or the like in front of the vehicle 1A is detected by the recognition unit 73 on the basis of, for example, an image from the camera 51M and sensor data from the LiDAR 53F.

Figure 11:
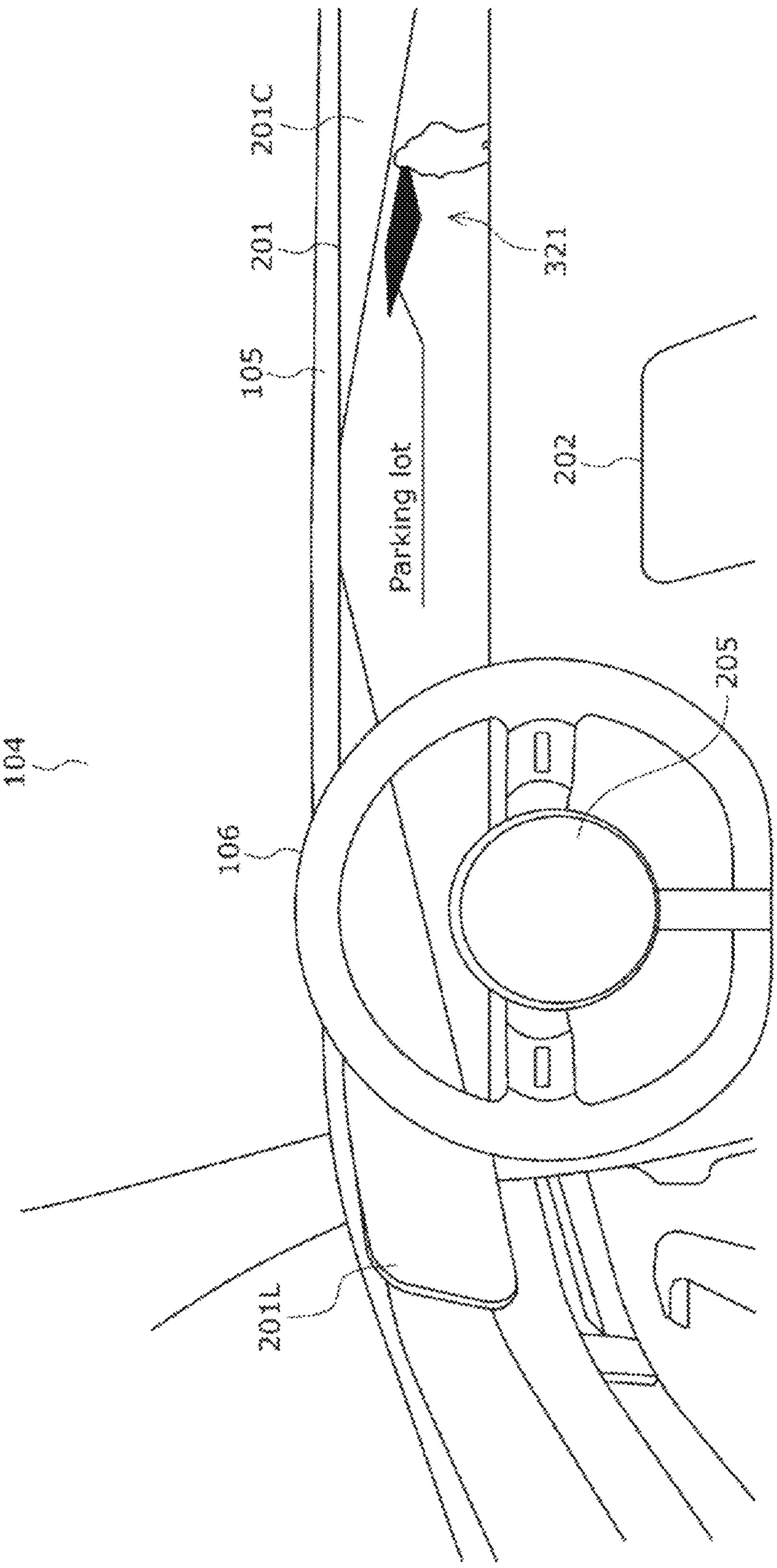
FIG. 11 is a view illustrating an example of display contents in the center portion of the center display.

For example, the center portion 201C displays information to support parking when the vehicle 1A is parked. For example, as illustrated in FIG. 11, images from the camera 51BL, the camera 51BC, and the camera 51BR, that is, images behind the vehicle 1A are displayed. Furthermore, a parking position 321 is displayed by blinking in the images behind the vehicle 1A. A parking position 321 indicates, for example, a position set to park in a case where automatic parking is performed, and indicates a parkable position or a recommended parking position in a case where manual parking is performed.

At this time, for example, an image of 360 degrees around the vehicle 1A captured by each camera 51 (hereinafter referred to as a wide-angle image) may be rotated and displayed on the center portion 201C. Note that the range of the wide-angle image displayed on the center portion 201C may be rotated according to a posture of the driver, for example. Specifically, for example, the range of the wide-angle image displayed in the center portion 201C may be shifted on the basis of the position of the driver with respect to a predetermined reference position, the direction of the head, and the like, to thereby rotate the wide-angle image displayed in the center portion 201C image.

This makes it possible to confirm the parking position, easily find an appropriate parking position, and safely park the vehicle 1A.

Note that the parking position 321 is detected by the recognition unit 73 on the basis of, for example, images from the camera 51BL, the camera 51BC, and the camera 51BR, and sensor data from the LiDAR 53B.

For example, the center portion 201C displays images from the camera 51BL, the camera 51BC, and the camera 51BR, that is, images behind the vehicle 1A when the vehicle 1A backs.

Figure 12:
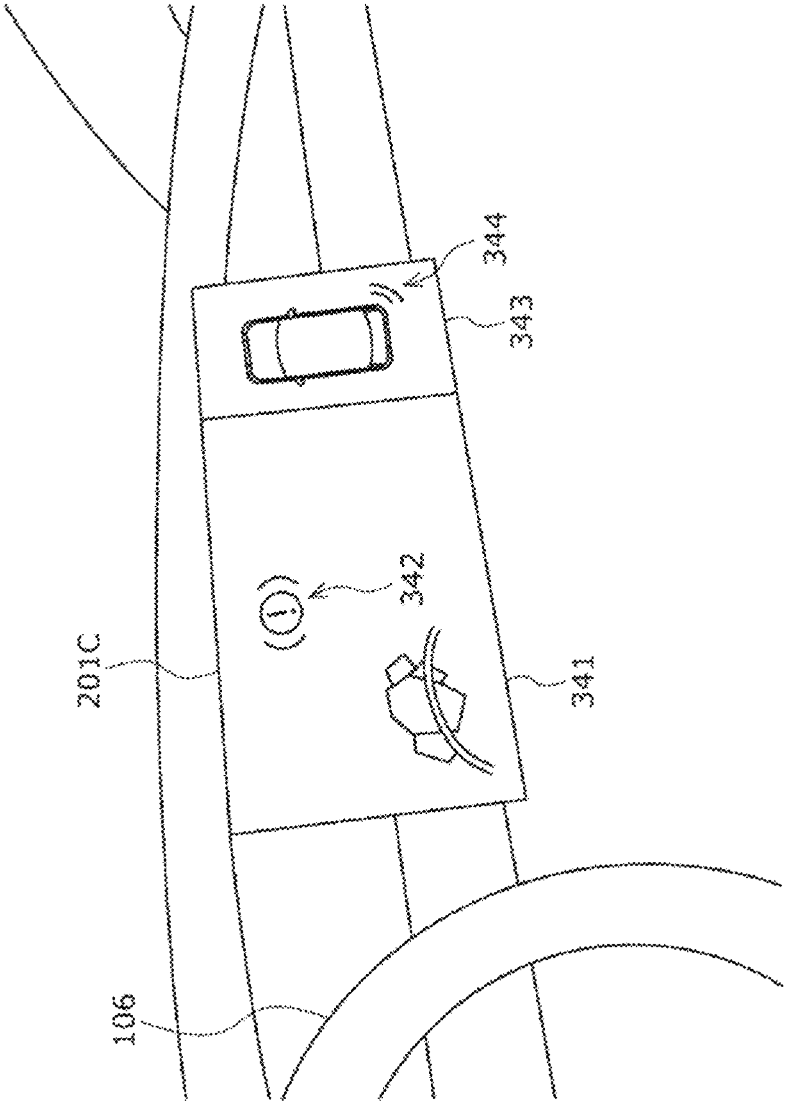
FIG. 12 is a view illustrating an example of display contents in the center portion of the center display.

For example, as illustrated in FIG. 12, an image 341 behind vehicle 1A is displayed. Furthermore, for example, in a case where an obstacle is detected behind the vehicle 1A, an alert display 342 blinks in the image 341. Furthermore, an image 343 illustrating the position of an obstacle is displayed. The vehicle in the image 343 illustrates the vehicle 1A. Then, the alert display 344 indicating the position of the obstacle blinks around the vehicle in the image 343. In this example, it is illustrated that there is an obstacle at diagonally backward right of the vehicle 1A.

Thus, the driver can safely back the vehicle 1A.

Note that an obstacle behind the vehicle 1A is detected by the recognition unit 73 on the basis of, for example, images from the cameras 51BL, 51BC, and 51BR, and sensor data from the radar 52BL, the radar 52BC, the radar 52BR, and the LiDAR 53B.

For example, in a case where a siren of an emergency vehicle (for example, an ambulance, a fire engine, a police car, or the like) is detected, the center portion 201C displays information indicating the direction of the sound source of the siren. Thus, the driver can accurately recognize the direction of the emergency vehicle and can appropriately take measures such as retreat.

Note that the direction of the sound source of the siren is detected by the recognition unit 73 on the basis of voice detected by the microphone included in the external recognition sensor 25, for example.

For example, the center portion 201C displays an alert in a case where a person is detected in the shadow around the vehicle 1A. For example, information or the like indicating the direction in which a person is present is displayed as an alert display. Thus, the driver can avoid a collision or contact with a person in the shadow.

Note that the person in the shadow is detected by the recognition unit 73 on the basis of the sensor data from each radar 52 and each LiDAR 53, for example.

For example, the center portion 201C displays an alert when an object (for example, an animal existing in the dark or the like) that is difficult for the human eye to see is detected in a case where the surroundings of the vehicle 1A are dark. For example, in a case where an image in front of the vehicle 1A captured by the camera 51M is displayed, a frame or the like indicating the position of the detected object is superimposed as an alert display. Thus, the driver can avoid collision or contact with the detected object.

Note that an object that is difficult to see is detected by the recognition unit 73, for example, on the basis of the difference in brightness in the image from the camera 51M.

For example, the center portion 201C displays information indicating a predicted traveling direction in a case where a lane keep assist (LKA) function is operating when the vehicle 1A backs. The traveling direction is indicated by, for example, a line or an arrow. Thus, the driver can know the direction of backing in advance, and can appropriately respond to an emergency or danger, for example.

For example, the center portion 201C displays images from the cameras 151FL and the cameras 151FR installed in the rear seat 103. Thus, the driver can monitor, for example, the state of a child sitting on the rear seat 103.

Note that for example, in a case where the center portion 201C displays an image around the vehicle 1A, the display range of the image may be changed on the basis of at least one of the line-of-sight direction or the posture of the driver.

The line-of-sight direction and posture of the driver are recognized by the DMS 30, for example, on the basis of an image from the camera 151FL. Furthermore, as the posture of the driver, for example, the position and direction of the head, the sitting position, and the like are recognized.

Furthermore, it is possible to divide the center portion 201C into three, a driver seat area in front of the driver seat 101, a central area between the driver seat 101 and the passenger seat 102, and a passenger seat area in front of the passenger seat 102, depending on the situation. The driver seat area, the central area, and the passenger seat area can individually display independently.

Information mainly for the driver is displayed in the driver seat area. For example, the above-described information for supporting driving is displayed.

In the central area, for example, information related to infotainment (vehicle-mounted infotainment) such as audio, video, website, and map is displayed.

In the passenger seat area, for example, infotainment-related information for the occupant in the passenger seat is displayed.

The left end portion 201L and the right end portion 201R of the center display 201 are mainly used as digital outer mirrors (electronic side mirrors) that replace the conventional side mirrors. That is, the left end portion 201L and the right end portion 201R are used for CMS. For example, the left end portion 201L displays an image of diagonally backward left of the vehicle 1A captured by the camera 51SL. The right end portion 201R displays an image of diagonally backward right of the vehicle 1A captured by the camera 51SR.

Note that the left end portion 201L, the center portion 201C, and the right end portion 201R of the center display 201 are continuous in a horizontal direction. Therefore, in a case where the driver shifts the line of sight from the center portion 201C to the left end portion 201L or the right end portion 201R, or shifts the line of sight from the left end portion 201L or the right end portion 201R to the center portion 201C, the driver is only required to move the line of sight in the horizontal direction. Consequently, the moving distance and moving direction of the line of sight of the driver are reduced, and visibility is improved.

Furthermore, for example, the left end portion 201L displays an alert in a case where a vehicle, a motorcycle, a bicycle, a pedestrian, or the like approaching from the left side or the rear of the vehicle 1A is detected.

Figure 13:
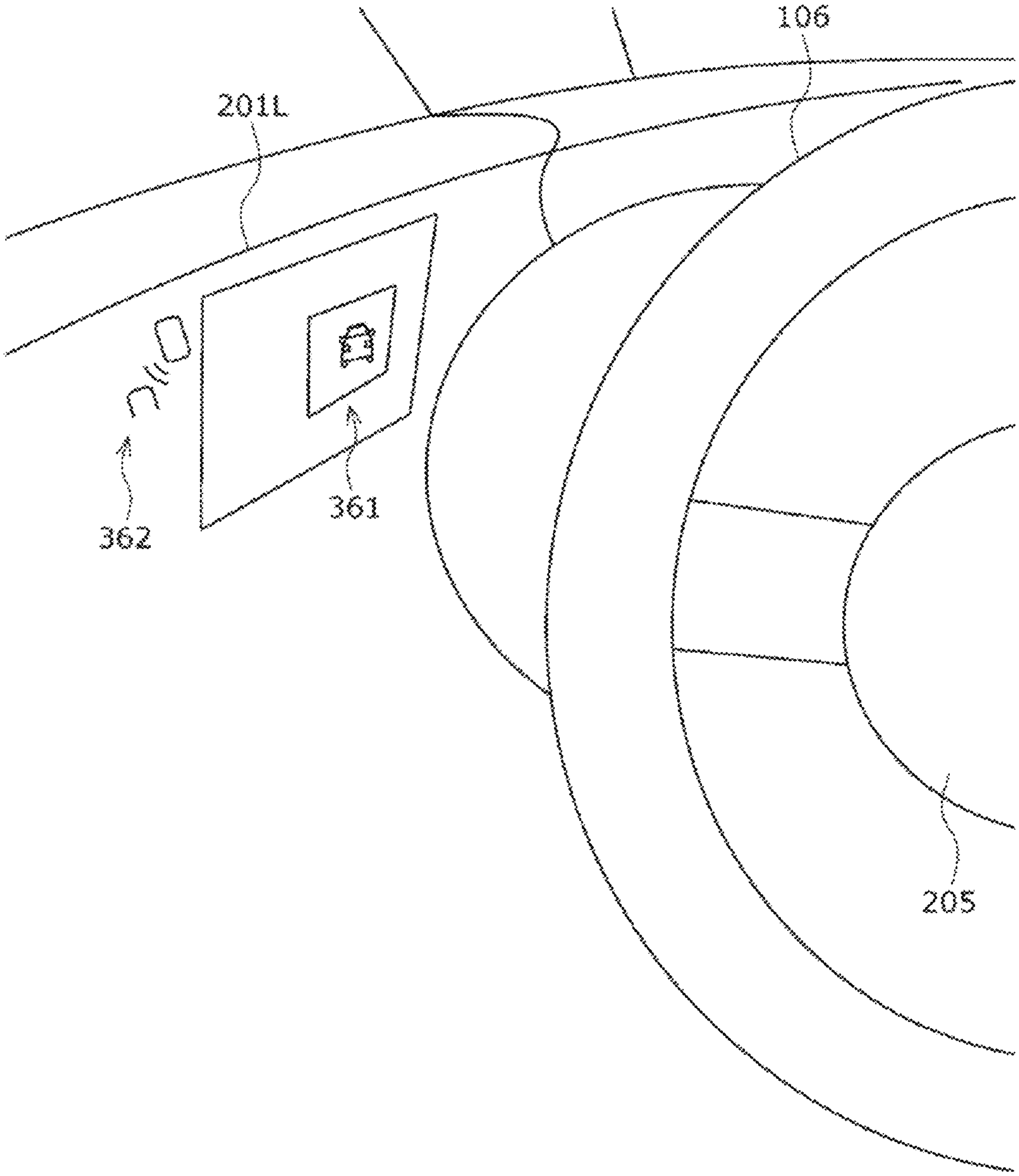
FIG. 13 is a view illustrating an example of display contents at a left end portion of the center display.

For example, in a case where a vehicle is approaching from diagonally left behind the vehicle 1A, a frame 361 that calls attention to the approaching vehicle is displayed as illustrated in FIG. 13. Furthermore, an icon 362 indicating the position of the approaching vehicle is displayed by blinking. A square in the upper right corner of the icon 362 illustrates the vehicle 1A, and a square in the lower left half illustrates the approaching vehicle.

Similarly, the right end portion 201R displays an alert in a case where a vehicle, a motorcycle, a bicycle, a pedestrian, or the like approaching from the right side or the rear of the vehicle 1A is detected.

Note that a vehicle approaching from the left or right side and the rear of the vehicle 1A is detected by the recognition unit 73, for example, on the basis of images from the camera 51SL, the camera 51SR, the camera 51BL, the camera 51BC, and the camera 51BR, as well as sensor data from the radar 52BL, the radar 52BC, the radar 52BR, and the LiDAR 53B, and the like.

Note that imaging capturing directions of the camera 51SL and the camera 51SR are adjusted by, for example, the display control unit on the basis of at least one of the line-of-sight direction or the posture of the driver. Thus, the range of the image displayed on the left end portion 201L and the right end portion 201R is appropriately adjusted according to the line-of-sight direction and posture of the driver, as in the conventional physical side mirror. Consequently, the driver can check the situation in a desired range diagonally behind the vehicle 1A without feeling any discomfort.

Furthermore, for example, the display ranges of images of the left end portion 201L and the right end portion 201R are changed on the basis of operation of the direction indicator. For example, in a case where the direction indicator is not operating, a normal angle of view is set, and in a case where the direction indicator is operating, the angle of view is widened. Thus, the driver can accurately recognize the situation around the vehicle 1A and safely change the traveling direction of the vehicle 1A.

Note that since the left end portion 201L, the center portion 201C, and the right end portion 201R are connected to one, it is possible to display one screen on the entire center display 201. For example, it is possible to display an image of surroundings of the vehicle 1A, map information, infotainment-related information, and the like on the entire center display 201.

<Example of Display Contents of Console Display 202>

Next, an example of display contents of the console display 202 will be described.

For example, the console display 202 displays an operation screen for operating air conditioning equipment in the vehicle. An occupant such as a driver operates the air conditioner in the vehicle by using the displayed operation screen.

Note that for example, at least a part of operation of the air conditioner in the vehicle can be performed by using the operation unit 109.

For example, the console display 202 displays an operation screen for operating the information displayed on the center display 201. For example, an occupant such as a driver performs scrolling, enlarging, reducing, switching, and the like of information (for example, a map, and the like) displayed on the center portion 201C of the center display 201 by using the displayed operation screen.

As described above, the center display 201 and the console display 202 have a sense of unity. Therefore, the occupant can operate the information displayed on the center display 201 by using the operation screen of the console display 202 with a natural feeling, and the operability is improved.

Note that the controller 108 can be pushed, turned, and tilted in a predetermined direction (for example, front, back, left, and right), and is used, for example, for operating an audio system in the vehicle. For example, when the controller 108 is pressed, the music is played or stopped, and the volume is adjusted by turning the controller 108.

<Example of Display Contents of Head-Up Display>

The display 203 of the head-up display displays, for example, information that supports driving.

For example, the display 203 displays an alert according to the situation around the vehicle 1A.

Figure 14:
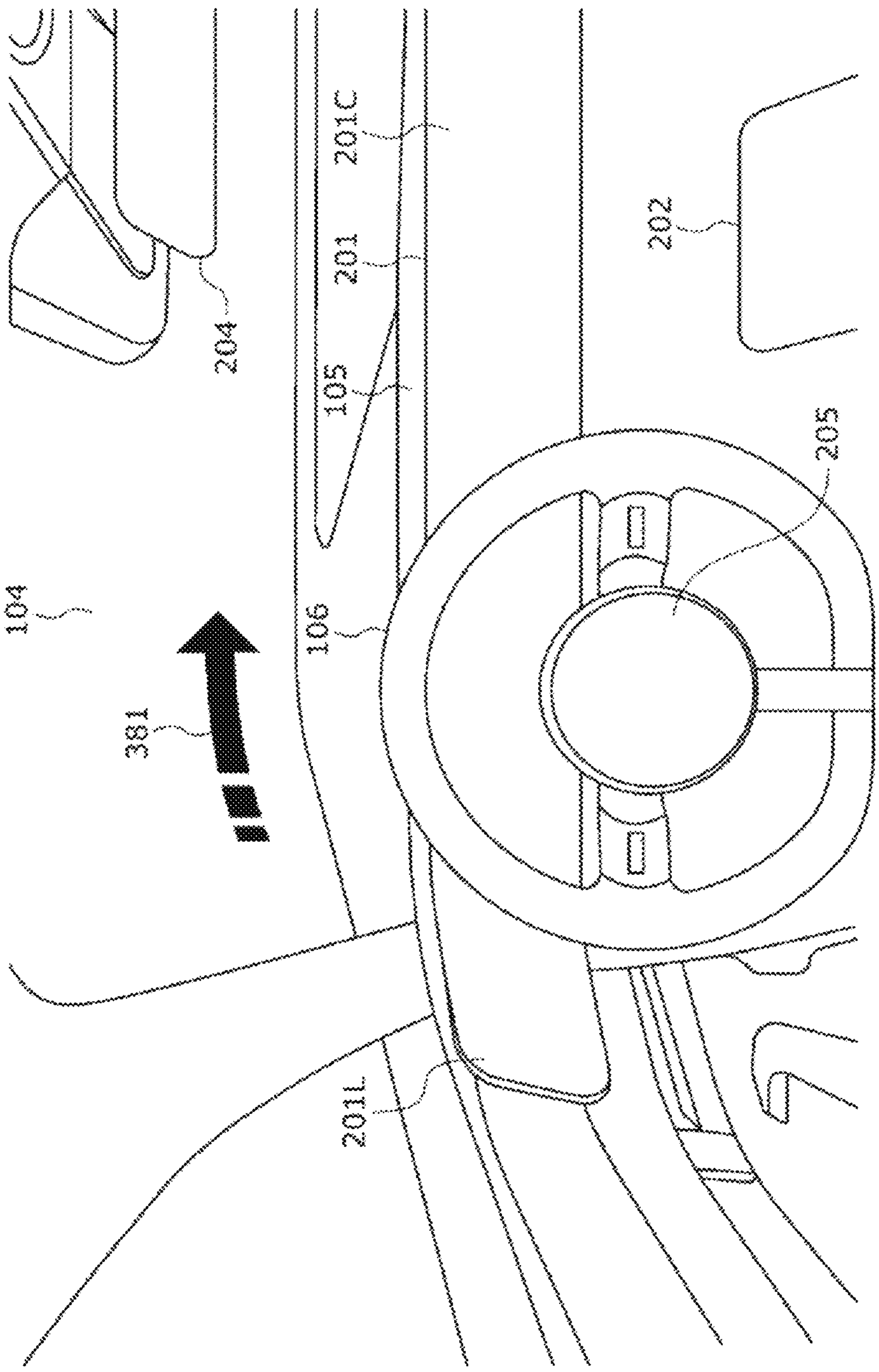
FIG. 14 is a view illustrating an example of display contents of a head-up display.

For example, as illustrated in FIG. 14, in a case where there is a sharp curve in front of the vehicle 1A, an alert display 381 is displayed. The alert display 381 indicates a direction of a curve with an arrow, and indicates a curvature of the curve with a shape (for example, length, thickness, and the like) and color of the arrow. Thus, the driver can recognize the existence of a sharp curve in advance and can drive the sharp curve safely.

Figure 15:
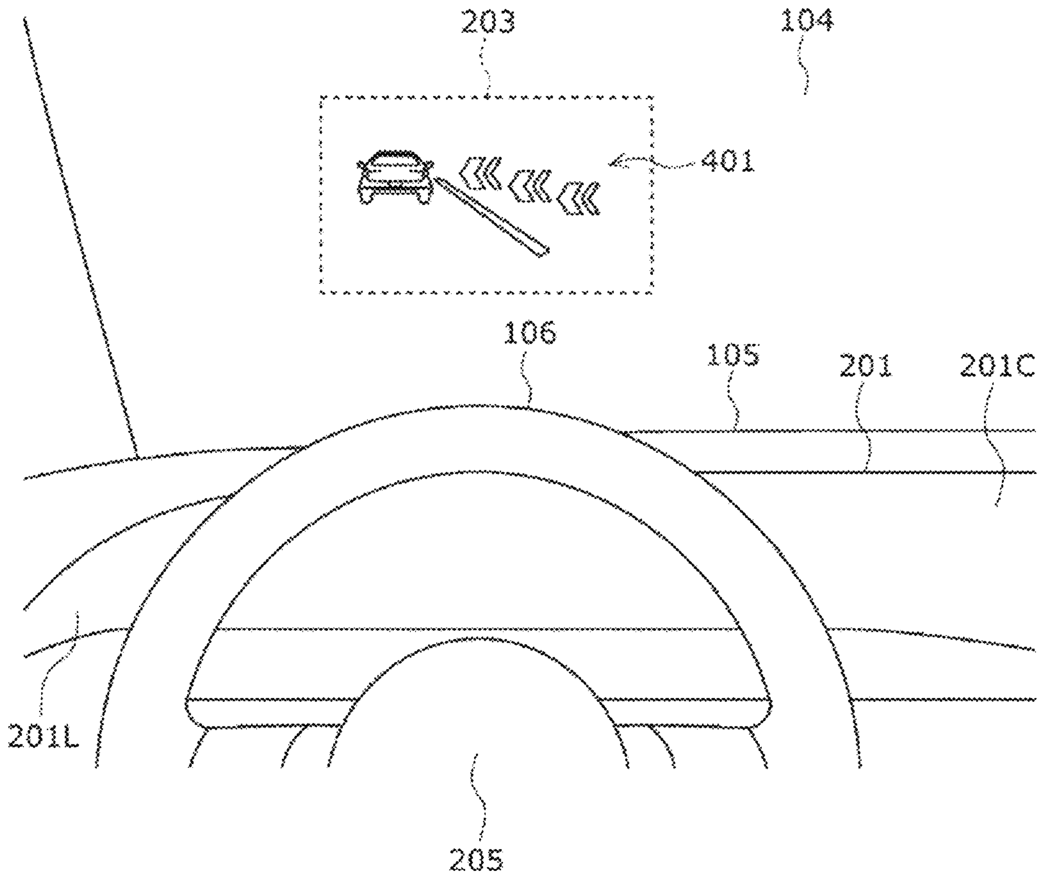
FIG. 15 is a view illustrating an example of display contents of the head-up display.

For example, as illustrated in FIG. 15, in a case where a large vehicle such as a truck exists in a lane adjacent to the traveling lane of the vehicle 1A, the alert display 401 is displayed by blinking. The alert display 401 is an alert display for giving notification that a large vehicle such as a truck is approaching in the lane to the right of the vehicle 1A. Thus, the driver can recognize the approach of the large vehicle in advance, and can avoid a collision or contact with the large vehicle.

For example, the display 203 displays an alert giving notification that emergency braking has been applied when the emergency braking of the vehicle 1A is applied. Thus, the driver is notified of the cause of emergency stop, which can give the driver a sense of security.

For example, the display 203 displays information indicating a vehicle in front to be followed while the ACC (Adaptive Cruise Control) is in operation. For example, a frame or the like surrounding the following vehicle is displayed. Thus, the driver can confirm the operation of the ACC and predict the route of the vehicle 1A, and can appropriately respond to, for example, an emergency, a danger, or the like.

For example, the display 203 displays a route to travel by an arrow or the like, if necessary, while the lane change support function is operating. Thus, the driver can recognize the lane change in advance, and can appropriately take measures such as an emergency or a dangerous situation, for example.

<Example of Display Contents of Digital Rearview Mirror 204>

The digital rearview mirror 204 displays, for example, an image behind the vehicle 1A captured by the camera 51BC.

Figure 16:
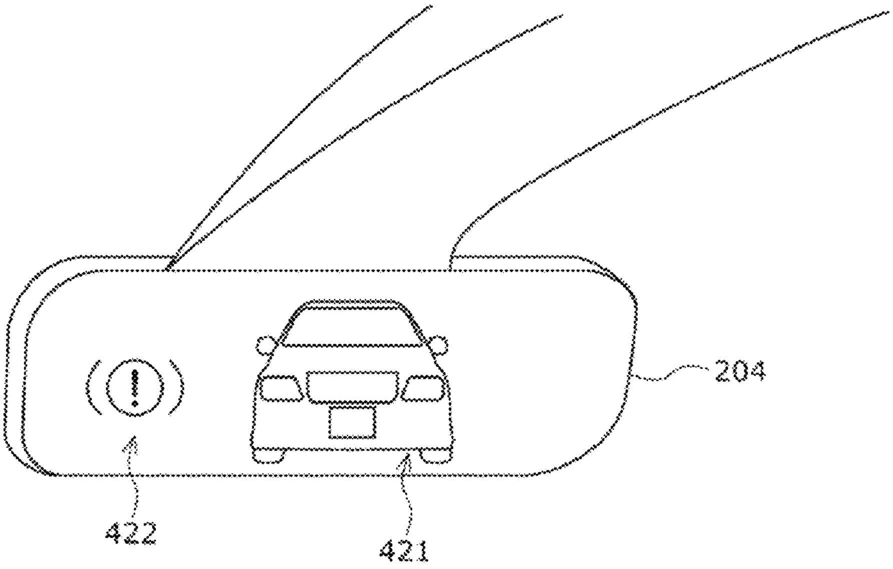
FIG. 16 is a view illustrating an example of display contents of a digital rearview mirror.

For example, the digital rearview mirror 204 displays an alert in a case where another vehicle is approaching behind the vehicle 1A. For example, as illustrated in FIG. 16, in a case where an inter-vehicle distance of the vehicle 1A to a vehicle 421 behind the vehicle 1A becomes less than a predetermined threshold value, an alert display 422 that calls attention of the driver blinks.

Note that the inter-vehicle distance to the vehicle behind is detected by the recognition unit 73 on the basis of sensor data from the radar 52BC and the LiDAR 53B, for example.

Furthermore, for example, an image capturing direction of the camera 51BC is adjusted on the basis of at least one of the line-of-sight direction or the posture of the driver. Thus, the range of the image displayed on the digital rearview mirror 204 is appropriately adjusted according to the line-of-sight direction or posture of the driver, as in a conventional physical rearview mirror. Consequently, the driver can confirm a situation in a desired range behind the vehicle 1A without feeling any discomfort.

<Example of Display Contents of Steering Wheel Display 205>

The steering wheel display 205 displays, for example, a message to the driver. Thus, the driver and vehicle 1A can communicate with each other.

Figure 17:
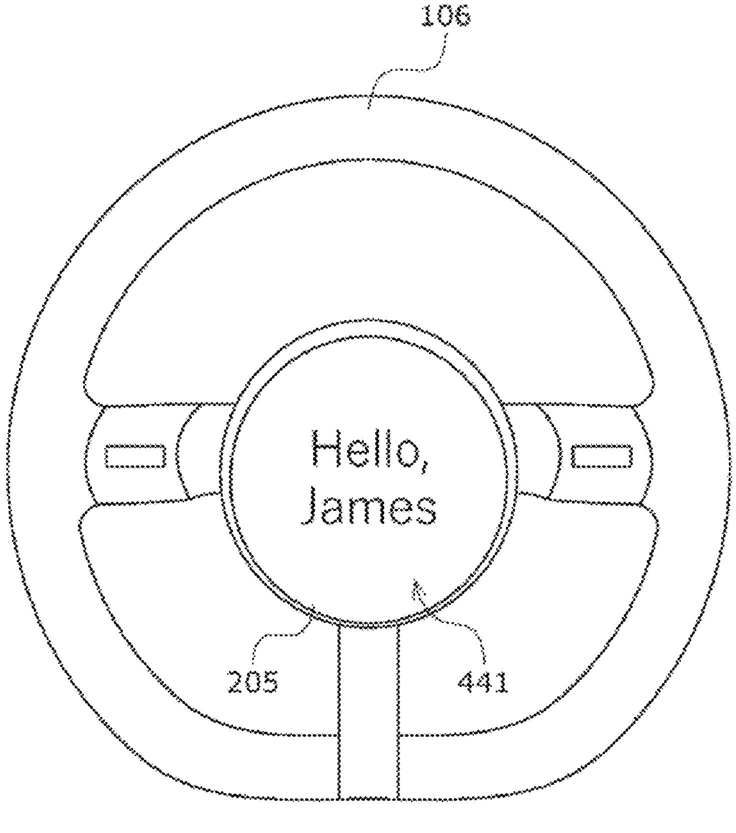
FIG. 17 is a view illustrating an example of display contents of a steering wheel display.

For example, in a case where a driver is recognized by the DMS 30, the steering wheel display 205 displays a message 441 containing the name of the recognized driver, as illustrated in FIG. 17.

Figure 18:
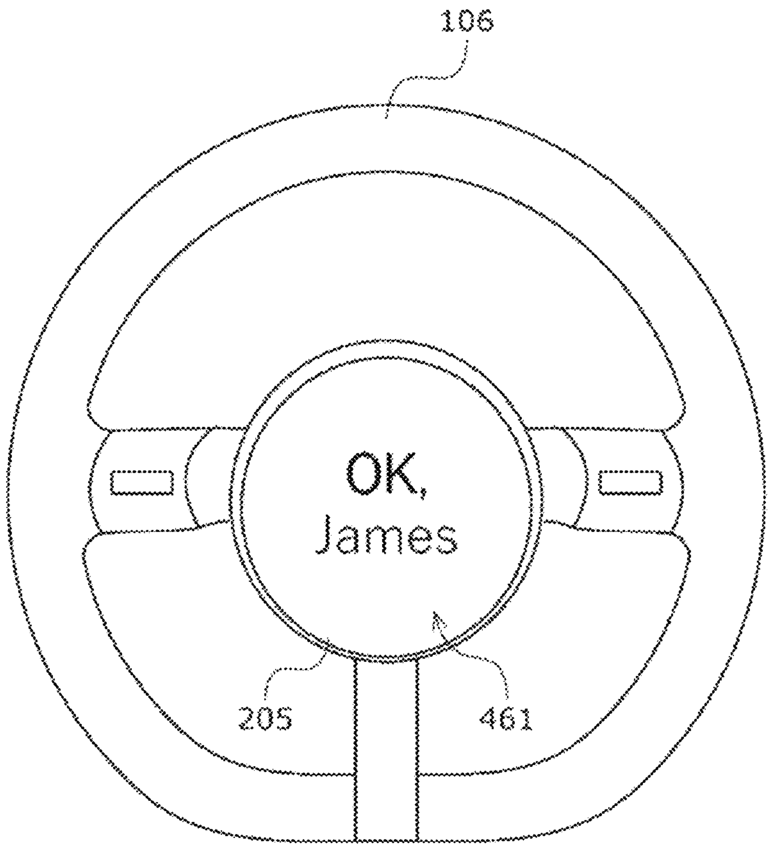
FIG. 18 is a view illustrating an example of display contents of the steering wheel display.

For example, in a case where the driver inputs a voice command, the steering wheel display 205 displays a message 461 indicating that the voice command has been accepted, as illustrated in FIG. 18.

Furthermore, for example, the steering wheel display 205 displays a message indicating confirmation and completion of payment of tolls for expressways, toll roads, parking lots, and the like.

<Example of Display Contents of Rear Entertainment Display 206>

For example, the rear entertainment display 206 displays infotainment-related information for an occupant on the rear seat 103.

Figure 19:
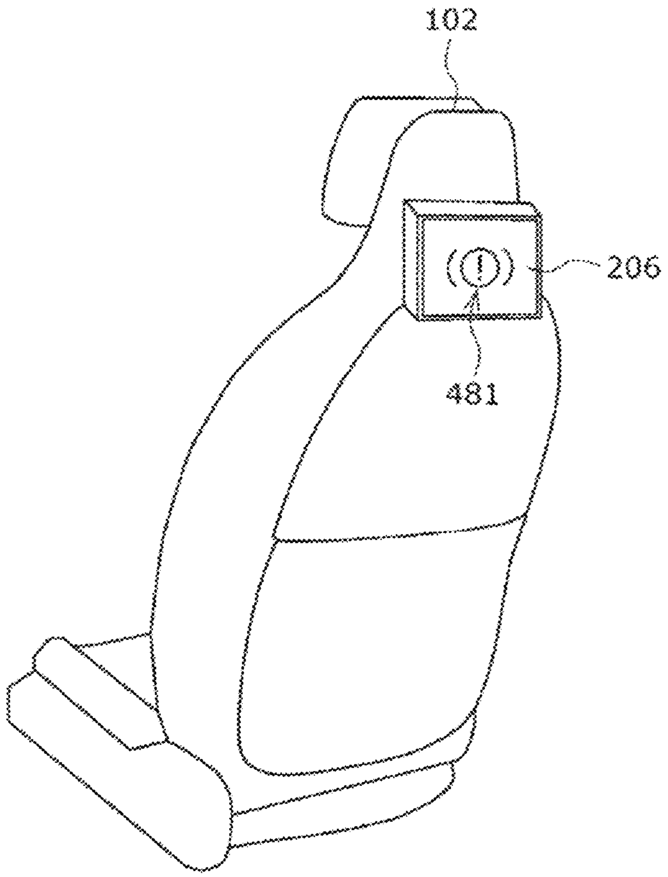
FIG. 19 is a view illustrating an example of display contents of a rear entertainment display.

For example, the rear entertainment display 206 displays an alert in an emergency, danger, or the like. For example, as illustrated in FIG. 19, an alert display 481 that calls attention of the occupant on the rear seat 103 is displayed by blinking at the time of an emergency stop.

As described above, by displaying various information on each display in the vehicle, it is possible to improve convenience for an occupant such as a driver. For example, it is possible to support the driving of the vehicle 1A, provide necessary information to the occupant, and entertain the occupant.

3. Modification Example of First Embodiment

Hereinafter, modification examples of the first embodiment of the present technology described above will be described.

The present technology can be applied to, for example, a mobile apparatus other than a vehicle on which a person is boarded.

Furthermore, the present technology can also be applied to, for example, a mobile apparatus that performs autonomous driving in which an occupant does not perform driving. In this case, the distinction between the driver seat 101 and the passenger seat 102 as described above does not exist, and the various displays described above are arranged in front of seats or the like in the mobile apparatus. Furthermore, for example, the display range or the like of the image displayed on the display is changed on the basis of the line-of-sight direction and posture of the person sitting on a predetermined seat.

4. Second Embodiment

Next, a second embodiment of the present technology will be described with reference to FIGS. 20 to 53.

Note that in each of the drawings of the second embodiment, the same reference numerals are given to the parts corresponding to those of the first embodiment, and description thereof will be omitted as appropriate.

<Configuration Example of Exterior of Vehicle 1B>

First, a configuration example of an exterior of a vehicle 1B, which is the second embodiment of the vehicle 1 to which the present technology is applied, will be described with reference to FIGS. 20 to 26. In the following, a configuration of the external lighting system of the vehicle 1B will be mainly described.

Figure 20:
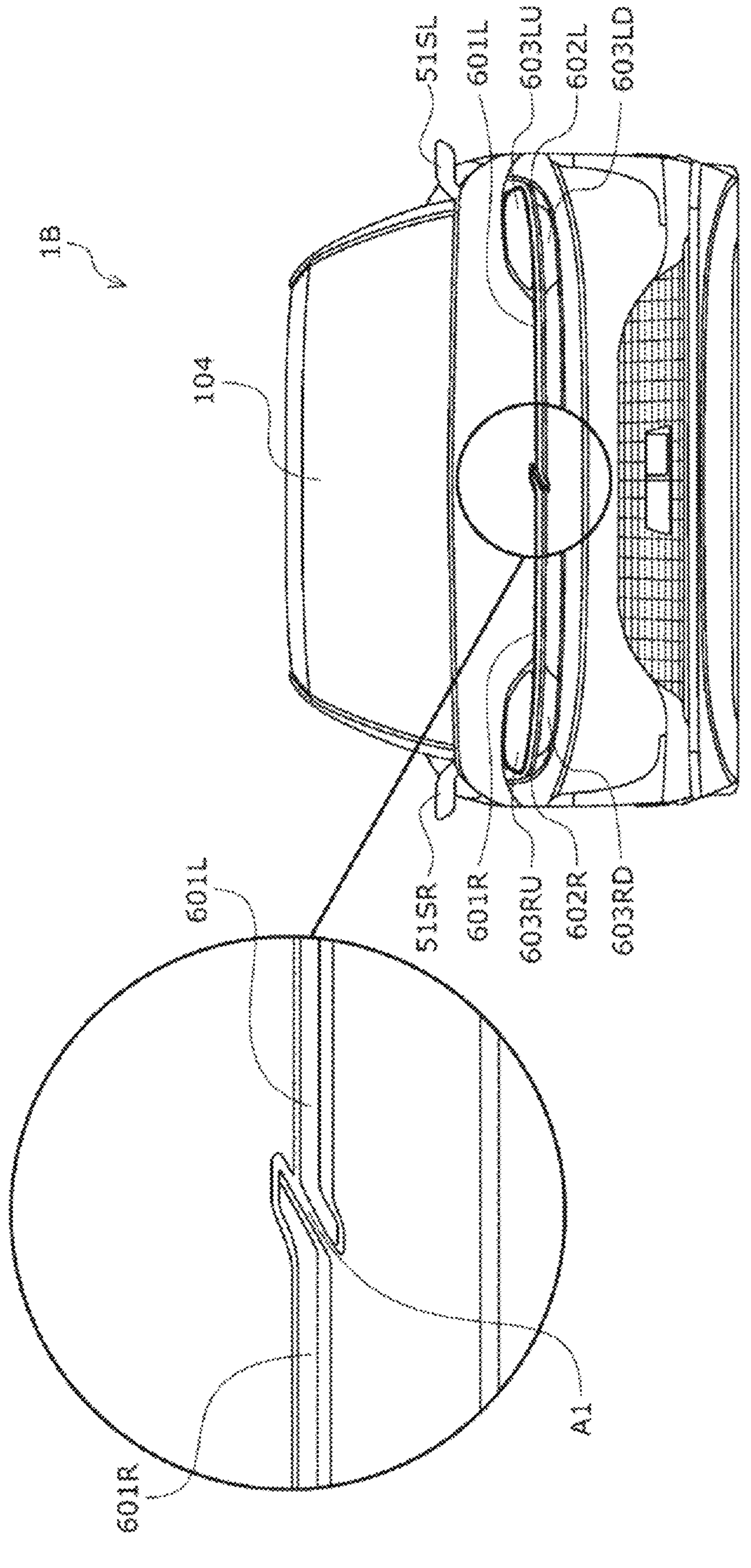
FIG. 20 is a front view of the vehicle and an enlarged view of the vicinity of a logo.
Figure 21:
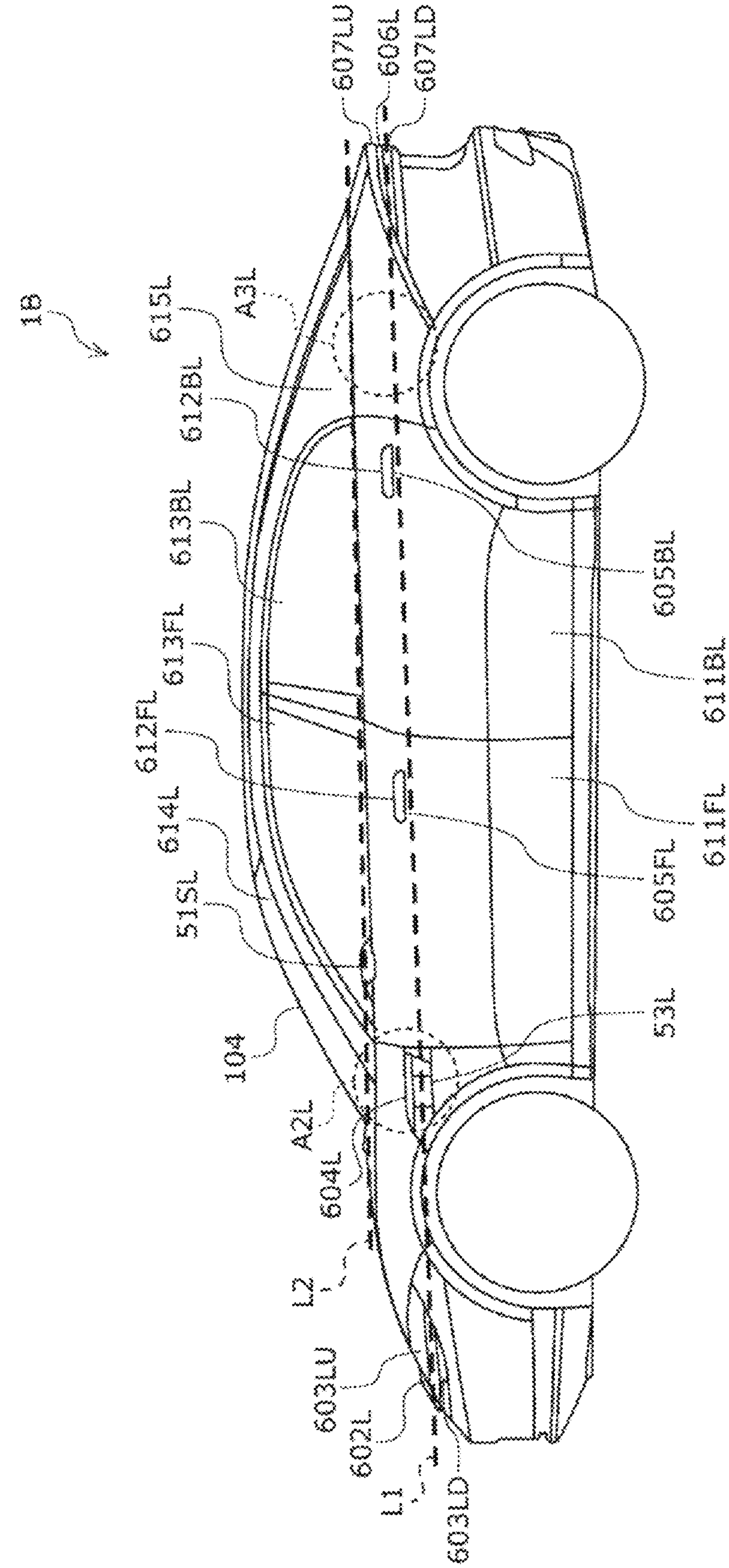
FIG. 21 is a left side view of the vehicle.
Figure 22:
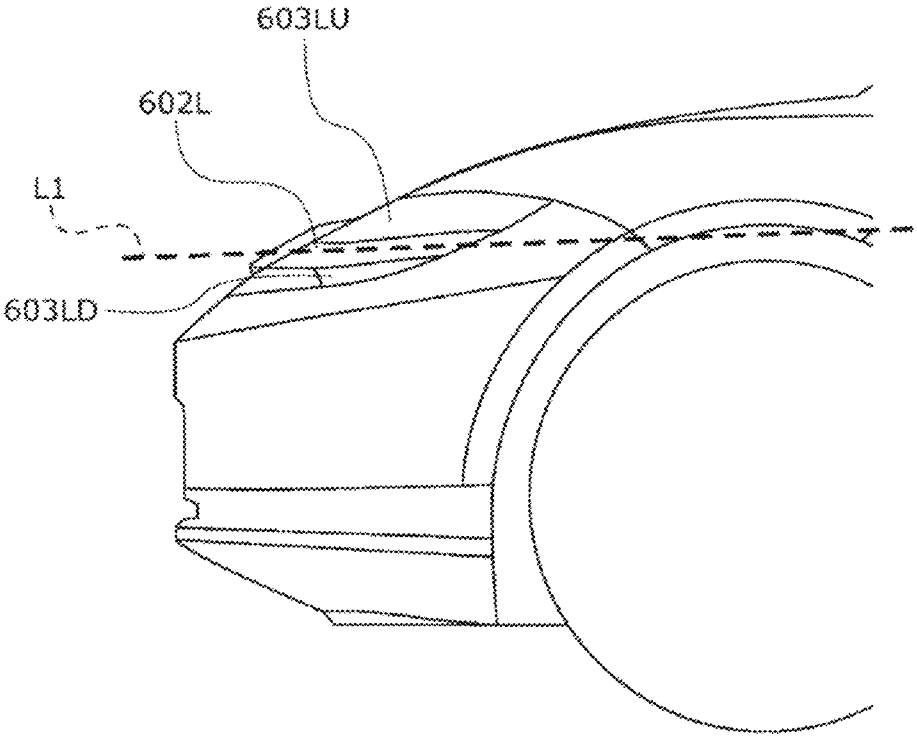
FIG. 22 is an enlarged view of a distal end portion of a left side surface of the vehicle.
Figure 23:
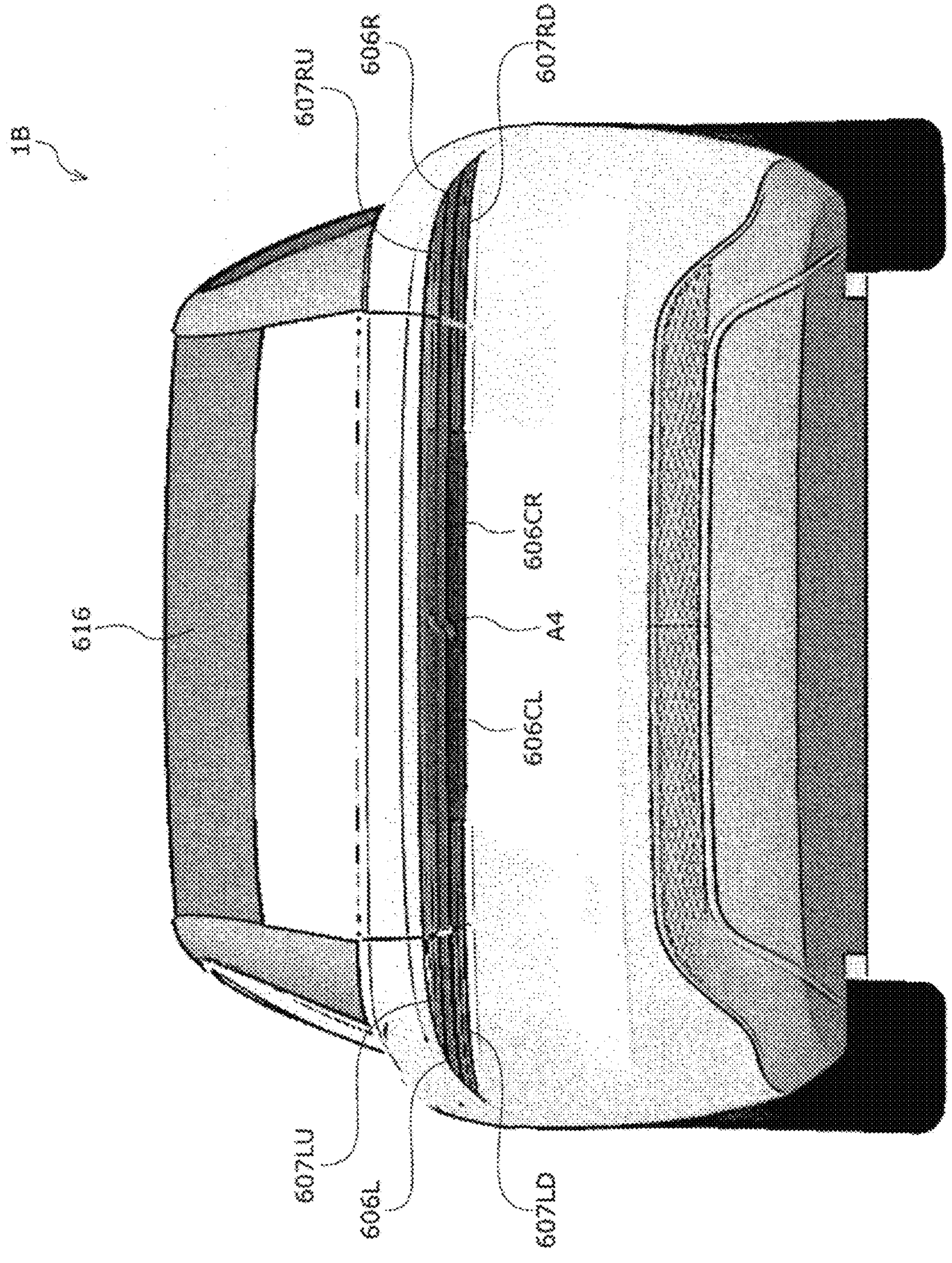
FIG. 23 is a rear view of the vehicle.
Figure 24:
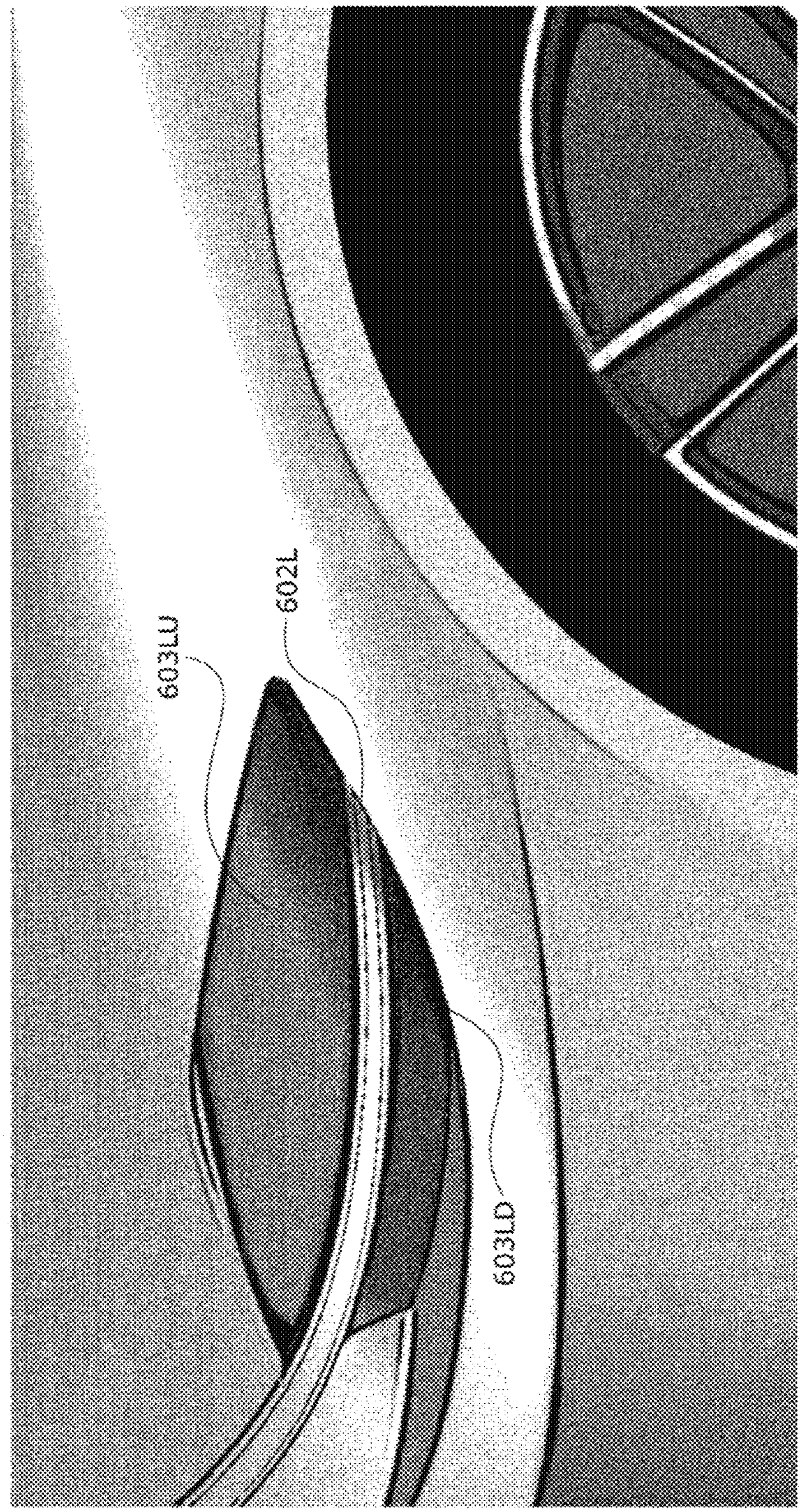
FIG. 24 is a view near a headlight on a left side of the vehicle.
Figure 25:
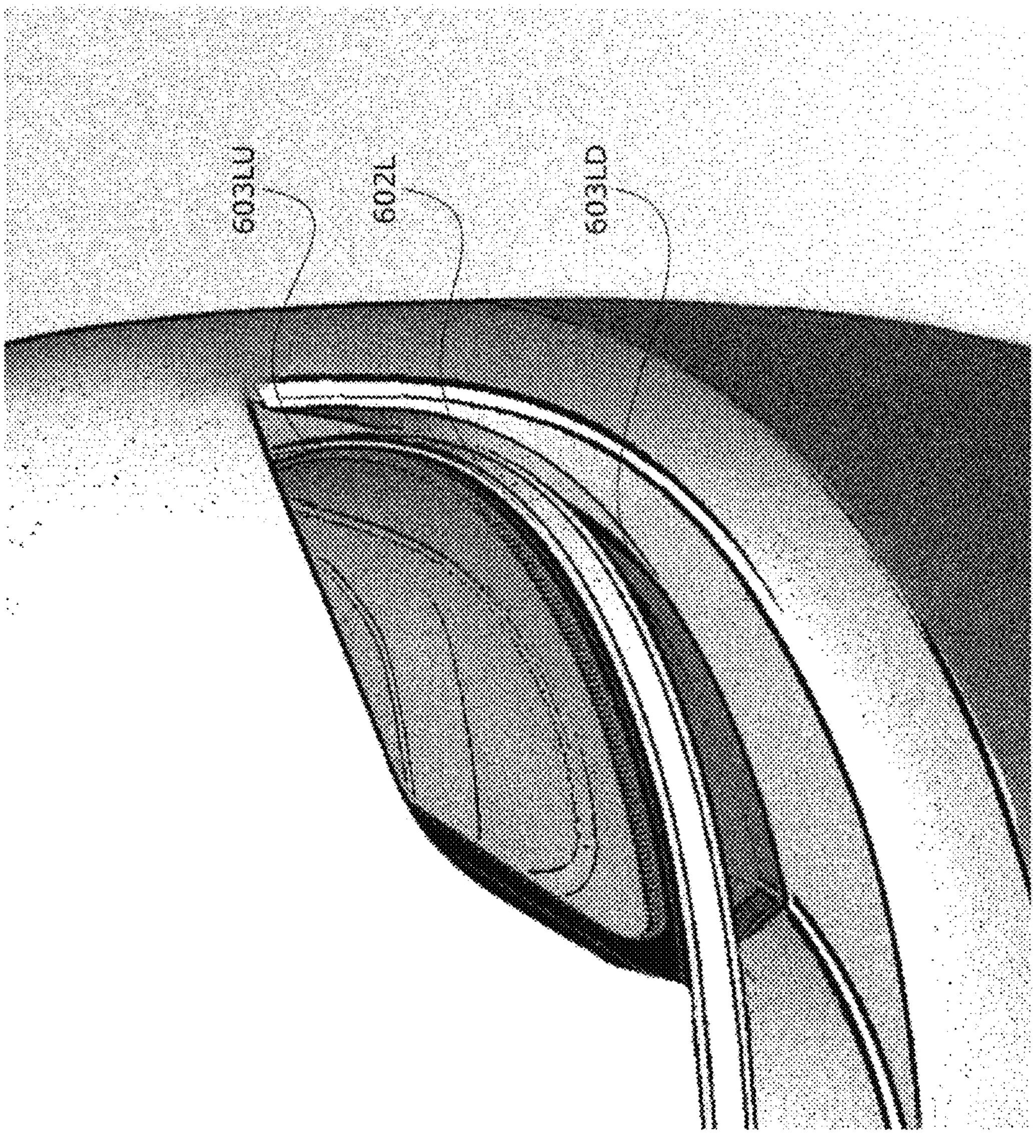
FIG. 25 is a view of the vicinity of the headlight on the left side of the vehicle.
Figure 26:
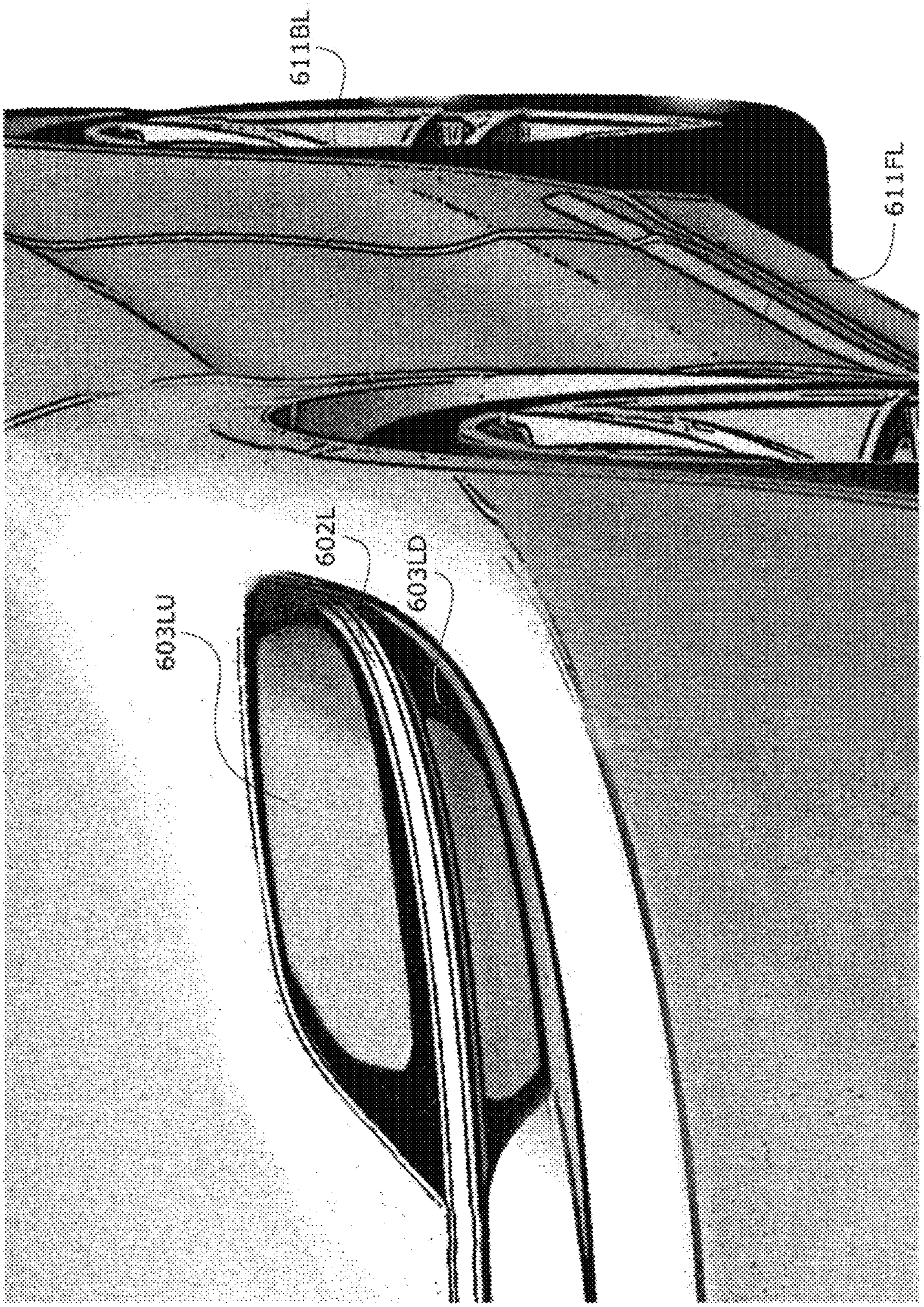
FIG. 26 is a view of the vicinity of the headlight on the left side of the vehicle.

FIG. 20 is a front view of the vehicle 1B and an enlarged view of the vicinity of a logo of the vehicle 1B in a center of a front. FIG. 21 is a left side view of the vehicle 1B. FIG. 22 is an enlarged view of a distal end portion of a left side surface of the vehicle 1B. FIG. 23 is a rear view of the vehicle 1B. FIGS. 24 to 26 are views of the vicinity of a headlight on a left side of the vehicle 1B as viewed from a plurality of directions.

Note that hereinafter, a left side and a right side facing a traveling direction of the vehicle 1B will be referred to as a left side and a right side of the vehicle 1B, respectively. For example, a left side and a right side of FIG. 20 are a right side and a left side of the vehicle 1B, respectively.

Most of lights and sensors outside the vehicle 1B are arranged along a loop line L1, which is a virtual line that surrounds a periphery of a body of the vehicle 1B in a substantially horizontal direction. Here, being arranged along the loop line L1 includes not only a case of being arranged on the loop line L1 but also a case of being arranged near the loop line L1.

For example, as illustrated in FIG. 20, an accessory light 601L, an accessory light 601R, a day running light 602L, a day running light 602R, a headlight 603LU, a headlight 603LD, a headlight 603RU, and a headlight 603RD are arranged on a front surface of the body.

The accessory light 601L extends from a center of the front surface of the body to the vicinity of right ends of the headlight 603LU and the headlight 603LD in a vehicle width direction (left-right direction). The accessory light 601R extends from the center of the front surface of the body to the vicinity of left ends of the headlight 603RU and the headlight 603RD in the vehicle width direction (left-right direction).

The accessory light 601L and the accessory light 601R are separated, and a gap is provided therebetween. Specifically, a right end portion of the accessory light 601L is bent diagonally downward to the right, and a left end portion of the accessory light 601R is bent diagonally upward to the left. A bent portion at a right end of the accessory light 601L and a bent portion at a left end of the accessory light 601R face each other substantially in parallel with a predetermined interval to form the logo of the vehicle 1B. For example, an optical sensor (not illustrated) such as a camera, a radar, or a LiDAR is arranged in an area A1 of a gap between the accessory light 601L and the accessory light 601R near the center of the logo.

The day running light 602L extends in the horizontal direction from a left end of the accessory light 601L to the vicinity of left ends of the headlight 603LU and the headlight 603LD. Furthermore, as illustrated in FIGS. 24 to 26, a left end portion of the day running light 602L curves rearward of the vehicle 1B and extends in a direction penetrating the body.

The day running light 602R extends in the horizontal direction from a right end of the accessory light 601R to the vicinity of right ends of the headlight 603RU and the headlight 603RD. Furthermore, although not illustrated, a right end portion of the day running light 602R curves rearward of the vehicle 1B and extends in the direction penetrating the body, similarly to that of the day running light 602L.

The accessory light 601L, the accessory light 601R, the day running light 602L, and the day running light 602R form a front light along the loop line L1 on the front surface of the body. Furthermore, the front light constitutes a front line that is a part of the loop line L1, extends in the vehicle width direction (left-right direction) on the front surface of the body, curves rearward at both ends, and extends in the direction penetrating the body.

The accessory light 601L, the accessory light 601R, the day running light 602L, and the day running light 602R each have a plurality of LEDs arranged in the horizontal direction. On and off, color, brightness, and the like of each LED can be controlled individually.

Note that hereinafter, in a case where it is not necessary to individually distinguish the accessory light 601L and the accessory light 601R, they are simply referred to as the accessory light 601. Hereinafter, in a case where it is not necessary to individually distinguish the day running light 602L and the day running light 602R, they are simply referred to as the day running light 602.

The headlight 603LU is adjacent to an upper side of the day running light 602L, extends in the horizontal direction, and curves rearward at a left end portion. The headlight 603LD is adjacent to a lower side of the day running light 602L, extends in the horizontal direction and curves rearward at a left end portion. In this manner, the headlight 603LU and the headlight 603LD are separated up and down by the day running light 602L (front line).

The headlight 603RU is adjacent to an upper side of the day running light 602R, extends in the horizontal direction and curves rearward at a right end portion. The headlight 603RD is adjacent to a lower side of the day running light 602R, extends in the horizontal direction and curves rearward at a right end portion. In this manner, the headlight 603RU and the headlight 603RD are separated up and down by the day running light 602R (front line).

The headlight 603LU and the headlight 603RU each include a plurality of LEDs arranged in the horizontal direction and the vertical direction, respectively, and output a low beam. The headlight 603LD and the headlight 603RD each include a plurality of LEDs arranged in the horizontal direction and the vertical direction, respectively, and output a high beam. On and off, color, brightness, and the like of each LED can be controlled individually.

Note that hereinafter, in a case where it is not necessary to individually distinguish the headlight 603LU and the headlight 603LD, they are simply referred to as the headlight 603L. Hereinafter, in a case where it is not necessary to individually distinguish the headlight 603RU and the headlight 603RD, they are simply referred to as the headlight 603R. Hereinafter, in a case where it is not necessary to individually distinguish the headlight 603L and the headlight 603R, they are simply referred to as the headlight 603.

By separating the headlight 603L and the headlight 603R up and down by the front line in this manner, the degree of freedom in designing the headlight 603L and the headlight 603R is improved. For example, the headlight 603L and the headlight 603R can be designed other than an upturned eye-like style or a downturned eye-like style. Furthermore, since the low beam (headlight 603LU and headlight 603RU) and the high beam (headlight 603LD and headlight 603RD) are arranged at appropriate positions, the functionality of the headlight 603 and the safety of the vehicle 1B are not deteriorated.

Furthermore, for example, as illustrated in FIG. 21, a turn signal 604L, an auxiliary light 605FL, and an auxiliary light 605BL are arranged on a left side surface of the body.

The turn signal 604L extends on an extension line of the A pillar 614L in the front-rear direction just above the loop line L1.

The auxiliary light 605FL is located behind a doorknob 612FL of a front left door 611FL and illuminates the vicinity of the doorknob 612FL. Since the doorknob 612FL is located just above the loop line L1, the auxiliary light 605FL is also located just above the loop line L1.

Furthermore, for example, a short-range wireless communication device (not illustrated) such as NFC is arranged in the vicinity of the doorknob 612FL or the doorknob 612FL.

The auxiliary light 605BL is located behind the doorknob 612BL of a rear left door 611BL and illuminates the vicinity of the doorknob 612BL. Since the doorknob 612BL is located just above the loop line L1, the auxiliary light 605BL is also located just above the loop line L1.

Furthermore, for example, a short-range wireless communication device (not illustrated) such as NFC is arranged in the vicinity of the doorknob 612BL or the doorknob 612BL.

In this manner, on the left side surface of the vehicle 1B, the turn signal 604L, the auxiliary light 605FL, and the auxiliary light 605BL are arranged in the front-rear direction along the loop line L1.

The turn signal 604L, the auxiliary light 605FL, and the auxiliary light 605BL each have a plurality of LEDs arranged in the horizontal direction. On and off, color, brightness, and the like of each LED can be controlled individually.

Furthermore, as illustrated in FIG. 21, for example, an optical sensor such as a camera, a radar, or a LiDAR is provided in an area A2L near the intersection of the loop line L1 and the extension line of the A pillar 614L. For example, the LiDAR 53L is provided below the turn signal 604L and above the loop line L1.

Moreover, for example, an optical sensor (not illustrated) such as a camera, a radar, or a LiDAR is provided in an area A3L near the intersection of the loop line L1 and the extension line of the C pillar 615L.

By arranging the optical sensor in the vicinity of the loop line L1 in this manner, for example, even if a surface color of the optical sensor is different from the body color, it is recognized that the optical sensor constitutes a part of the loop line L1. Thus, the optical sensor naturally blends into the appearance of the body without giving a sense of discomfort.

Note that although not illustrated, on the right side surface of the vehicle 1B, a turn signal 604R, an auxiliary light 605FR, an auxiliary light 605BR, a doorknob 612FR, a doorknob 612BR, a short-range wireless communication device, and an optical sensor are also located at similar positions to those on the left side surface.

Moreover, for example, as illustrated in FIG. 23, a tail light 606CL, a tail light 606CR, a tail light 606L, a tail light 606R, a brake light 607LU, a brake light 607LD, a brake light 607RU, and a brake light 607RD are arranged on a rear surface of the body.

The tail light 606CL extends from a center of the rear surface of the body to the vicinity of right ends of the brake light 607LU and the brake light 607LD in the vehicle width direction (left-right direction). The tail light 606CR extends in the horizontal direction from the center of the rear surface of the body in the vehicle width direction (to the vicinity of the right ends) of the brake light 607RU and the brake light 607RD.

The tail light 606CL and the tail light 606CR are separated, and a gap is provided therebetween.

Specifically, a right end portion of the tail light 606CL is bent diagonally upward to the right, and a left end portion of the tail light 606CR is bent diagonally downward to the left. A bent portion at a right end of the tail light 606CL and a bent portion at a left end of the tail light 606CR face each other substantially in parallel with a predetermined interval to form the logo of the vehicle 1B. For example, an optical sensor (not illustrated) such as a camera, a radar, or a LiDAR is arranged in an area A4 of a gap between the tail light 606CL and the tail light 606CR near the center of the logo.

The tail light 606L extends in the horizontal direction from a left end of the tail light 606CL to the vicinity of left ends of the brake light 607LU and the brake light 607LD. A left end portion of the tail light 606L curves forward. The tail light 606R extends in the horizontal direction from a right end of the tail light 606CR to the vicinity of right ends of the brake light 607RU and the brake light 607RD. A right end portion of the tail light 606R curves forward.

The tail light 606CL, the tail light 606CR, the tail light 606L, and the tail light 606R form a tail line that extends in the left-right direction on the rear surface of the body and has both ends curved forward. The tail line forms part of the loop line L1.

The tail light 606CL, the tail light 606CR, the tail light 606L, and the tail light 606R each have a plurality of LEDs arranged in the horizontal direction. On and off, color, brightness, and the like of each LED can be controlled individually.

Note that hereinafter, in a case where it is not necessary to individually distinguish the tail light 606CL and the tail light 606CR, they are simply referred to as the tail light 606C. Hereinafter, in a case where it is not necessary to individually distinguish the tail light 606C, the tail light 606L, and the tail light 606R, they are simply referred to as the tail light 606.

The brake light 607LU is adjacent to an upper side of the tail light 606L and curves forward at a left end portion. The brake light 607LD is adjacent to a lower side of the tail light 606L and curves forward at a left end portion. In this manner, the brake light 607LU and the brake light 607LD are separated up and down by the tail light 606L.

The brake light 607RU is adjacent to an upper side of the tail light 606R and curves forward at a right end portion. The brake light 607RD is adjacent to a lower side of the tail light 606R and curves forward at a right end portion. In this manner, the brake light 607RU and the brake light 607RD are separated up and down by the tail light 606R (tail line).

The brake light 607LU, the brake light 607LD, the brake light 607RU, and the brake light 607RD each have a plurality of LEDs arranged in the horizontal direction. On and off, color, brightness, and the like of each LED can be controlled individually.

Note that hereinafter, in a case where it is not necessary to individually distinguish the brake light 607LU and the brake light 607LD, they are simply referred to as the brake light 607L. Hereinafter, in a case where it is not necessary to individually distinguish the brake light 607RU and the brake light 607RD, they are simply referred to as the brake light 607R. Hereinafter, in a case where it is not necessary to individually distinguish the brake light 607L and the brake light 607R, they are simply referred to as the brake light 607.

Furthermore, along a lower end of the windshield 104, a lower end of a window 613FL of the door 611FL, a lower end of a window 613BL of the door 611BL, a lower end of a window 613FR (not illustrated) of a door 611FR, and a lower end of a window 613BR (not illustrated) of a door 611BR, the color of the body is different with a loop line L2, which is a virtual line that surrounds the body of the vehicle 1B in a substantially horizontal direction, as a boundary.

For example, along the loop line L2, a black line is formed by chrome plating. Then, an area above the loop line L2 is grouped in a black color. For example, above the loop line L2, the body is painted black. Furthermore, the windshield 104, the window 613FL, the window 613BL, the window 613FR, the window 613BR, and a rear window 616 are smoked in black.

On the other hand, below the loop line L2, the body is painted in a different color from above. Note that the color of the lower body is not particularly limited.

Furthermore, the camera 51SL and the camera 51SR are provided along the loop line L2 near a front end and the lower end of the window 613FL and the window 613FR (not illustrated). The camera 51SL and the camera 51SR capturing an image of the vehicle 1B diagonally backward left or diagonally backward right, respectively.

As described above, the design can be improved while avoiding deterioration of safety and functionality of the vehicle 1B.

For example, in the appearance of the vehicle 1B, two substantially parallel loop lines L1 and loop lines L2 are virtually recognized. This makes the car body look low and can give a sporty impression.

Furthermore, as described above, the degree of freedom in designing the headlight is improved. Moreover, since each light is placed in an appropriate position, functionality of each light and safety of the vehicle 1B are not deteriorated.

Furthermore, the front line (front light) curves rearward at both ends and extends in the direction penetrating the body, giving an impression that the front line penetrates the body and is connected to the LiDAR 53L on the left side surface and the LiDAR 53R on the right side surface.

Moreover, by arranging the sensors around the vehicle 1B along the loop line L1, an impression of watching (monitoring) the surroundings of the vehicle 1B is given, and theft and vandalism of the vehicle 1B can be prevented.

<Configuration Example of Interior of Vehicle 1B>

Next, a configuration example of an interior of the vehicle 1B will be described with reference to FIGS. 27 to 36.

First, devices arranged along a loop line L11 will be described with reference to FIGS. 27 to 30.

Figure 27:
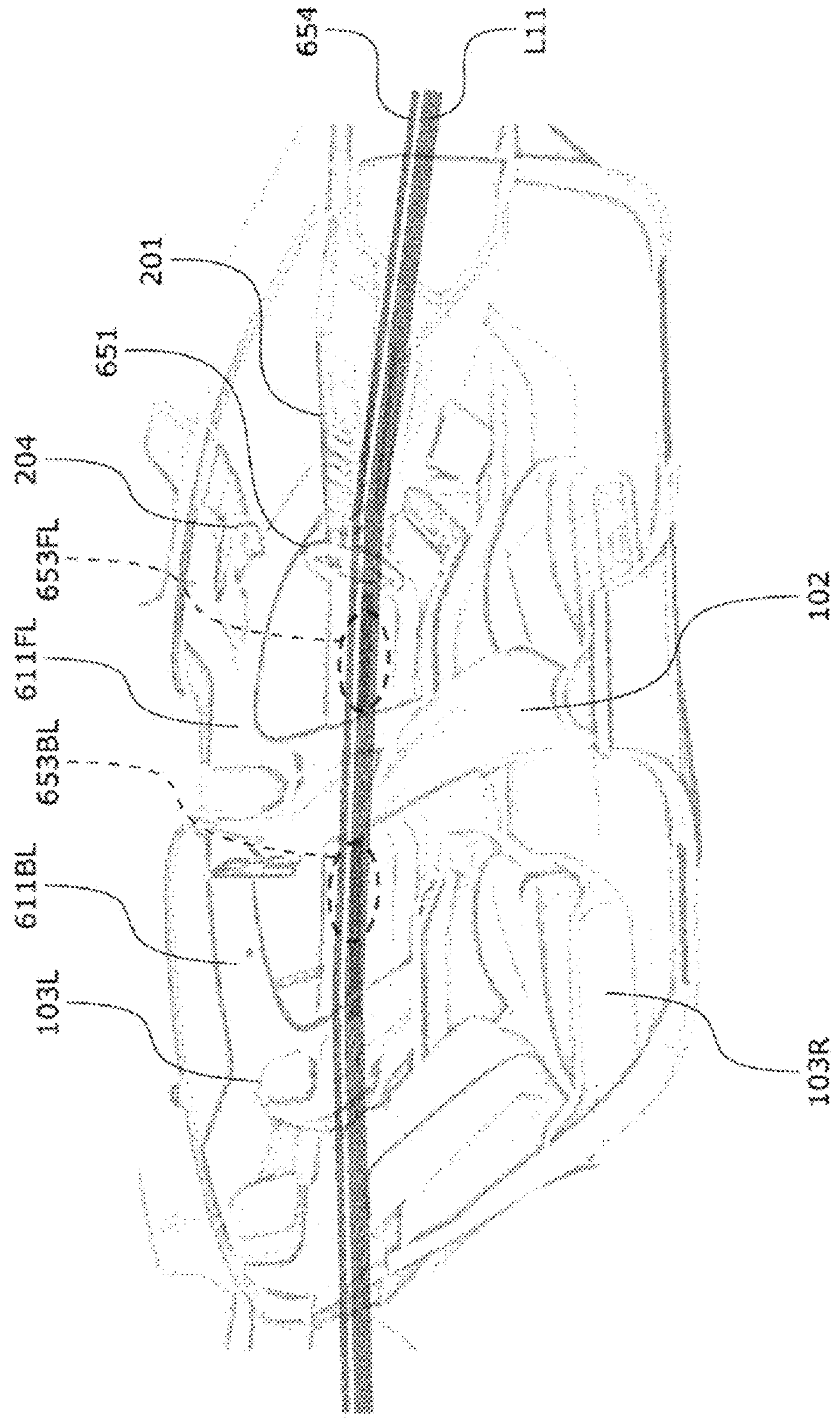
FIG. 27 is a schematic view of an inside of the vehicle as viewed from right.
Figure 28:
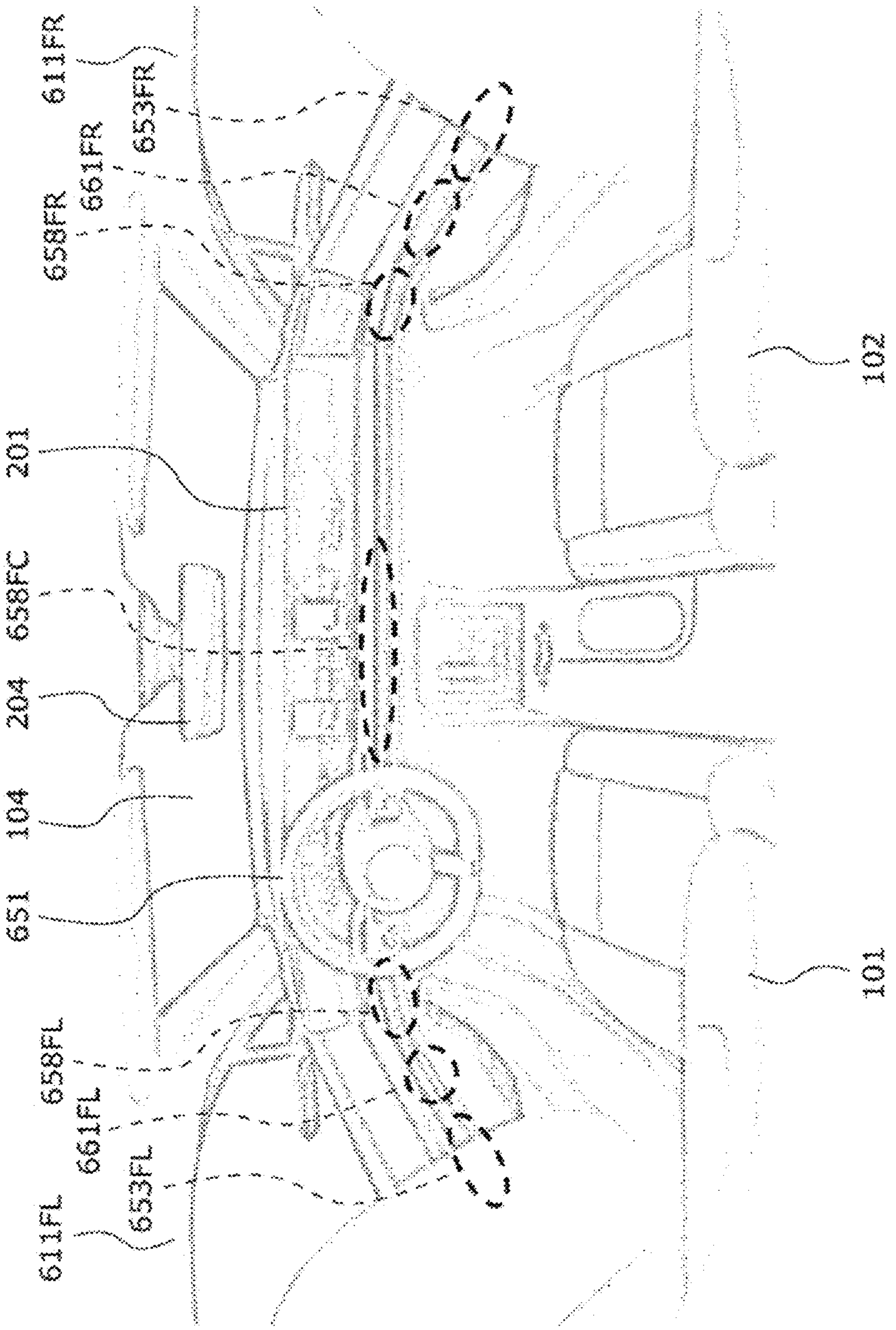
FIG. 28 is a schematic view of the vicinity of the driver seat and the passenger seat of the vehicle.
Figure 29:
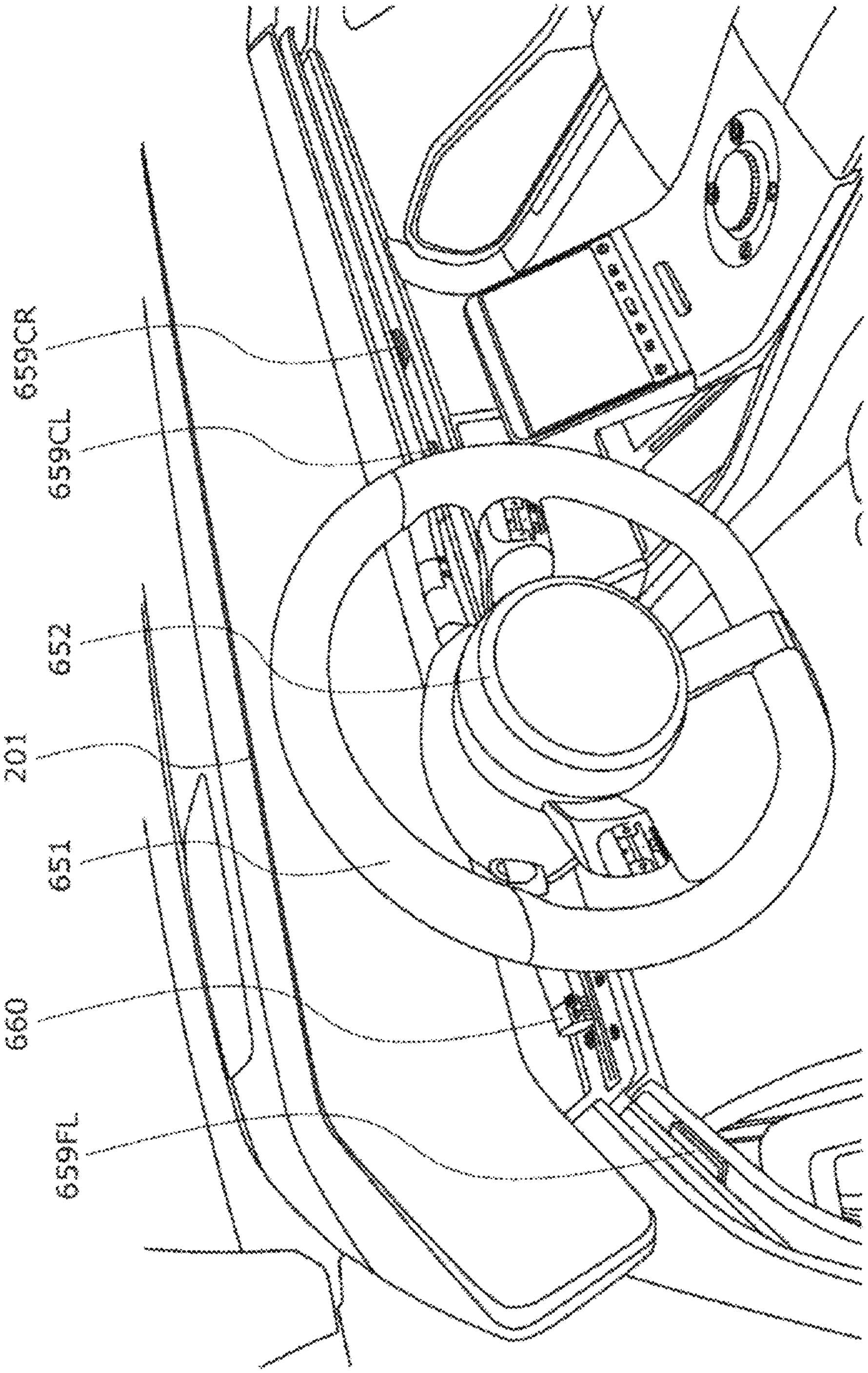
FIG. 29 is a schematic view of the vicinity of the dashboard of the vehicle.
Figure 30:
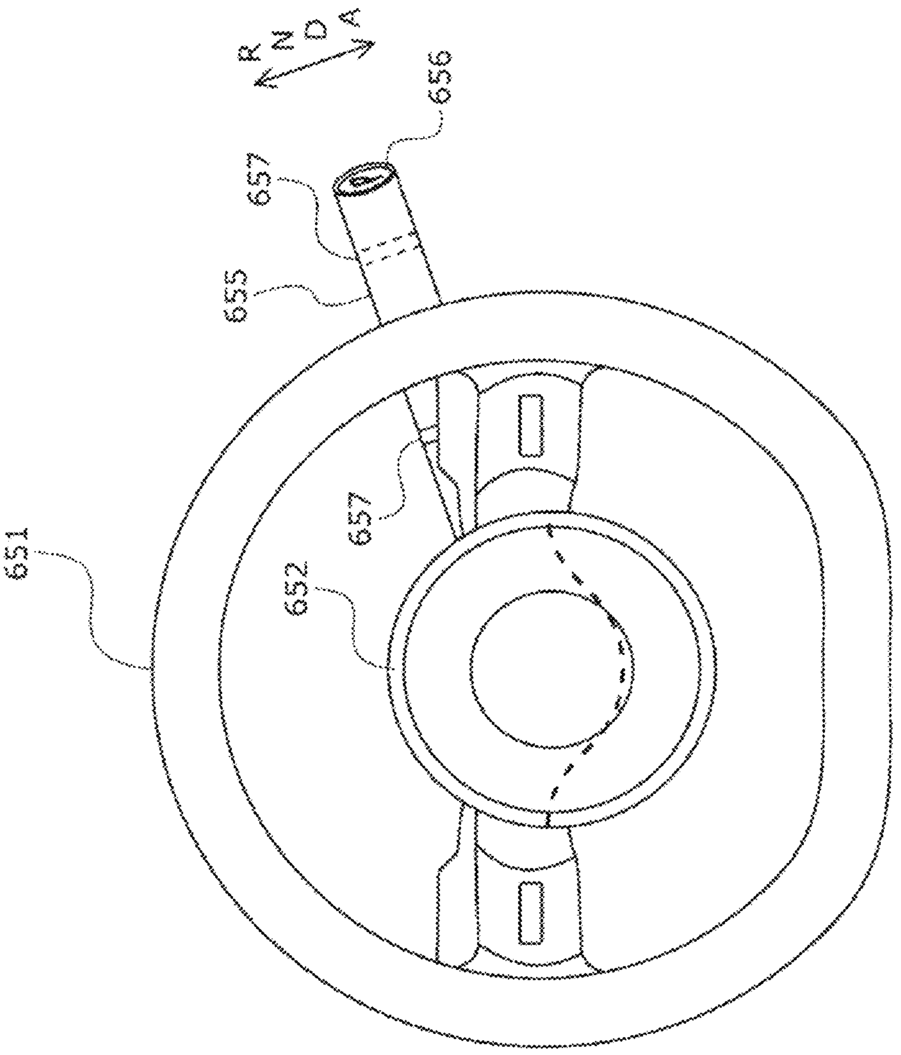
FIG. 30 is an enlarged view of a steering wheel of the vehicle.

FIG. 27 is a schematic view of an inside of the vehicle 1B as viewed from the right direction. FIG. 28 is a schematic view of the vicinity of the driver seat 101 and the passenger seat 102 of the vehicle 1B. FIG. 29 is a schematic view of the vicinity of the dashboard of the vehicle 1B. FIG. 30 is an enlarged view of a steering wheel 651 of the vehicle 1B.

Inside the vehicle 1B, devices for a plurality of user interfaces are centrally arranged and various interfaces are gathered along the loop line L11 (FIG. 27), which is a virtual line that surrounds a periphery of the interior in a substantially horizontal direction.

Here, the devices for the user interfaces include, for example, an output device that outputs visual information, auditory information, and tactile information, and an operation device used for various operations. Furthermore, being arranged along the loop line L11 includes not only a case of being arranged on the loop line L11 but also a case of being arranged near the loop line L11.

The loop line L11 is arranged at the same height as the loop line L1 outside the vehicle 1B. Furthermore, the loop line L11 is slightly inclined upward from the front to the rear. This is because positions of the rear seat 103L and the rear seat 103R are higher than positions of the driver seat 101 and the passenger seat 102.

For example, a display device constituting the HMI 31 in FIG. 1 is arranged along the loop line L11.

For example, as illustrated in FIGS. 27 to 29, the center display 201 is arranged to extend in the vehicle width direction (left-right direction) just above the loop line L11 on a front surface of the dashboard in front of the driver seat 101 and the passenger seat 102.

As described above, the center display 201 is roughly divided into a left end portion, a center portion, and a right end portion depending on the direction of the display. The left end portion, the center portion, and the right end portion of the center display 201 can be individually displayed independently, or can be integrally displayed. The left end portion and right end portion of the center display 201 are mainly used as digital outer mirrors (electronic side mirrors) that replace conventional side mirrors. For example, the left end portion displays an image of diagonally backward left of the vehicle 1B captured by the camera 51SL (FIG. 20). The right end portion displays an image of diagonally backward right of the vehicle 1B captured by the camera 51SR (FIG. 20).

Furthermore, as illustrated in FIGS. 28 to 30, the steering wheel 651 is arranged on the loop line L11 in front of the driver seat 101.

Moreover, as illustrated in FIGS. 29 and 30, an illumination 652 is provided along a periphery of a center portion of the steering wheel 651. The illumination 652 includes a plurality of LEDs arranged on a circumference along the periphery of the center portion of the steering wheel 651. On and off, color, brightness, and the like of each LED can be controlled individually. Therefore, the illumination 652 has a variable color, brightness, and light emitting area (light emitting range).

Note that an airbag is housed in the center portion of the steering wheel 651. Then, when the airbag is activated, a portion indicated by a dotted line in the center portion of the steering wheel 651 in FIG. 30 is split. The illumination 652 is arranged so as to avoid the split portion in the center portion. This prevents debris and harmful substances from the illumination 652 from scattering when the airbag is activated.

Furthermore, speakers constituting the HMI 31 in FIG. 1 are arranged along the loop line L11.

Specifically, as illustrated in FIGS. 27 and 28, a speaker 653FL is embedded near the loop line L11 inside the door 611FL on the driver seat 101 side. As illustrated in FIG. 28, a speaker 653FR is embedded near the loop line L11 inside the door 611FR on the passenger seat 102 side. As illustrated in FIG. 27, a speaker 653BL is embedded near the loop line L11 inside the door 611BL on the left rear seat 103L side. Although not illustrated, a speaker 653BR is embedded near the loop line L11 inside the door 611BR on the right rear seat 103R side.

Furthermore, although not illustrated, speakers (hereinafter referred to as seat speakers) are individually embedded under headrests of the driver seat 101, the passenger seat 102, the rear seat 103L, and the rear seat 103R. Moreover, shapes of the seats and positions of the seat speakers are adjusted so that people of various heights (sitting heights) can clearly hear the sound of the seat speakers of each seat.

The speakers 653FL to 653BR arranged along the loop line L11 are used, for example, to output sound directed to the entire vehicle interior (all occupants in the vehicle).

Furthermore, 360-degree real audio is achieved by the speaker 653FL to speaker 653FR. By achieving the 360-degree real audio, for example, it is possible to enjoy moving images, music, and the like in the vehicle by sounds with realistic feeling. Furthermore, notification of the position of a dangerous object such as an obstacle existing around the vehicle 1B can be given by the sound output direction.

On the other hand, the seat speaker of each seat is used, for example, to output a private sound mainly for the individual occupant sitting on each seat. That is, the sound output from each seat speaker is individually controlled.

Note that the arrangement of the speakers is an example and can be changed. For example, the number of speakers arranged on the loop line L11 may be increased. For example, the speaker may be placed on the dashboard on the front side of the vehicle 1B.

Furthermore, as illustrated in FIG. 27, a loop light 654 surrounds a periphery inside the vehicle slightly above the loop line L11 and at substantially the same height as the external loop line L1, and substantially parallel to the loop line L11. The loop light 654 is a downlight equipped with a plurality of LEDs embedded in the vehicle so as to line up in a substantially horizontal direction, and is mainly used for auxiliary lighting and interior decoration. On and off, color, brightness, and the like of each LED can be controlled individually.

Note that the loop light 654 does not necessarily surround the entire periphery inside the vehicle, and may surround a part of the periphery inside the vehicle without being continuous.

Moreover, various operation devices are arranged along the loop line L11.

For example, as described above, the steering wheel 651 is arranged on the loop line L11 in front of the driver seat 101.

Furthermore, as illustrated in FIG. 30, a stalk lever 655, which is a rod-shaped operating body, is provided behind the steering wheel 651 so as to extend from a steering column (not illustrated) in a vehicle width direction (lateral direction (right direction)). The stalk lever 655 can be moved in an up-down direction, and the shift position of the vehicle 1B can be switched by moving the stalk lever 655 in the up-down direction. That is, the stalk lever 655 constitutes a tilt type shift lever that is movable in the up-down direction. Note that the stalk lever 655 may be, for example, either a straight type that moves straight in the up-down direction or a column type that moves in a zigzag manner in the up-down direction.

A setting order of the shift position by the stalk lever 655 is arranged in the order of reverse (R), neutral (N), drive (D), and autonomous driving (A) from the top. That is, when the stalk lever 655 is moved from top to bottom, the shift position is switched in the order of R, N, D, and A. When the stalk lever 655 is moved from the bottom to the top, the shift position is switched in the order of A, D, N, and R.

Furthermore, at a tip of the stalk lever 655, a button 656 that can be pressed in an axial direction of the stalk lever 655 is provided. When the button 656 is pressed, the shift position of the vehicle 1B is switched to parking (P).

Furthermore, an indicator 657 is provided on a side surface of the stalk lever 655 in a circumferential shape in a circumferential direction. The indicator 657 is arranged at a position visible from a gap between spokes of the steering wheel 651 as viewed from the driver seat 101.

The indicator 657 changes in color depending on the set shift position. For example, in a case where the shift position is set to the parking, the indicator 657 turns red. In a case where the shift position is set to drive, the indicator 657 turns white. In a case where the shift position is set to autonomous driving and the autonomous driving is possible, the indicator 657 turns green. In a case where the shift position is set to autonomous driving and the autonomous driving is in operation, the indicator 657 turns blue.

Note that as illustrated by the dotted line in FIG. 30, the indicator 657 may be arranged outside of an outer periphery of the steering wheel 651 as viewed from the driver seat 101. This makes the indicator 657 visible from outside the steering wheel 651. Furthermore, the indicator 657 may be arranged at both positions of a solid line and a dotted line.

In this manner, by providing the indicator 657 on the operating body (stalk lever 655) used for switching the shift position, the driver can intuitively understand the meaning of the color of the indicator 657, and can intuitively and certainly recognize the shift position.

Furthermore, for example, the setting state of the shift position may be displayed on the center display 201 or the like. In this case, for example, the shift positions are displayed in the order of a setting direction by the stalk lever 655. That is, the shift positions are displayed in the order of R (reverse), N (neutral), D (drive), and A (autonomous driving) from the top.

Moreover, for example, a dial that rotates around the axis (circumferential direction) may be provided at the tip or in middle of the stalk lever 655 in the axial direction, and the shift position may be switched by rotating the dial.

Furthermore, as illustrated in FIG. 28, an air vent 658FC, an air vent 658FL, and an air vent 658FR of air conditioner (A/C) are arranged on the loop line L11. Specifically, the air vent 658FR is located between the driver seat 101 and the passenger seat 102, just below the center display 201. The air vent 658FL is located near a joint of the door 611FL on the driver seat 101 side, just below the center display 201. The air vent 658FR is located near a joint of the door 611FR on the passenger seat 102 side, just below the center display 201.

Moreover, as illustrated in FIG. 29, the air vent 658FC is provided with a knob 659CL and a knob 659CR for changing the wind direction. As illustrated in FIG. 29, the air vent 658FL is provided with a knob 659FL for changing the wind direction. Although not illustrated, the air vent 658FR is provided with a knob 659FR for changing the wind direction at a similar position to that of the knob 659FL of the air vent 658FL. Thus, the knob 659CL, the knob 659CR, the knob 659FL, and the knob 659FR are provided on the loop line L11.

Furthermore, as illustrated in FIG. 29, an operation unit 660 including switches and the like for performing various settings of the headlight 603 is arranged on the loop line L11 on the right side of the back of the steering wheel 651.

Moreover, a door opener is placed on the loop line L11. For example, as illustrated in FIG. 28, a door opener 661FL is arranged on the loop line L11 near a center in the front-rear direction of the door 611FL on the driver seat 101 side. Similarly, a door opener 661FR is arranged on the loop line L11 near a center in the front-rear direction of the door 611FR on the passenger seat 102 side.

By arranging devices for various user interfaces, or the like along the loop line L11 in this manner, noise that interferes with driving is removed from the line of sight of the driver, and an environment in which it is easy to concentrate on driving is provided. Furthermore, by gathering various devices near the loop line L11, it becomes possible to intuitively recognize the positions of various devices and operate the devices. Moreover, by gathering various devices near the loop line L11 and arranging the loop light 654, it is possible to give an impression of watching over the inside of the vehicle 1B. Furthermore, the movement of the line of sight of an occupant such as a driver in the up-down direction is reduced, and the motion sickness of the occupant is suppressed.

Figure 31:
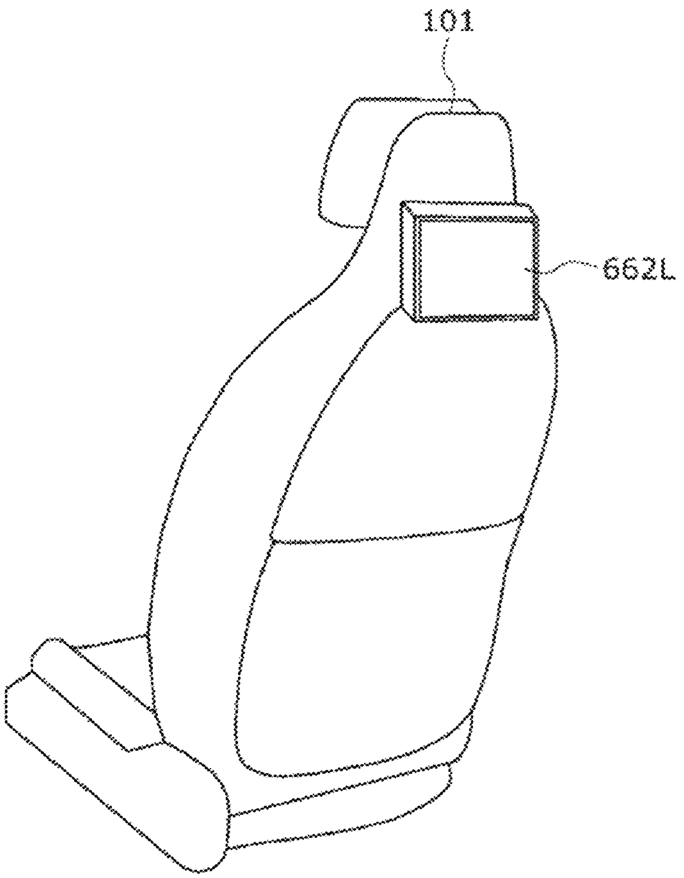
FIG. 31 is a view of the driver seat as viewed from diagonally backward left.

FIG. 31 is a view of the driver seat 101 as viewed from diagonally backward left.

A tablet terminal 662L is provided on a back surface of the driver seat 101, more specifically, on a back surface of the headrest of the driver seat 101.

For example, the tablet terminal 662L constitutes the rear entertainment display 206 of FIG. 9, and presents infotainment-related information to an occupant on the rear seat 103L, and accepts operations on the presented information. Furthermore, for example, the tablet terminal 662L displays an alert in an emergency, danger, or the like.

Note that although not illustrated, for example, a tablet terminal 662R similar to the tablet terminal 662L is provided on the back surface of the passenger seat 102.

Furthermore, for example, a ToF camera may be provided near each of the tablet terminal 662L and the tablet terminal 662R. Thus, for example, recognition of an occupant operating the tablet terminal 662L and the tablet terminal 662R, or the like is possible on the basis of an image captured by the ToF camera.

Next, an example of the installation position of the ToF camera for capturing an image of a direction of the driver seat 101 (the driver sitting in the driver seat 101) will be described with reference to FIGS. 32 to 36.

Figure 32:
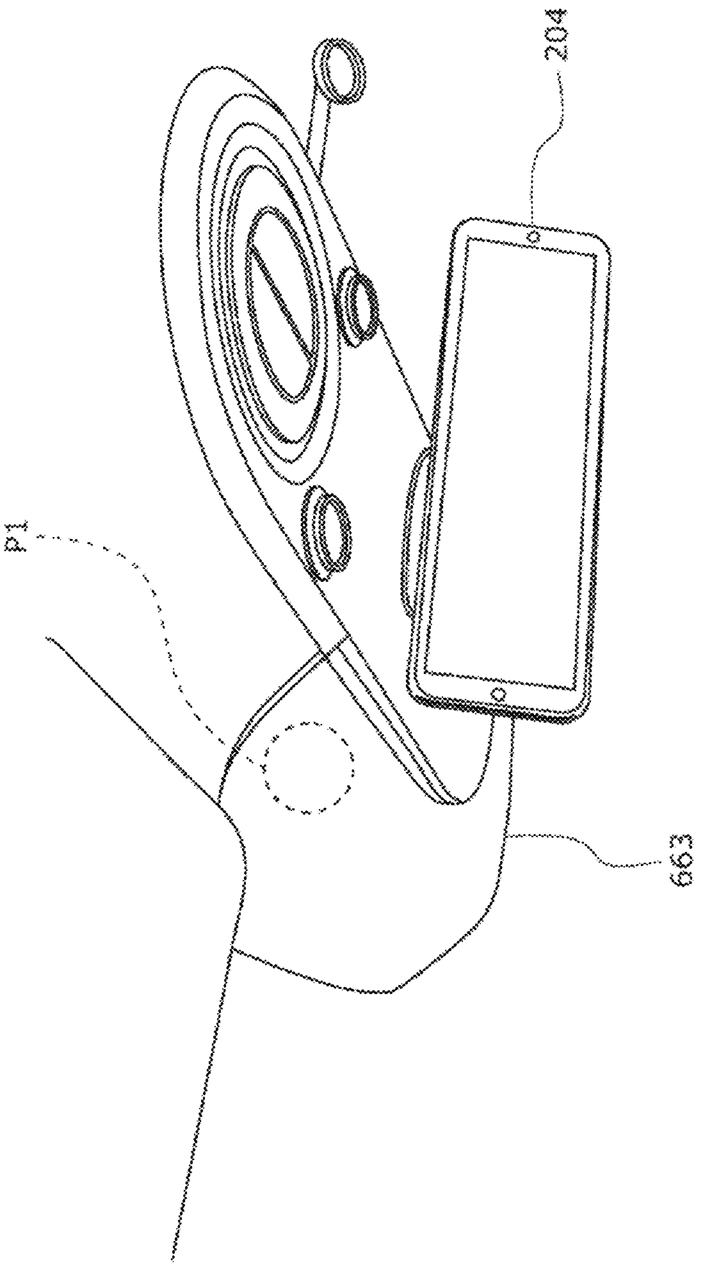
FIG. 32 is a view illustrating an example of an installation position of a ToF camera for capturing an image of the driver.
Figure 33:
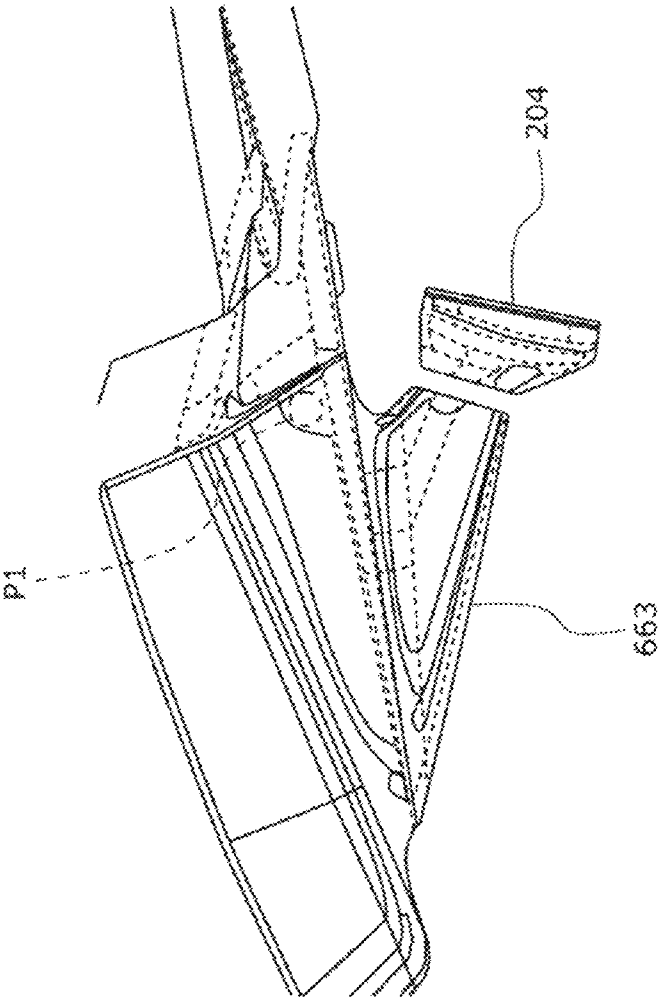
FIG. 33 is a view illustrating an example of the installation position of the ToF camera for capturing an image of the driver.

As illustrated in FIGS. 32 and 33, the ToF camera is installed, for example, at an installation position P1 around the digital rearview mirror 204.

The digital rearview mirror 204 is used to check the rear of the vehicle 1B instead of a conventional rearview mirror, and is also called a smart rearview mirror or a digital rearview mirror. As illustrated in FIG. 28 and the like, the digital rearview mirror 204 is provided near the upper end and the center of the windshield 104 and slightly rearward of the vehicle 1B with respect to the windshield 104 like the conventional rearview mirror, and is provided above a center portion of the center display 201. Furthermore, as illustrated in FIGS. 32 and 33, the digital rearview mirror 204 is installed near a ceiling via a mounting portion 663 in front and at diagonally right of the driver seat 101.

The installation position P1 is located near a rear end of a left side surface of the mounting portion 663 and near an upper left of the digital rearview mirror 204 on the ceiling of the vehicle 1B.

Figure 34:
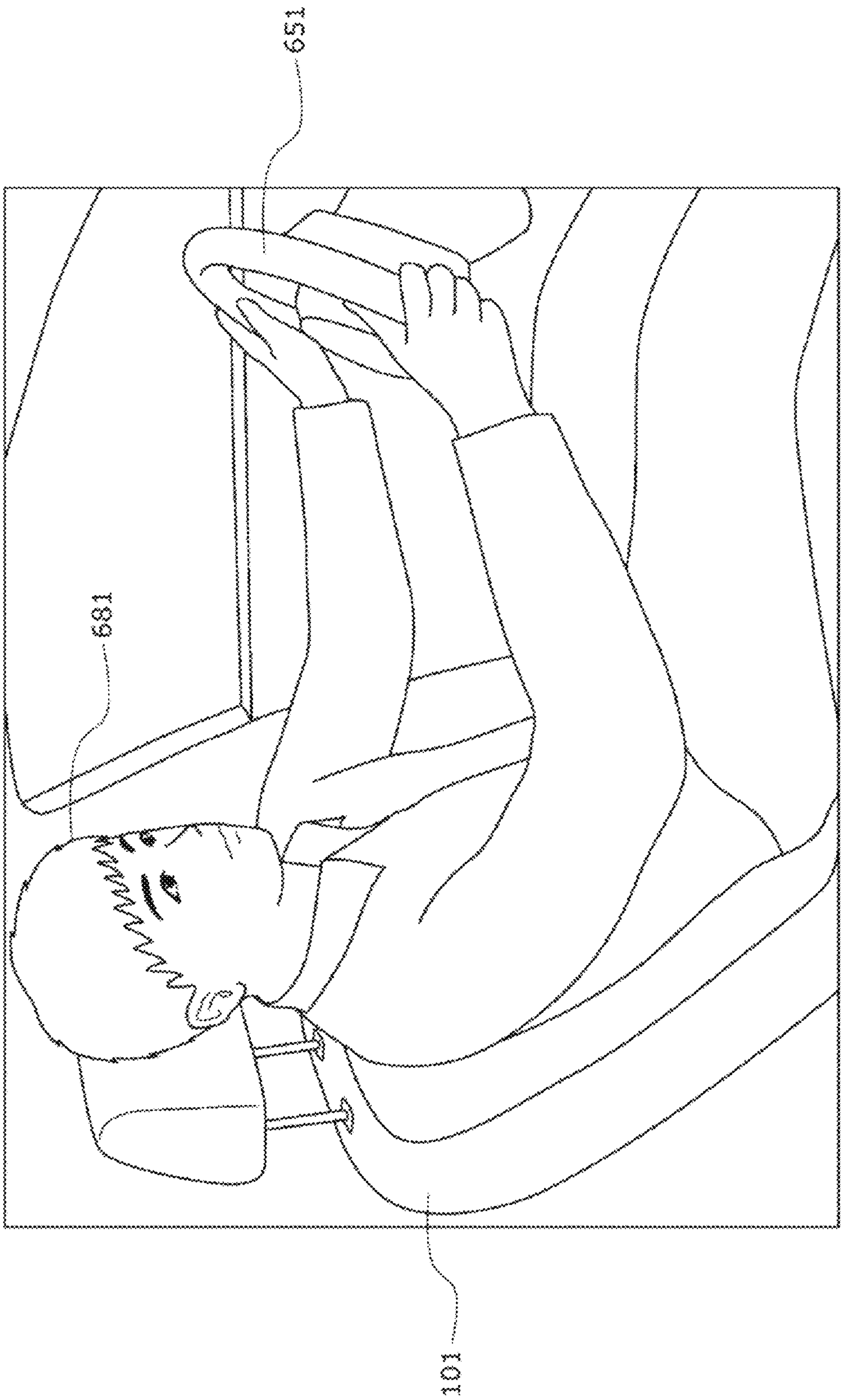
FIG. 34 is a schematic view illustrating an example of an image captured by the ToF camera installed at the installation position of FIGS. 32 and 33.

FIG. 34 schematically illustrates an example of an image captured by the ToF camera in a case where the TOF camera is installed at the installation position P1.

By installing the ToF camera at the installation position P1, an image of the upper body of a driver 681 sitting on the driver seat 101 is captured from diagonally right and as if looking down from above. Thus, an image of the face of the driver 681 can be captured from diagonally right and above, and for example, the recognition unit 73 (FIG. 1) can recognize the line of sight of the driver 681. Furthermore, an image of the upper body of the driver 681 including the steering wheel 651 can be captured like a bird's-eye view, and for example, the recognition unit 73 can recognize the posture of the driver 681. Moreover, since the probability that an obstacle appears between the driver 681 and the digital rearview mirror 204 is low, the line of sight and the posture of the driver 681 can be stably recognized.

Figure 35:
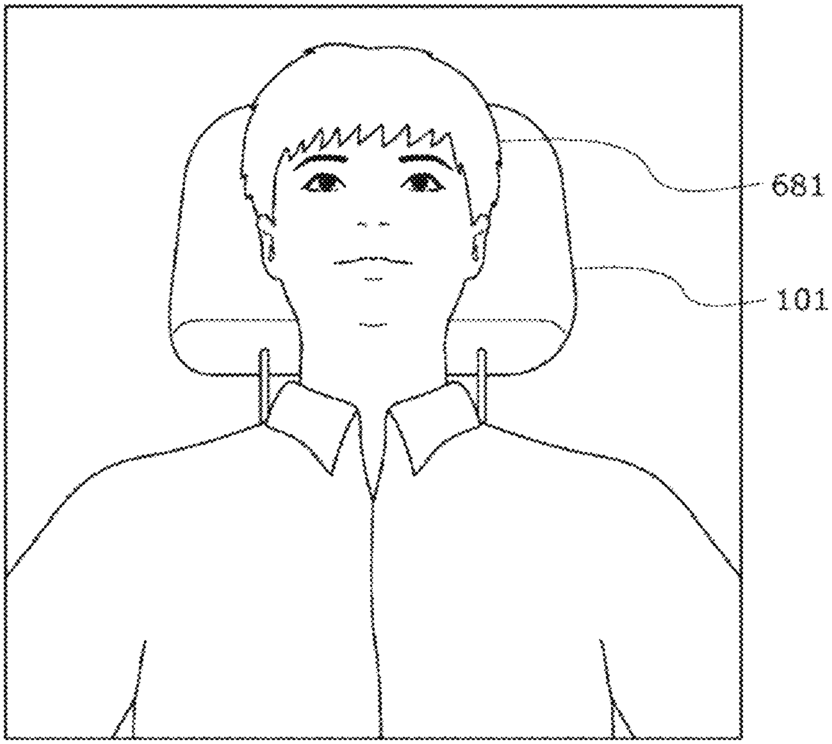
FIG. 35 is a schematic view illustrating an example of an image captured by a ToF camera installed near the steering wheel.

On the other hand, FIG. 35 illustrates an example of an image captured by the ToF camera in a case where the ToF camera is arranged on the steering wheel 651 or near the steering wheel 651.

In this case, an image of the vicinity of the face of the driver 681 is captured so as to look up from the front. Therefore, the recognition unit 73 can recognize the line of sight of the driver 681. However, obstacles such as a hand of the driver 681 is likely to appear between the driver 681 and the steering wheel 651, and it is assumed that a situation in which the line of sight cannot be recognized is likely to occur. Furthermore, since an image of the entire upper body of the driver 681 is not captured, it becomes difficult for the recognition unit 73 to recognize the posture of the driver 681.

Figure 36:
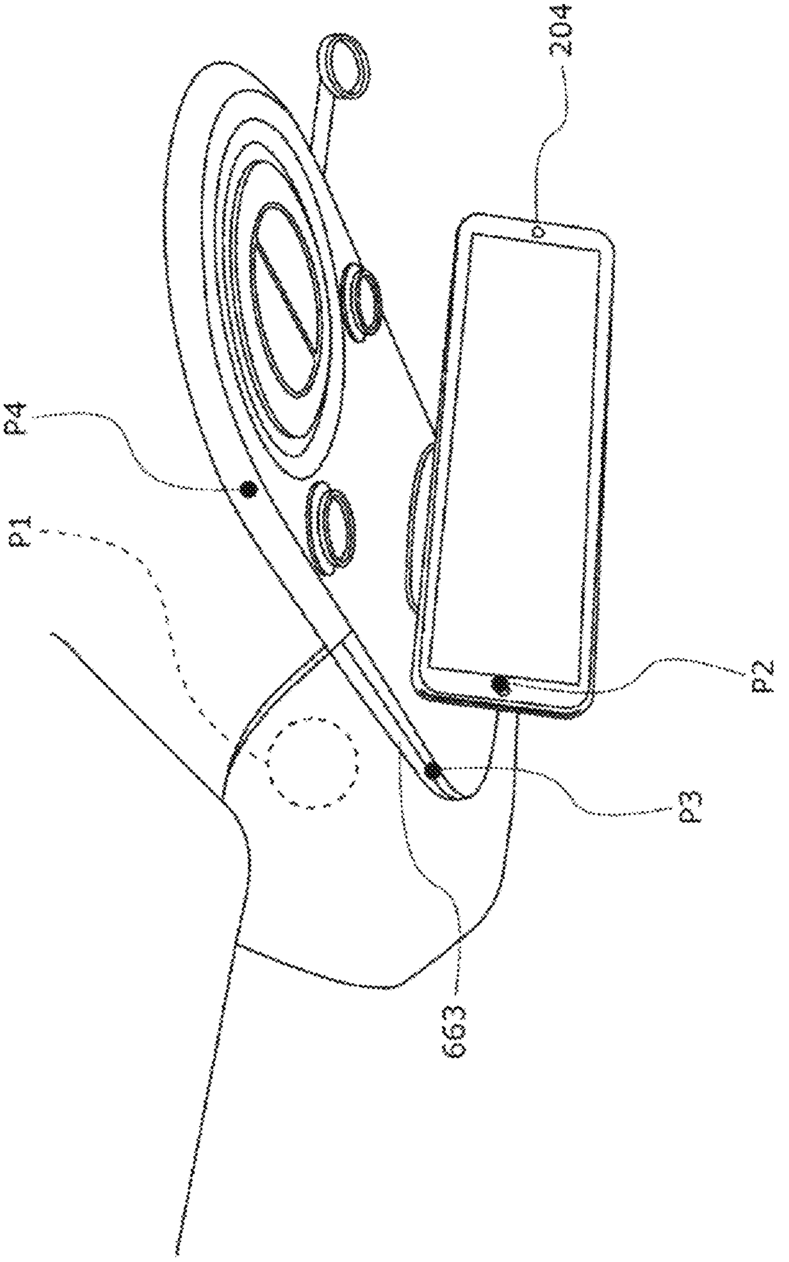
FIG. 36 is a view illustrating an example of an installation position of a ToF camera for capturing an image of the driver.

FIG. 36 illustrates a modification example of the installation position of the ToF camera.

For example, the ToF camera may be installed at an installation position P2 at a left end of the digital rearview mirror 204.

For example, on the ceiling of the vehicle 1B, the ToF camera may be installed behind the digital rearview mirror 204 (front side of the vehicle 1B from the digital rearview mirror 204) and at an installation position P3 closer to the driver seat 101 than the digital rearview mirror 204 (to the left than the digital rearview mirror 204).

For example, on the ceiling of the vehicle 1B, the ToF camera may be installed in front of the digital rearview mirror 204 (rear side of the vehicle 1B from the digital rearview mirror 204) and at an installation position P4 closer to the driver seat 101 than the digital rearview mirror 204 (closer to the left than the digital rearview mirror 204).

Regardless of whether the ToF camera is installed at any of the installation position P2 to the installation position P4, recognition of the line-of-sight and posture of the driver is possible on the basis of an image captured by the ToF camera, as in a case of installing at the installation position P1.

Note that instead of the digital rearview mirror 204, a conventional optical mirror may be used. Furthermore, a camera of a type different from the TOF camera may be used.

Moreover, for example, the ToF camera that captures an image of the occupant sitting on the passenger seat 102 may be installed at a position symmetrical to the camera that captures an image of the driver.

<Configuration Example of Information Processing Unit 701>

Figure 37:
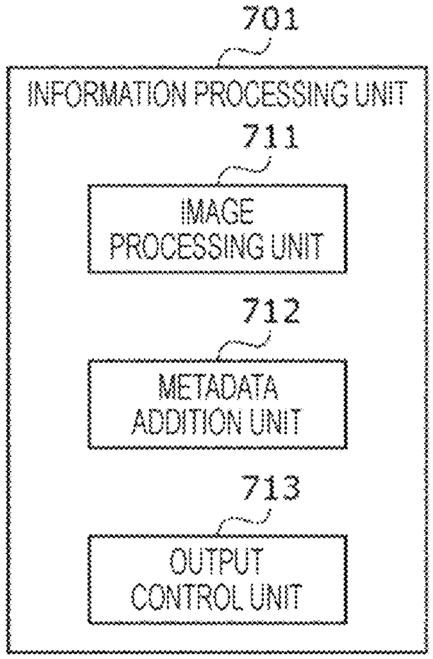
FIG. 37 is a block diagram illustrating a configuration example of an information processing unit.

FIG. 37 is a block diagram illustrating a configuration example of an information processing unit 701 achieved by the processor 21, the HMI 31, and the like of FIG. 1.

The information processing unit 701 includes an image processing unit 711, a metadata addition unit 712, and an output control unit 713.

The image processing unit 711 performs various image processing and editing on the moving image data obtained by the camera 51. Furthermore, the image processing unit 711 images sensor data obtained by an optical sensor other than the camera, such as the radar 52 and the LiDAR 53.

The metadata addition unit 712 adds metadata to the moving image data obtained by the camera 51.

The output control unit 713 controls output of visual information, auditory information, and tactile information in the HMI 31. For example, the output control unit 713 controls output of visual information from the center display 201, the tablet terminal 662L, the tablet terminal 662R, and the illumination 652 of the steering wheel 651. For example, the output control unit 713 controls output of auditory information (sound) from the speakers 653FL to 653BR and the seat speakers.

<Operation of Vehicle 1B>

Next, an example of operation of the vehicle 1B will be described with reference to FIGS. 38 to 53.

Note that hereinafter, in a case where it is not necessary to individually distinguish the door 611FL, the door 611FR, the door 611BL, and the door 611BR, they are simply referred to as the door 611.

<Light Emission Pattern of Lighting System>

First, an example of the light emission pattern of the lighting system of the vehicle 1B will be described with reference to FIGS. 38 to 47.

The light control unit 85 (FIG. 1) performs cooperative control of the lights outside the vehicle and the lights inside the vehicle.

Specifically, FIGS. 38 to 47 illustrate examples of light emission patterns of the accessory light 601L, the accessory light 601R, the day running light 602L, the day running light 602R, the headlight 603L, the headlight 603R, the turn signal 604L, the turn signal 604R, the auxiliary light 605FL, the auxiliary light 605FR, the auxiliary light 605BL, the auxiliary light 605BR, the tail light 606L, the tail light 606R, the tail light 606CL, the tail light 606CR, the brake light 607L, the brake light 607R, the loop light 654, and a main light 751.

Note that the main light 751 is equipped with LEDs arranged along an outer periphery of the ceiling in the interior of the vehicle 1B, and is used as a main lighting in the vehicle. On and off, color, brightness, and the like of each LED can be controlled individually. Furthermore, FIGS. 38 to 47, the headlight 603LU and the headlight 603LD, the headlight 603RU and the headlight 603RD, the brake light 607LU and the brake light 607LD, and the brake light 607RU and the brake light 607RD are not distinguished from each other and are illustrated together in one.

Note that unless otherwise specified below, the accessory light 601L, the accessory light 601R, the day running light 602L, the day running light 602R, the headlight 603L, the headlight 603R, the turn signal 604L, the turn signal 604R, the auxiliary light 605FL, the auxiliary light 605FR, the auxiliary light 605BL, and the auxiliary light 605BR shine white. Hereinafter, unless otherwise specified, the tail light 606L, the tail light 606R, the tail light 606CL, the tail light 606CR, the brake light 607L, and the brake light 607R shine red. Hereinafter, unless otherwise specified, the loop light 654 and the main light 751 shine orange.

Furthermore, hereinafter, basically, in each of the drawings, it is assumed that a light that is on is painted black and a light that is not on is painted white.

<At Power On>

Figure 38:
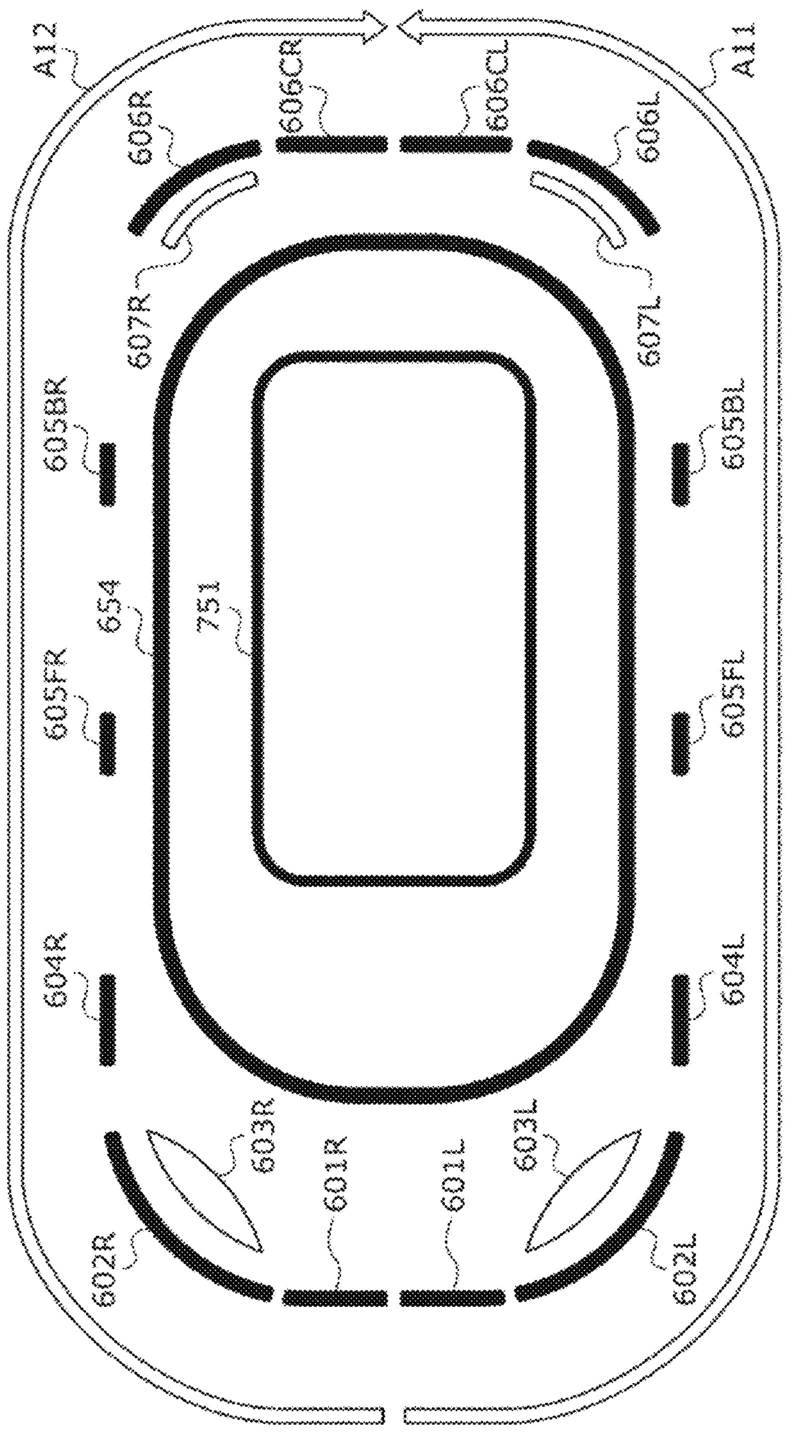
Figure 39:
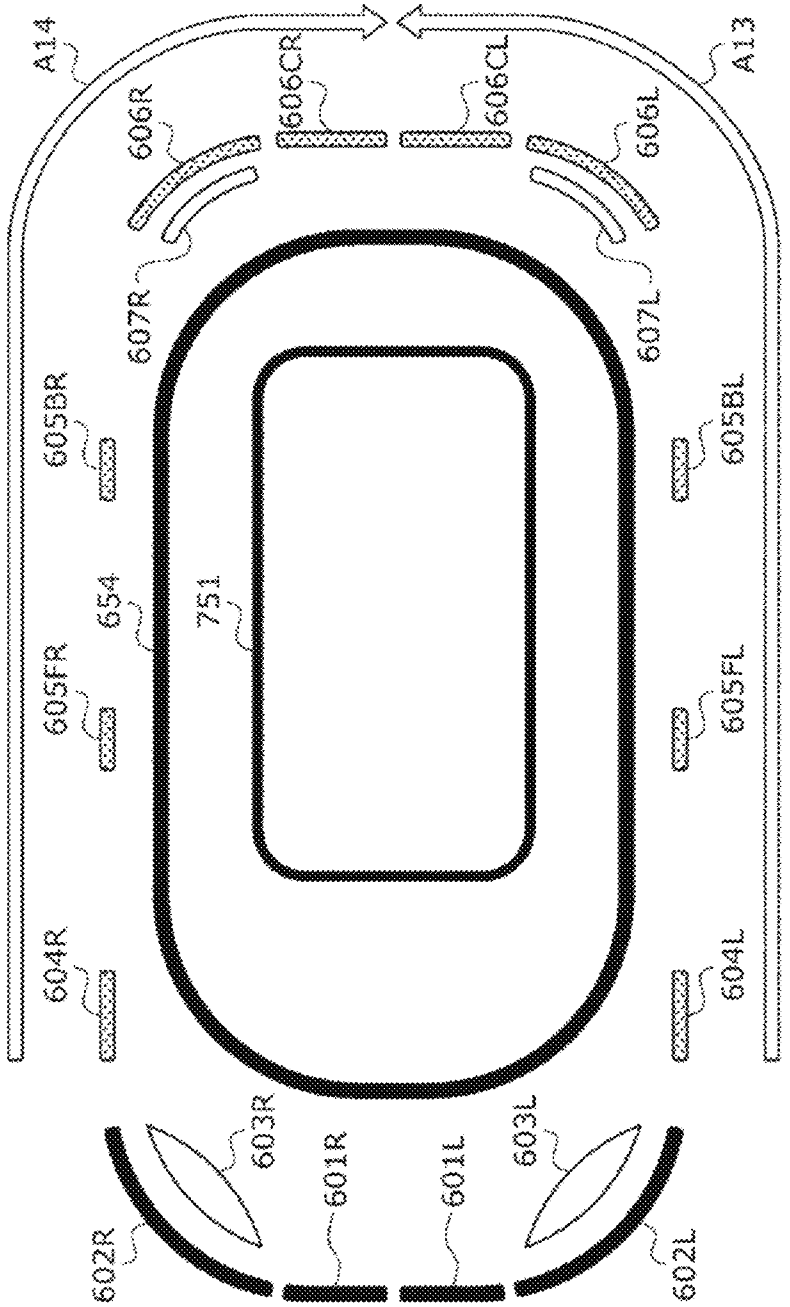

FIGS. 38 and 39 illustrate an example of a light emission pattern when the power of the vehicle 1B is turned on. FIG. 38 illustrates a state when all lights to be turned on at a time of power-on turn on. FIG. 39 illustrates the final state of the light at a time of power-on.

When the vehicle 1B is powered off, all the lights are off.

Then, when the power of the vehicle 1B is turned on, the accessory light 601L, the accessory light 601R, the day running light 602L, the day running light 602R, the turn signal 604L, the turn signal 604R, the auxiliary light 605FL, the auxiliary light 605FR, the auxiliary light 605BL, the auxiliary light 605BR, the tail light 606L, the tail light 606R, the tail light 606CL, and the tail light 606CR turn on.

At this time, as indicated by arrows A11 and A12 in the drawings, the lights turn on so that light flows around the body from the center of the front surface of the body to the center of the rear surface.

Specifically, logo portions at the right end of the accessory light 601L and the left end of the accessory light 601R first turn on for a while.

Next, the LEDs turn on in order from the right end to the left end of the accessory light 601L. Next, the LEDs turn on in order from a right end to a left end of the day running light 602L. Next, the LEDs turn on in order from a front end to a rear end of the turn signal 604L. Next, the LEDs turn on in order from a front end to a rear end of the auxiliary light 605FL. Next, the LEDs turn on in order from a front end to a rear end of the auxiliary light 605BL. Next, the LEDs turn on in order from a left end to a right end of the tail light 606L. Finally, the LEDs turn on in order from the left end to the right end of the tail light 606CL. Thus, as illustrated by the arrow A11, each light turns on so that the light flows counterclockwise from the center of the front surface of the body to the center of the rear surface.

Similarly, the LEDs turn on in order from the left end to the right end of the accessory light 601R. Next, the LEDs turn on in order from a left end to a right end of the day running light 602R. Next, the LEDs turn on in order from a front end to a rear end of the turn signal 604R. Next, the LEDs turn on in order from a front end to a rear end of the auxiliary light 605FR. Next, the LEDs turn on in order from a front end to a rear end of the auxiliary light 605BR. Next, the LEDs turn on in order from a right end to a left end of the tail light 606R. Finally, the LEDs turn on in order from the right end to the left end of the tail light 606CR. Thus, as illustrated by the arrow A12, each light turns on so that the light flows clockwise from the center of the front surface of the body to the center of the rear surface. The counterclockwise and clockwise light turning on are performed at the same time.

Next, the loop light 654 and the main light 751 turn on. At this time, each of the loop light 654 and the main light 751 turns on so that the whole is gradually brightened.

Then, when the lighting of the loop light 654 and the main light 751 is completed, the state illustrated in FIG. 38 is reached.

Next, part of the lights turn off as illustrated in FIG. 39. At this time, as indicated by arrows A13 and A14 in the drawing, the lights turn off in order from the front of the left side surface and the front of the right side surface of the body to the center of the rear surface.

Specifically, the LEDs turn off in order from the front end to the rear end of the turn signal 604L. Next, the LEDs turn off in order from the front end to the rear end of the auxiliary light 605FL. Next, the LEDs turn off in order from the front end to the rear end of the auxiliary light 605BL. Next, the LEDs turn off in order from the left end to the right end of the tail light 606L. Finally, the LEDs turn off in order from the left end to the right end of the tail light 606CL. Thus, as illustrated by the arrow A13, each light turns off in order counterclockwise from the front of the left side surface of the body to the center of the rear surface.

Similarly, the LEDs turn off in order from the front end to the rear end of the turn signal 604R. Next, the LEDs turn off in order from the front end to the rear end of the auxiliary light 605FR. Next, the LEDs turn off in order from the front end to the rear end of the auxiliary light 605BR. Next, the LEDs turn off in order from the right end to the left end of the tail light 606R. Finally, the LEDs turn off in order from the right end to the left end of the tail light 606CR. Thus, as illustrated by the arrow A14, each light turns off in order from the front of the right side surface of the body to the center of the rear surface in a clockwise direction.

The counterclockwise and clockwise light turning off are performed at the same time.

<While Driving and when Headlight 603 is Off>

Figure 40:
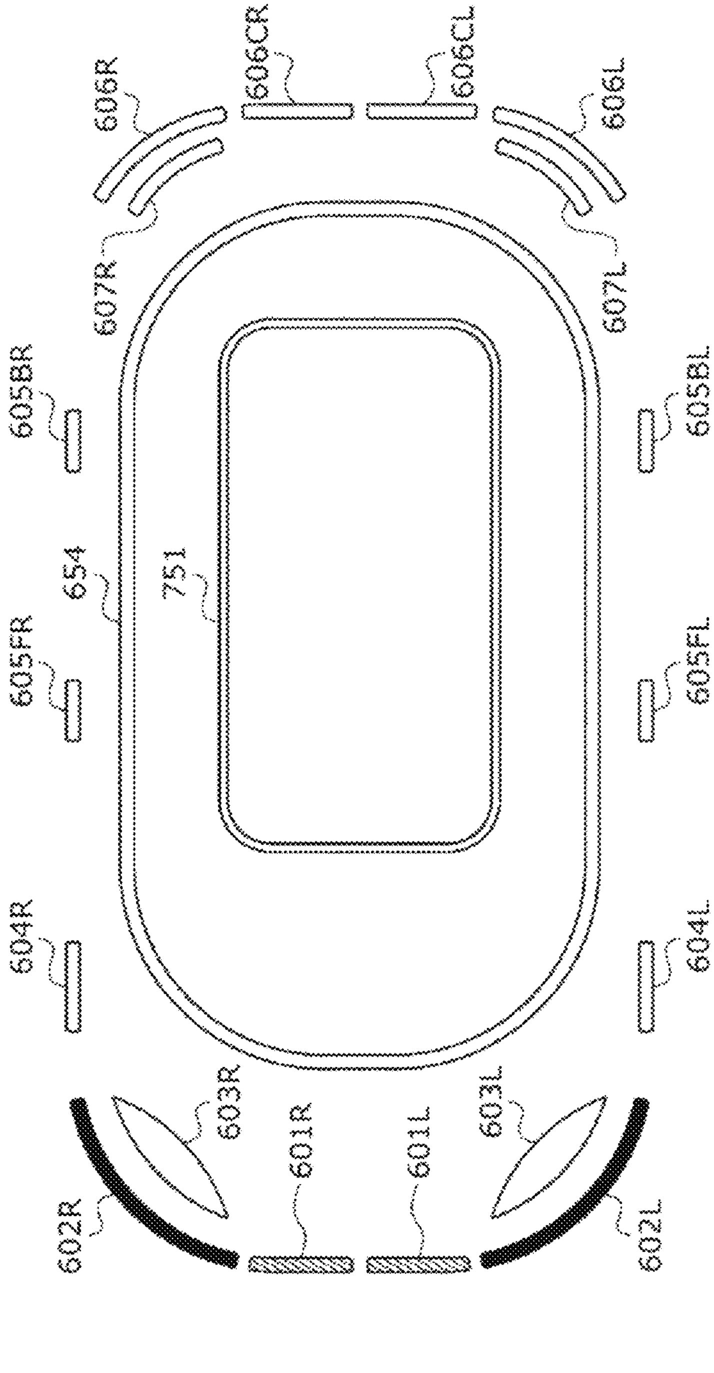
FIG. 40 is a diagram illustrating an example of a light emission pattern during operation and when the headlight is off.

FIG. 40 illustrates an example of a light emission pattern in a case where the vehicle 1B is being driven (the shift position is set to driving or autonomous driving) and the headlight 603 is off.

In this state, the accessory light 601L, the accessory light 601R, the day running light 602L, and the day running light 602R turn on.

Note that the day running light 602L and the day running light 602R are always on while the vehicle 1B is in operation due to restrictions such as laws and regulations. On the other hand, the accessory light 601L and the accessory light 601R need to be dimmed or turned off while the vehicle 1B is being driven due to restrictions such as laws and regulations. Therefore, brightness of the accessory light 601L and the accessory light 601R is set lower than usual.

<While Driving and when Headlight 603 is On>

Figure 41:
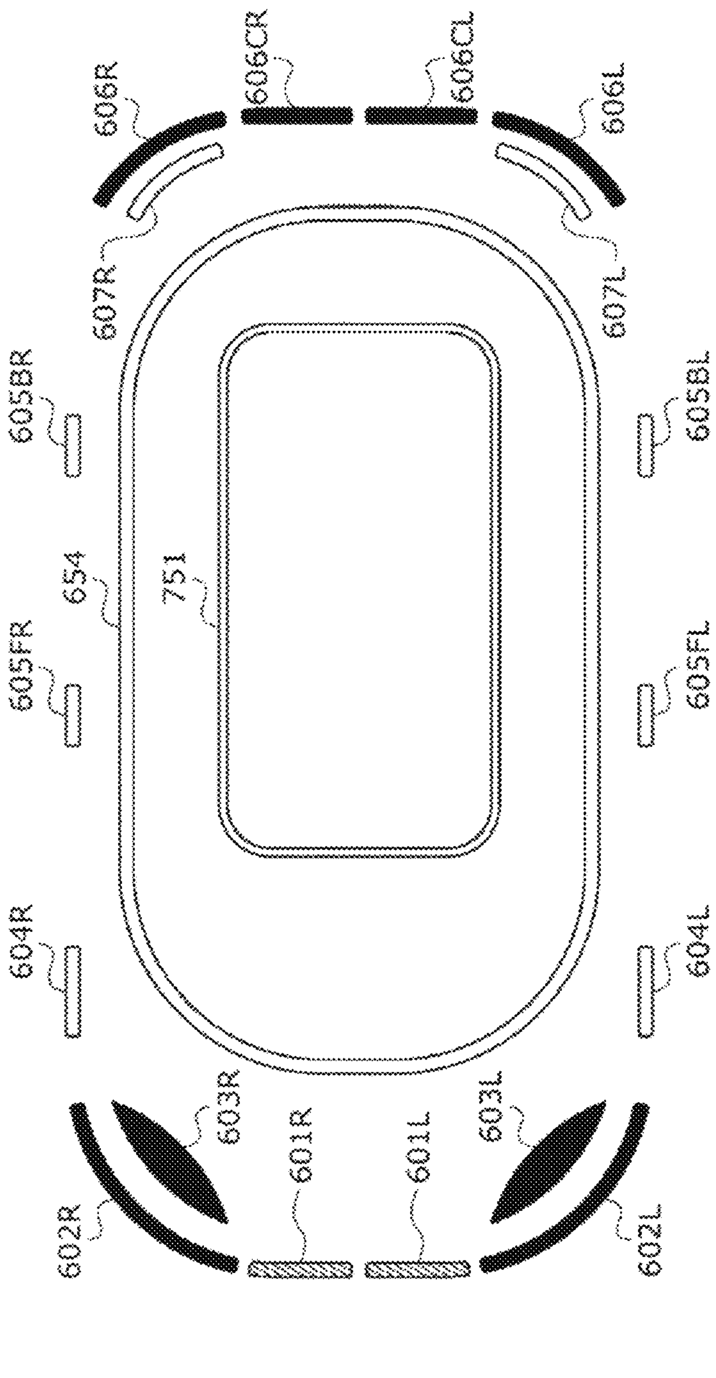

FIG. 41 illustrates an example of a light emission pattern in a case where the vehicle 1B is being driven (the shift position is set to driving or autonomous driving) and the headlight 603 is on.

Comparing FIG. 41 with FIG. 40, there is a difference in that the headlight 603L, the headlight 603R, the tail light 606L, the tail light 606R, the tail light 606CL, and the tail light 606CR are on. That is, the tail light 606L, the tail light 606R, the tail light 606CL, and the tail light 606CR turn on according to turning on of the headlight 603L and the headlight 603R.

<When Brake is Applied>

Figure 42:
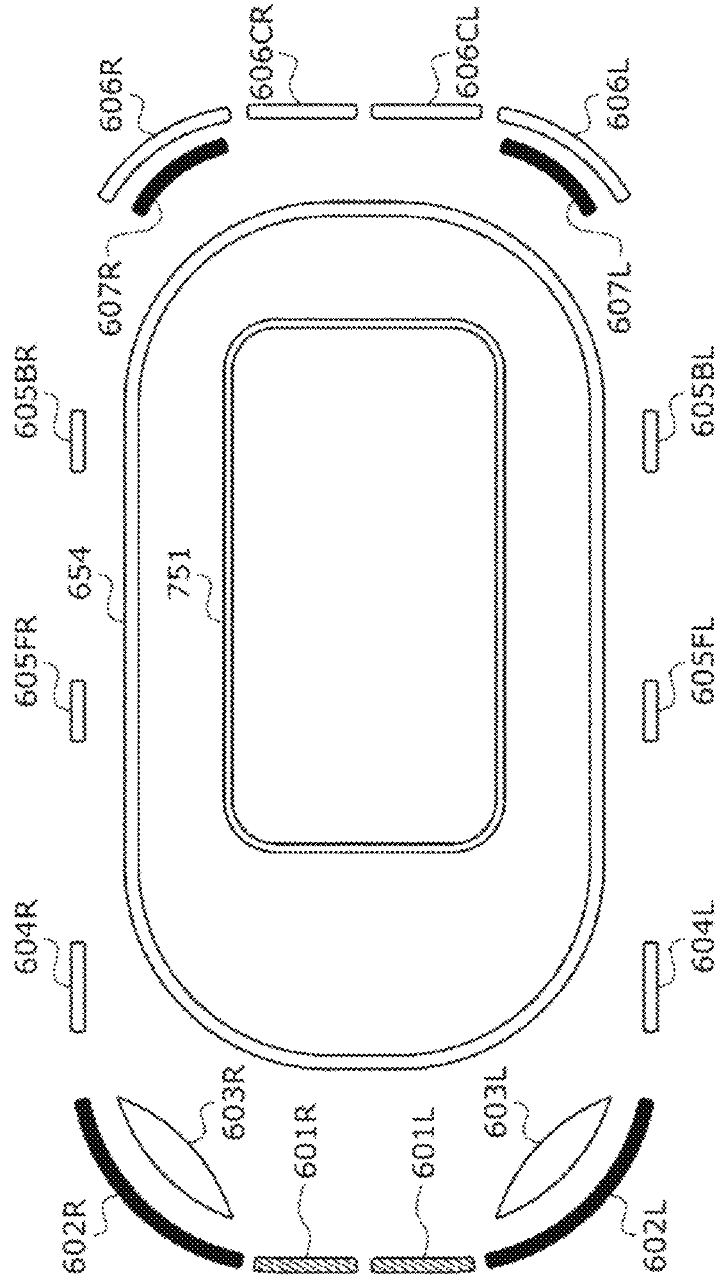
FIG. 42 is a diagram illustrating an example of a light emission pattern when a brake is applied.

FIG. 42 illustrates an example of a light emission pattern when the brake is applied.

Comparing the state of FIG. 42 with the state of FIG. 40, there is a difference in that the brake light 607L and the brake light 607R are on. That is, when the brake is applied, the brake light 607L and the brake light 607R turn on.

<When Turn Signal Operates>

Figure 43:
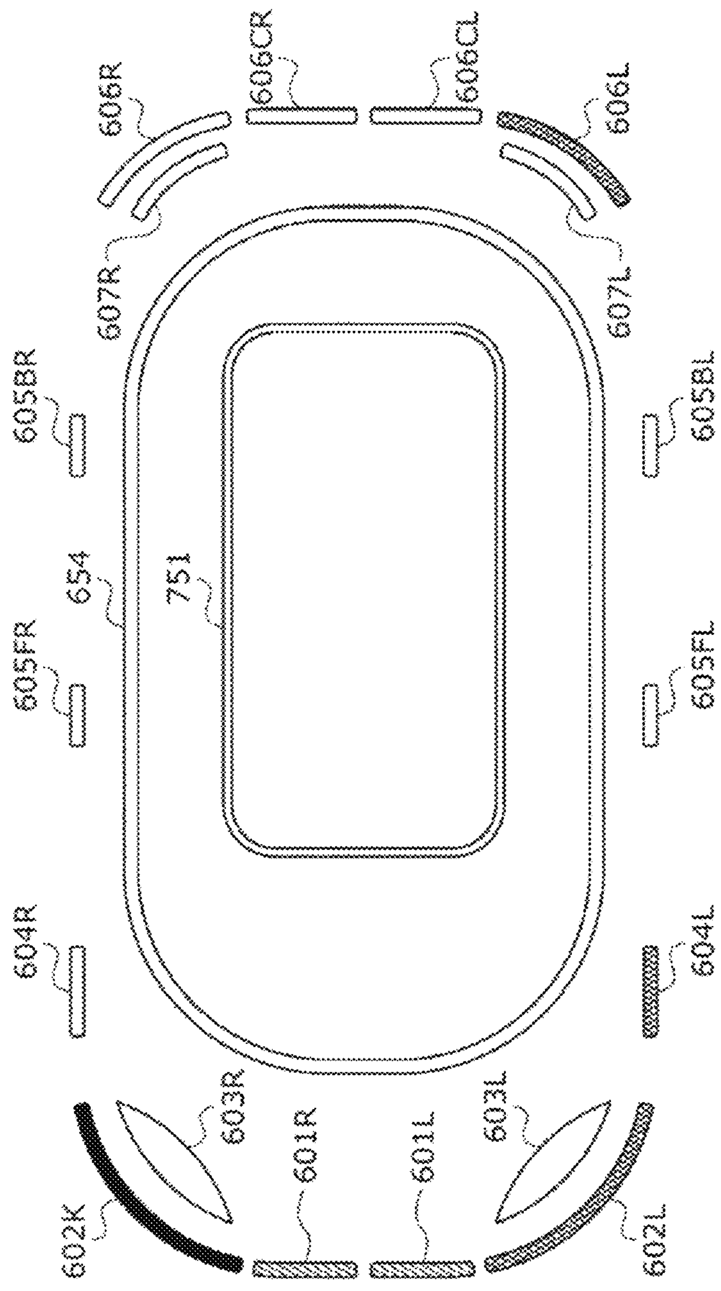
FIG. 43 is a diagram illustrating an example of a light emission pattern during a turn signal operation.

FIG. 43 illustrates an example of a light emission pattern in a case where the left turn signal is operating.

Comparing FIG. 43 with FIG. 40, there is a difference in that colors of the day running light 602L and the tail light 606L change and the turn signal 604L blinks.

Specifically, the LEDs change from white to orange in order from the right end to the left end of the day running light 602L. After all the LEDs of the day running light 602L have changed to orange, the LEDs turn on in orange in order from the distal end to the rear end of the turn signal 604L.

In parallel with this, the LEDs change from white to orange in order from the right end to the left end of the tail light 606L.

Next, the LEDs change from orange to white in order from the right end to the left end of the day running light 602L. After all the LEDs of the day running light 602L have changed to white, the LEDs turn off in order from the distal end to the rear end of the turn signal 604L.

In parallel with this, the LEDs change from orange to white in order from the right end to the left end of the tail light 606L.

Hereinafter, a similar operation is repeated.

<Case where Door 611 is Open>

Figure 44:
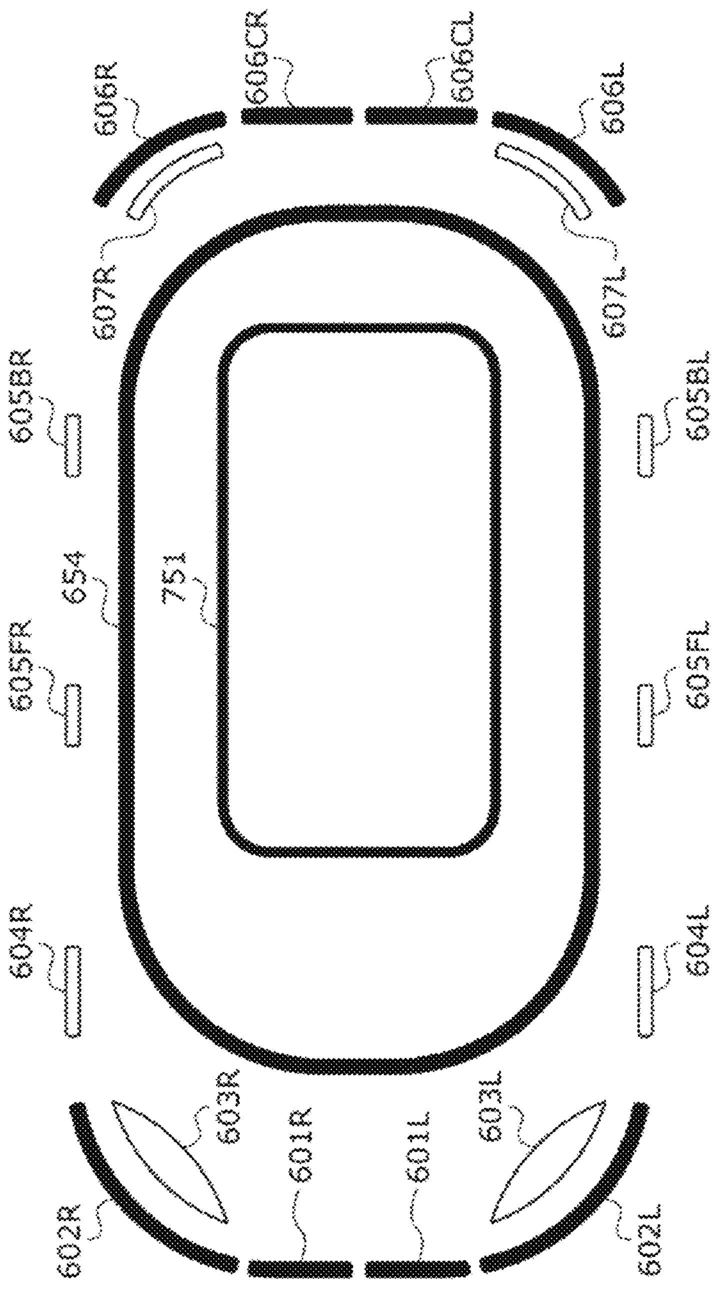
FIG. 44 is a diagram illustrating an example of a light emission pattern when a door is open.

FIG. 44 illustrates an example of a light emission pattern in a case where any door 611 of the vehicle 1B is open.

At this time, the accessory light 601L, the accessory light 601R, the day running light 602L, the day running light 602R, the tail light 606L, the tail light 606R, the tail light 606CL, the tail light 606CR, the loop light 654, and the main light 751 turn on.

<When Door 611 is Closed>

Figure 45:
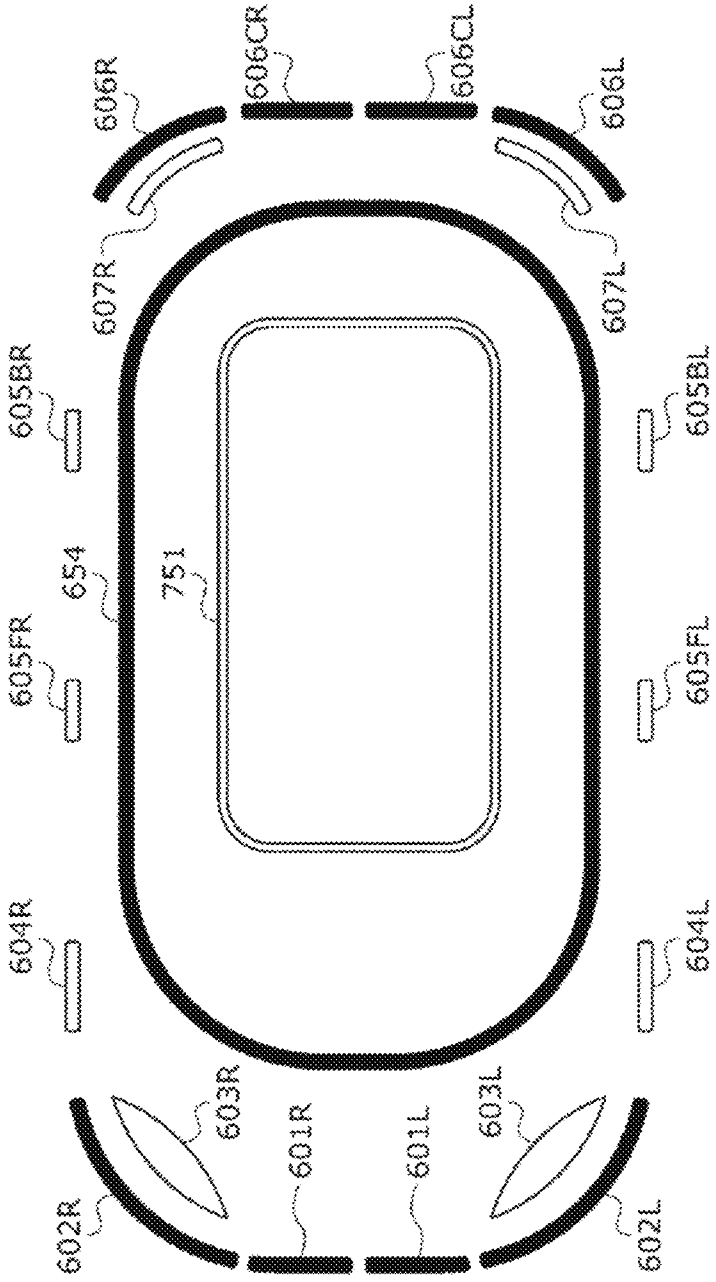
FIG. 45 is a diagram illustrating an example of a light emission pattern when a door is closed.

FIG. 45 illustrates an example of a light emission pattern when changing from a state where any door 611 of the vehicle 1B is open to a state where all doors 611 are closed.

Figure 46:
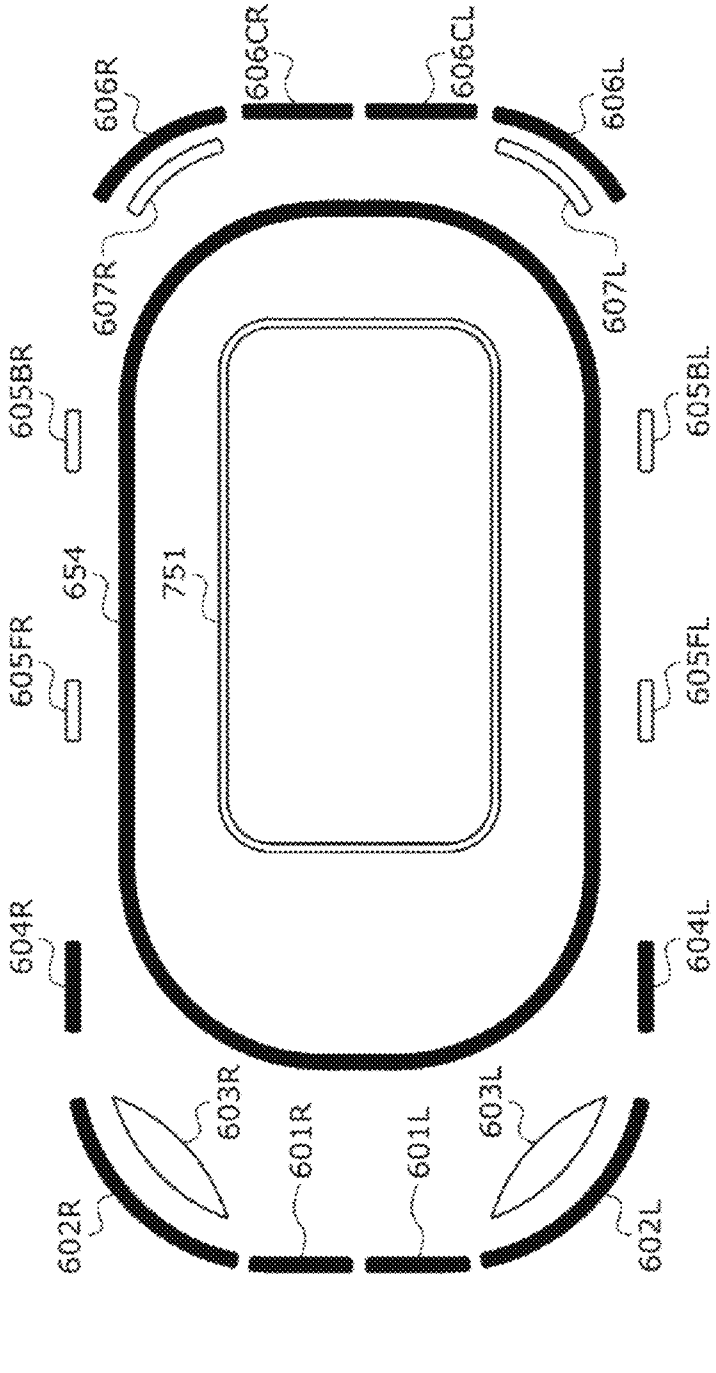
FIG. 46 is a diagram illustrating an example of a light emission pattern during parking.

Comparing the state of FIG. 45 with the state of FIG. 46, there is a difference in that the main light 751 is off. That is, when the door 611 is closed, the main light 751 turns off.

<When Parking>

FIG. 46 illustrates an example of a light emission pattern in a case where the shift position of the vehicle 1B is set to parking.

In this case, the accessory light 601L, the accessory light 601R, the day running light 602L, the day running light 602R, the turn signal 604L, the turn signal 604R, the tail light 606L, the tail light 606R, the tail light 606CL, the tail light 606CR, and the loop light 654 turn on.

<At Power Off>

Figure 47:
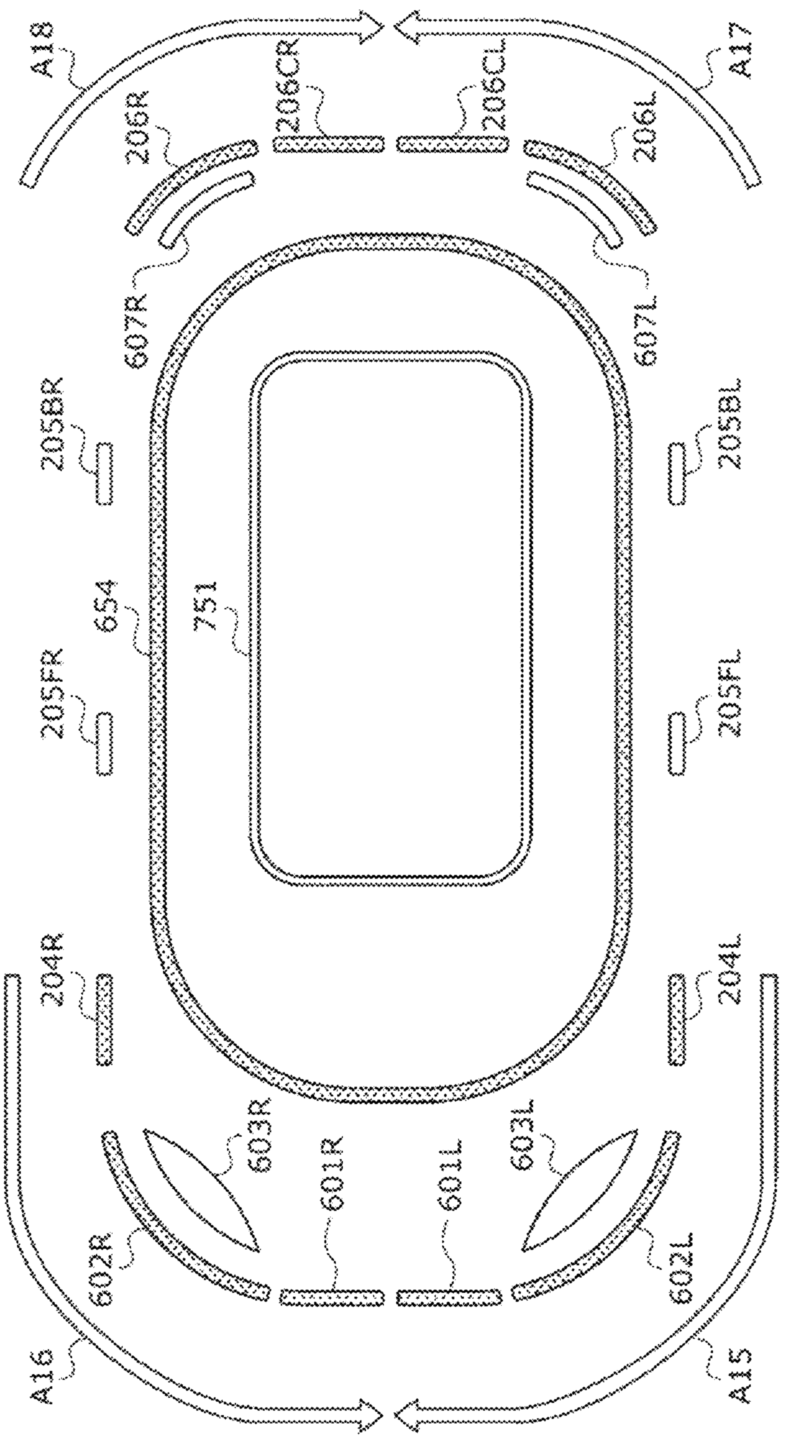
FIG. 47 is a diagram illustrating an example of a light emission pattern when power is off.

FIG. 47 illustrates an example of a light emission pattern when the power is turned off from a state where the shift position of the vehicle 1B is set to parking.

In this case, the accessory light 601L, the accessory light 601R, the day running light 602L, the day running light 602R, the turn signal 604L, the turn signal 604R, the tail light 606L, the tail light 606R, the tail light 606CL, the tail light 606CR, and the loop light 654 turn off.

At this time, as indicated by arrows A15 and A16, the lights turn off so as to flow from side surfaces of the body to the center of the front surface.

Furthermore, as indicated by arrows A17 and A18, the lights turn off so that they flow from the side surfaces of the body to the center of the rear surface.

Specifically, the LEDs turn off in order from the rear end to the front end of the turn signal 604L. Next, the LEDs turn off in order from the left end to the right end of the day running light 602L. Next, the LEDs turn off in order from the left end to the right end of the accessory light 601L.

In parallel with this, the LEDs turn off in order from the rear end to the front end of the turn signal 604R. Next, the LEDs turn off in order from the right end to the left end of the day running light 602R. Next, the LEDs turn off in order from the right end to the left end of the accessory light 601R.

In parallel with this, the LEDs turn off in order from the left end to the right end of the tail light 606L. Next, the LEDs turn off in order from the left end to the right end of the tail light 606CL.

In parallel with this, the LEDs turn off in order from the right end to the left end of the tail light 606R. Next, the LEDs turn off in order from the right end to the left end of the tail light 606CR.

Furthermore, the loop light 654 gradually turns off.

<When Person Approaches Area Around Vehicle 1B>

Next, although not illustrated, an example of a light emission pattern when an approach of a person to the vehicle 1B is detected by the recognition unit 73 will be described, for example.

For example, a light at a position near the person approaching (near a location approaching) turns on or blinks. Specifically, for example, when an approach of a person to the vicinity of the door 611FL is detected, the turn signal 604L and the auxiliary light 605FL near the door 611FL turn on or blink. Moreover, for example, after the turn signal 604L and the auxiliary light 605FL have turned on, other lights may turn on in sequence.

Furthermore, for example, the light may always turn on or blink in a similar pattern, in a case where an approach of a person is detected, regardless of the position of the approach. For example, the light may turn on so that the light flows around the vehicle.

Moreover, for example, the mode of turning on or blinking the light (for example, color, pattern, and the like) may be changed depending on the approaching person. For example, in a case where the approaching person is recognized as a pre-registered user (for example, a driver, his or her family member, or the like), white light may blink. On the other hand, for example, in a case where recognition of the approaching person fails (in a case where the approaching person is not recognized as a pre-registered user), red light may blink.

Note that for example, in a case where the body system control unit 84 detects the approach of a registered user, the door lock may be automatically unlocked.

Furthermore, for example, conditions for turning on or blinking light when a person approaches may be limited. For example, the light may turn on or blink by the approach of a person only in a case where the power of the vehicle 1B is turned off or in a case where there is no person in the vehicle 1B.

In this manner, in a case where the approach of a person is detected, for example, by turning on or blinking an external light, it is appealed to the surroundings that the vehicle 1B is monitoring the surroundings, and stealing or destructive behavior of the vehicle 1B can be prevented. Furthermore, in a case where the approach of a person is detected, for example, by turning on or blinking a light in the vehicle, it is possible to appeal to the surroundings that the vehicle 1B is also monitoring the inside of the vehicle.

<Light emission pattern of illumination 652 of steering wheel 651>

Next, a light emission pattern of the illumination 652 of the steering wheel 651 will be described.

For example, the light control unit 85 lights or blinks the illumination 652 in a pattern according to a situation on the basis of at least one of a situation of the vehicle 1B, a situation around the vehicle 1B, or a situation of an occupant. The light emission pattern of the illumination 652 is defined by, for example, at least one of color, brightness, blinking pattern, light movement, or light emitting area.

Specifically, for example, when the vehicle 1B is ready for autonomous driving, a plurality of short bands of light makes about one revolution around the illumination 652. Then, the entire illumination 652 blinks. Thus, the driver can surely recognize that it is ready for autonomous driving.

Furthermore, for example, in a case where the vehicle 1B changes lanes by autonomous driving, first, the entire illumination 652 turns on. Subsequently, after the illumination 652 has turned off, the LEDs of the illumination 652 in the direction in which the vehicle 1B moves to change lanes blink. Then, after the lane change is completed, the entire illumination 652 turns on and then turns off. In this manner, a lane change notification is given from before the lane change until the lane change is completed, which can give the occupant a sense of security.

Moreover, for example, in a case of calling attention of the driver by approaching an obstacle, falling asleep, or the like, an upper part of the illumination 652 blinks in red. This allows the driver to quickly detect and avoid danger.

Furthermore, for example, in a case where voice recognition is performed, a plurality of bands of light moves left and right in the upper part of the illumination 652. Thus, the driver can recognize that the voice recognition function is operating normally.

<Image Capturing Processing>

Figure 48:
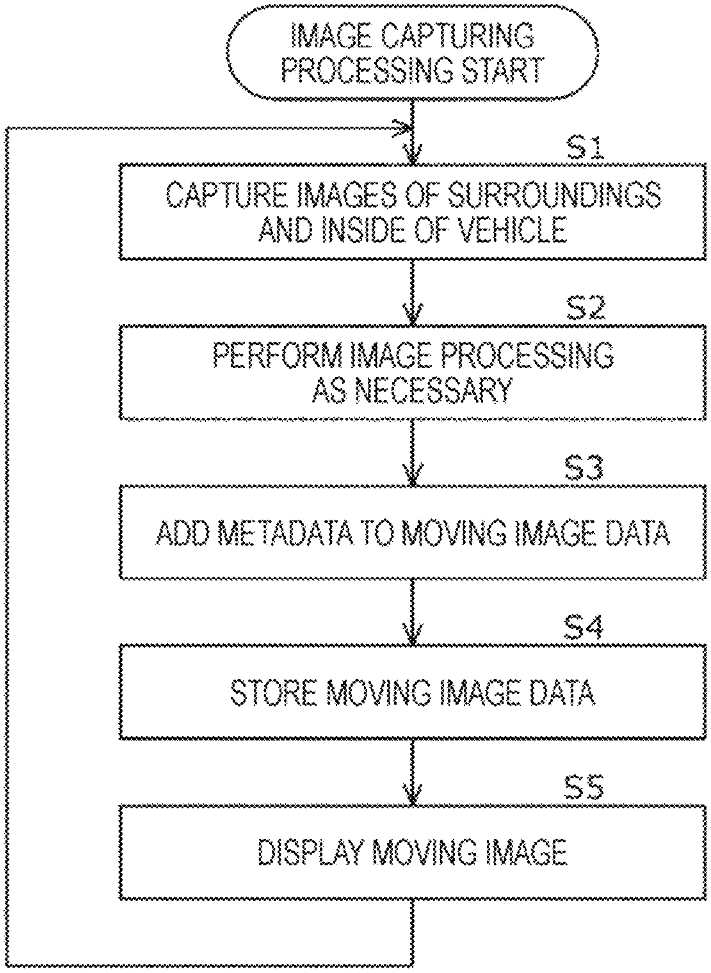
FIG. 48 is a flowchart for describing image capturing processing.

Next, image capturing processing executed by the vehicle 1B will be described with reference to a flowchart of FIG. 48.

This process starts, for example, when the power of the vehicle 1B is turned on, and ends when the power of the vehicle 1B is turned off.

In step S1, the camera 51 captures images of the surroundings and the inside of the vehicle 1B. Specifically, the camera 51 includes a plurality of cameras, and each camera captures an image of the surroundings or the inside (interior) of the vehicle 1B. Each camera supplies moving image data obtained by image capturing to the information processing unit 701.

In step S2, the image processing unit 711 performs image processing as necessary.

For example, the image processing unit 711 superimposes visual information on each frame of the moving image data, as will be described later with reference to FIGS. 49 to 52.

Furthermore, for example, the image processing unit 711 performs image processing such as noise cancellation for each frame of the moving image data on the basis of sensor data from the in-vehicle sensor 26 and the vehicle sensor 27. For example, the image processing unit 711 removes noise such as raindrops in the frame in a case where it is raining.

In step S3, the metadata addition unit 712 adds metadata to the moving image data.

For example, the metadata addition unit 712 adds metadata regarding at least one of image capturing location, image capturing date and time, situation of the vehicle 1B, situation inside the vehicle, or situation of the surroundings to each piece of moving image data captured during movement or the like.

The metadata regarding the image capturing location includes, for example, at least one of the position of the vehicle 1B at the time of image capturing, the image capturing direction, the position of the camera used for image capturing, or the like.

The metadata regarding the image capturing date and time includes, for example, at least one of the date, time, or the like at the time of image capturing.

The metadata regarding the situation of the vehicle 1B includes, for example, at least one of speed, acceleration, traveling direction, destination, or state of the vehicle 1B (for example, presence or absence of failure, presence or absence of accident, charge amount, and the like).

The metadata regarding the situation inside the vehicle includes, for example, occupant identification information (for example, name, ID, and the like), passenger seat position, occupant situation (for example, action content, doze, and the like), voice recognition result of conversation in the vehicle, activity level in the vehicle, and the like. The activity level is set on the basis of, for example, the volume of conversation in the vehicle, movement of an occupant, and the like.

The metadata regarding the situation of the surroundings includes at least one of, for example, weather, temperature, humidity, brightness, position and type of a surrounding object (for example, another vehicle, a pedestrian, an obstacle, a traffic sign, a landmark, or the like), presence or absence of occurrence and type of an event (for example, accident, construction, and the like), or the like.

Furthermore, for example, the metadata addition unit 712 may add metadata input by the user (occupant) to the moving image data. For example, the steering wheel 651 may be provided with a movie button, and the driver may press the movie button in a case where a scene or the like for which it is desired to save moving image data is being captured. As the case where a scene or the like for which it is desired to save moving image data, for example, a case where there is fine scenery around the vehicle 1B, or a case where a trouble such as an accident has occurred, or the like is assumed. For example, the metadata addition unit 712 adds metadata indicating that it is necessary to save the moving image data captured during a period specified by the user using the movie button.

Note that a unit in which the metadata is given can be arbitrarily set. For example, metadata is added in frame units, units including a plurality of frames, or moving image data units. Furthermore, the unit in which the metadata is given may be variable depending on the type of metadata.

In step S4, the vehicle 1B stores the moving image data. Specifically, the image processing unit 711 stores the moving image data in the recording unit 28.

Note that at this time, audio data recorded around and inside the vehicle 1B may be stored together with the moving image data.

In step S5, the vehicle 1B displays the moving image. Specifically, the output control unit 713 causes the HMI 31 to display a moving image on the basis of the moving image data.

For example, moving images illustrated in FIGS. 49 to 52 are displayed on the center display 201.

Figure 49:
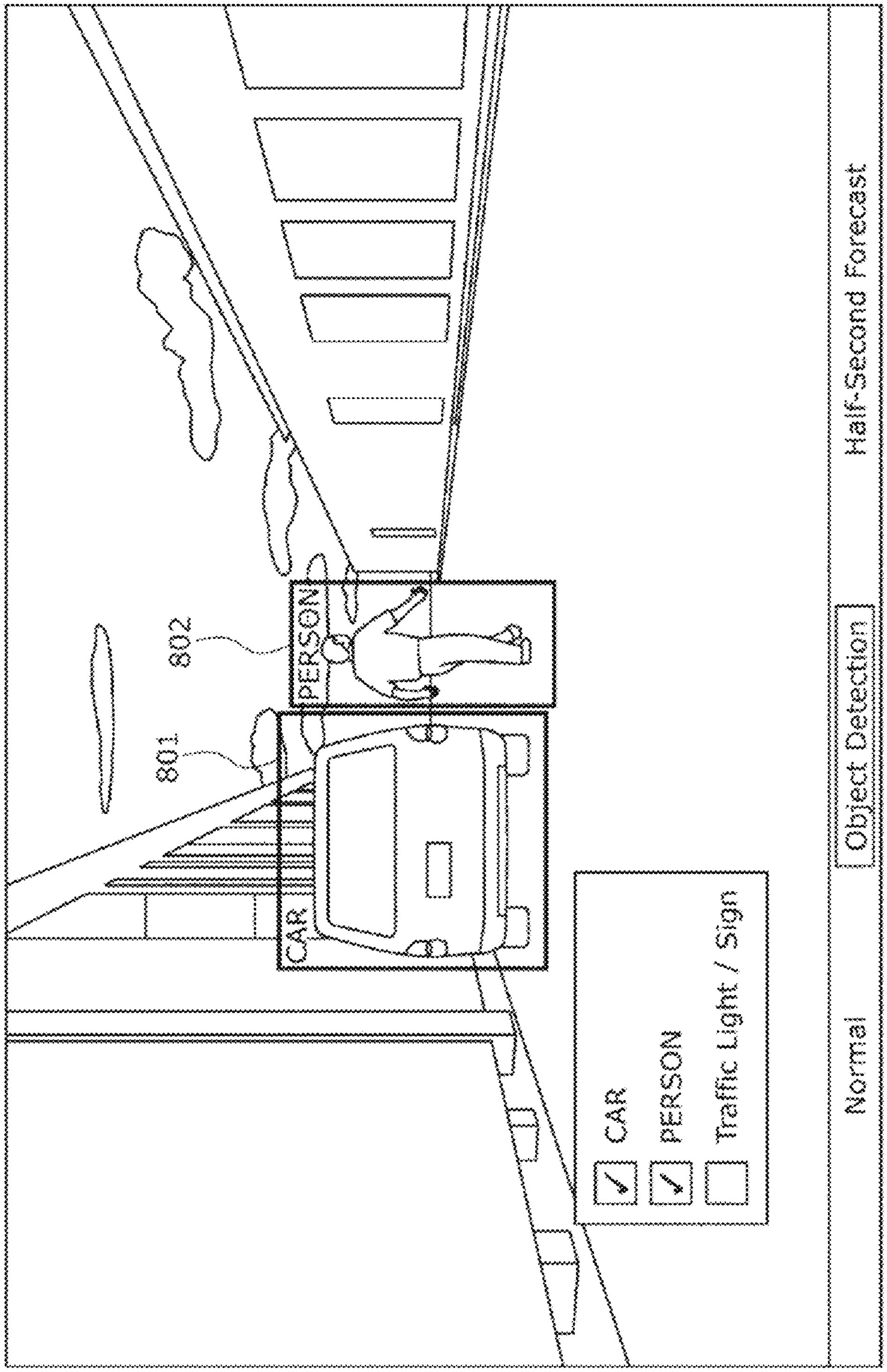
FIG. 49 illustrates an example of a moving image when an object detection mode is set.

FIG. 49 illustrates an example of a moving image displayed in a case where a display mode is set to an object detection mode, for example. In this example, an example in which a vehicle and a person are selected as detection targets is illustrated. Then, a frame 801 surrounding the vehicle and a frame 802 surrounding the person detected in a captured moving image of the front of the vehicle 1B are displayed. Furthermore, characters (CAR and PERSON) indicating the types of objects detected in the frame 801 and the frame 802 are displayed.

Figure 50:
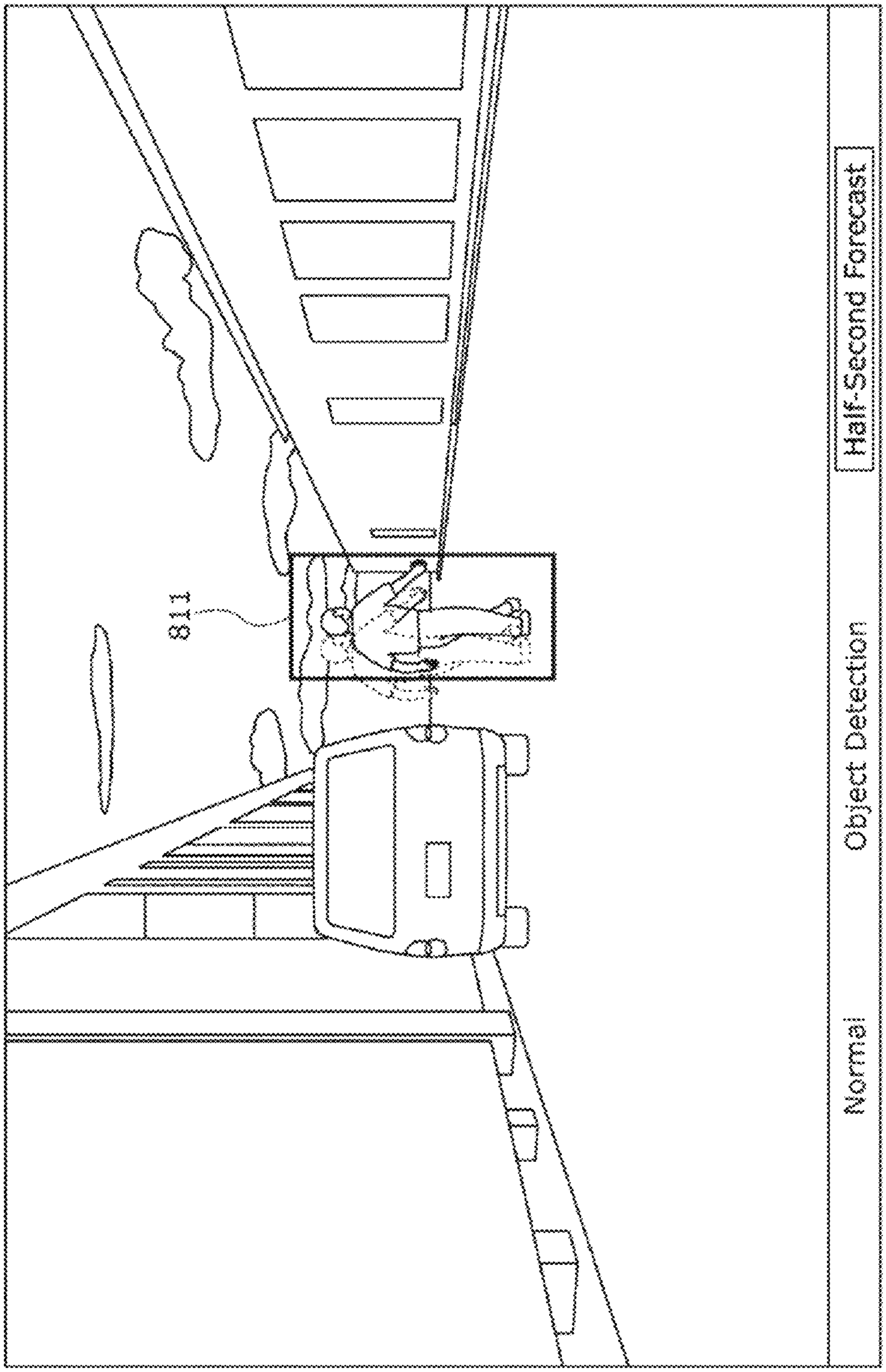
FIG. 50 illustrates an example of a moving image when a prediction mode is set.

FIG. 50 illustrates, for example, an example of a moving image displayed in a case where the display mode is set to a prediction mode. In this example, a predicted position after 0.5 seconds of the mobile apparatus (person in this example) detected in the moving image is displayed. In this example, the current position of the person is indicated by a dotted line, the predicted position of the person after 0.5 seconds is indicated by a solid line, and is surrounded by a frame 811.

Figure 51:
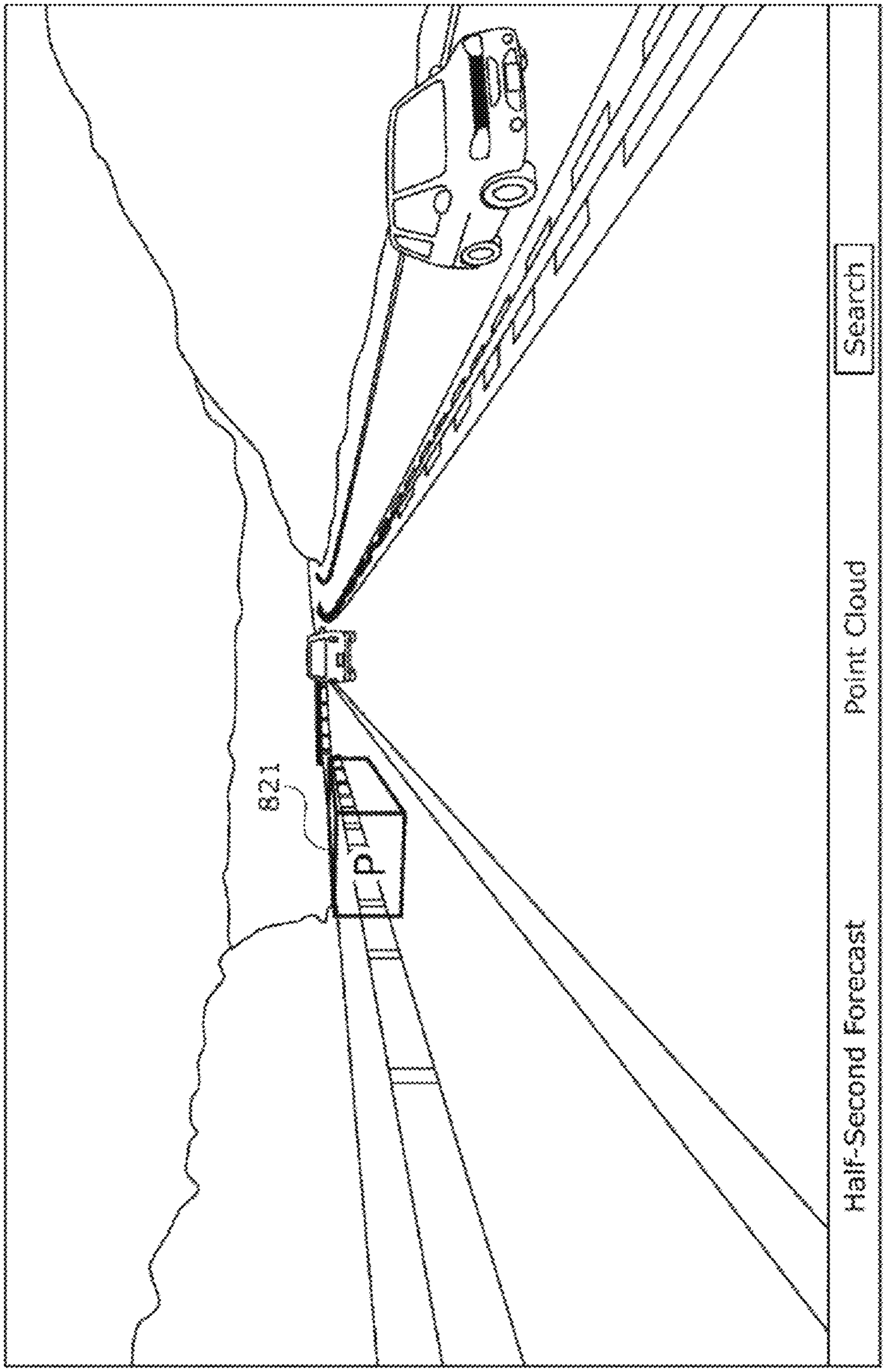
FIG. 51 illustrates an example of a moving image when a search mode is set.

FIG. 51 illustrates, for example, an example of a moving image displayed in a case where the display mode is set to a search mode. Here, an example of searching for and displaying a parkable position is illustrated. Specifically, a frame 821 indicating a parkable position is displayed.

Note that for example, a plurality of parkable positions may be displayed. Furthermore, for example, the parkable position may be displayed in a bird's-eye view.

Figure 52:
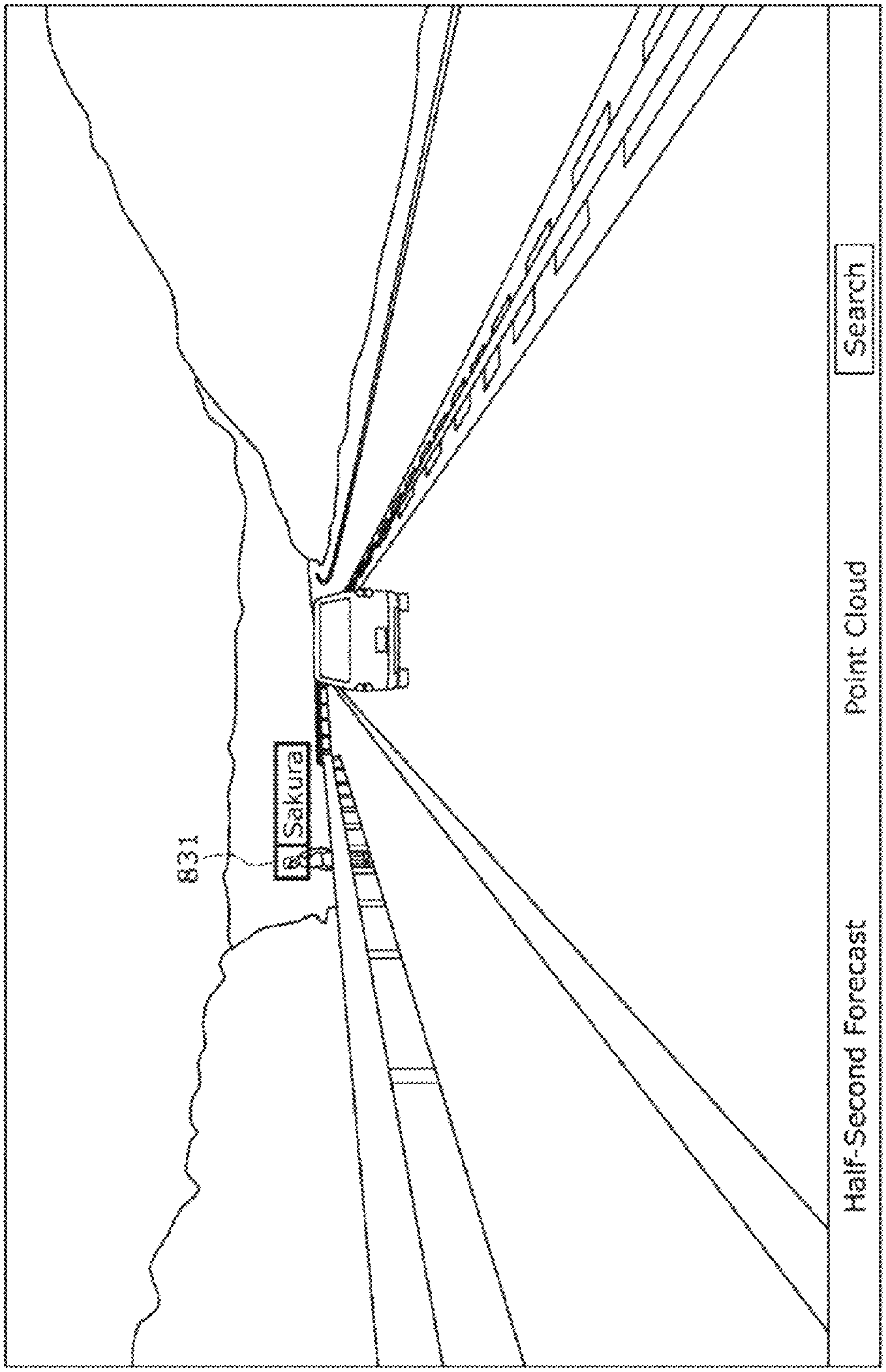
FIG. 52 illustrates an example of a moving image when the search mode is set.

FIG. 52 illustrates, for example, an example of a moving image displayed in a case where the display mode is set to a search mode. Here, an example of searching for a pre-registered person and displaying a detected person is illustrated. Specifically, in the moving image, a frame 831 surrounding a pre-registered person is displayed. Furthermore, the name of the detected person (Sakura) is displayed in the frame 831.

Note that, for example, a moving image in a direction (for example, forward, backward, leftward, rightward, and the like) selected by an occupant such as a driver may be displayed on the center display 201. Furthermore, for example, a 360-degree moving image around the vehicle 1B may be displayed on the center display 201 while scrolling.

Furthermore, for example, sensor data obtained by the radar 52 or LiDAR 53 may be imaged and displayed on the center display 201. Furthermore, visual information based on data obtained by two or more types of sensors of the camera 51, the radar 52, and the LiDAR 53 may be superimposed and displayed on the moving image.

Moreover, for example, the direction of planned travelling and the like may be superimposed and displayed on the moving image on the basis of route planning.

Furthermore, for example, movement of another vehicle predicted by information and the like obtained by vehicle-to-vehicle communication may be superimposed and displayed on the moving image.

Thereafter, the processing returns to step S1, and the processing of steps S1 to S5 is repeatedly executed.

<Moving Image Editing Processing>

Figure 53:
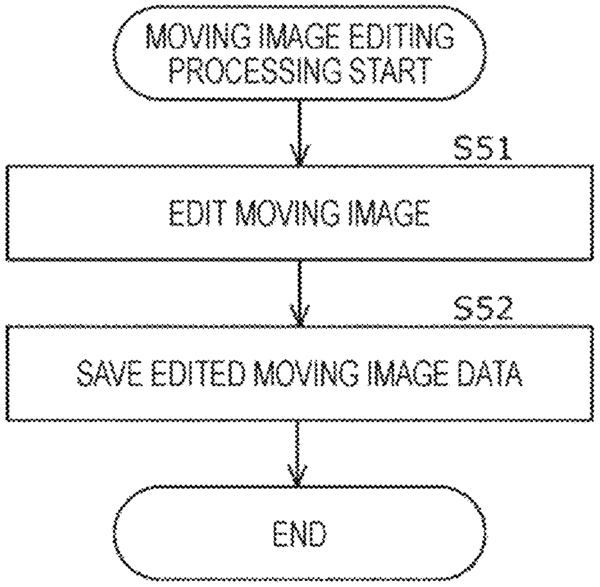
FIG. 53 is a flowchart for describing editing processing.

Next, moving image editing processing executed by the vehicle 1B will be described with reference to FIG. 53.

This processing is started, for example, when an instruction to edit a moving image is input to the HMI 31. The instruction to edit a moving image includes, for example, a period during which a moving image to be edited is captured (hereinafter referred to as an editing target period), a condition for extracting frames to be included in the moving image, and the like.

In step S51, the image processing unit 711 edits the moving image.

For example, the image processing unit 711 may extract frames to be included in moving image data after editing (hereinafter referred to as edited moving image data) from each piece of moving image data captured within the editing target period (hereinafter referred to as captured moving image data) on the basis of metadata or the like.

For example, the image processing unit 711 extracts a frame to which metadata indicating that it is necessary to be saved is added.

Furthermore, for example, the image processing unit 711 extracts a frame satisfying a given condition on the basis of the metadata.

For example, the image processing unit 711 extracts a frame on the basis of the route of the vehicle 1B and the metadata within the editing target period. For example, the image processing unit 711 detects the route of the vehicle 1B within the editing target period on the basis of position information included in the map data and the metadata of the moving image data. Then, for example, in a case where the vehicle 1B is traveling on the road along the sea, the image processing unit 711 preferentially extracts a frame capturing an image in a direction of the sea. For example, in a case where the vehicle 1B is traveling on a hill such as a mountain, the image processing unit 711 preferentially extracts a frame capturing an image in a direction to look down on the surroundings. Moreover, for example, the image processing unit 711 preferentially extracts a frame showing a landmark or the like around the vehicle 1B on the basis of a traveling direction, a turning direction, or the like of the vehicle 1B.

For example, the image processing unit 711 extracts a frame when a specific event occurs on the basis of the metadata. For example, in a case where the vehicle 1B has an accident or an accident occurs around the vehicle 1B, the image processing unit 711 preferentially extracts frames of a time zone before and after the accident. Furthermore, for example, the image processing unit 711 preferentially extracts a frame capturing a direction in which the accident has occurred is captured.

For example, in a case of detecting excitement in the vehicle on the basis of the activity level included in the metadata, the image processing unit 711 preferentially extracts a frame capturing an image inside the vehicle. Furthermore, for example, the image processing unit 711 also extracts audio data corresponding to the extracted frame in the vehicle.

Furthermore, for example, the output control unit 713 may display a list of moving image data and actual moving images on the center display 201, the tablet terminal 662L, and the like, and the image processing unit 711 may edit a moving image on the basis of an instruction of the user.

For example, the user may select moving image data or a frame that he or she wants to include in edited moving image data. In this case, for example, various information, visual effects, visual information such as graffiti may be superimposed on the frame of the moving image displayed on the center display 201 and the tablet terminal 662L or the like.

Then, the image processing unit 711 generates edited moving image data by, for example, combining extracted frames. For example, the image processing unit 711 generates the edited moving image data by connecting the extracted frames in a time series, arranging or superimposing a plurality of frames in the same frame, and the like. Furthermore, the image processing unit 711 superimposes visual information on the extracted frame as necessary on the basis of, for example, the metadata.

In step S52, the vehicle 1B saves the moving image data. For example, the image processing unit 711 stores the edited moving image data in the recording unit 28. Furthermore, for example, the image processing unit 711 transmits the edited moving image data to a server or an information processing terminal (for example, a smartphone, a tablet terminal, a personal computer, or the like) owned by the occupant via the communication unit 22 and stores the edited moving image data.

Thereafter, the moving image editing processing ends.

In this manner, it is possible to easily edit a captured moving image of the surroundings and the inside of the vehicle 1B. Thus, it is possible to easily generate, for example, moving image data recording memories of a trip, moving image data obtained by extracting scenes of beautiful views, moving image data recording the situation of an accident, and the like.

5. Modification Example of Second Embodiment

Hereinafter, a modification example of the second embodiment of the present technology described above will be described.

For example, the captured moving image data to which the metadata before editing is added can be stored or copied outside the vehicle 1B, and a device external to the vehicle 1B (for example, a server (cloud), a smartphone, a tablet terminal, or a personal computer, or the like) may edit the moving image. Furthermore, for example, the device external to the vehicle 1B and the vehicle 1B may jointly edit the moving image. Moreover, for example, the metadata may be added by the device external to the vehicle 1B.

Furthermore, in the above description, the example of illuminating the front line and the tail line of the loop line L1 has been illustrated, but for example, the front line and the tail line may not be illuminated in consideration of design, laws and regulations, and the like.

Moreover, in the above description, the example of dividing the center portion of the front line and the center portion of the tail line has been illustrated, but for example, in consideration of design and the like, the center portion of the front line and the center portion of the tail line may be connected without being divided.

Furthermore, for example, an optical sensor such as a camera, a radar, or a LiDAR may be arranged in the headlight 603.

Moreover, in the above description, the example in which the vehicle 1B is a left-hand drive vehicle has been illustrated, but the present technology can of course be applied to a right-hand drive vehicle. In a case where the present technology is applied to a right-hand drive vehicle, the layouts outside and inside the vehicle described above are appropriately changed according to the right-hand drive vehicle.

Furthermore, the type of a vehicle to which the present technology can be applied is not particularly limited. Furthermore, in addition to vehicles, the present technology can also be applied to a mobile apparatus such as personal mobility, airplanes, ships, construction machinery, and agricultural machinery.

Furthermore, the mobile apparatus to which the present technology can be applied includes, for example, a mobile apparatus that captures an image of the surroundings without a person on board, such as a drone or a robot.

6. Third Embodiment

Figure 105:
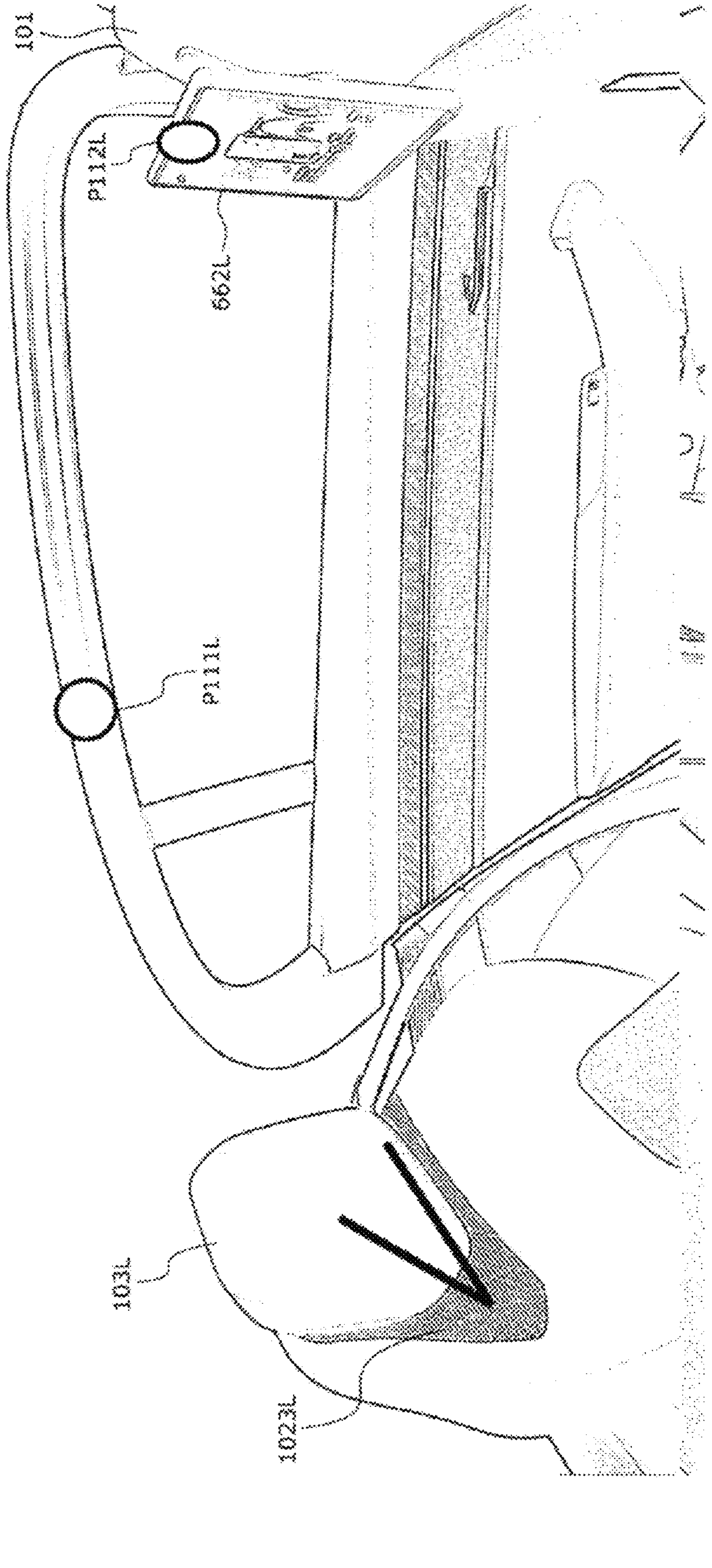
FIG. 105 is a view for describing a method of controlling voice for an occupant on a rear seat.

Next, a third embodiment of the present technology will be described with reference to FIGS. 54 to 105.

Note that in each of the drawings of the third embodiment, the same reference numerals are given to the parts corresponding to those of the first embodiment and the second embodiment, and description thereof will be omitted as appropriate. Furthermore, components included in the first embodiment and the second embodiment that are not illustrated or described in the third embodiment are basically assumed to be included in the third embodiment, except for cases where an alternative configuration is illustrated or described and cases where such components are described as deleted.

<Configuration Example of Interior of Vehicle 1C>

First, a configuration example of an interior of a vehicle 1C will be described with reference to FIGS. 54 to 57.

Figure 54:
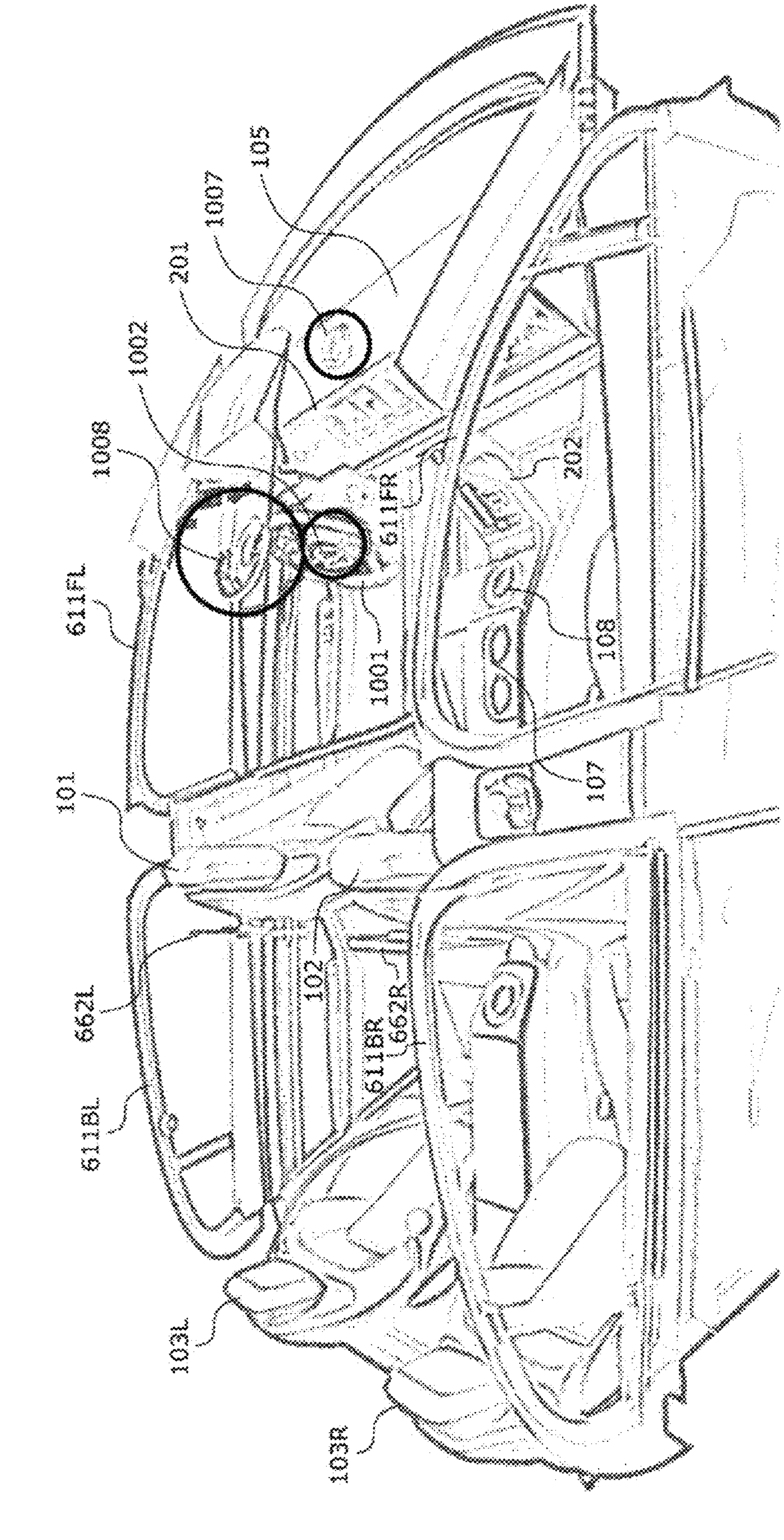
FIG. 54 is a schematic view of the interior of the vehicle looking down from the right.
Figure 55:
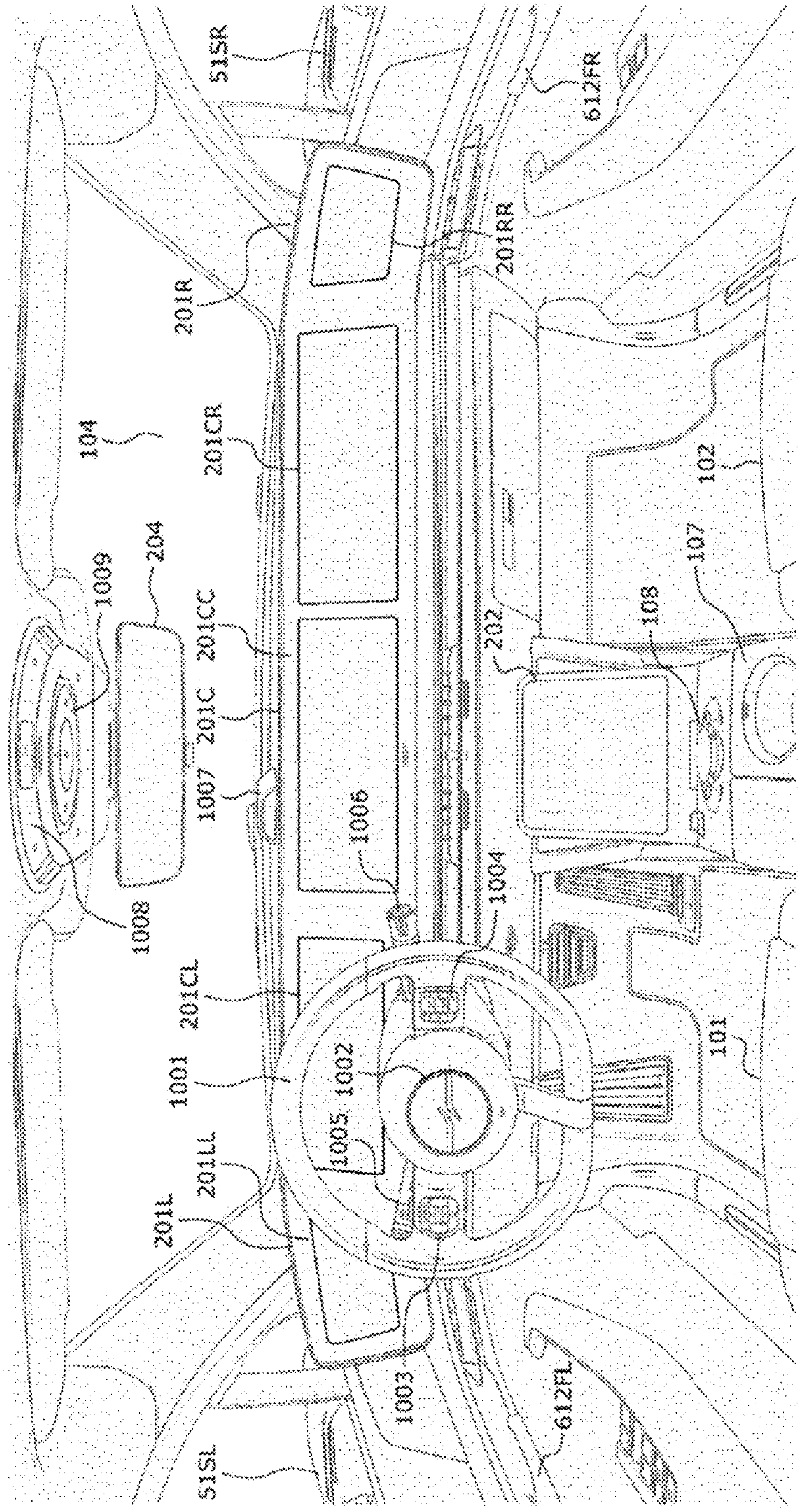
FIG. 55 is a schematic view illustrating the front in the vehicle.
Figure 56:
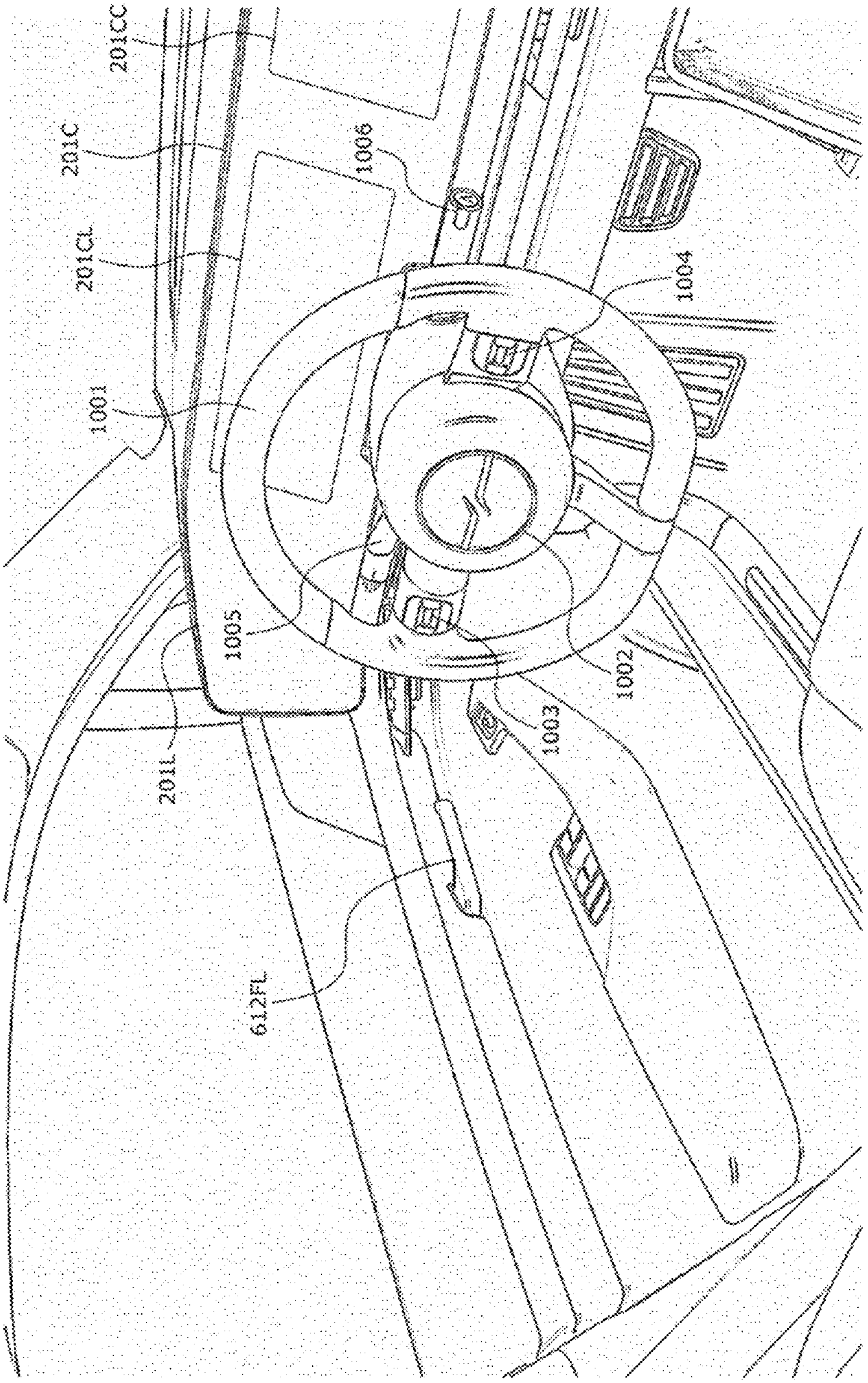
FIG. 56 is a schematic view illustrating a front of the driver seat in the vehicle.
Figure 57:
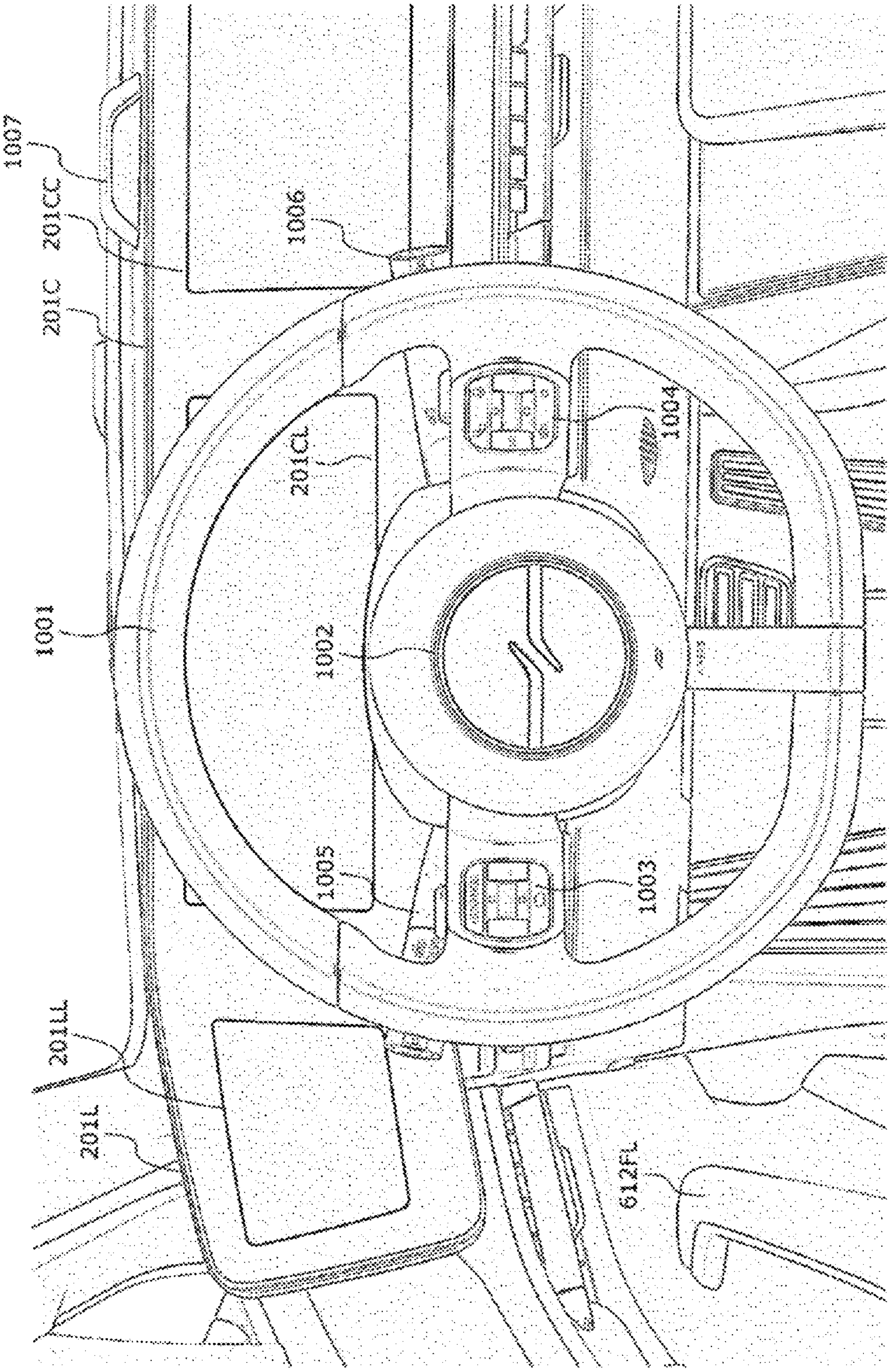
FIG. 57 is an enlarged view of the vicinity of a steering wheel.

FIG. 54 is a schematic view of the interior of the vehicle 1C looking down from the right direction. FIG. 55 is a schematic view illustrating a front in the interior of the vehicle 1C. FIG. 56 is a schematic view illustrating a front of the driver seat 101 in the interior of the vehicle 1C. FIG. 57 is an enlarged view of the vicinity of a steering wheel 1001 of the vehicle 1C.

In FIG. 54, a part where the vehicle 1C is significantly different from the vehicle 1A and the vehicle 1B is circled. Specifically, the steering wheel 1001, a camera module 1007, and a camera module 1008 are significantly different parts.

As illustrated in FIG. 57, the steering wheel 1001 differs in a position of an illumination 1002 as compared with the steering wheel 651 of FIG. 30. The illumination 1002 includes a plurality of LEDs arranged in a ring shape inside by a predetermined distance from an outer periphery of a center portion of the steering wheel 1001. On and off, color, brightness, and the like of each LED can be controlled individually. Therefore, the illumination 1002 has a variable color, brightness, and light emitting area (light emitting range). Inside the illumination 1002, a logo of the vehicle 1C is formed.

Note that an airbag (not illustrated) is housed in the center portion of the steering wheel 1001. Then, the illumination 1002 is arranged so as to avoid a portion where the center portion of the steering wheel 1001 is split when the airbag is activated. This prevents debris and harmful substances from the illumination 1002 from scattering when the airbag is activated.

A spoke on a left side of the steering wheel 1001 is provided with an operation unit 1003 having a plurality of buttons. A spokes on a right side of the steering wheel 1001 is provided with an operation unit 1004 having a plurality of buttons.

As illustrated in FIG. 57, a stalk lever 1005, which is a rod-shaped operating body, is provided behind the steering wheel 1001 so as to extend from the steering column (not illustrated) to the left. Furthermore, a stalk lever 1006, which is a rod-shaped operating body, is provided behind the steering wheel 1001 so as to extend from the steering column (not illustrated) to the right. The stalk lever 1006 has a similar configuration to that of the stalk lever 655 illustrated in FIG. 30, for example.

As illustrated in FIGS. 54, 55, and 57, the camera module 1007 is provided on the dashboard 105 slightly closer to the driver seat 101 than a center in the left-right direction. The camera module 1007 has a shape as if a part of a truncated cone is cut out vertically, and has a vertical flat portion on a side surface. The flat portion of the side surface of the camera module 1007 is directed toward the driver seat 101, and as will be described later, the camera module 1007 captures an image of a range including at least the head of the driver sitting on the driver seat 101.

As illustrated in FIG. 55, the camera module 1008 is provided at a front end of the ceiling of the vehicle 1C and at the center in the left-right direction near the digital rearview mirror 204. The camera module 1008 has two ToF cameras (not illustrated). The ToF cameras capture images of the driver and the occupant on the passenger seat 102, respectively, as will be described later.

A circular light 1009 is provided on a lower surface of the camera module 1008. Furthermore, the camera module 1008 incorporates a built-in microphone (not illustrated) for collecting voices of occupants and the like.

Furthermore, in this example, as illustrated in FIG. 55, the center portion 201C of the center display 201 is divided into a display unit 201CL in front of the driver seat 101, a display unit 201CC between the driver seat 101 and the passenger seat 102, and a display unit 201CR in front of the passenger seat 102. Note that as described above, it is also possible to connect the display unit 201CL, the display unit 201CC, and the display unit 201CR to form one display unit. A display unit 201LL is provided on the left end portion 201L of the center display 201. A display unit 201RR is provided on the right end portion 201R of the center display 201.

<Example of Installation Position of ToF Camera>

Next, an example of the installation position of the ToF camera will be described with reference to FIGS. 58 to 63.

Figure 58:
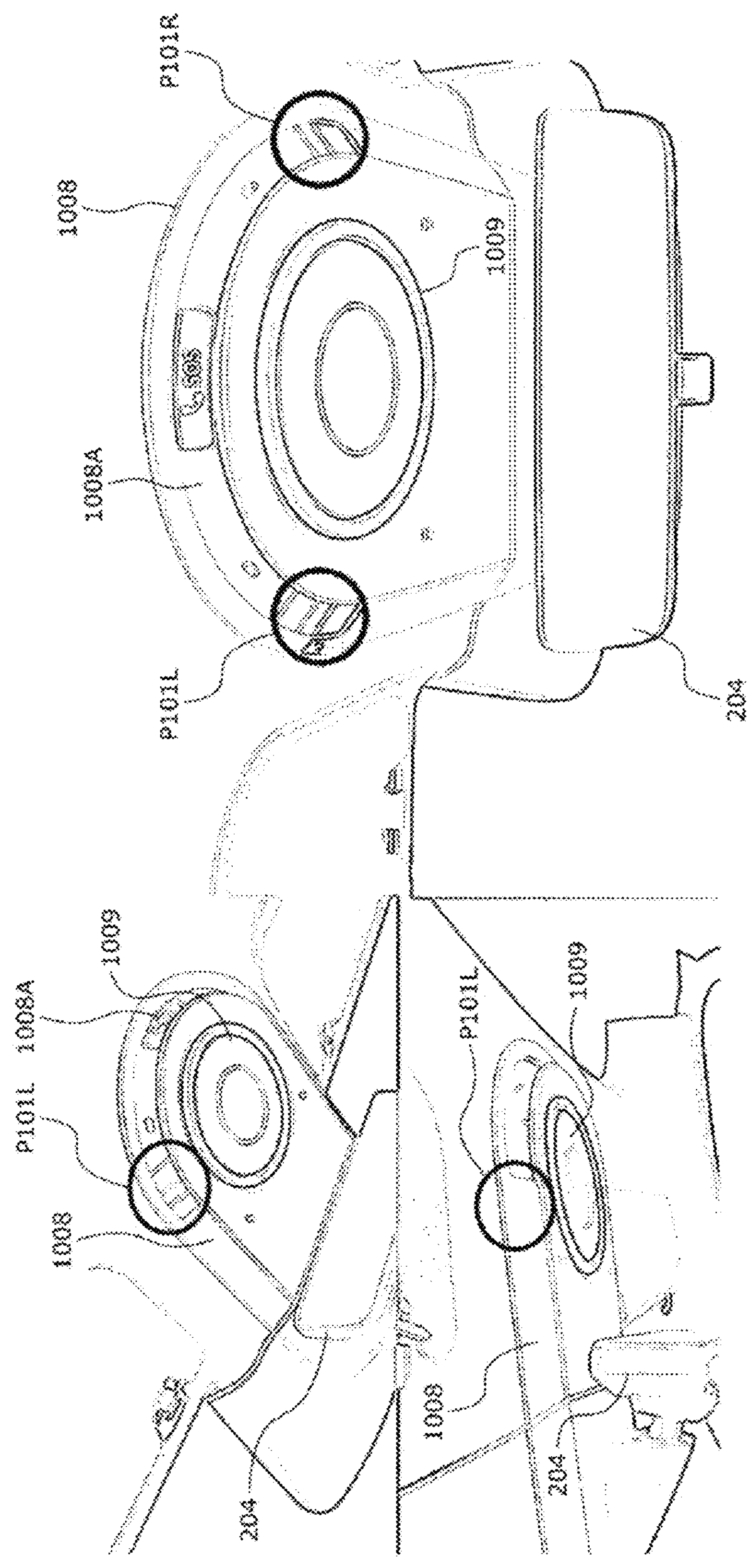
FIG. 58 is a view illustrating an example of an installation position of a ToF camera in a camera module.

FIG. 58 illustrates an example of the installation position of the ToF camera in the camera module 1008. An upper left view of FIG. 58 is a schematic view of the camera module 1008 as viewed from a diagonally lower left direction. A lower left view of FIG. 58 is a schematic view of the camera module 1008 as viewed from a lower left direction. A right view of FIG. 58 is a schematic view of the camera module 1008 as viewed from a diagonally lower direction from the front.

The camera module 1008 has a shape in which a table with a half truncated cone is connected to a rear end (rear side of the vehicle 1C) of a table obtained by diagonally cutting out left and right sides of a rectangular parallelepiped. As described above, the camera module 1008 is arranged at the front end of the ceiling of the vehicle 1C and at the center in the left-right direction.

A ToF camera (hereinafter referred to as a ToF camera P101L) is incorporated in a position P101L near a front end portion on a left side of a truncated cone portion of the camera module 1008. The optical axis of the ToF camera P101L is directed toward a middle of both eyes of a driver in a case where the driver of a standard physique sits on the driver seat 101 arranged in a standard position, for example.

Figure 59:
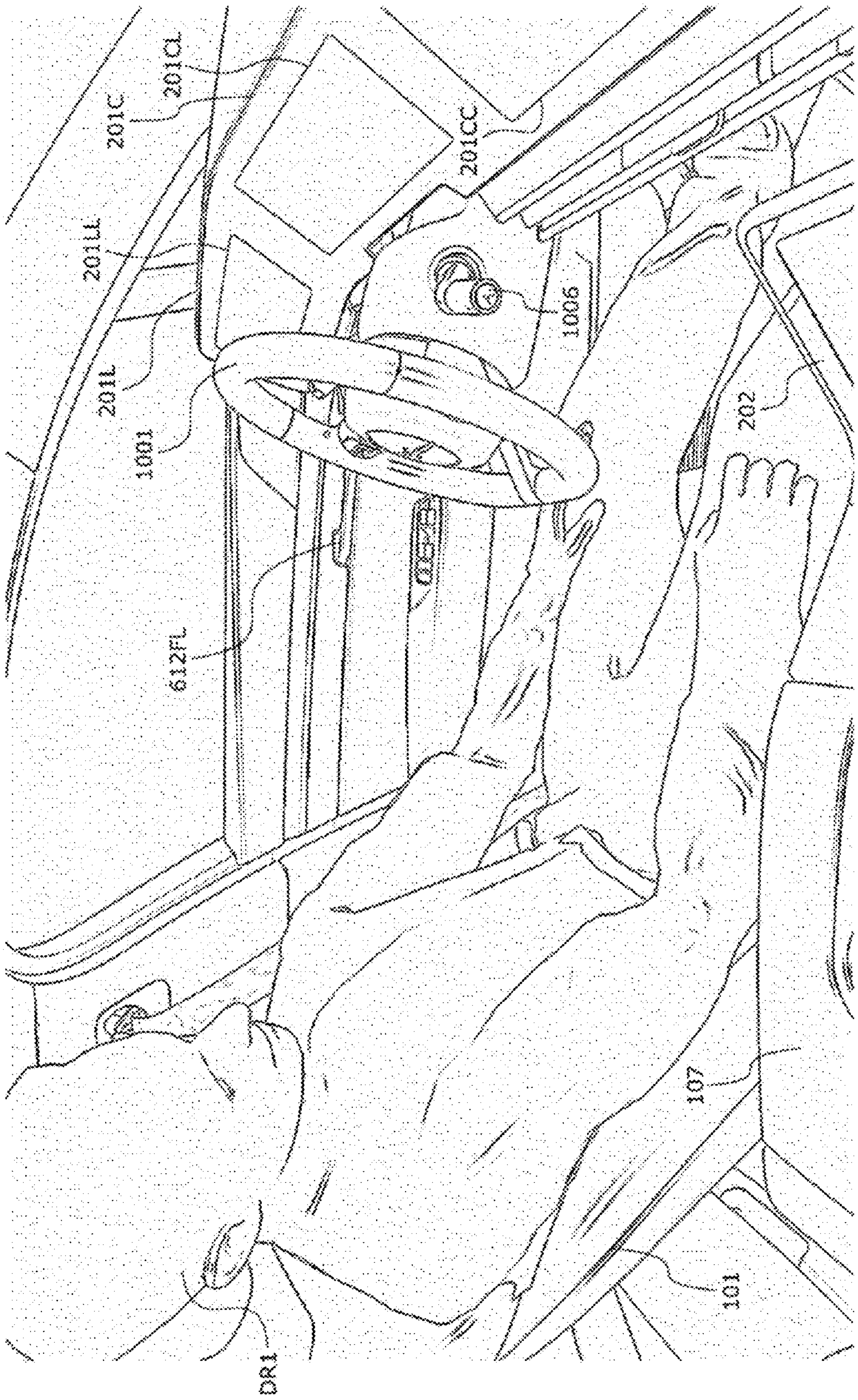
FIG. 59 is a view illustrating an example of an image capturing range of the ToF camera.

FIG. 59 illustrates an example of the image capturing range of the ToF camera P101L. The ToF camera P101L can capture an image of almost the entire body of a driver DR1 from the head to the vicinity of the feet from a diagonally upward right direction regardless of the physique of the driver DR1 and the position of the driver seat 101.

A ToF camera (hereinafter referred to as a ToF camera P101R) is incorporated in a position P101R near the front end portion on a right side of the truncated cone portion of the camera module 1008. Although not illustrated, the ToF camera P101R, like the ToF camera P101L, can capture an image of almost the entire body of an occupant from the head to the vicinity of the feet from a diagonally upward left direction regardless of the physique of the occupant sitting on the passenger seat 102 and the position of the passenger seat 102.

A black glossed cover 1008A is provided on a side surface of the truncated cone portion of the camera module 1008. The cover 1008A makes it difficult to see lenses of the ToF camera P101L and the ToF camera P101R from the outside. Furthermore, it is possible to provide cameras and sensors other than the ToF camera P101L and the ToF camera P101R on a back side of the cover 1008A.

For example, the DMS 30 (FIG. 1) recognizes a posture and movement of the driver by performing recognition of the skeleton of the driver, or the like on the basis of the image of the ToF camera P101L. For example, the DMS 30 performs driver recognition processing (for example, personal recognition) on the basis of the image of the ToF camera P101L.

Similarly, for example, the DMS 30 recognizes a posture and movement of the occupant by performing recognition of the skeleton of the occupant, or the like on the passenger seat 102 on the basis of the image of the ToF camera P101R. For example, the DMS 30 performs occupant recognition processing on the basis of the image of the ToF camera P101L.

Next, another example of the installation position of the ToF camera will be described with reference to FIGS. 60 to 63.

For example, as illustrated in an upper view of FIG. 60, a ToF camera (hereinafter referred to as a ToF camera P101C) is incorporated in a position P101C at a rear end portion of the camera module 1008.

Figure 60:
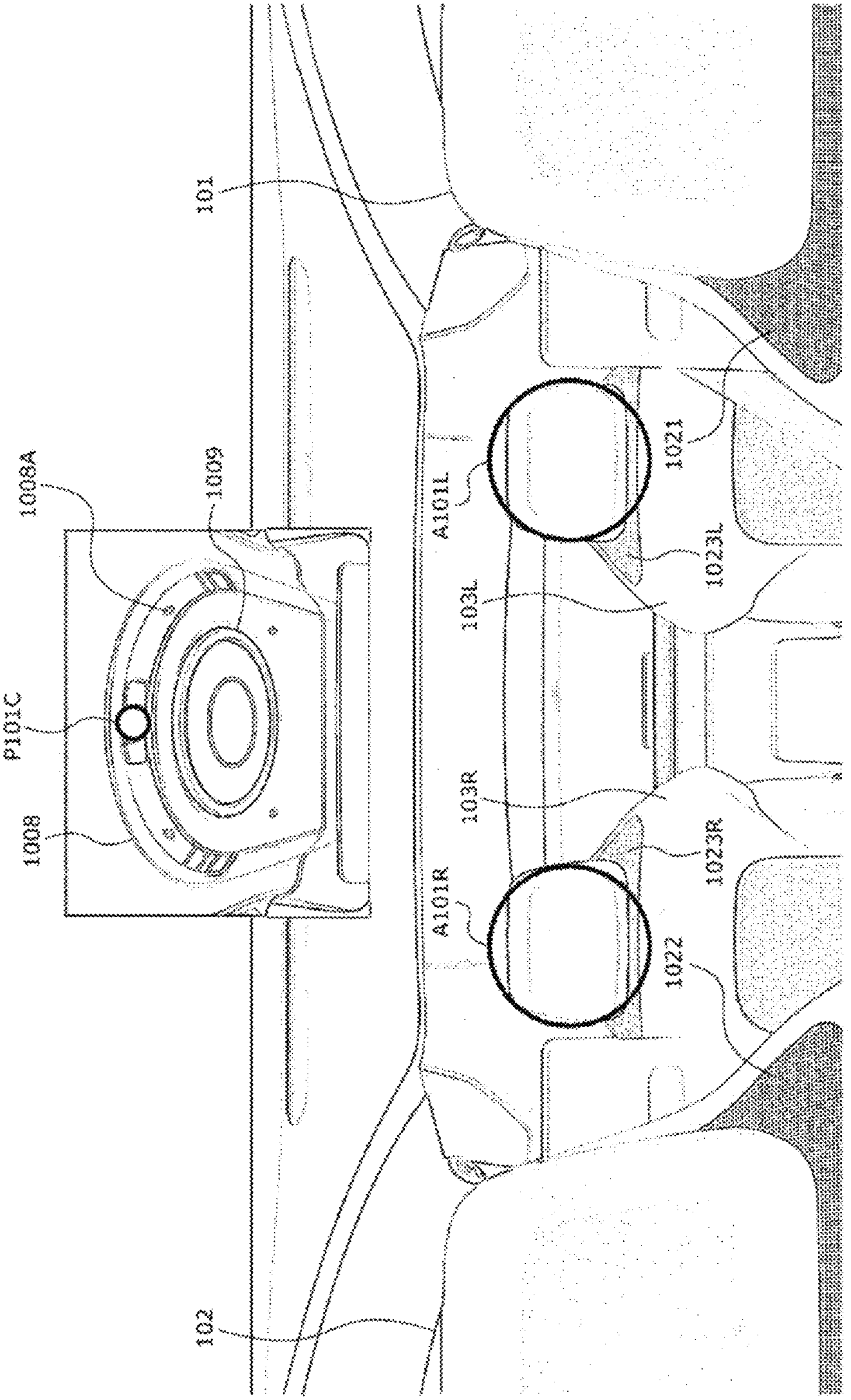
FIG. 60 is a view illustrating another example of an installation position of the ToF camera.

The lower view of FIG. 60 illustrates an example of an image capturing range of the ToF camera P101C. As described above, the ToF camera P101C can capture an image of an area including an area A101L including the headrest of the rear seat 103L and an area A101R including the headrest of the rear seat 103R. Therefore, the ToF camera P101C can capture an image of the upper body including the head of an occupant on the rear seat 103L and the upper body including the head of an occupant on the rear seat 103R at the same time.

Note that as illustrated in FIG. 60, the above-mentioned seat speaker is embedded below the headrest of each seat. Specifically, a seat speaker 1021 is embedded below the headrest of the driver seat 101. A seat speaker 1022 is embedded below the headrest of the passenger seat 102. A seat speaker 1023L is embedded under the headrest of the rear seat 103L on the left side. A seat speaker 1023R is embedded below the headrest of the rear seat 103R on the right side.

Furthermore, although not illustrated, the speakers 653FL to 653BR described above with reference to FIGS. 27 and 28 are embedded in the respective doors to achieve the 360-degree real audio.

Figure 61:
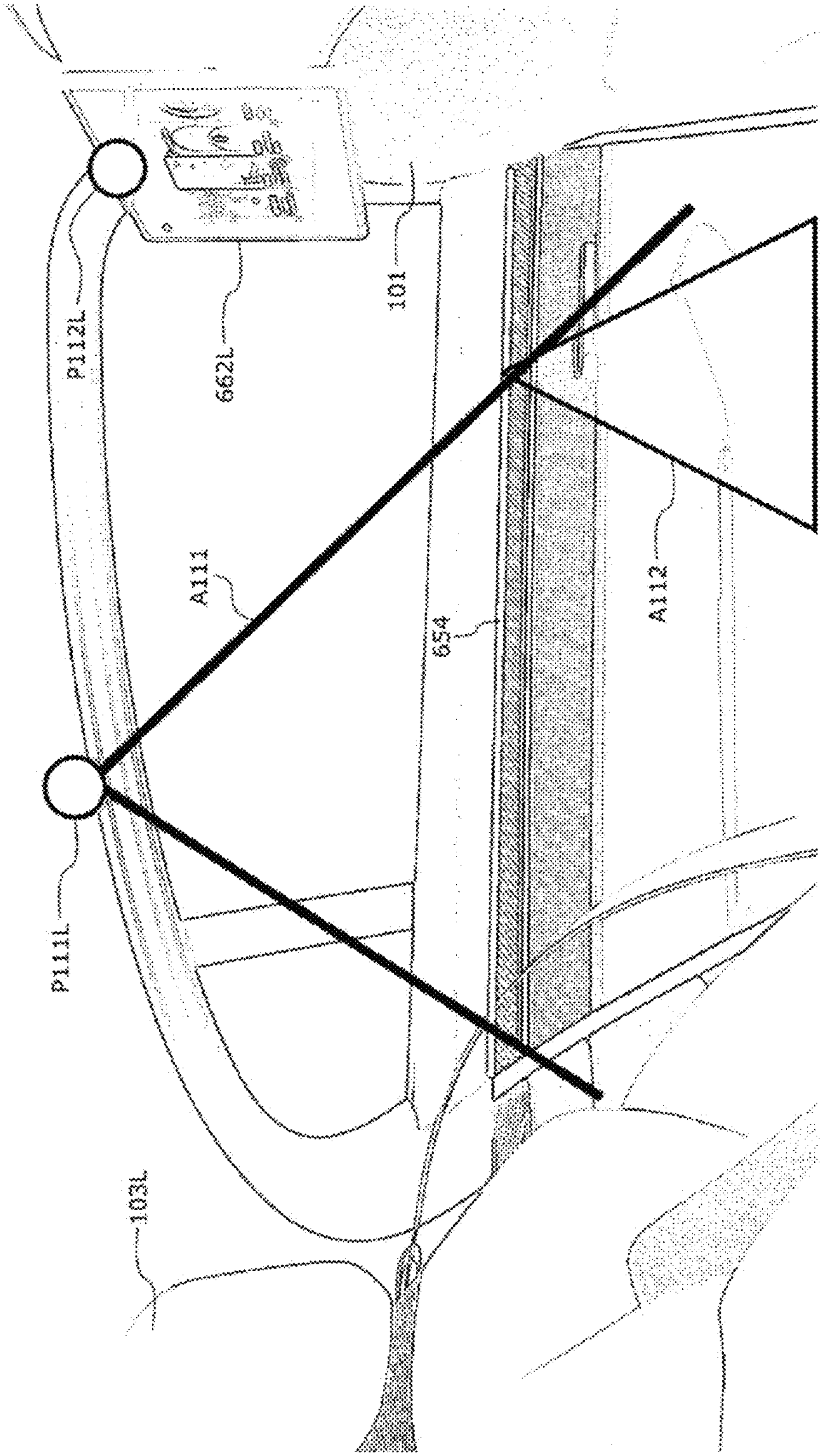
FIG. 61 is a view illustrating another example of installation positions of the ToF camera.
Figure 62:
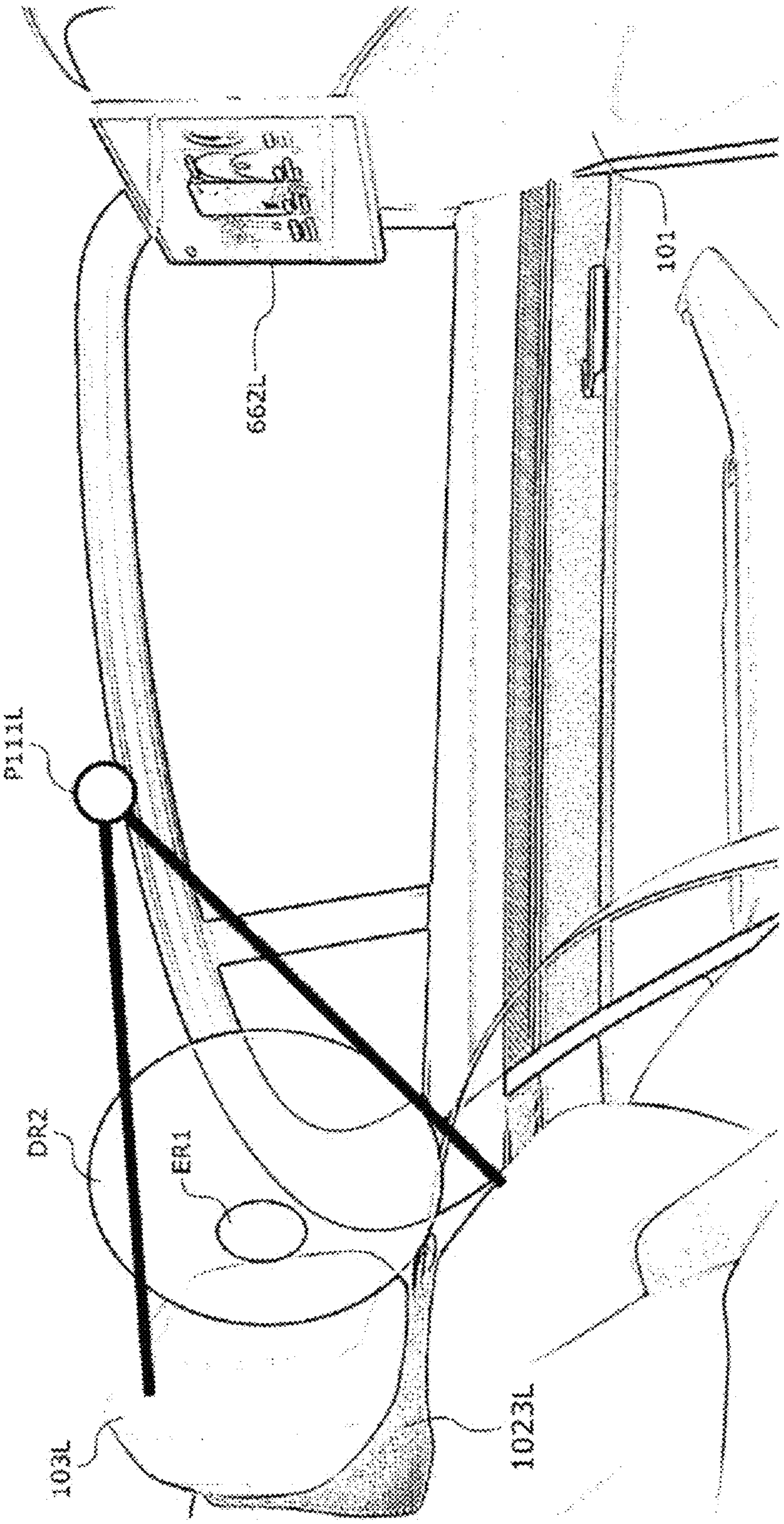
FIG. 62 is a view illustrating another example of an installation position of the ToF camera.
Figure 63:
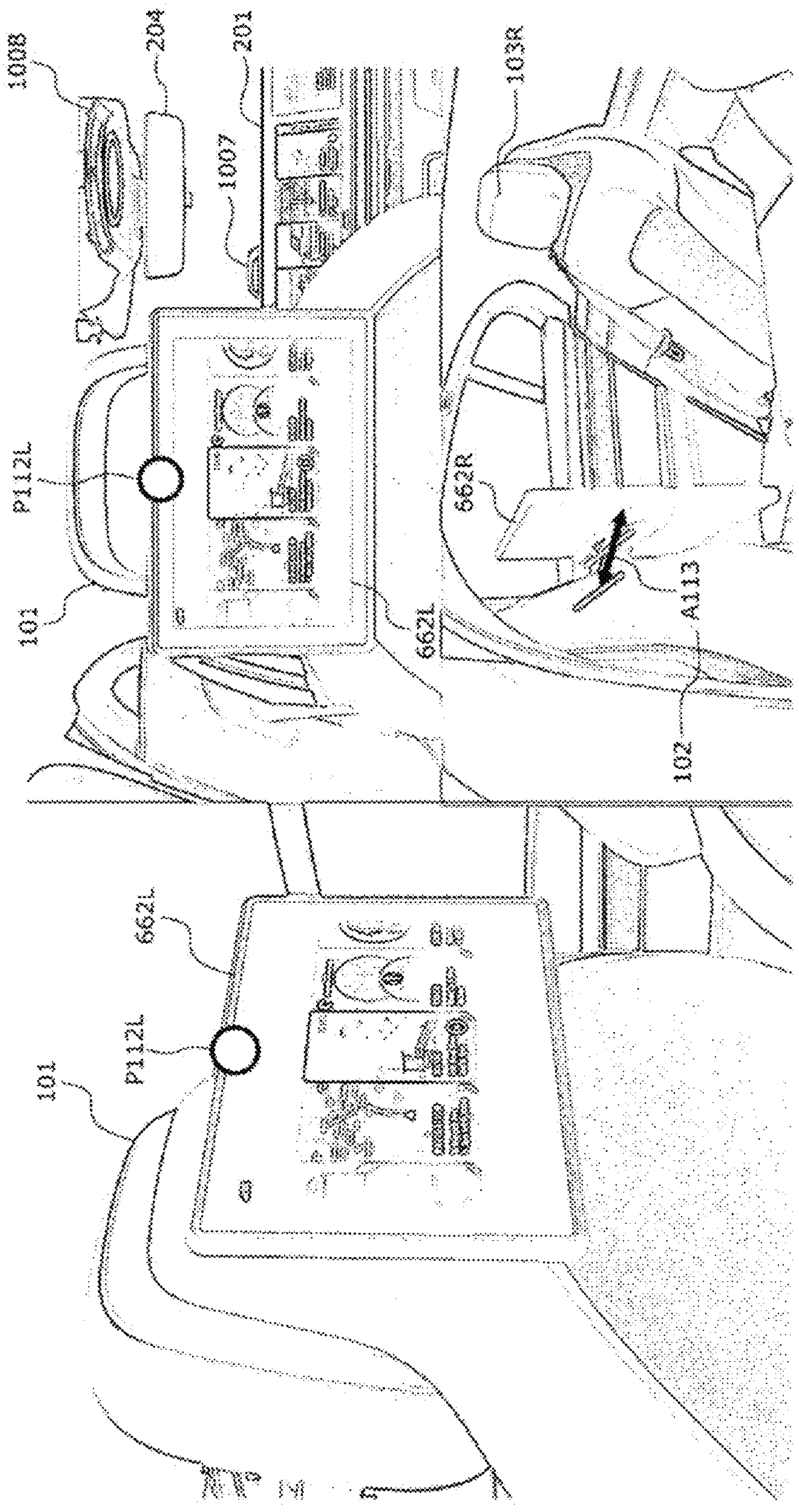
FIG. 63 is a view illustrating another example of an installation position of the ToF camera.

FIGS. 61 to 63 illustrate an example of the installation position of the ToF camera installed with respect to the rear seat 103L.

For example, a ToF camera (hereinafter referred to as a ToF camera P111L) is provided at a position P111L just above a frame of an upper portion of the door 611BL on the ceiling of the vehicle 1C. The ToF camera P111L can, for example, capture an image of almost the entire body of an occupant on the rear seat 103L from a diagonally upward left direction. Furthermore, a reading light (not illustrated) capable of emitting illumination light within a range A111 is provided around the ToF camera P111L.

For example, a ToF camera (hereinafter referred to as a ToF camera P112L) is provided at a position P112L near a center of an upper end of the tablet terminal 662L in the width direction. The ToF camera P112L can, for example, capture an image of a part including the upper body of the occupant on the rear seat 103L from the front.

Note that although not illustrated, ToF cameras are provided at a position P111R and a position P112R, which are similar to the position P111L and the position P112L with respect to the rear seat 103L, with respect to the rear seat 103R. Hereinafter, the ToF camera provided at the position P111R will be referred to as a ToF camera P111R, and the ToF camera provided at the position P112R will be referred to as a ToF camera P112R.

For example, the DMS 30 recognizes a posture and movement of an occupant by performing recognition of the skeleton of the occupant, or the like on the rear seat 103L on the basis of an image of at least one of the ToF camera P111L or the ToF camera P112L. For example, the DMS 30 performs occupant recognition processing on the basis of the image of at least one of the ToF camera P111L or the ToF camera P112L. For example, the DMS 30 performs lip reading of the occupant on the basis of an image of the ToF camera P112L.

Similarly, for example, the DMS 30 recognizes a posture and movement of an occupant by performing recognition of the skeleton of the occupant, or the like on the rear seat 103R on the basis of an image of at least one of the ToF camera P111R or the ToF camera P112R. For example, the DMS 30 performs occupant recognition processing on the basis of the image of at least one of the ToF camera P111R or the ToF camera P112R. For example, the DMS 30 performs lip reading of the occupant on the basis of an image of the ToF camera P112L.

For example, as illustrated in FIG. 61, the light control unit 85 controls on and off, brightness, and the like of the reading light on the basis of an action of the occupant on the rear seat 103L. Furthermore, for example, the light control unit 85 controls brightness or the like of an irradiation range A112 in the vicinity of the rear seat 103L of the loop light 654 described above on the basis of the action of the occupant on the rear seat 103L. For example, the light control unit 85 turns on the reading light or brightens the irradiation range A112 of the loop light 654 in a case where an action of reading a document or the like of the occupant is recognized.

Note that for example, in the passenger seat 102 and the rear seat 103R, lighting control similar to that for the rear seat 103L is executed.

For example, as illustrated in FIG. 62, the DMS 30 can recognize positions and shapes of a left ear EL1 (not illustrated) and a right ear ER1 of an occupant DR2 on the rear seat 103L on the basis of an image of the ToF camera P111L. On the other hand, an audio control unit, which is a part of the function of the HMI 31, controls the seat speaker 1023L of the rear seat 103L to control a sound image, a sound field, a volume, and the like of various types of sounds for the occupant DR2 corresponding to positions and shapes of the ears of the occupant DR2.

Note that for example, on the driver seat 101, the passenger seat 102, and the rear seat 103R, a sound image, a sound field, a volume, and the like of various types of sounds for the occupant on each seat are controlled similarly to those for the rear seat 103L.

For example, as illustrated in a lower right view of FIG. 63, the body system control unit 84 controls a position and posture of the rear seat 103R and a position of the tablet terminal 662R on the basis of the physique or the like of the occupant on the rear seat 103R. For example, the rear seat 103R is deeply inclined according to the physique of the occupant, and the tablet terminal 662R moves in a direction approaching the rear seat 103R as illustrated by the arrow A113.

Note that, similarly, the positions and postures of the rear seat 103L and the tablet terminal 662L are controlled on the basis of the physique and the like of the occupant on the rear seat 103L.

<Details of camera module 1007>

Next, details of the camera module 1007 will be described with reference to FIGS. 64 to 67.

Figure 64:
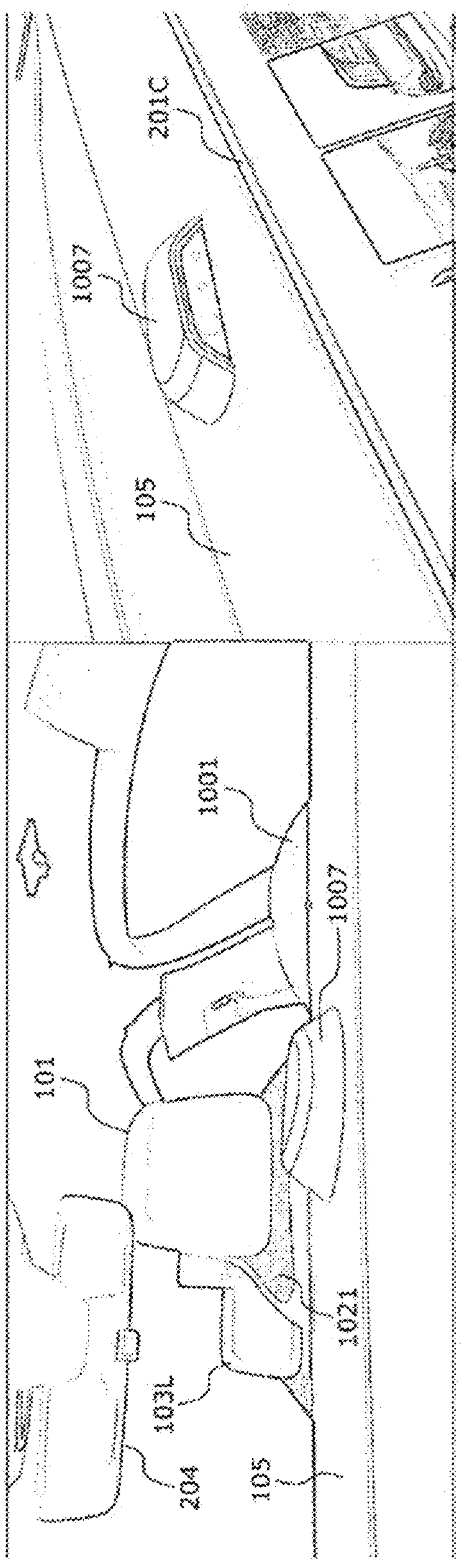
FIG. 64 is a view illustrating an example of an installation position of a camera module.

FIG. 64 illustrates an example of an installation position of the camera module 1007. As described above, the camera module 1007 is provided on the dashboard 105 slightly closer to the driver seat 101 than the center in the left-right direction.

Figure 65:
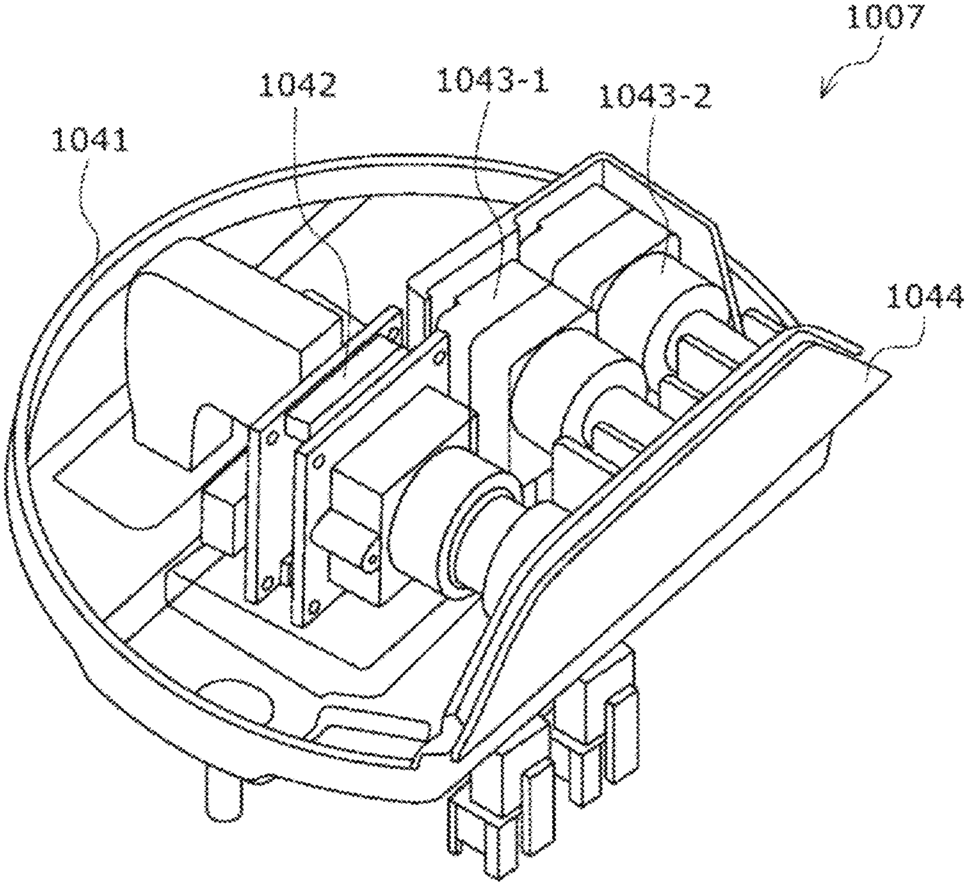
FIG. 65 is a view illustrating a configuration example of an inside of the camera module.

FIG. 65 illustrates a configuration example of an inside of the camera module 1007.

The camera module 1007 includes a housing 1041, a camera 1042, an LED 1043-1 and an LED 1043-2, and a cover 1044.

Note that hereinafter, in a case where it is not necessary to individually distinguish the LED 1043-1 and LED 1043-2, they are simply referred to as the LED 1043.

The camera 1042, and the LED 1043-1 and LED 1043-2 are arranged in the housing 1041 so as to be arranged in the horizontal direction. The camera 1042 is arranged at a position closer to the driver seat 101 than the LED 1043-1 and LED 1043-2. The optical axes of the camera 1042, and LED 1043-1 and LED 1043-2 are substantially parallel and each face the direction of the driver seat 101. The camera 1042 can capture an image of a range including at least the crown to the Adam's apple of the driver regardless of the physique of the driver and the position of the driver seat 101.

The camera 1042 is a camera capable of performing two types of image capturing, RGB image capturing (color image capturing) and IR image capturing (infrared image capturing). The camera 1042 automatically switches between RGB image capturing and IR image capturing, for example, on the basis of conditions such as ambient brightness.

The LED 1043 is a light source that outputs IR light (infrared light). By providing the two LEDs 1043 of the LED 1043-1 and the LED 1043-2, it is possible to suppress the amount of light emitted from each LED 1043 and suppress the amount of heat generated by each LED 1043 while ensuring the amount of IR light.

The cover 1044 is a flat portion of a side surface of the housing 1041 and is arranged in front of the camera 1042 and each LED 1043. The cover 1044 makes it difficult to see lenses of the camera 1042 and the light emitting part of each LED 1043 from the outside.

For example, in a bright environment in a daytime or the like, the camera 1042 automatically performs RGB image capturing and acquires a color image. On the other hand, in a dark environment at night or the like, each LED 1043 automatically turns on, and the camera 1042 automatically performs IR image capturing and acquires a monochrome image. Thus, an image of the head of the driver can be reliably captured regardless of ambient brightness.

For example, the DMS 30 performs lip reading of the driver on the basis of an image of the camera 1042 and recognizes an utterance content of the driver. The DMS 30 performs iris detection, line-of-sight detection, awakening determination, recognition processing, and the like of the driver on the basis of, for example, the image of the camera 1042.

Next, a modification example of the installation position of the camera 1042 will be described with reference to FIG. 66.

Figure 66:
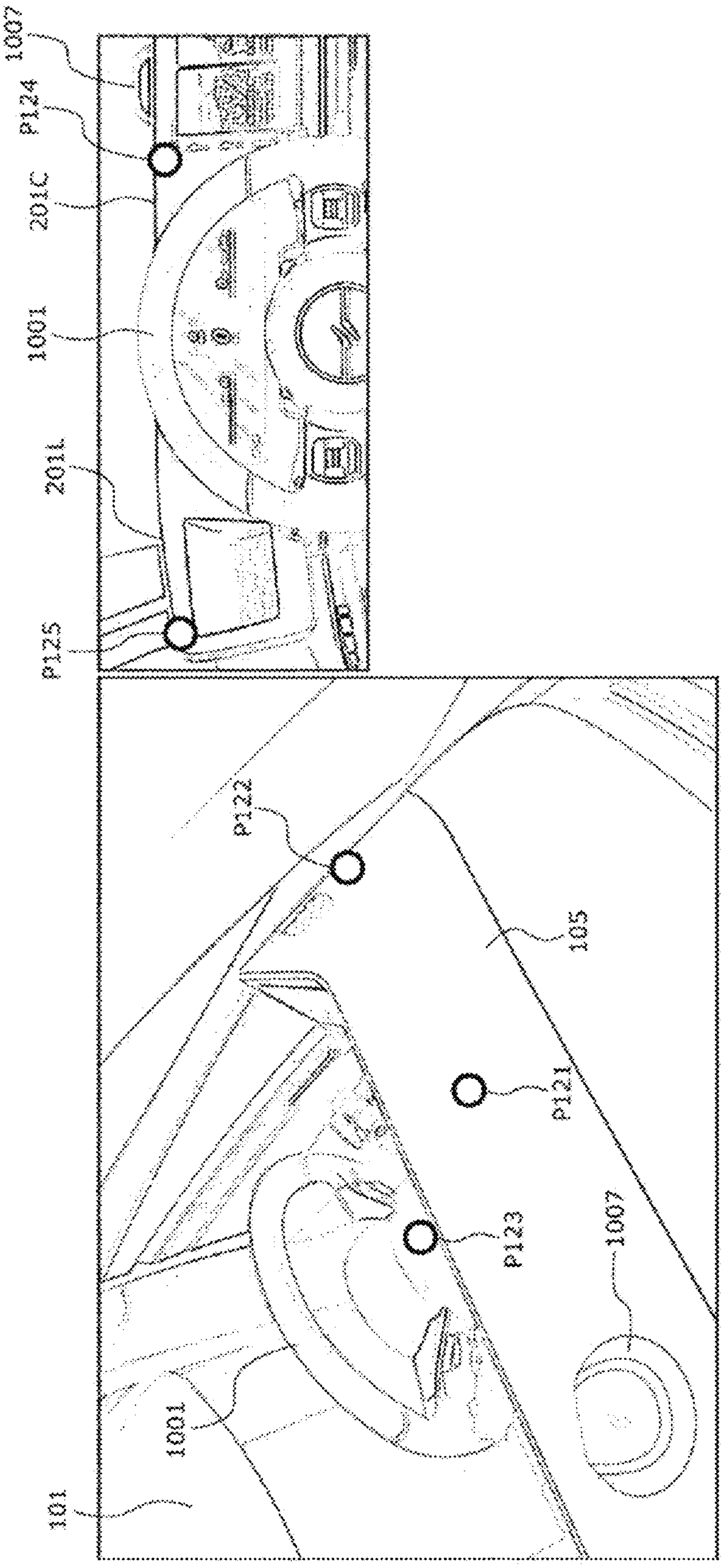
FIG. 66 is a view illustrating a modification example of an installation position of a camera.

A left view of FIG. 66 is a schematic view of the vicinity of the steering wheel 1001 of the vehicle 1C looking down from diagonally upward right. A right view of FIG. 66 is a schematic view of the vicinity of the front of the driver seat 101.

For example, it is conceivable to install the camera 1042 at a position P121 on the dashboard 105 in front of the driver seat 101. In this case, an image of the face of the driver can be captured from the front. On the other hand, when the steering wheel 1001 rotates, the spokes of the steering wheel 1001 obstruct the field of view of the camera 1042.

For example, it is conceivable to install the camera 1042 at a position P122 near a left end of the dashboard 105. In this case, an image of the face of the driver is captured from diagonally front left, in contrast to the camera module 1007.

For example, it is conceivable to install the camera 1042 at a position P123 on the steering column of the steering wheel 1001. In this case, an image of the face of the driver can be captured from the front at a short distance. On the other hand, as in the position P121, when the steering wheel 1001 rotates, the spokes of the steering wheel 1001 obstruct the field of view of the camera 1042. Furthermore, the field of view of the driver with respect to the display unit 201CL of the center display 201 is obstructed.

For example, it is conceivable to incorporate the camera 1042 in a position P124 on the right side of the steering wheel 1001 and near an upper end of the center portion 201C of the center display 201. In this case, an image of the face of the driver is captured from diagonally forward right. On the other hand, since the storage space of the camera 1042 is limited, it is necessary to reduce the size of the camera 1042.

Furthermore, the camera 1042 and the LED 1043 may be arranged apart from each other.

For example, it is conceivable to incorporate the camera 1042 in a position P125 near an upper left corner of the left end portion 201L of the center display 201. In this case, an image of the face of the driver is captured from diagonally forward left. On the other hand, since the storage space of the camera 1042 is limited, it is necessary to reduce the size of the camera 1042. Furthermore, the camera 1042 and the LED 1043 may be arranged apart from each other.

For example, it is conceivable to place a smartphone in the center portion of the steering wheel 1001 and capture an image of the face of the driver with the smartphone. In this case, an image of the face of the driver can be captured from the front. On the other hand, the smartphone may be damaged when the airbag is activated. Furthermore, in a case where the steering wheel 1001 is rotated, an image of the face of the driver becomes tilted when it is captured.

For example, it is conceivable to incorporate the camera 1042 in the A pillar (not illustrated) on the side of the driver seat of the vehicle 1C. In this case, an image of the face of the driver is captured from diagonally upward left. On the other hand, since the storage space of the camera 1042 is limited, it is necessary to reduce the size of the camera 1042. Furthermore, the camera 1042 and the LED 1043 may be arranged apart from each other.

For example, if the camera 1042 can be widened sufficiently, the camera module 1008 may be placed in the center of the dashboard 105 in the left-right direction so that the optical axis of the camera 1042 faces the rear of the vehicle 1C.

Figure 67:
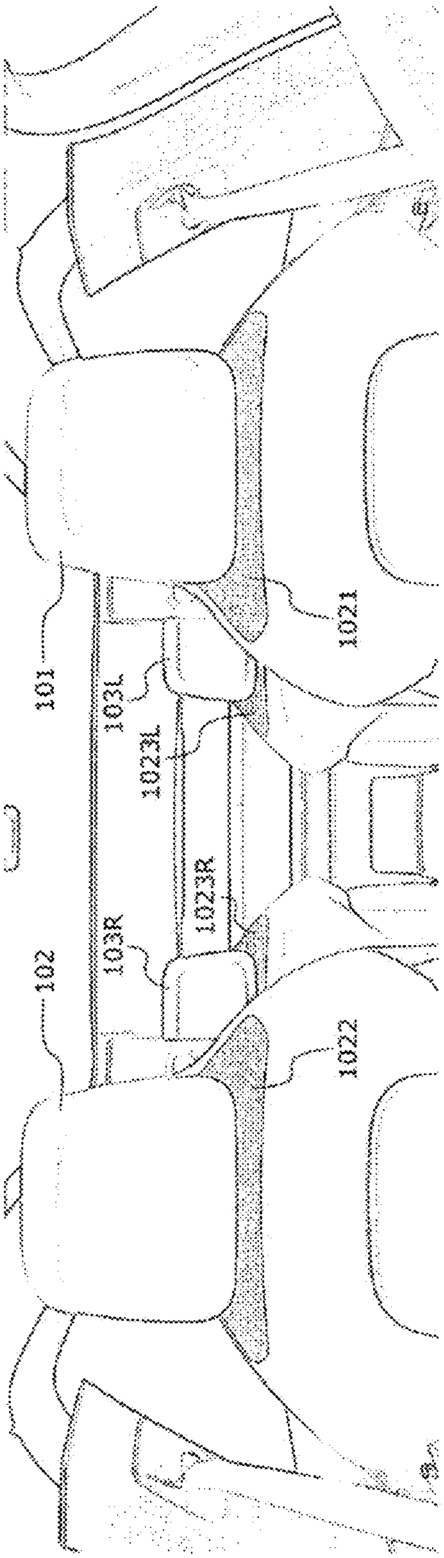
FIG. 67 is a view illustrating an example of an image capturing range of a camera.

FIG. 67 illustrates an example of an image capturing range of the camera 1042 in this case. In this example, the entire headrest of the driver seat 101, the entire headrest of the passenger seat 102, a part of the headrest of the rear seat 103L, and a part of the headrest of the rear seat 103R are included in the image capturing range. Therefore, images of the entire head of the driver, the entire head of the occupant on the passenger seat 102, a part of the head of the occupant on the rear seat 103L, and a part of the head of the occupant on the rear seat 103R can be captured by one camera 1042.

<CMS Operation Example>

Next, an operation example of a CMS of the vehicle 1C will be described with reference to FIGS. 68 to 85. Hereinafter, a display example of a display unit 201LL of the left end portion 201L of the center display 201 will be mainly described.

For example, the display control unit, which is a part of the function of the HMI 31, causes the display unit 201LL to display an image based on an image of the camera 51SL. More specifically, the display control unit sets a display range in the image of the camera 51SL, and causes the display unit 201LL to display an image in the set display range.

Furthermore, the recognition unit 73 performs object recognition processing on the basis of an image of the camera 51SL or the like. The display control unit controls display of the display unit 201LL on the basis of a recognition result of the object, the state of the vehicle 1C, and the like.

Figure 68:
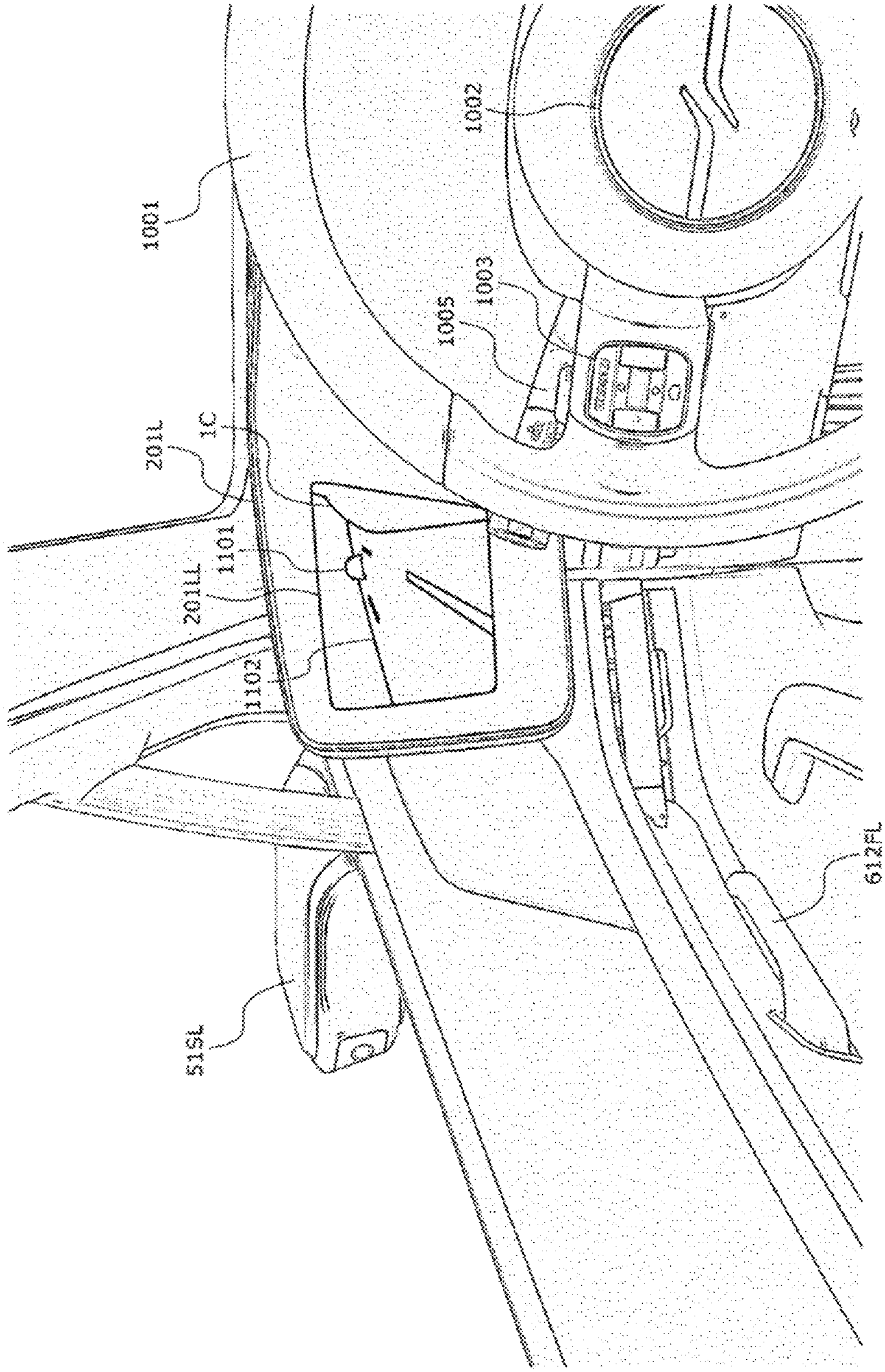
FIG. 68 is a view illustrating a display example of a display unit for a CMS in a normal state.

FIG. 68 illustrates a display example of the display unit 201LL in a normal state. In this example, a part of the body of the vehicle 1C, a vehicle 1101 that is a following vehicle traveling in a left adjacent lane at diagonally backward left of the vehicle 1C, and a road surface 1102 are displayed.

Figure 69:
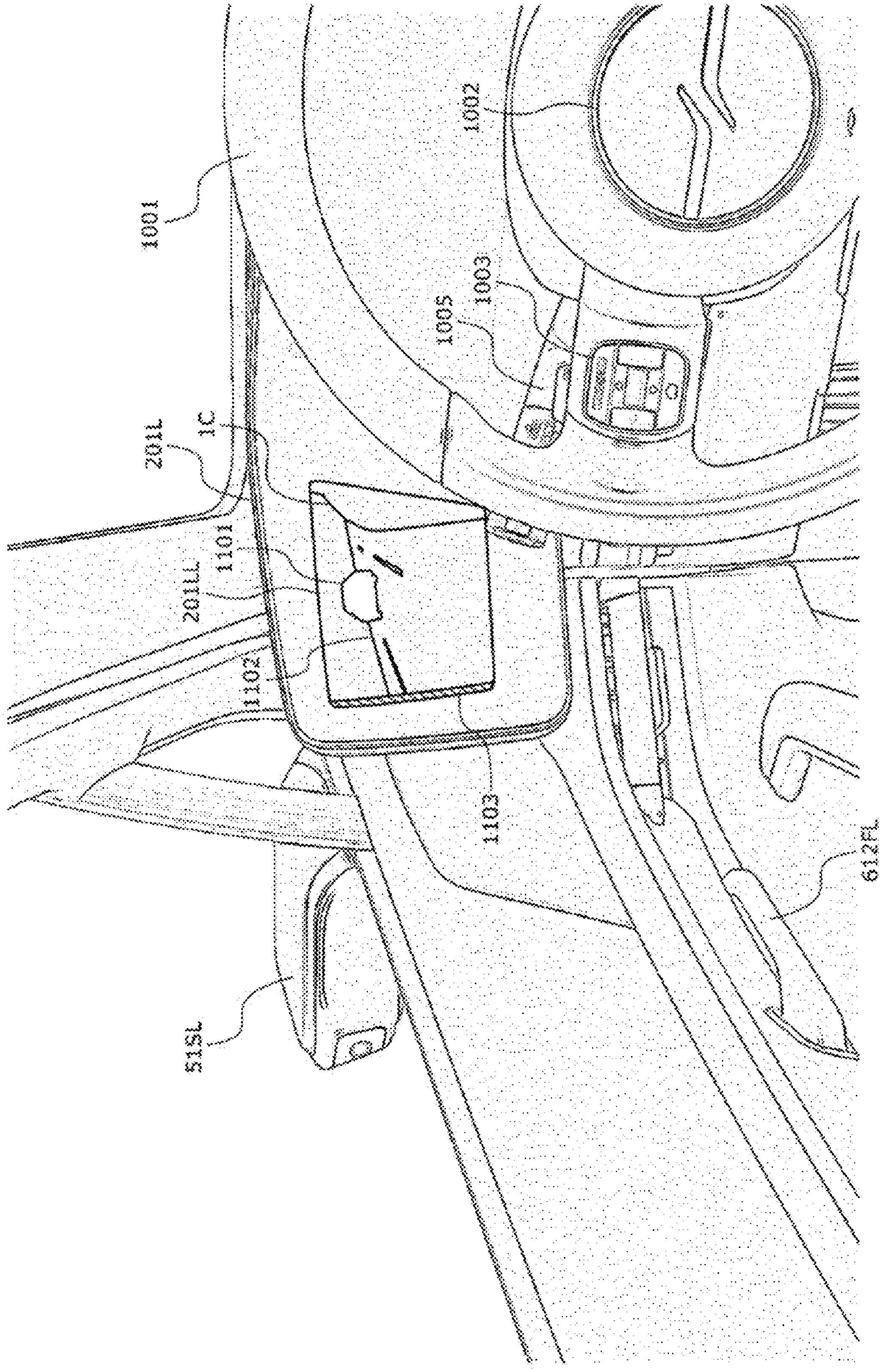
FIG. 69 is a view illustrating a first display example of the display unit for the CMS when a vehicle in an adjacent lane is approaching.

Then, for example, in a case where the vehicle 1101 approaches the vehicle 1C and the distance between the vehicle 1101 and the vehicle 1C is within a predetermined range, as illustrated by diagonal lines in FIG. 69, a bar 1103 that is a vertically long strip-shaped visual effect is superimposed and displayed on a left end of the display unit 201LL. The bar 1103 is displayed, for example, in a case where the vehicle 1101 is within a range shown in the display unit 201LL and the distance from the vehicle 1C is within the predetermined range. The color of bar 1103 is a prominent color, for example yellow.

The driver can be alerted by display of the bar 1103 and can reliably prevent accidents.

Note that a display mode of the bar 1103 such as color, brightness, shape, blinking pattern, and movement is not limited to this example, and can be arbitrarily changed. For example, the display mode of bar 1103 changes according to the degree of risk.

Figure 70:
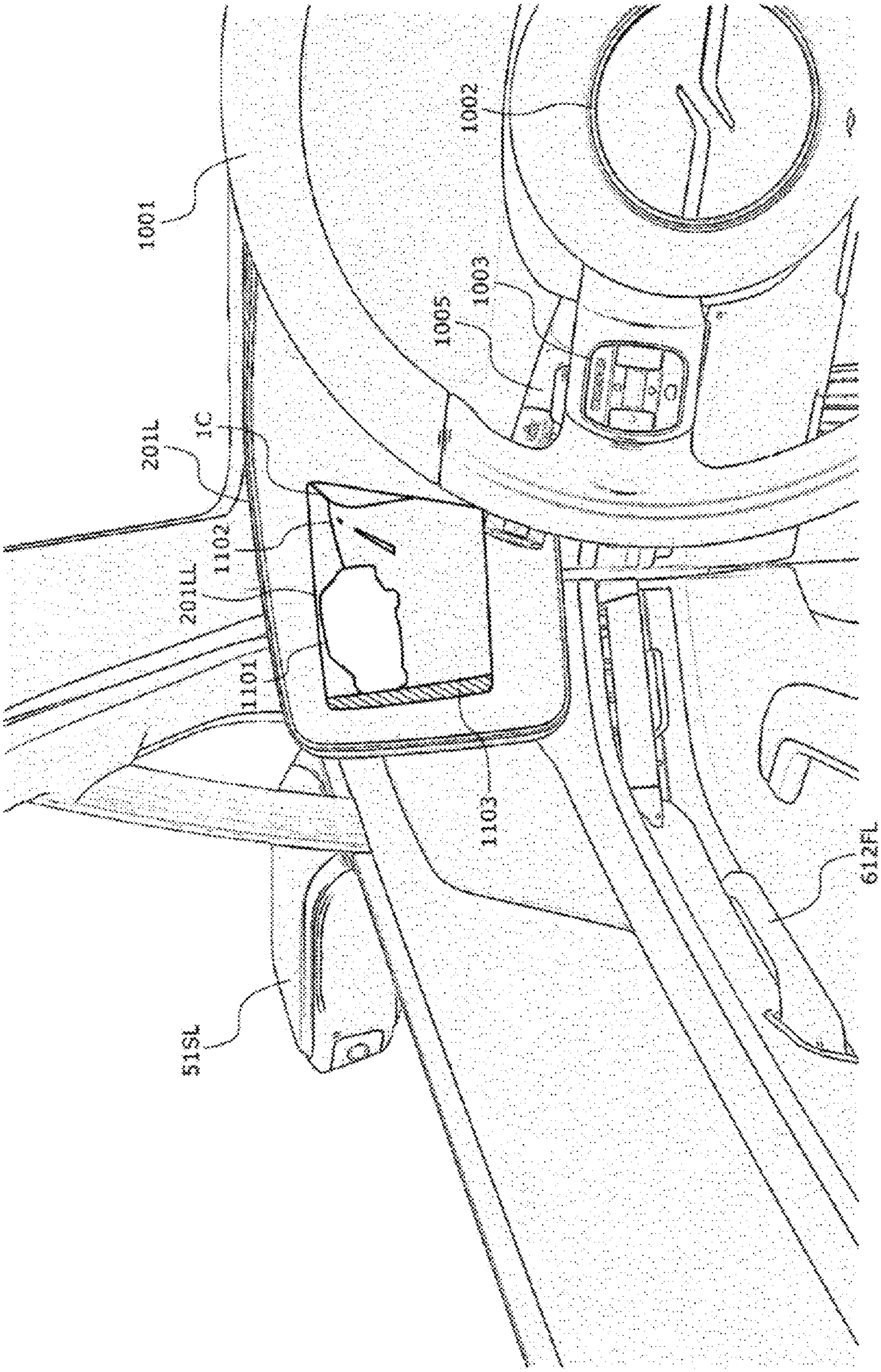

For example, in a case where the direction indicator in the left direction of the vehicle 1C is turned on, there is a possibility that the vehicle 1C turns left (changing direction to the left) or change lanes to the left lane, and the risk of collision or contact with the vehicle 1101 increases. Accordingly, for example, as illustrated in FIG. 70, the bar 1103 becomes wider and blinks. Thus, the driver can be alerted more.

Moreover, for example, in a case where the direction indicator in the left direction of the vehicle 1C is turned on, the blinking speed of the bar 1103 changes according to the degree of danger. For example, the faster the absolute speed of the vehicle 1101 or the relative speed with respect to the vehicle 1C, the faster the blinking speed of the bar 1103. For example, the closer the vehicle 1101 is, in other words, the shorter the distance between the vehicle 1101 and the vehicle 1C, the faster the blinking speed of the bar 1103. Note that for example, a warning sound may be sounded in synchronization with the blinking of the bar 1103.

For example, in a case where an absolute speed of the vehicle 1101 or a relative speed thereof with respect to the vehicle 1C is equal to or greater than a predetermined threshold value, the timing at which the bar 1103 is displayed is earlier. That is, the bar 1103 is displayed from a time point when the vehicle 1101 is located farther from the vehicle 1C.

Figure 71:
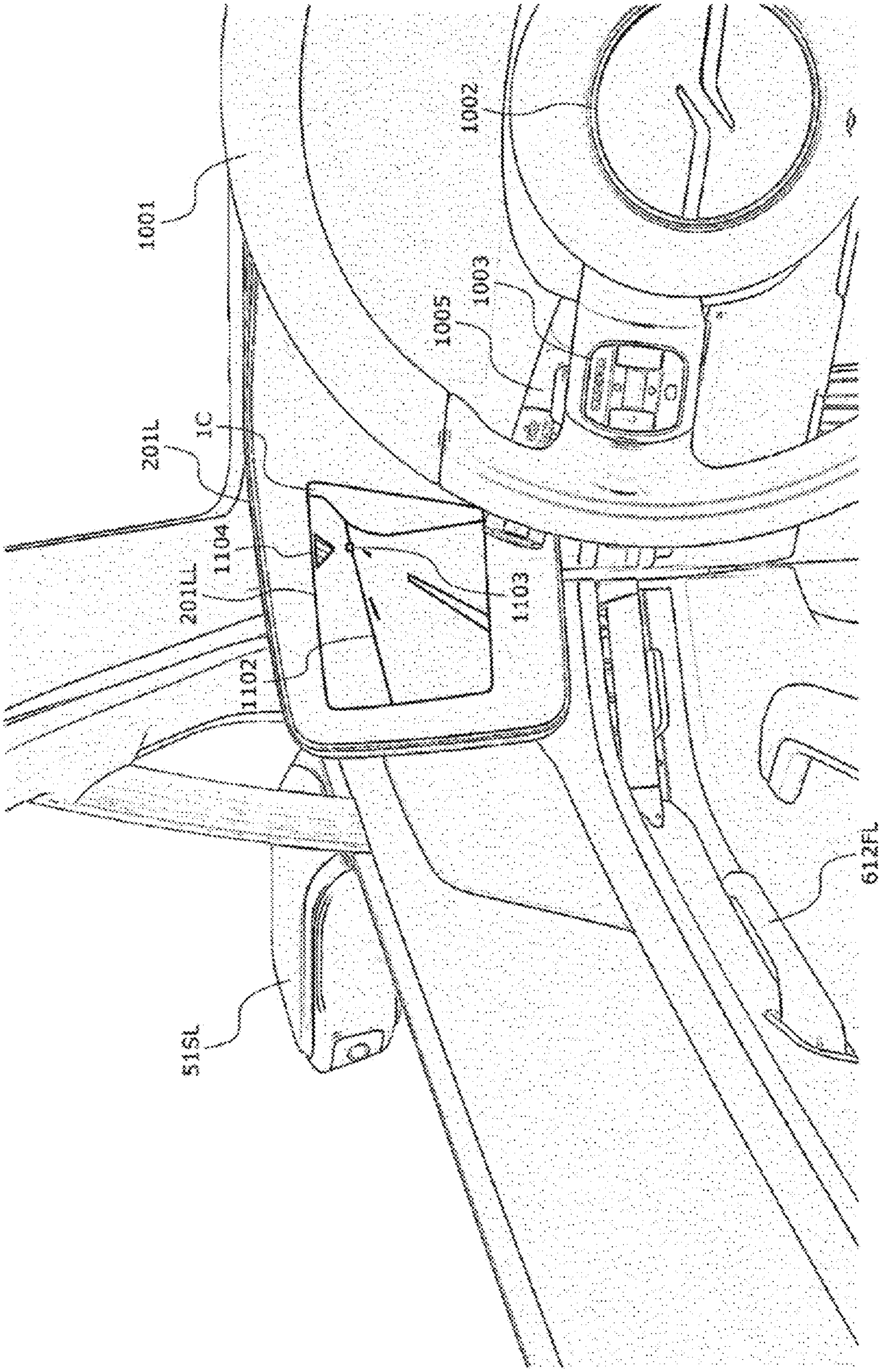
FIG. 71 is a view illustrating a second display example of the display unit for the CMS when a vehicle in an adjacent lane is approaching.

Furthermore, for example, as illustrated in FIG. 71, at a time point when the vehicle 1101 at diagonally backward left is recognized, the mark 1104, which is a triangular visual effect indicating the existence of the vehicle 1101, may be superimposed and displayed near the vehicle 1101. The mark 1104 moves following movement of the vehicle 1101.

Thus, for example, the driver can reliably recognize the position of the vehicle 1101 even in a case where visibility of an image displayed on the display unit 201LL is poor due to fog, haze, or the like.

Note that notification of the position of the vehicle 1101 may be given by a display mode different from that of the mark 1104 in FIG. 71. For example, a frame surrounding the vehicle 1101 may be displayed.

Note that although detailed description is omitted, the display unit 201RR of the right end portion 201R of the center display 201 performs similar display on the basis of the situation of the vehicle traveling in a right adjacent lane of the vehicle 1C and the operation of the direction indicator in the right direction.

Furthermore, in the above description, the example of calling attention to another vehicle has been illustrated, but similar processing is also performed in a case of calling attention to a moving body (for example, a motorcycle or the like) other than the vehicle.

Furthermore, for example, the display control unit controls the range of the image displayed on the display unit 201LL according to an operation of the direction indicator.

Figure 72:
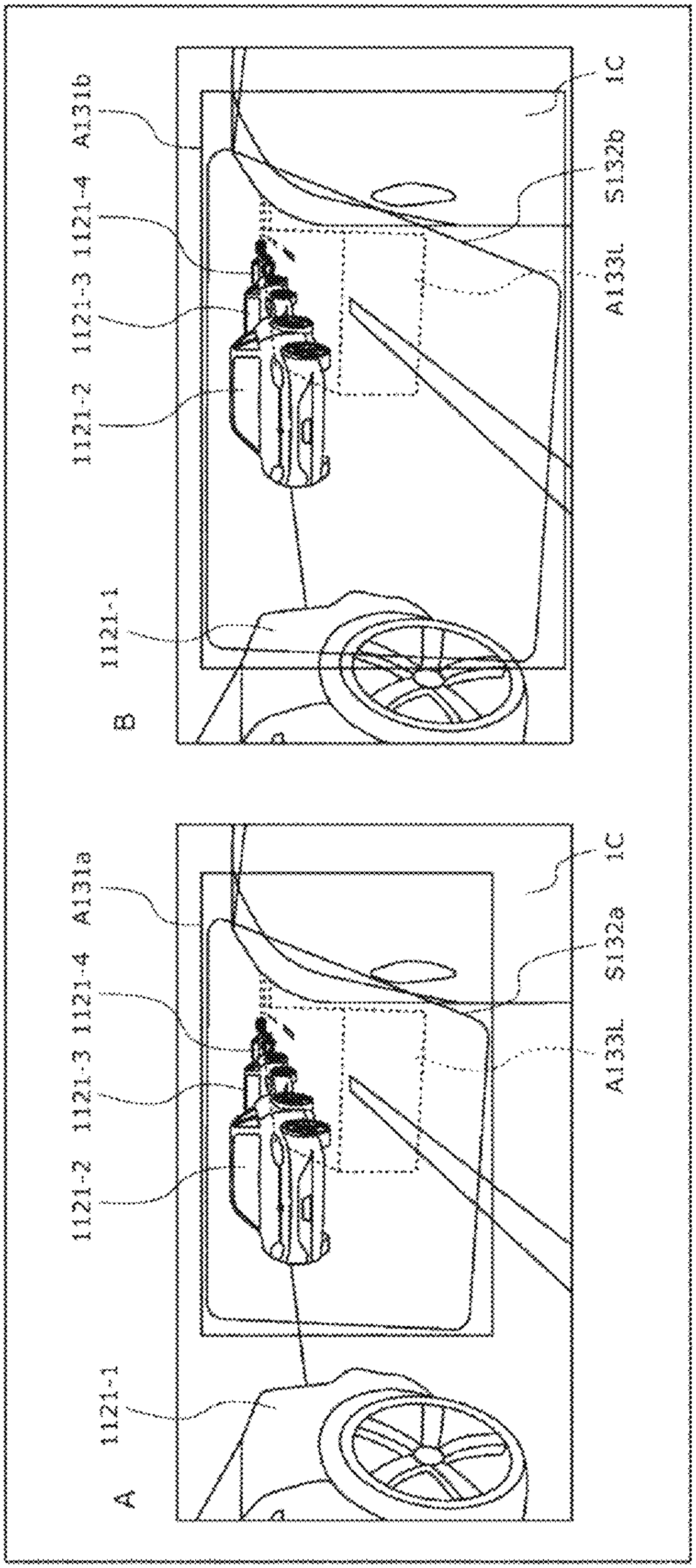
FIG. 72 is a view illustrating a display example of the display unit for the CMS when the direction indicator is in operation.

FIG. 72 illustrates an example of changing the display range of the image displayed on the display unit 201LL according to an operation of the direction indicator in the left direction.

Specifically, A and B in FIG. 72 illustrate an example of an image captured by the camera 51SL. The image shows vehicles 1121-1 to 1121-4 traveling in the left lane of the vehicle 1C, and the like.

For example, in a case where the direction indicator in the left direction of the vehicle 1C is turned off, an image in an area A131*a* of A in FIG. 72 is extracted, and an image in an area A132*a* is displayed on the display unit 201LL. The area A132*a* includes the vehicles 1121-2 to 1121-4, and does not include the vehicle 1121-1.

On the other hand, in a case where the direction indicator in the left direction of the vehicle 1C is turned on, an image in an area A131*b* of B in FIG. 72 is extracted, and an image in an area A132*b* is displayed on the display unit 201LL. The area A131*b* and area A132*b* are wider than the area A131*a* and the area A132*a*. That is, a display range of the display unit 201LL is zoomed out (extended) and expanded. Then, in addition to the vehicles 1121-2 to 1121-4, a rear end portion of the vehicle 1121-1 is included in the area A132*b*.

Thus, the driver can recognize the situation in the left lane of the vehicle 1C in a wider range when the direction indicator in the left direction is turned on. Consequently, the driver can change lanes or turn left more safely.

Note that for example, in a case where the display range of the display unit 201LL is zoomed out, an icon, a frame, or the like indicating that it is zoomed out may be displayed on the display unit 201LL.

Figure 73:
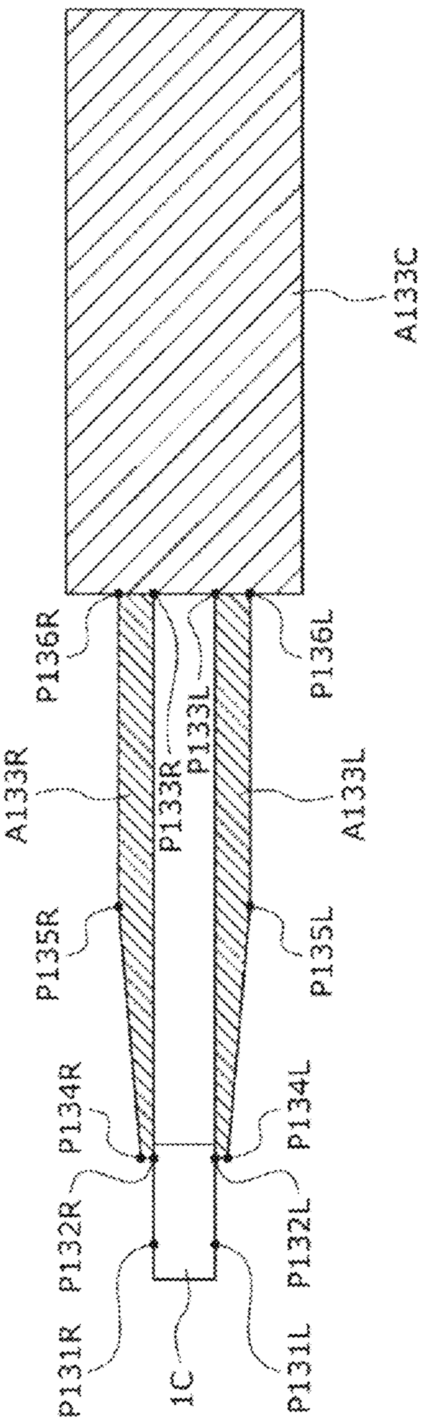
FIG. 73 is a diagram illustrating an example of a range of a required field of view.

Here, the United Nations Economic Commission for Europe Regulation 46 (UN ECE-R46) defines the range of a field of view (hereinafter referred to as the range of a required field of view) that is always visible in the CMS. The range of a required field of view varies depending on the seating capacity, weight, or the like of the vehicle, and FIG. 73 illustrates an example.

In this example, the range of a required field of view includes an area A133L, an area A133R, and an area A133C.

The area A133L is an area surrounded by points P132L to P136L on the left side of the vehicle 1C. Specifically, the leftmost point of the vehicle 1C corresponding to the same position as the positions of the eyes of the driver in the front-rear direction of the vehicle 1C is set as a reference point P131L. The point P132L is a point 4 m behind the reference point P131L. The point P133L is a point 60 m behind the reference point P131L. The point P134L is a point 1 m away in the left direction from the point P132L. The point P135L is a point 20 m behind and 4 m away in the left direction from the reference point P131L. The point P136L is a point 60 m behind and 4 m away in the left direction from the reference point P131L.

The area A133R is an area surrounded by points P132R to P136R on the right side of the vehicle 1C. Specifically, the rightmost point of the vehicle 1C corresponding to the same position as the positions of the eyes of the driver in the front-rear direction of the vehicle 1C is set as a reference point P131R. The point P132R is a point 4 m behind the reference point P131R. The point P133R is a point 60 m behind the reference point P131R. The point P134R is a point 1 m away in the right direction of the point P132R. The point P135R is a point 20 m behind and 4 m away in the right direction of the reference point P131R. The point P136R is a point 60 m behind and 4 m away in the right direction of the reference point P131R.

The area A133C is an area separated by 60 m or more behind from the positions of the eyes of the driver of the vehicle 1C and having a width of 20 m centered on the center of the vehicle 1C in the left-right direction.

Therefore, for example, as illustrated in FIG. 72, in a case where the display range of the display unit 201LL is changed according to the operation of the direction indicator in the left direction, the display range is changed so that the area A133L is always included.

Note that although detailed description is omitted, the display unit 201RR of the center display 201 also controls a similar display range according to the operation of the direction indicator in the right direction. Furthermore, the display range of the display unit 201RR is changed so that the area A133R is always included.

Furthermore, for example, the display control unit controls the display range of the display unit 201LL on the basis of the shift position of the vehicle 1C.

Figure 74:
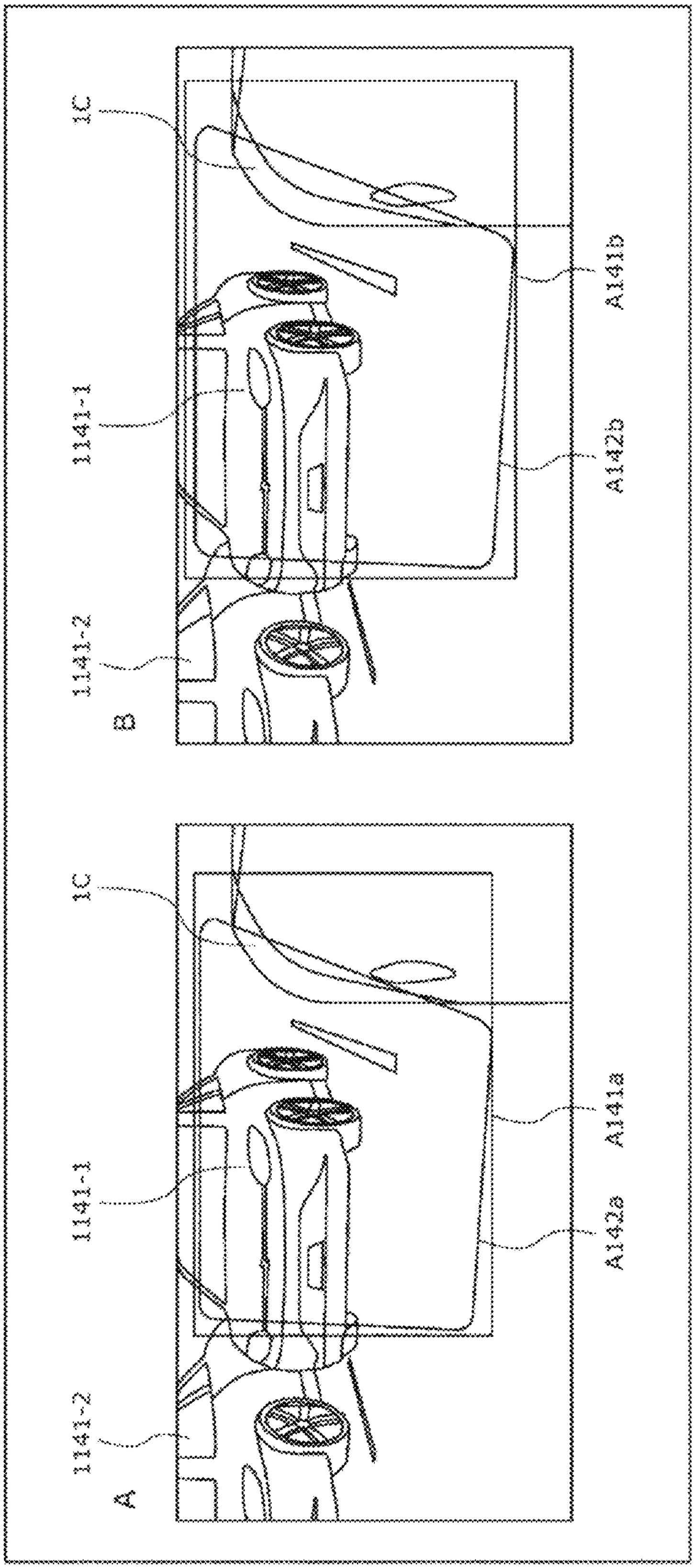
FIG. 74 is a view for describing an example of changing a display range of the display unit for the CMS on the basis of a shift position.

FIG. 74 illustrates an example of changing the display range of the display unit 201LL on the basis of the shift position of the vehicle 1C.

Specifically, A and B in FIG. 74 illustrate an example of an image captured by the camera 51SL. The image shows vehicles 1141-1 and 1141-2 parked side by side on the rear left side of the vehicle 1C, and the like.

For example, before the shift position of the vehicle 1C is set to reverse, the image in the area A141*a* of A in FIG. 74 is extracted, and the image in the area A142*a* is displayed on the display unit 201LL.

On the other hand, after the shift position of the vehicle 1C is set to reverse, an image in the area A141*b* of B in FIG. 74 is extracted, and an image in the area A142*b* is displayed on the display unit 201LL. The area A141*b* and area A142*b* are wider than the area A141*a* and area A142*a*. That is, the display range of the display unit 201LL is zoomed out and expanded. At this time, for example, the display range of the display unit 201LL may be automatically moved downward so that the ground around the vehicle 1C is displayed wider.

Note that although detailed description is omitted, also in the display unit 201RR of the center display 201, the display range is changed similarly to that in the display unit 201LL on the basis of the shift position of the vehicle 1C.

This allows the driver to check a situation at diagonally backward left of the vehicle 1C in a wider range. Consequently, the driver can park the vehicle 1C more safely.

Figure 75:
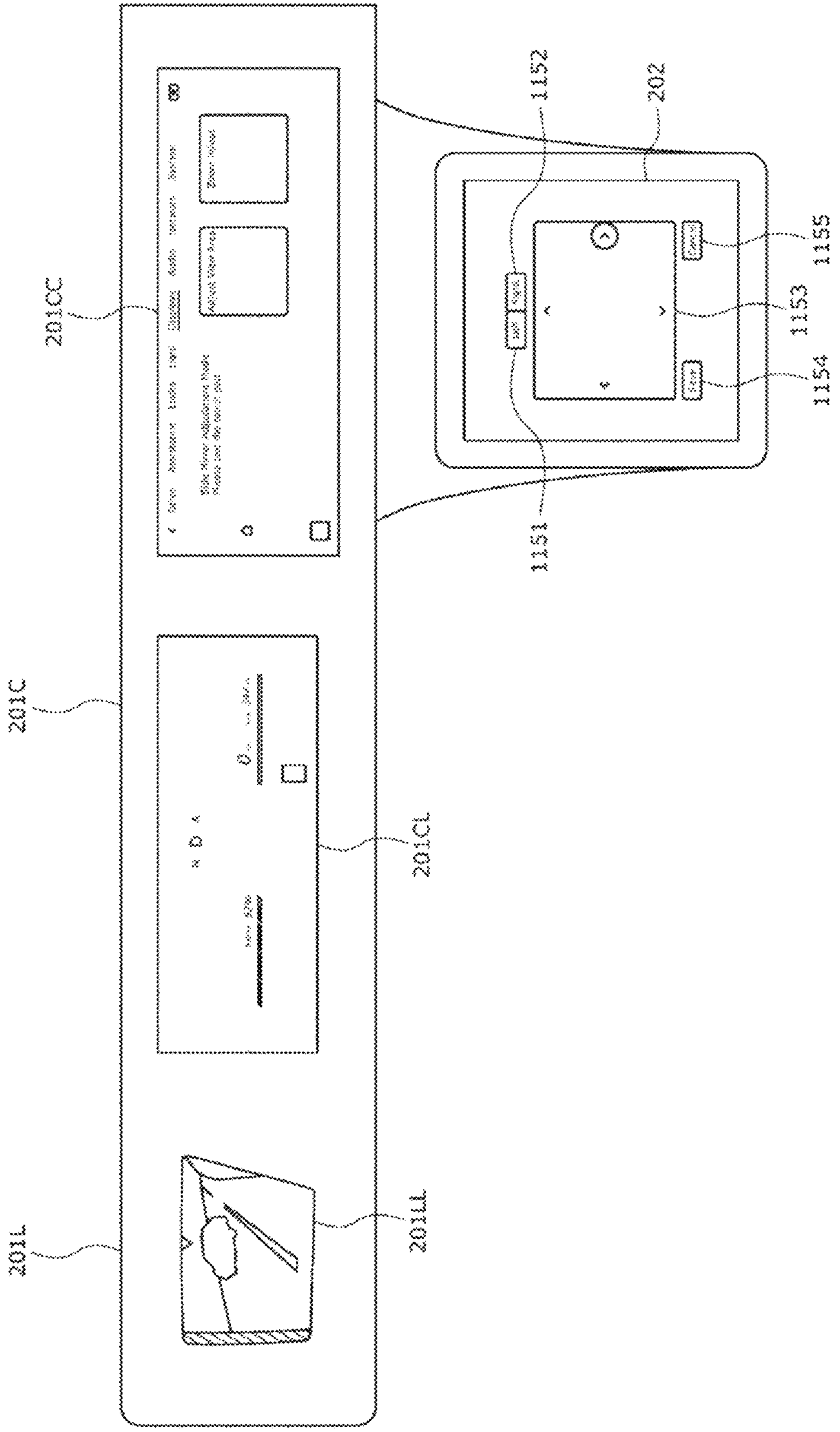
FIG. 75 is a view for describing a method of setting the display range of the display unit for the CMS.

Furthermore, for example, the driver can change the display ranges of the display unit 201LL and the display unit 201RR by operating the operation screen displayed on the console display 202 of FIG. 75.

A button 1151, a button 1152, a touch pad 1153, a button 1154, and a button 1155 are displayed on this operation screen.

When the button 1151 is pressed, the display range of the display unit 201LL on the left side becomes a setting target. When the button 1152 is pressed, the display range of the display unit 201RR on the right side becomes a setting target.

When the touch pad 1153 is operated, the display ranges of the display unit 201LL and the display unit 201CC move. That is, the display ranges of the display unit 201LL and the display unit 201CC move in the direction in which the touch pad 1153 is pressed.

When the button 1154 is pressed, the currently set display range is stored.

When the button 1155 is pressed, the change in the display range is canceled and the state before the change is restored.

Furthermore, for example, the zoom ratio (Zoom Factor) of the display ranges of the display unit 201LL and the display unit 201RR are set by another button, which is not illustrated, of the console display 202.

Figure 76:
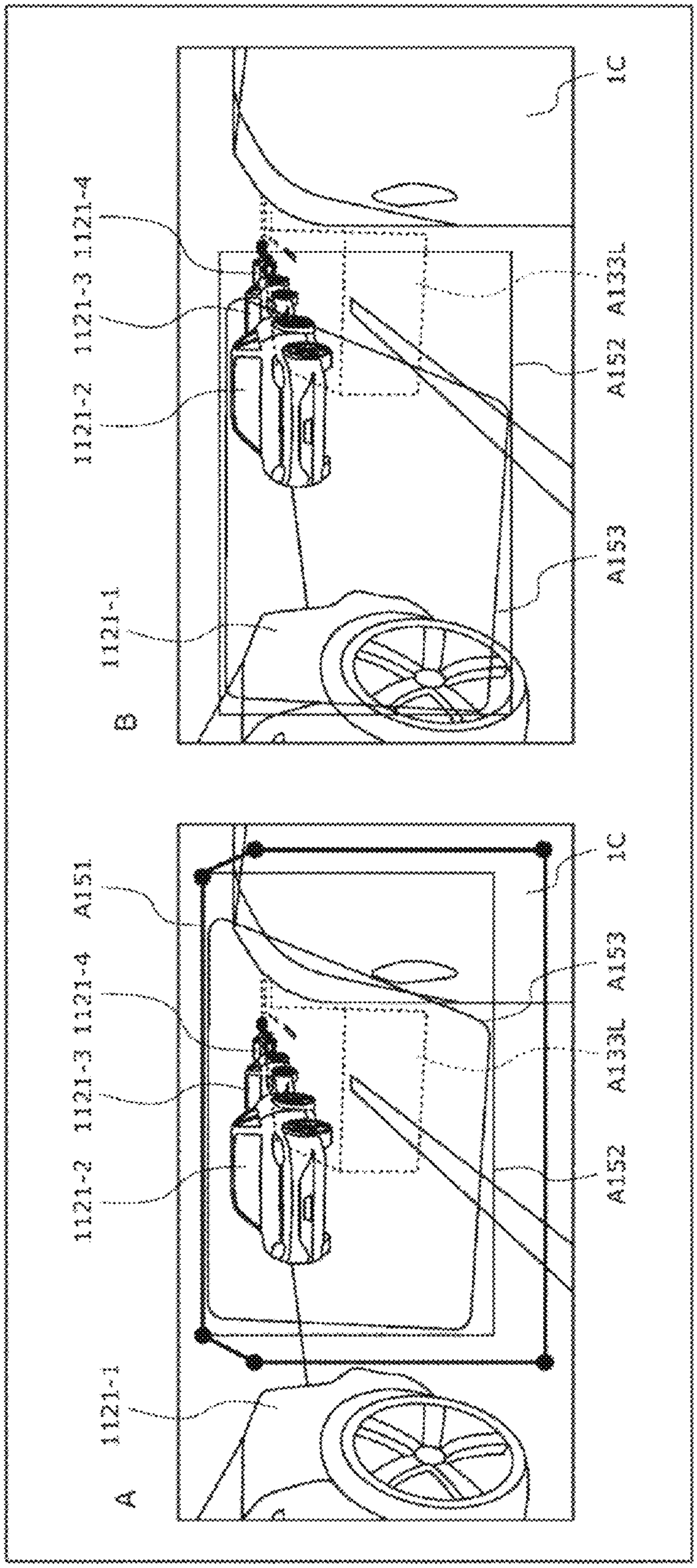
FIG. 76 is a view for describing a method of setting the display range of the display unit for the CMS.

Here, the display range can be set within a settable range A151 illustrated in FIG. 76. Note that in FIG. 76, parts corresponding to those in FIG. 72 are designated by the same reference numerals, and description thereof will be omitted as appropriate.

For example, the size of an extraction range A152 extracted from a captured image for display is set on the basis of a set zoom ratio. That is, the extraction range A152 is zoomed in (reduced) and zoomed out (expanded) on the basis of the zoom ratio. Then, an image in the predetermined display range A153 in the extraction range A152 is displayed on the display unit 201LL.

At this time, the display range A153 can be moved within the settable range A151. The settable range A151 is set in a range in which the area A133L is included in the display range A153.

On the other hand, for example, as illustrated in B of FIG. 76, in a case where the area A133L extends beyond the display range A153, a warning is given to the driver. For example, a warning message is displayed on the display unit 201LL and a warning sound is output.

Alternatively, for example, a movement range of the display range A153 may be restricted so that the display range A153 does not go out of the settable range A151 regardless of the operation of the driver.

Figure 77:
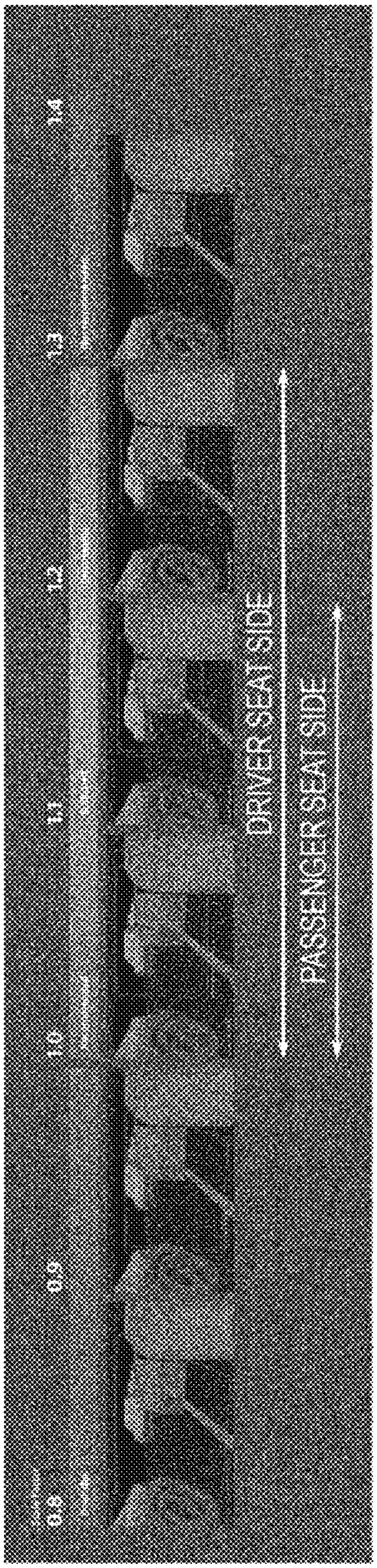
FIG. 77 is a view illustrating an example of a zoom ratio and the display range of the display unit for the CMS.

FIG. 77 illustrates an example of the display range of the display unit 201LL in a case where the zoom ratio is changed from 0.8 to 1.3 in 0.1 increments.

As the zoom ratio becomes smaller, the display range becomes larger and confirmation of a wider range becomes possible. On the other hand, the size of an object such as a following vehicle displayed on the display unit 201LL becomes smaller.

Meanwhile, as the zoom ratio becomes larger, the display range becomes smaller and the size of an object such as a following vehicle displayed on the display unit 201LL becomes larger. On the other hand, the number of pixels of the extracted image is reduced, and sharpness of the image is lowered.

Therefore, for example, the settable range of the zoom ratio of the display unit 201LL on the driver seat side is set to a range of 1.0 to 1.2. The settable range of the zoom ratio of the display unit 201RR on the passenger seat side is set to a range of 1.0 to 1.1.

Here, the settable range of the zoom ratio of the display unit 201LL on the driver seat side and the settable range of the zoom ratio of the display unit 201RR on the passenger seat side are different. This is because the distance from the driver to the display unit 201LL and the distance to the display unit 201CC are different, and the direction of the line of sight of the driver with respect to the display unit 201LL and the direction of the line of sight of the driver with respect to the display unit 201CC are different. That is, an appearance of the display unit 201LL and an appearance of the display unit 201CC to the driver are different.

Furthermore, as described above, in a case where the direction indicator operates or in a case where the shift position is set to reverse, the zoom ratio of the display unit 201LL and the display unit 201CC is lowered. Assuming this, a lower limit value of the settable range of the zoom ratio is limited to 1.0. For example, in a case where the zoom ratio described above is not changed, the lower limit value of the settable range of the zoom ratio can be lowered to 0.8 or 0.9.

In this manner, by operating the console display 202, the driver can move the display range A153 to his or her favorite position within a range including the area A133L, and zoom in or out of the display range A153 can be performed. Furthermore, the driver can easily adjust the display range A153 without distracting his or her line of sight by moving a finger or clicking on the console display 202 while remaining in the driving posture, for example.

Furthermore, for example, in a case of a physical side mirror, the driver can change the visible range through the side mirror by bringing his or her face close to the side mirror and looking into the side mirror. For example, the driver may check presence or absence of obstacles on the ground around the vehicle by looking into the side mirror when parking or the like.

On the other hand, the display range of the display unit 201LL can be changed similarly by the driver taking an action like moving his or her face close to the display unit 201LL and looking into the display unit 201LL.

For example, the DMS 30 detects the position and direction of the head of the driver by performing recognition of the skeleton of the driver, or the like on the basis of the image of the ToF camera P101L. The DMS 30 detects an angle at which the driver looks into the display unit 201LL in a case where an action of the driver to look into the display unit 201LL is recognized on the basis of the position and direction of the head of the driver.

On the other hand, the display control unit controls the display range of the display unit 201LL on the basis of the angle at which the driver looks into the display unit 201LL in a case where the vehicle 1C is stopped, that is, in a case where the speed of the vehicle 1C is zero.

Figure 78:
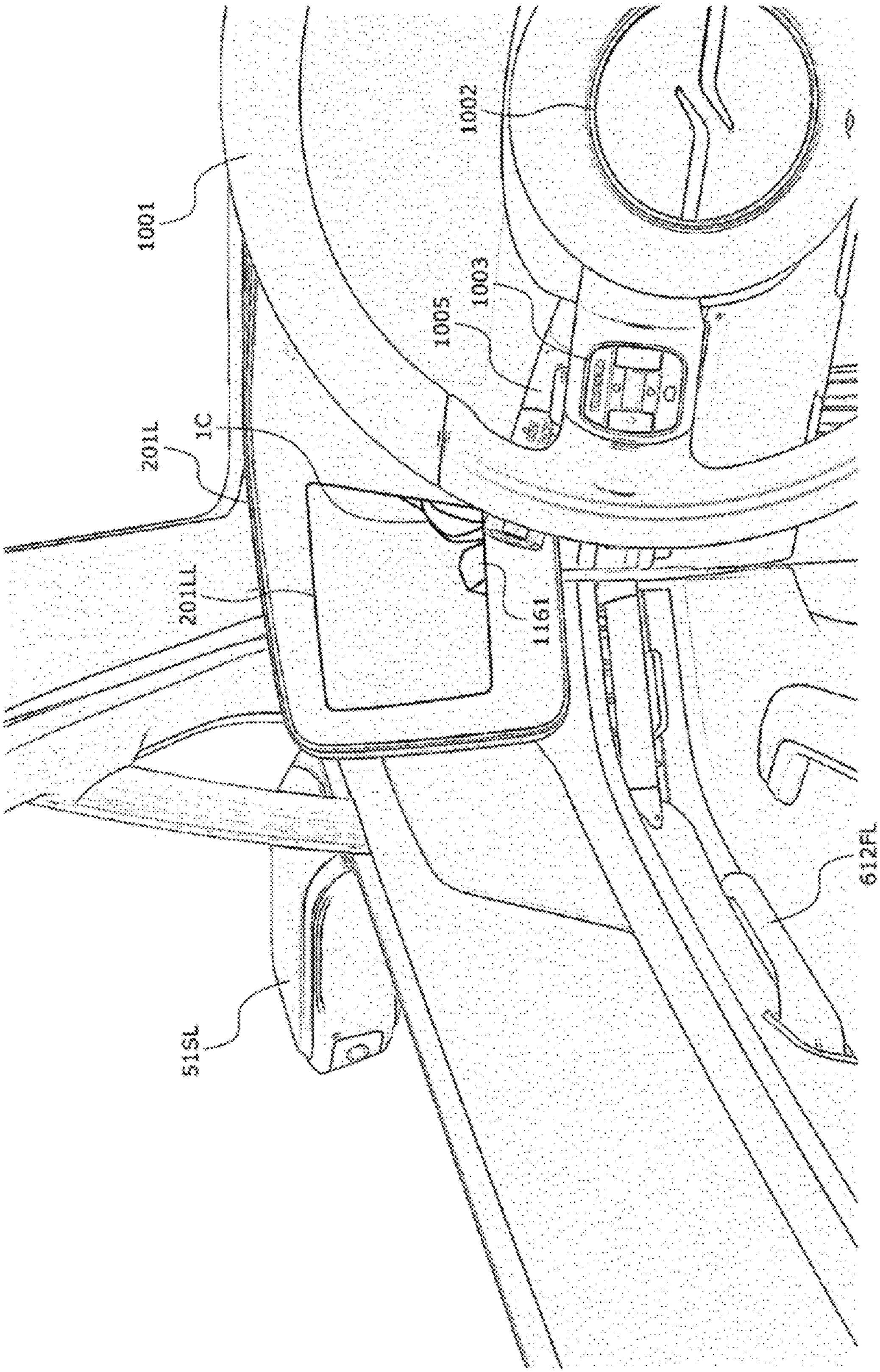
FIG. 78 is a view for describing a method of controlling the display range in a case of looking into the display unit for the CMS.

For example, FIG. 78 illustrates the display range of the display unit 201LL before the driver looks into the display unit 201LL. In this example, a part of the body of the vehicle 1C is displayed in a lower right corner of the display unit 201LL. Furthermore, an upper part of an object 1161 on the rear left of the vehicle 1C is displayed.

Figure 79:
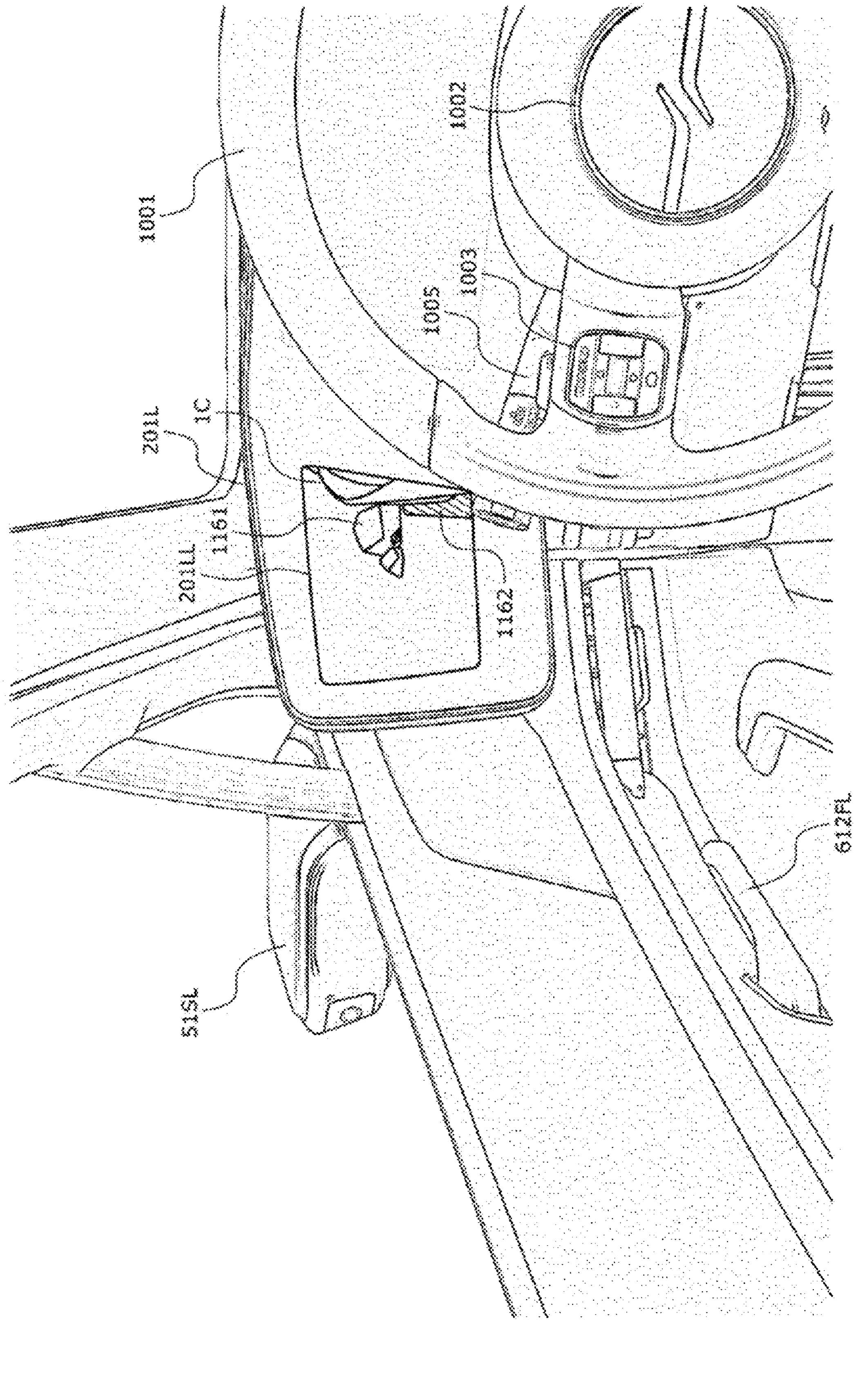
FIG. 79 is a view for describing a method of controlling the display range in a case of looking into the display unit for the CMS.

In this case, for example, in a case where the driver takes an action like looking into the display unit 201LL from a diagonally upward direction, the display range of the display unit 201LL changes as illustrated in FIG. 79. Specifically, the display range of the display unit 201LL moves downward. Thus, a lower part of the object 1161 is also displayed on the display unit 201LL, and the driver can visually recognize the entire object 1161.

Furthermore, as illustrated by diagonal lines in the view, a strip-shaped visual effect line 1162, which indicates an area of the ground within a predetermined range around the vehicle 1C, is superimposed and displayed and blinks. Thus, the driver can quickly recognize an object that the vehicle 1C may collide with or come into contact with, and move the vehicle 1C while avoiding the recognized object.

Figure 80:
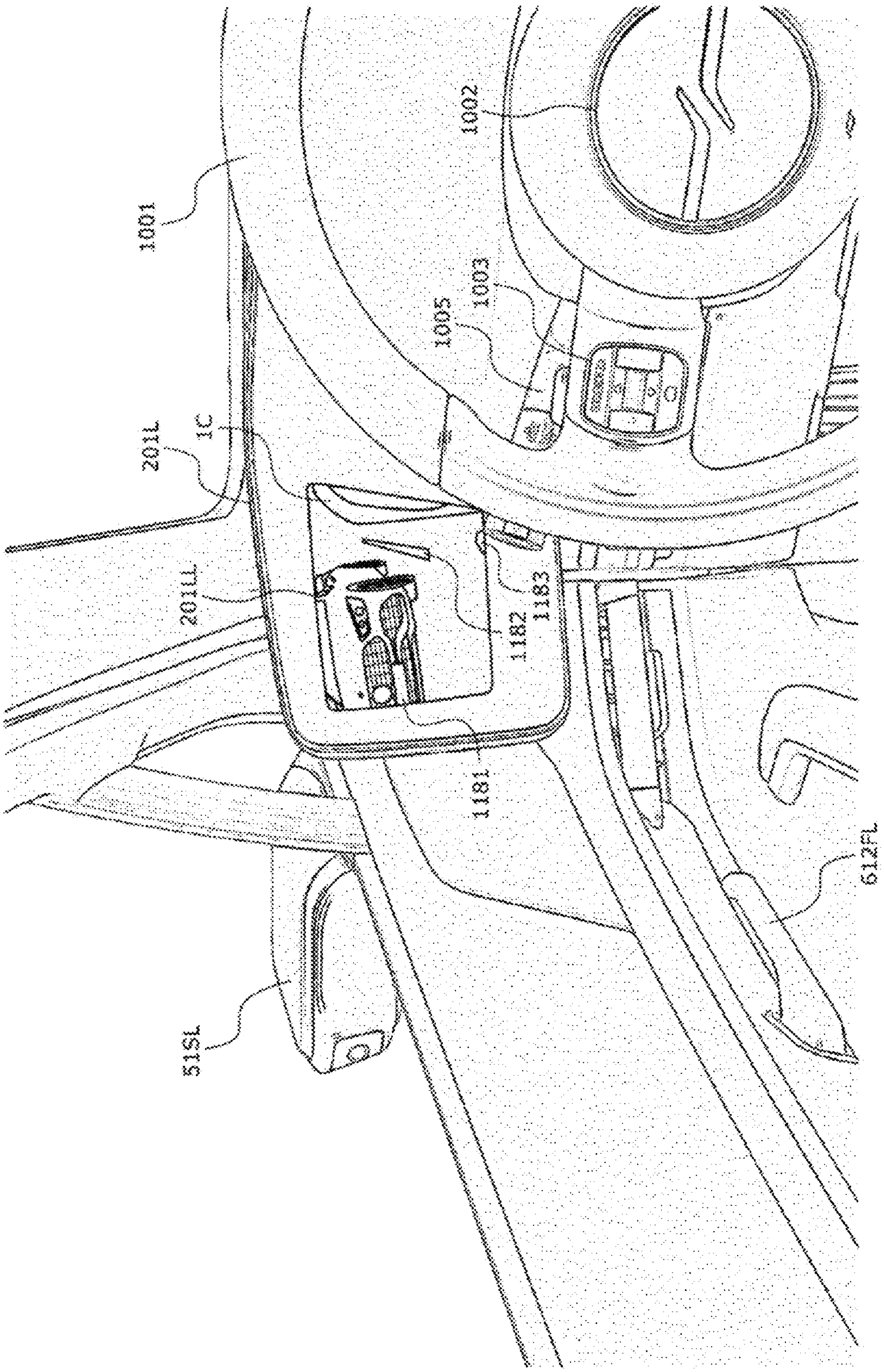
FIG. 80 is a view for describing a method of controlling the display range in a case where the shift position is set to reverse and the display unit for CMS is looked into.

Furthermore, for example, FIG. 80 illustrates the display range of the display unit 201LL before the driver looks into it. In this example, a part of the body of the vehicle 1C is displayed at a right end of the display unit 201LL. A part of a vehicle 1181 at rear left is displayed on an upper left of the display unit 201LL. A parking line 1182 is displayed between the vehicle 1C and the vehicle 1181. An upper end of an object 1183 is displayed on the left of the vehicle 1C and at a lower end of the display unit 201LL.

Figure 81:
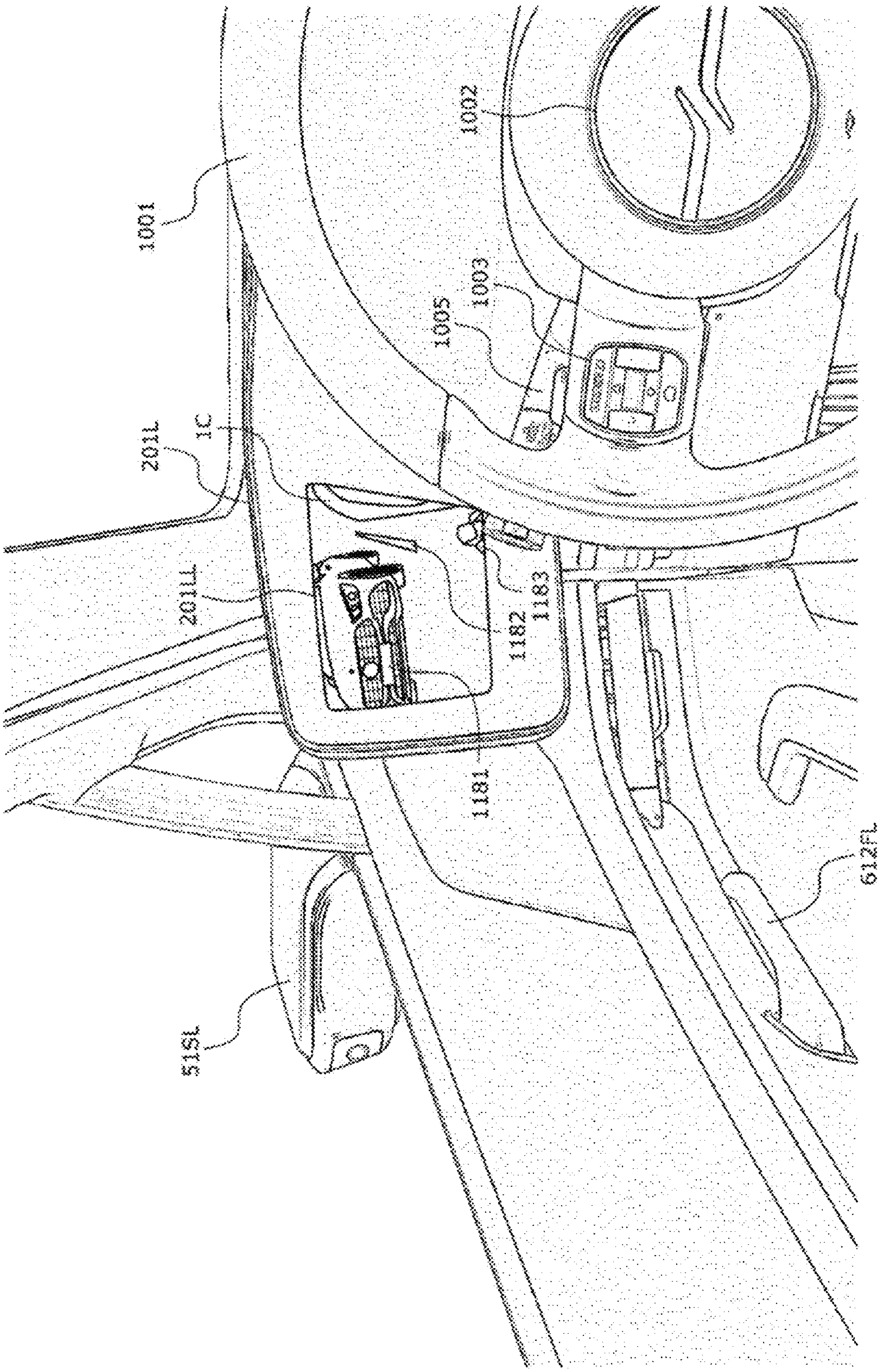
FIG. 81 is a view for describing a method of controlling the display range in the case where the shift position is set to reverse and the display unit for CMS is looked into.

Here, for example, in a case where the driver sets the shift position to reverse in order to park the vehicle 1C, the display range of the display unit 201LL is zoomed out as described above with reference to FIG. 74. Thus, as illustrated in FIG. 81, the display range of the display unit 201LL is expanded, and the range in which the vehicle 1C, the vehicle 1181, and the object 1183 are displayed is expanded.

Figure 82:
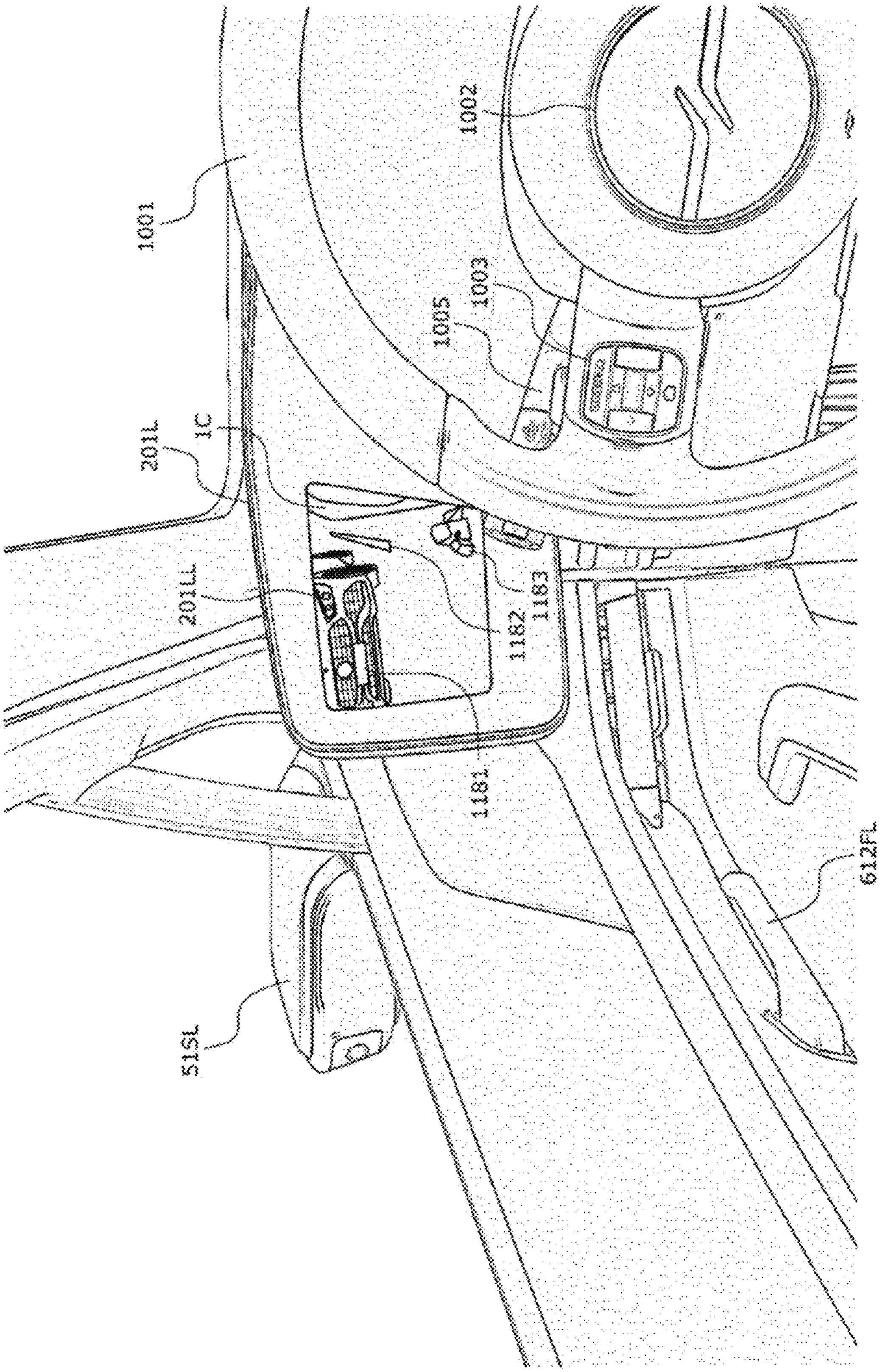
FIG. 82 is a view for describing a method of controlling the display range in the case where the shift position is set to reverse and the display unit for CMS is looked into.

Moreover, for example, in a case where the driver takes an action like looking into the display unit 201LL from a diagonally upward direction, the display range of the display unit 201LL moves downward as illustrated in FIG. 82. Thus, the entire object 1183 is displayed on the display unit 201LL. Consequently, the driver can park the vehicle 1C while reliably avoiding the object 1183.

Note that although detailed description is omitted, also in a case where the driver looks into the display unit 201RR of the center display 201, the display range moves similarly to that of the display unit 201LL.

Furthermore, for example, also in a case where the driver brings his or her face close to and looks into the digital rearview mirror 204, a display range of the digital rearview mirror 204 moves.

For example, the DMS 30 detects an angle at which the driver looks into the digital rearview mirror 204 in a case where an action of the driver to look into the digital rearview mirror 204 is recognized on the basis of the position and direction of the head of the driver.

On the other hand, the display control unit controls the display range of the digital rearview mirror 204 on the basis of the angle at which the driver looks into the digital rearview mirror 204 in a case where the vehicle 1C is stopped, that is, in a case where the speed of the vehicle 1C is zero.

Figure 83:
FIG. 83 is a view for describing a method of controlling a foot light in a case of looking down at feet.

Moreover, for example, as illustrated in FIG. 83, in a case where an action of the driver DR1 to look down at his or her feet is recognized, the light control unit 85 may turn on the feet light (not illustrated) that illuminates the driver's feet. Thus, in a case where the driver drops a key or the like at his or her feet, for example, the driver can easily find the dropped key or the like.

Furthermore, for example, the DMS 30 detects movement of the driver's left hand by performing recognition of the skeleton of the driver, or the like on the basis of the image of the ToF camera P101L. The recognition unit 73 detects an object around the door 611FL of the driver seat 101 outside the vehicle 1C on the basis of sensing data such as an image of the camera 51SL. Then, in a case where an object is detected within a predetermined range around the door 611FL of the driver seat 101, when the driver takes an action to open the door 611FL, for example, when the driver's left hand touches the door opener 661FL of the door 611FL, the display unit 201LL displays a warning.

Figure 84:
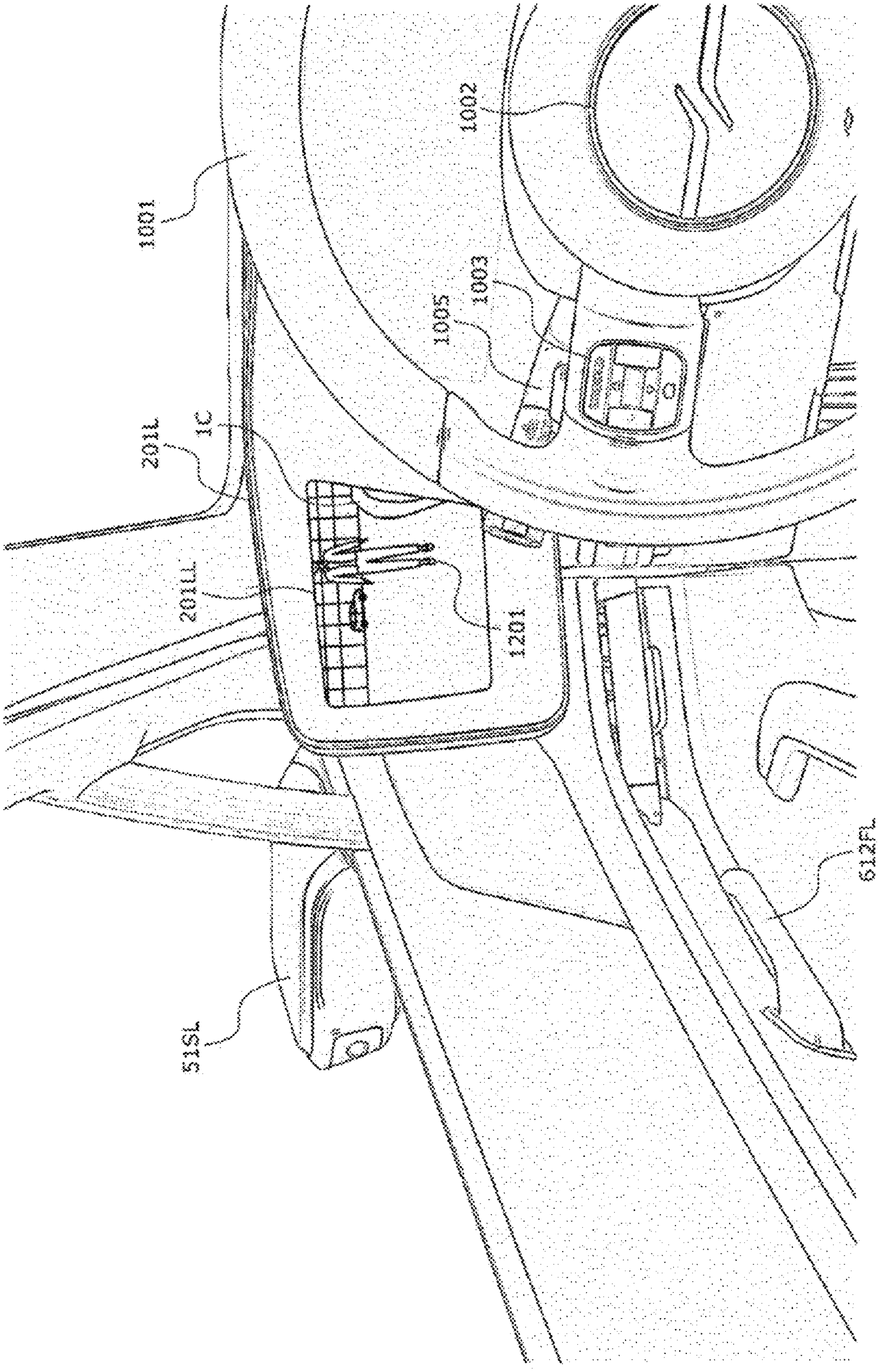
FIG. 84 is a view for describing a method of controlling the display unit for the CMS in a case where the door opener is touched.

For example, FIG. 84 illustrates a display example of the display unit 201LL before the driver's left hand touches the door opener 661FL. A part of the body of the vehicle 1C is displayed at the right end of the display unit 201LL. On the left side of the vehicle 1C, a pedestrian 1201 approaching the vehicle 1C from behind is displayed.

Figure 85:
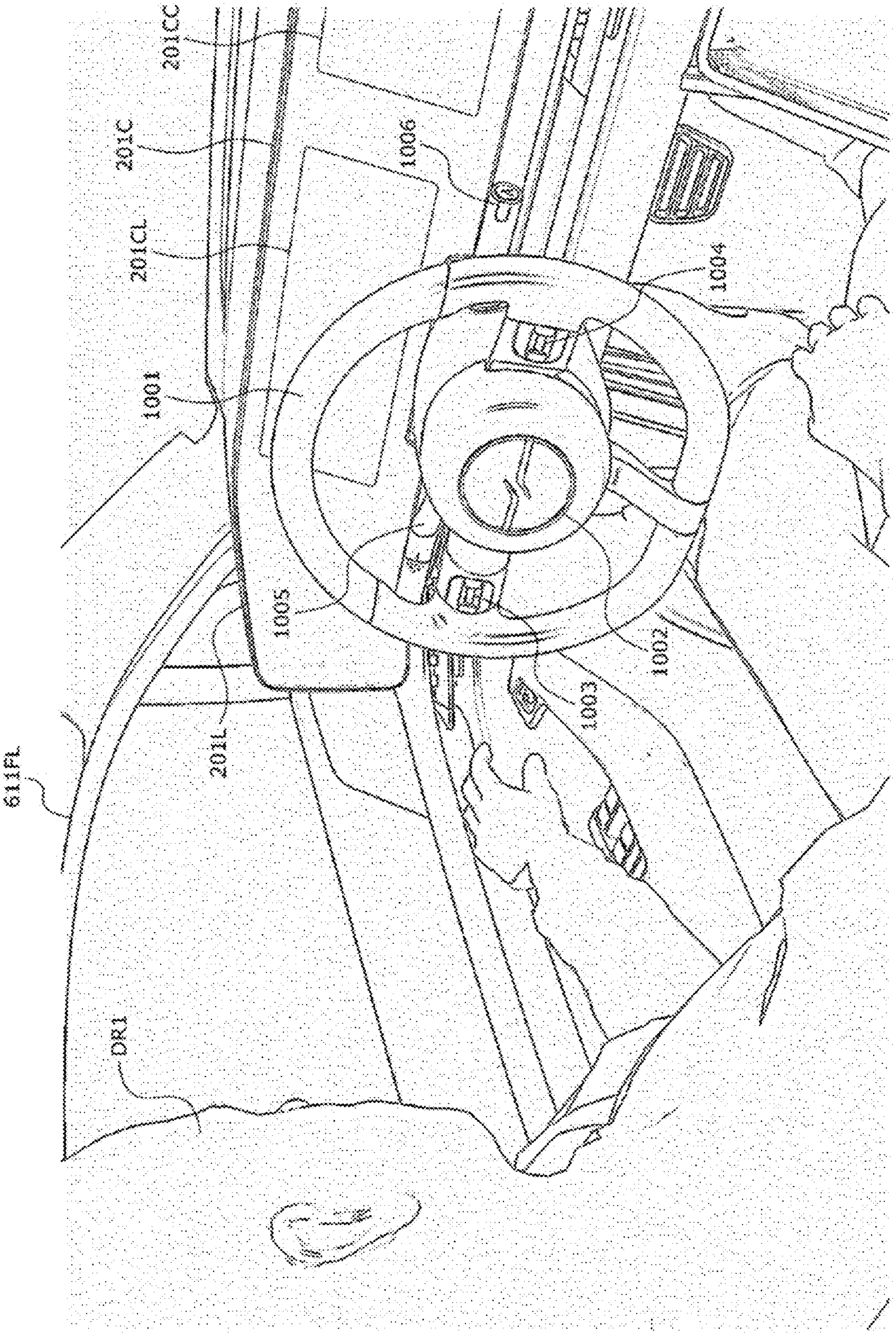
FIG. 85 is a view for describing a method of controlling the display unit for the CMS in the case where the door opener is touched.
Figure 86:
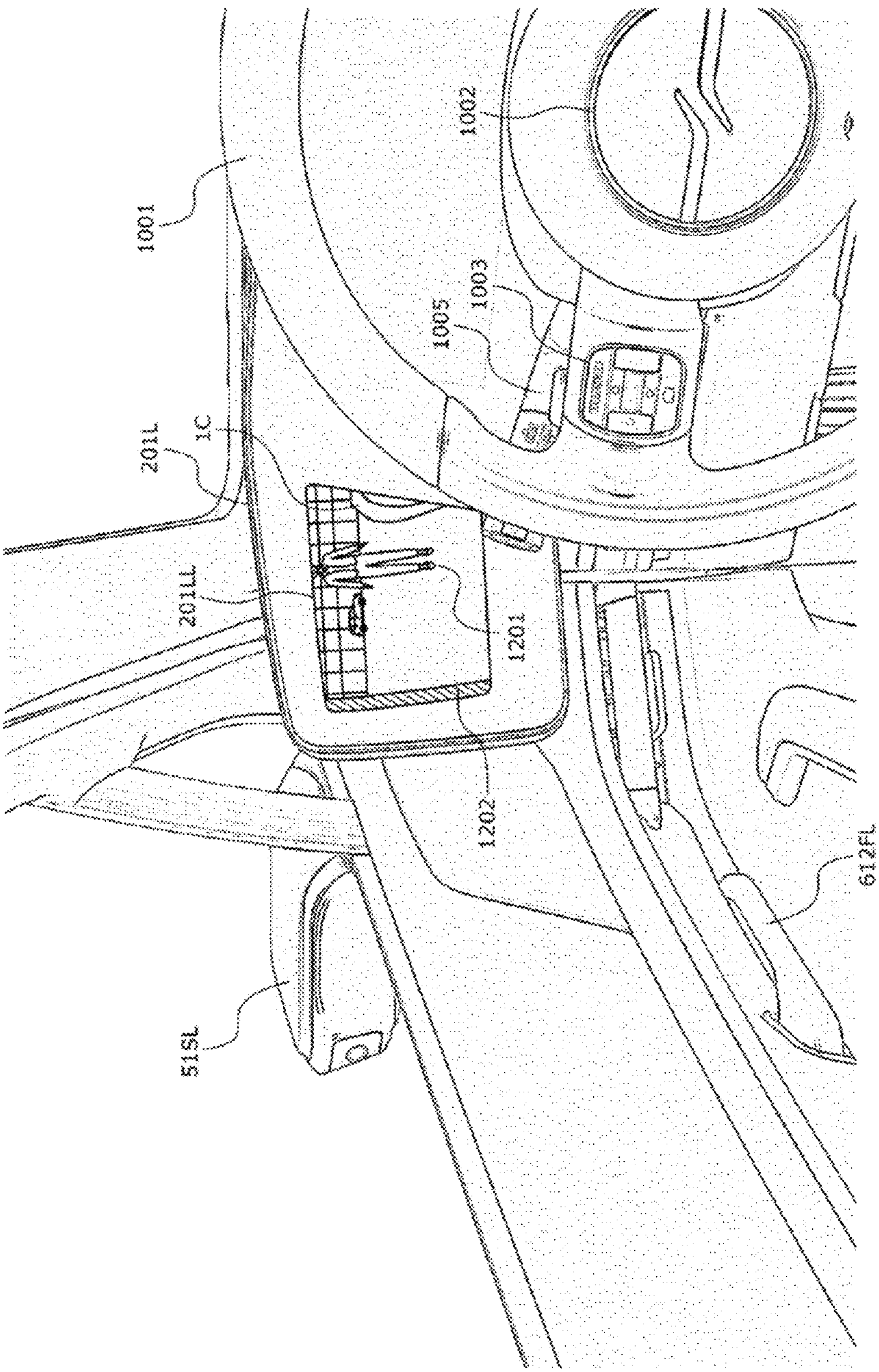
FIG. 86 is a view for describing a method of controlling the display unit for the CMS in the case where the door opener is touched.

In this case, for example, when it is recognized that the left hand of the driver DR1 touches the door opener 661FL as illustrated in FIG. 85, the display unit 201LL displays a warning as illustrated by diagonal lines in FIG. 86. Specifically, at the left end of the display unit 201LL, a bar 1202, which is a vertically long strip-shaped visual effect, is superimposed and displayed and blinks. The color of the bar 1202 is a prominent color, for example yellow.

Note that at this time, a warning sound may be output.

This calls attention of the driver DR1 to the pedestrian 1201 and prevents the door 611FL from hitting the pedestrian 1201 when the door 611FL is opened.

Note that at this time, for example, the body system control unit 84 may increase torque of the door 611FL to make the door 611FL difficult to open.

Furthermore, for example, in a case where a hand of the occupant in the passenger seat 102 touches the door opener 661FR of the door 611FR, the display unit 201RR on the passenger seat 102 side may display similar warning.

<Operation example of display unit 201CL and illumination 1002>

Next, an operation example of the display unit 201CL of the center display 201 and the illumination 1002 of the steering wheel 1001 will be described with reference to FIGS. 87 to 95.

For example, the display control unit causes the display unit 201CL to display contents according to a situation on the basis of at least one of a situation of the vehicle 1C, a situation around the vehicle 1C, or a situation of an occupant.

For example, the light control unit 85 turns on or blinks the illumination 1002 in a pattern according to the situation on the basis of at least one of the situation of the vehicle 1C, the situation around the vehicle 1C, or the situation of the occupant. A light emission pattern of the illumination 1002 is defined by, for example, at least one of color, brightness, blinking pattern, light movement, or light emitting area.

For example, in a case where the driver gets into the vehicle 1C and sits on the driver seat 101, the DMS 30 performs recognition processing of the driver on the basis of at least one of the image of the ToF camera P101L or the image of the camera 1042 of the camera module 1007. Then, the display unit 201CL and the illumination 1002 give notification that the driver has been recognized.

Figure 87:
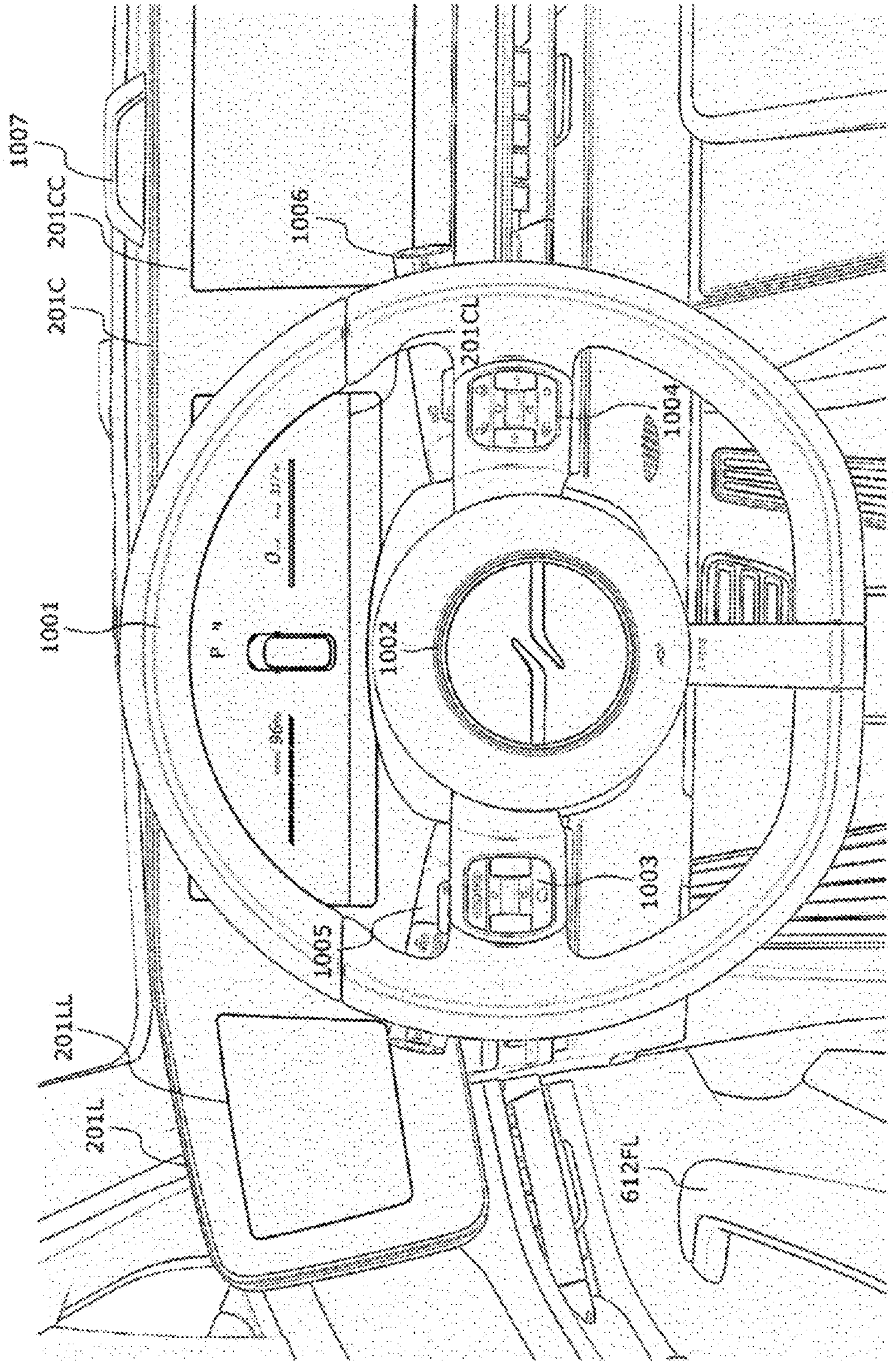
FIG. 87 is a view illustrating states of a display unit for the driver seat and an illumination of the steering wheel before recognition of the driver.

For example, FIG. 87 illustrates states of the display unit 201CL and the illumination 1002 before the driver is recognized.

The status of the vehicle 1C is displayed on the display unit 201CL. Specifically, the shift position, charge amount, speed, cruising range, and the like are displayed.

The illuminations 1002 are off.

Figure 88:
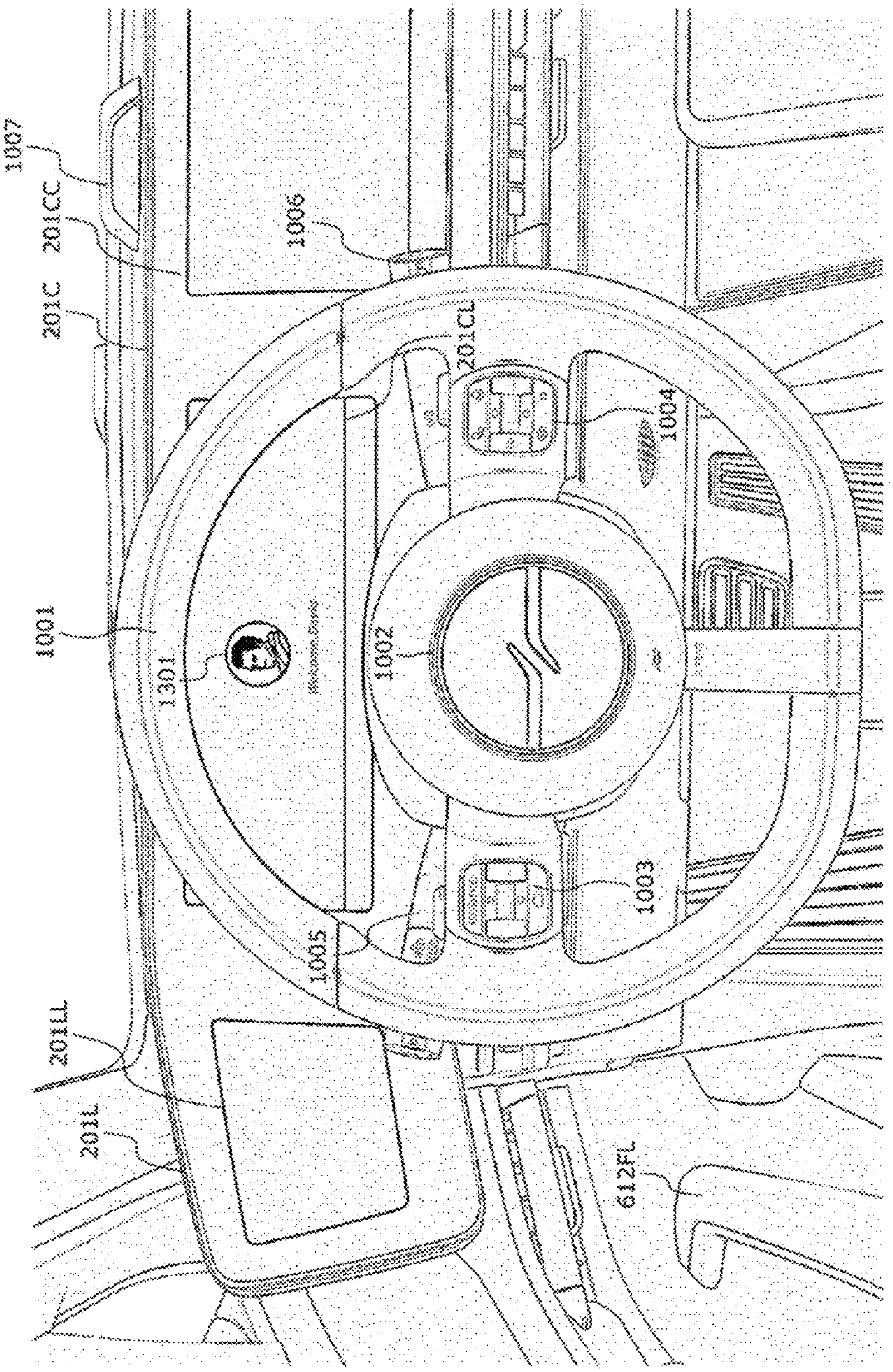
FIG. 88 is a view illustrating states of the display unit for the driver seat and the illumination of the steering wheel at a time of recognition of the driver.

FIG. 88 illustrates states of the display unit 201CL and the illumination 1002 when the driver is recognized.

The display unit 201CL displays an image and name of the recognized driver and a message to the driver. Thereafter, the display unit 201CL returns to the state illustrated in FIG. 87.

Although detailed illustration is omitted, the illumination 1002 turns on in a predetermined pattern. For example, a plurality of short bands of white light moves in a predetermined pattern over the illumination 1002.

Thus, the driver is surely notified that the vehicle 1C has recognized the driver.

At this time, for example, the body system control unit 84 may set a position and an angle of the driver seat 101, a position and an angle of the steering wheel 1001, and the like on the basis of a recognized physique of the driver or preferences of the driver set in advance. Thus, a driving position suitable for the recognized driver is set.

Furthermore, for example, the display control unit may adjust a display position of the display unit 201CL of the center display 201 on the basis of recognized positions of the eyes of the driver, a position and angle of the steering wheel 1001, and the like. Thus, the display range of the display unit 201CL is set at a position that is easy to see without being obstructed by the steering wheel 1001 according to the recognized driver.

Furthermore, for example, when the vehicle 1C is ready for autonomous driving, the display unit 201CL and the illumination 1002 give notification that preparation for autonomous driving is completed.

Figure 89:
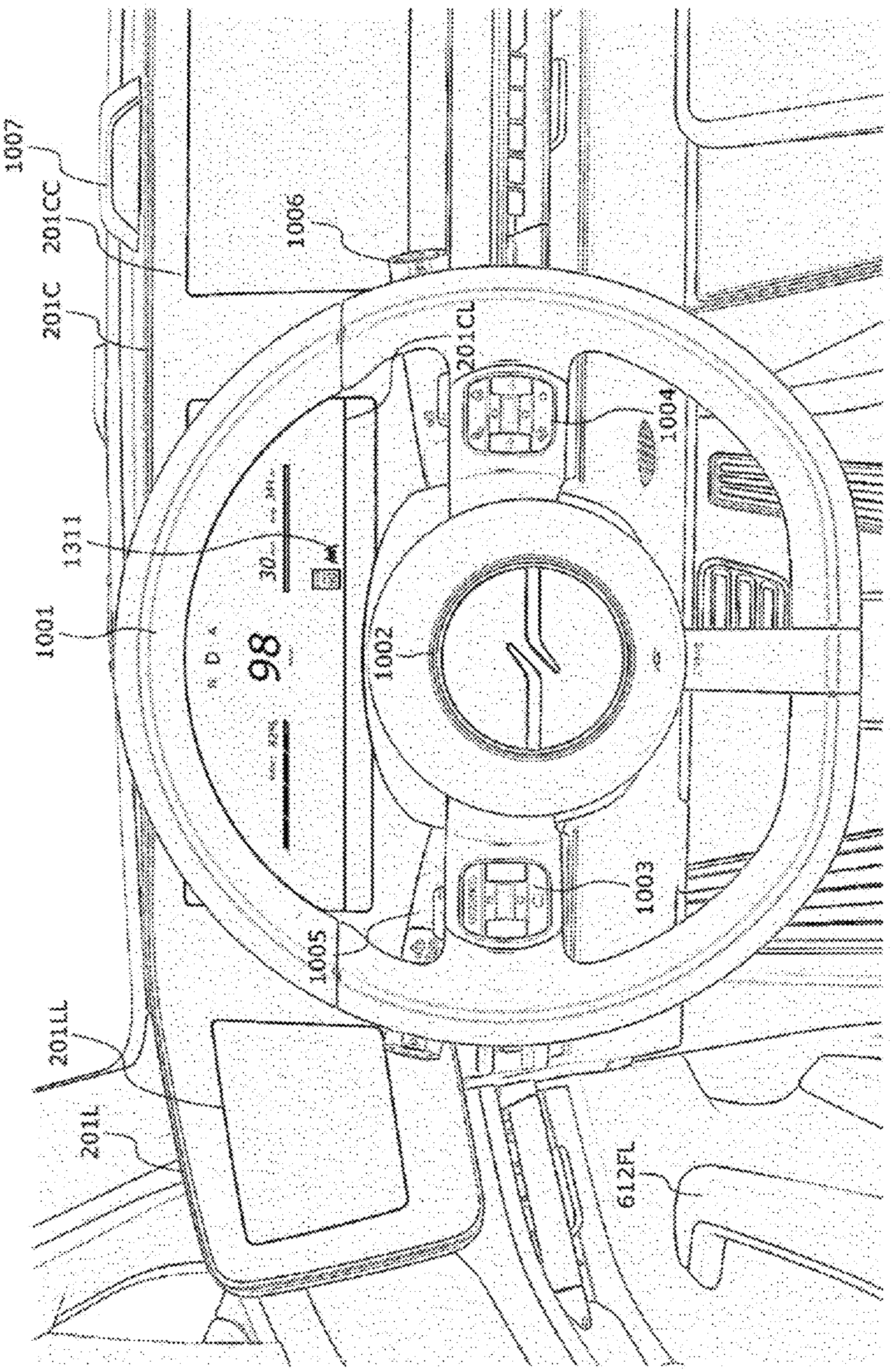
FIG. 89 is a view illustrating states of the display unit for the driver seat and the illumination of the steering wheel when preparation for autonomous driving is completed.

FIG. 89 illustrates states of the display unit 201CL and the illumination 1002 when the preparation for autonomous driving is completed.

In addition to the display contents illustrated in FIG. 87, the display unit 201CL displays an icon 1311 indicating that the preparation for autonomous driving is completed. Note that to the left of the icon 1311, a speed limit of the road on which the vehicle 1 is traveling is displayed.

Although detailed illustration is omitted, the illumination 1002 turns on in a predetermined pattern. For example, a plurality of short bands of white light moves in a predetermined pattern over the illumination 1002.

Thus, the driver can surely recognize that the preparation for autonomous driving is complete.

Furthermore, for example, when the autonomous driving of the vehicle 1C is started, the display unit 201CL and the illumination 1002 give notification of the start of the autonomous driving.

Figure 90:
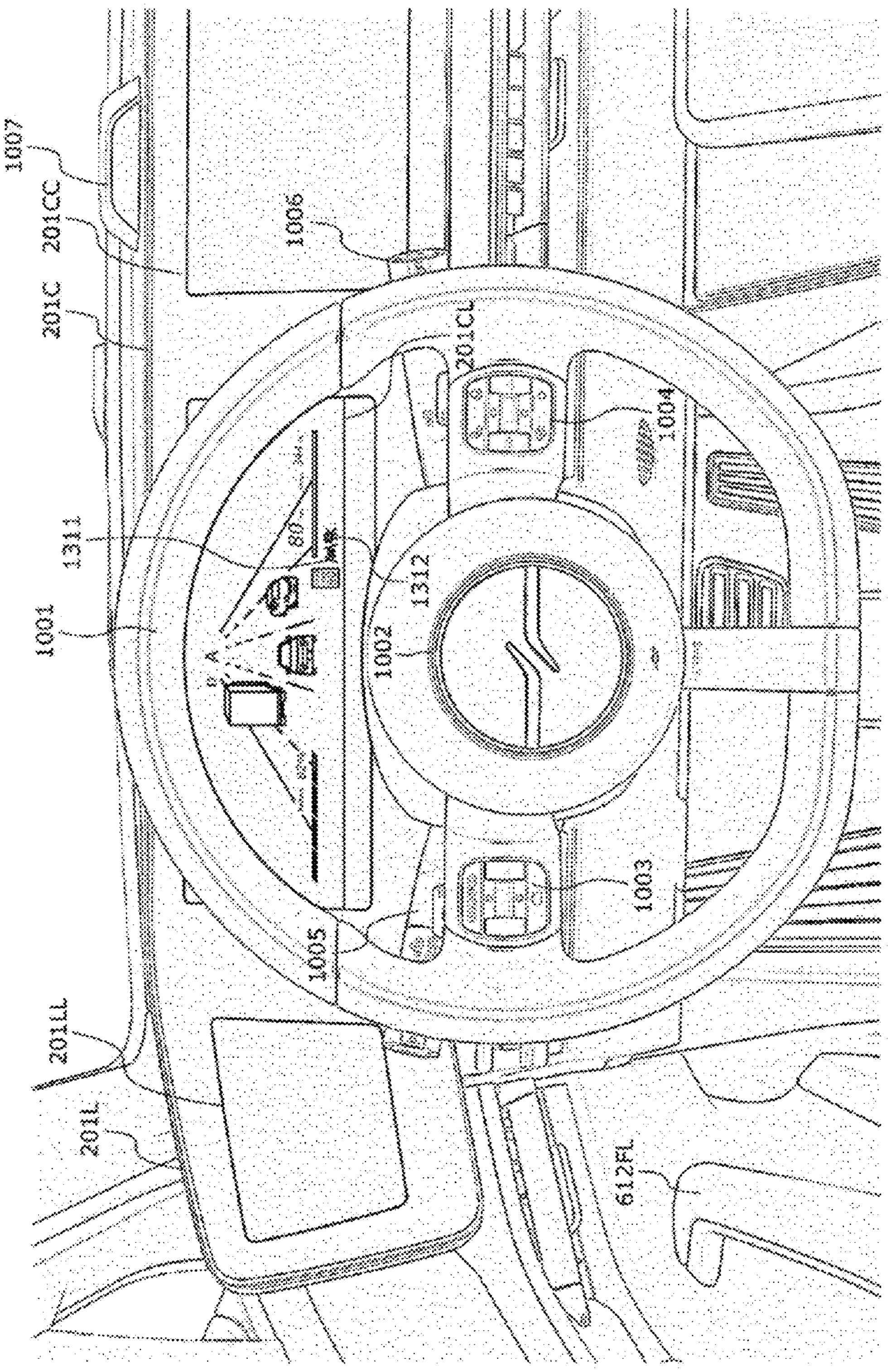
FIG. 90 is a view illustrating states of the display unit for the driver seat and the illumination of the steering wheel when autonomous driving is started.

FIG. 90 illustrates states of the display unit 201CL and the illumination 1002 when autonomous driving is started.

The display unit 201CL displays, for example, an image in front of the vehicle 1C captured by the camera 51FC. On the display unit 201CL, for example, the shift position, charge amount, speed, cruising range, speed limit of the road on which the vehicle is traveling, fuel consumption, and the like are displayed. On the display unit 201CL, an icon 1312 indicating that autonomous driving is in progress is displayed to the right of the above-mentioned icon 1311. Furthermore, for example, the color of the icon 1311 changes with the start of autonomous driving.

Although detailed illustration is omitted, the illumination 1002 turns on in a predetermined pattern. For example, a plurality of short bands of white light gradually turns blue while moving in a predetermined pattern over the illumination 1002. Finally, the entire illumination 1002 turns on in blue and remains on in blue during autonomous driving.

Thus, the driver can surely recognize that the autonomous driving has been started. Furthermore, by turning on the illumination 1002, occupants other than the driver can surely recognize that the autonomous driving has been started.

Figure 91:
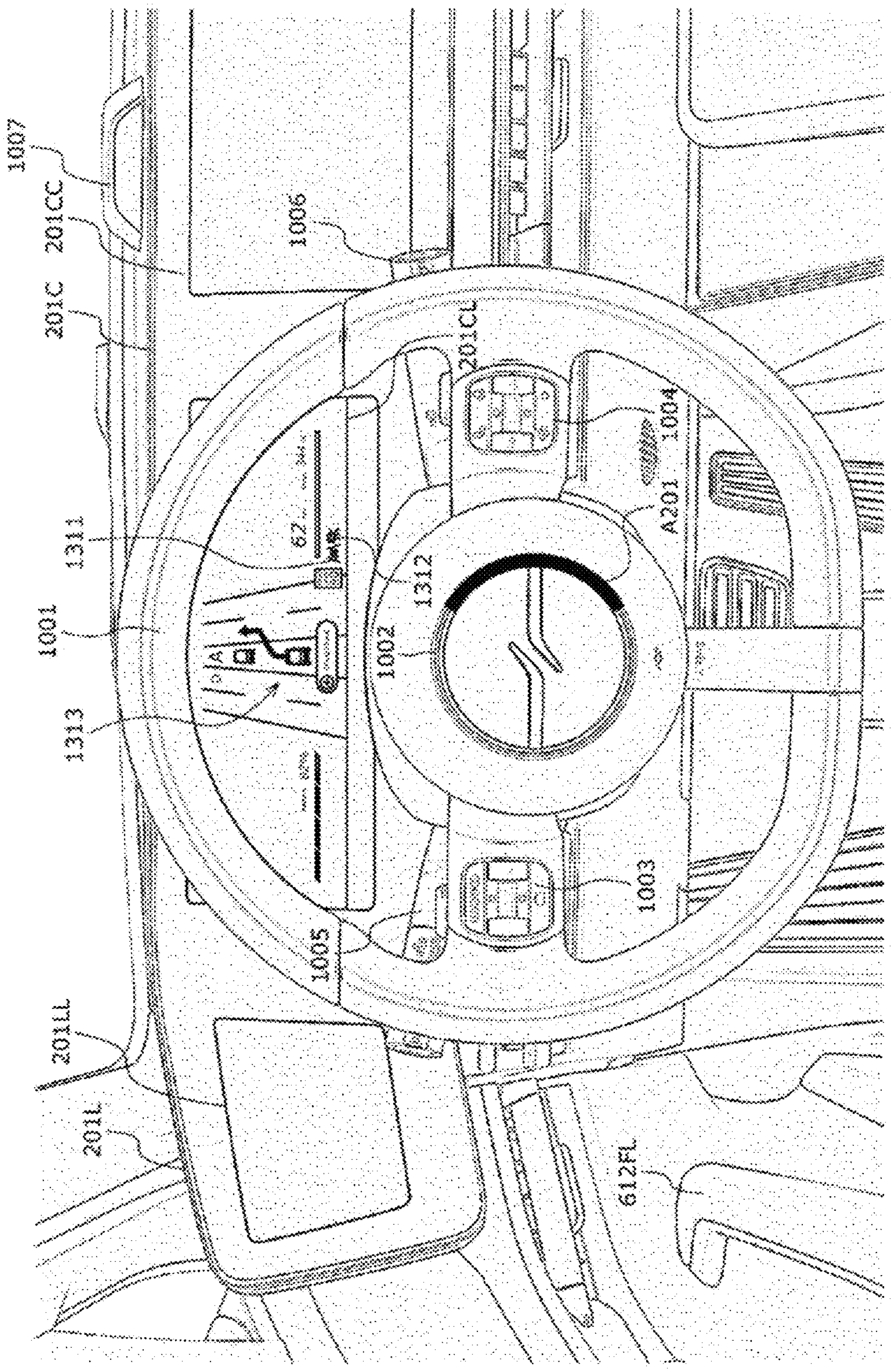
FIG. 91 is a view illustrating states of the display unit for the driver seat and the illumination of the steering wheel when changing lanes during autonomous driving.

FIG. 91 illustrates states of the display unit 201CL and the illumination 1002 in a case where the vehicle 1C changes lanes to the right lane during autonomous driving.

In a case where the vehicle 1C changes lanes, the display unit 201CL superimposes and displays guidance information 1313 including an animation for giving notification of execution and direction of a lane change on an image in front of the vehicle 1C.

Further, the blue light of the entire illumination 1002 turns off, and a predetermined blinking range A201 on the right side of the illumination 1002 blinks blue. Furthermore, in a case where the steering wheel 1001 rotates clockwise to change lanes, the blinking range A201 rotates in the opposite direction (counterclockwise) according to the rotation angle of the steering wheel 1001. Further, in a case where the steering wheel 1001 rotates counterclockwise so as to return to the original state after changing lanes, the blinking range A201 rotates in the opposite direction (clockwise) according to the rotation angle of the steering wheel 1001. Thus, the blinking range A201 is maintained at a constant position as viewed from the outside without rotating together with the steering wheel 1001. Then, after the rotation angle of the steering wheel 1001 returns to zero degrees, the entire illumination 1002 turns on in blue, similarly to that before the lane change.

Thus, the driver can recognize in advance that the vehicle 1C will change lanes.

Note that, in a case where the vehicle 1C changes lanes to the left lane, similarly, the guidance information 1313 is superimposed on the display unit 201CL and displayed, and a predetermined blinking range on the left side of the illumination 1002 blinks in blue.

Furthermore, for example, in a case where the vehicle 1C changes direction (for example, turns left or right), similar processing is performed. For example, guidance information including an animation for giving notification of execution and direction of a direction change is superimposed and displayed on the display unit 201CL, and a predetermined blinking range corresponding to the direction of the direction change of the illumination 1002 blinks blue.

Figure 92:
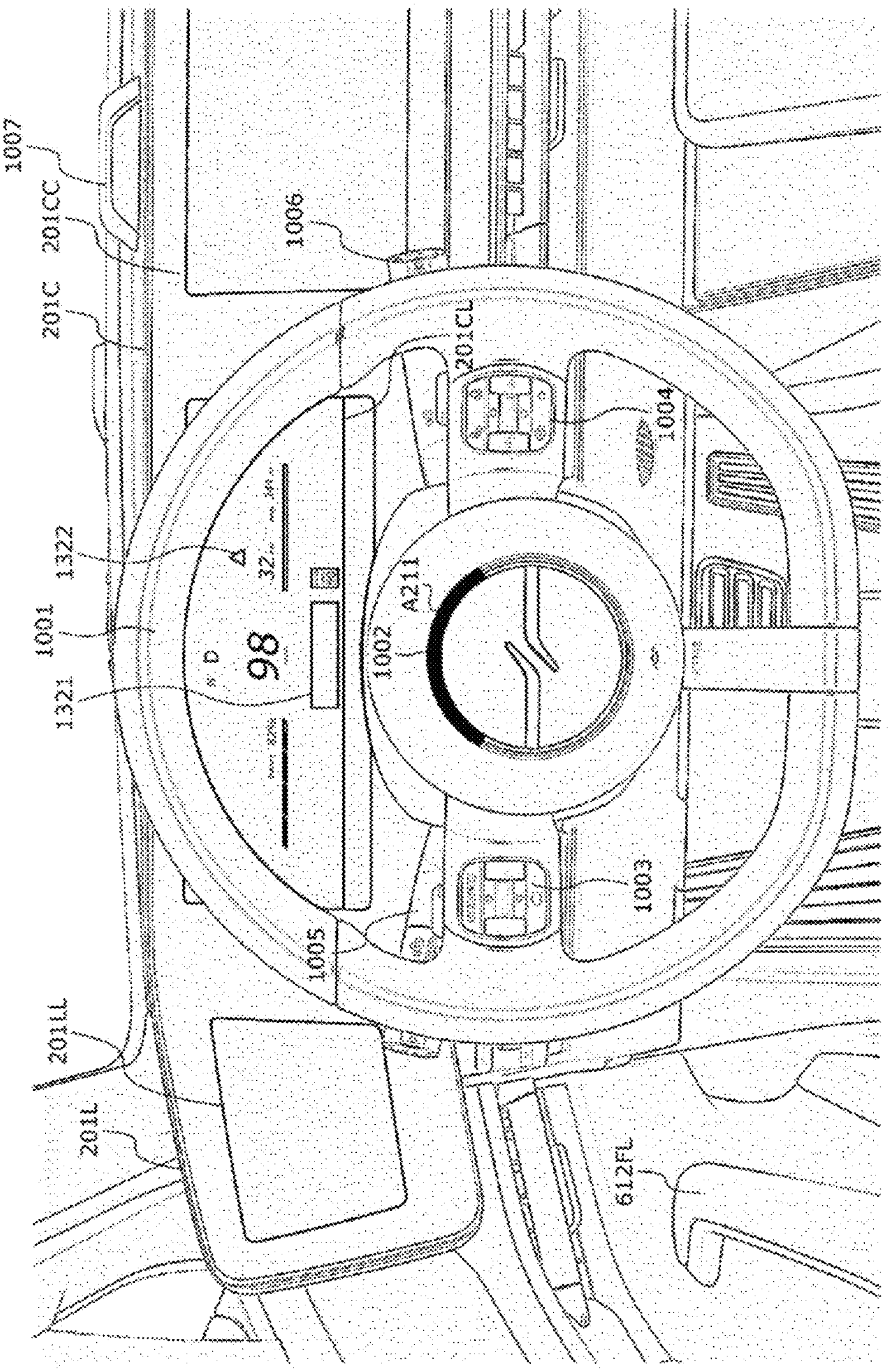
FIG. 92 is a view illustrating states of the display unit for the driver seat and the illumination of the steering wheel when danger is detected.

FIG. 92 illustrates states of the display unit 201CL and the illumination 1002 in a case where a dangerous state is detected around the vehicle 1C.

On the display unit 201CL, for example, a message 1321 and an icon 1322 indicating a detected state, a countermeasure, and the like are displayed.

Furthermore, the blue light of the entire illumination 1002 turns off, and a predetermined blinking range A211 above the illumination 1002 blinks. For example, a color and blinking speed of light in the blinking range A211 changes on the basis of the degree of danger of the detected state. For example, in a case where the degree of danger is high, the blinking range A211 blinks red, and in a case where the degree of danger is low, the blinking range A211 blinks yellow. Furthermore, the higher the risk, the faster the blinking speed, and the lower the risk, the slower the blinking speed.

Furthermore, for example, a warning sound is output in accordance with the blinking of the blinking range A211.

Furthermore, for example, the DMS 30 detects positions of the driver's left and right hands by performing recognition of the skeleton of the driver, or the like on the basis of an image captured by the ToF camera P101L. Then, the DMS 30 detects a position where a finger of the driver's left hand touches the operation unit 1003 of the steering wheel 1001 and a position where a finger of the driver's right hand touches the operation unit 1004 of the steering wheel 1001.

For example, in the display control unit, in a case where the finger of the driver's left hand touches the operation unit 1003, or in a case where the finger of the driver's right hand touches the operation unit 1004, guidance indicating a function, operation method, and the like of the button touched by the finger is displayed on the display unit 201CL.

Figure 93:
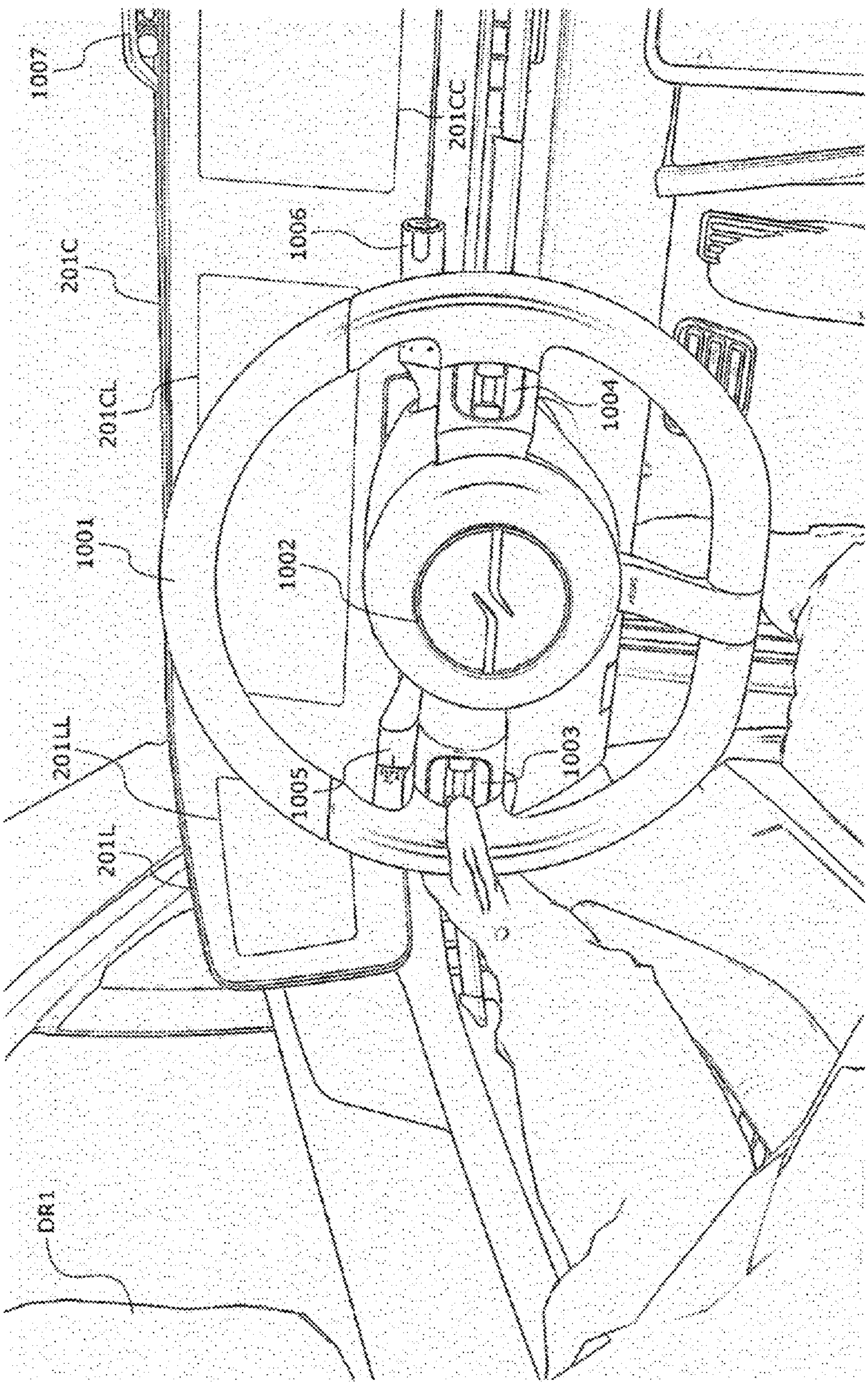
FIG. 93 is a view for describing an example of guidance display when a button is operated.
Figure 94:
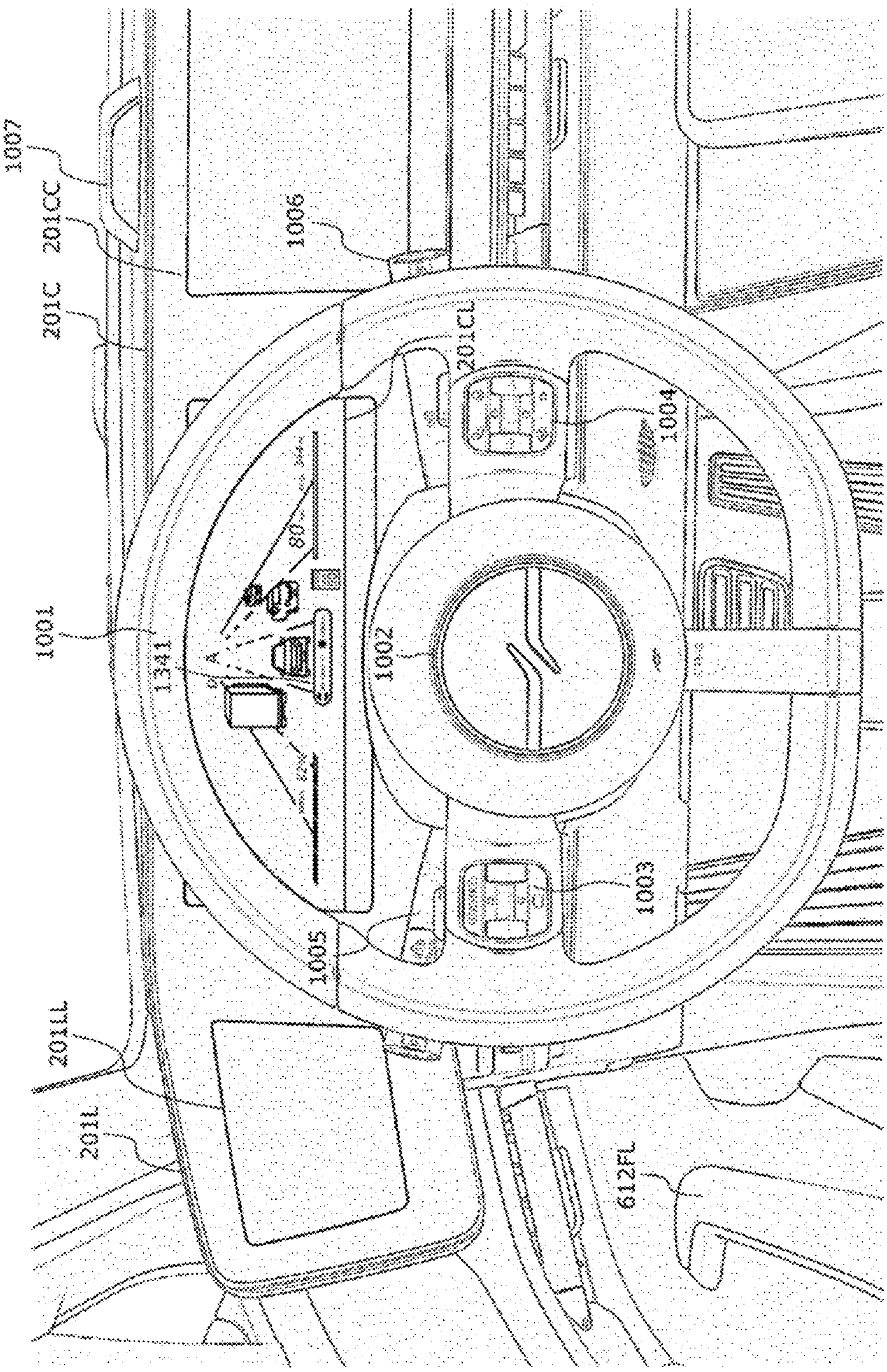
FIG. 94 is a view for describing the example of guidance display when the button is operated.

For example, in a case where the thumb of the left hand of the driver DR1 touches the leftmost button of the operation unit 1003 as illustrated in FIG. 93, guidance information 1341 is displayed near a center in the left-right direction and a lower end of the display unit 201CL as illustrated in FIG. 94. The guidance information 1341 indicates a function and operation method of the button touched by the finger of the driver DR1.

Note that in FIG. 94, the hand and the like of the driver DR1 are not illustrated in order to make the view easier to understand.

Furthermore, similar guidance information may be displayed on the display 203 of the head-up display.

Thus, the driver DR1 can grasp a function and operation method of a button to be operated without moving the line of sight in a direction of the operation unit 1003 or the operation unit 1004. For example, the driver DR1 can grasp the function and operation method of the button to be operated even in a dark state at night or the like. For example, even in a case where the driver DR1 is not accustomed to driving the vehicle 1C, the function and operation method of the button to be operated can be easily grasped.

Figure 95:
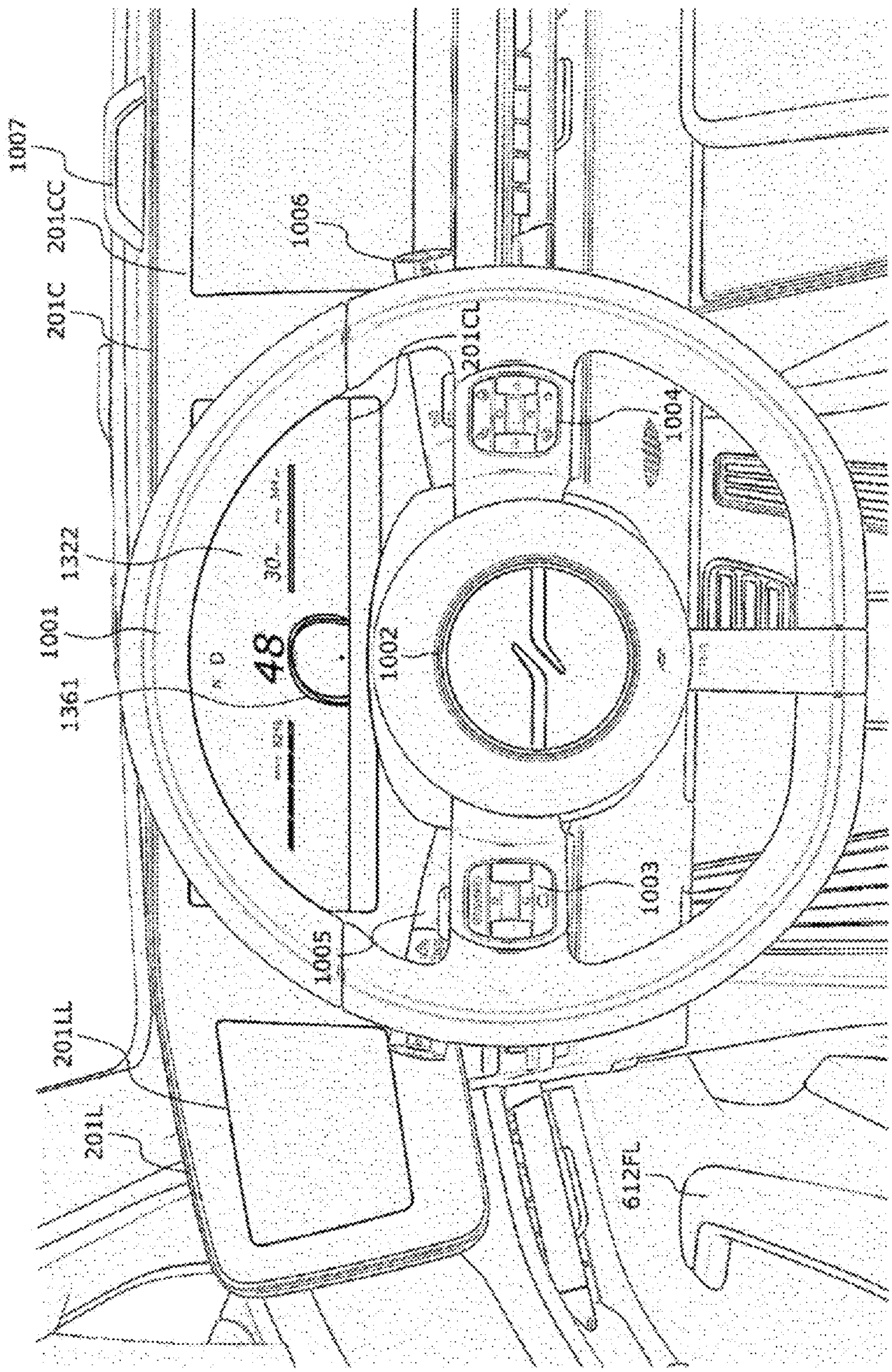
FIG. 95 is a view illustrating a display example of the display unit for the driver seat during lip reading.

FIG. 95 illustrates states of the display unit 201CL and the illumination 1002 in a case where the DMS 30 performs at least one of voice recognition or lip reading.

In this case, the display unit 201CL displays an animation 1361 indicating that at least one of voice recognition or lip reading is being performed.

Although detailed illustration is omitted, the illumination 1002 expresses movement of light linked to movement of the animation 1361.

Note that for example, a similar animation to the animation 1361 may be displayed on the display unit 201CC of the center display 201.

This ensures that an occupant such as the driver is notified that at least one of voice recognition or lip reading is being performed. Consequently, for example, it is possible to prevent the occupant from suspecting that data such as conversations is collected without permission.

<Examples Related to Audio Control>

Next, an example of audio control of the vehicle 1C will be described with reference to FIGS. 96 to 105.

The vehicle 1C can achieve 360-degree real audio as described above. Furthermore, the driver seat 101, the passenger seat 102, the rear seat 103L, and the rear seat 103L include the seat speaker 1021, the seat speaker 1022, the seat speaker 1023L, and the seat speaker 1023R, respectively. Therefore, the audio control unit, which is a part of the function of the HMI 31, can freely control a sound image, a sound field, a volume, and the like for the occupant on each seat.

The DMS 30 can recognize shapes and positions of both ears of the driver on the basis of, for example, the image of the ToF camera P101L. Therefore, the audio control unit can appropriately set a sound image, a sound field, a volume, and the like for the driver by controlling the seat speaker 1021, and the like of the driver seat 101 on the basis of the positions and shapes of both the ears of the driver.

Similarly, the DMS 30 can recognize shapes and positions of both ears of the occupant on the passenger seat 102 on the basis of, for example, the image of the ToF camera P101R. Therefore, the audio control unit can appropriately set a sound image, a sound field, a volume, and the like for the occupant by controlling the seat speaker 1022, and the like of the passenger seat 102 on the basis of the positions and shapes of both the ears of the occupant.

Similarly, the DMS 30 can recognize shapes and positions of both ears of the occupant on the rear seat 103L on the basis of, for example, the image of the ToF camera P111L or the ToF camera P112L. Therefore, the audio control unit can appropriately set a sound image, a sound field, a volume, and the like for the occupant by controlling the seat speaker 1023L, and the like of the rear seat 103L on the basis of the positions and shapes of both the ears of the occupant.

Similarly, the DMS 30 can recognize shapes and positions of both ears of the occupant on the rear seat 103R on the basis of, for example, the image of the ToF camera P111R or the ToF camera P112R. Therefore, the audio control unit can appropriately set a sound image, a sound field, a volume, and the like for the occupant by controlling the seat speaker 1023R, and the like of the rear seat 103R on the basis of the positions and shapes of both the ears of the occupant.

In this manner, the vehicle 1C can individually output sound to the occupant on each seat, and can individually control the sound image, the sound field, the volume, and the like. Using this characteristic, for example, the following functions can be achieved.

Figure 96:
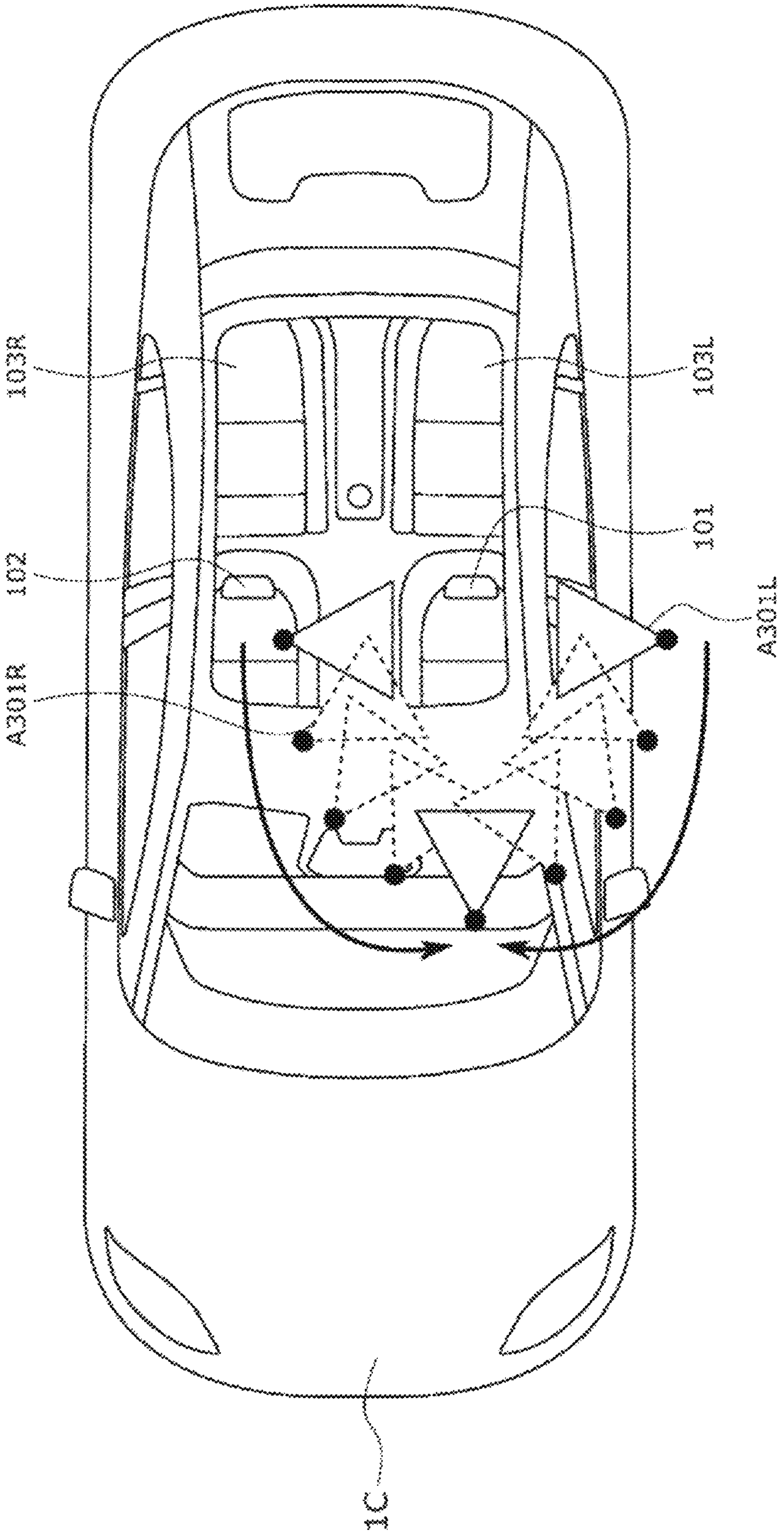
FIG. 96 is a view for describing a method of controlling a warning sound that calls attention to a front of the vehicle.

FIG. 96 illustrates an example of a method of controlling a warning sound in a case where there is a danger such as an obstacle in front of the vehicle 1.

A sound field A301L and a sound field A301R schematically illustrate a sound field of the warning sound for the driver in the driver seat 101.

Specifically, triangles representing the sound field A301L and the sound field A301R indicate a position of a virtual sound source and a spread of a sound field. Specifically, among apexes of triangle, apexes indicated by black circles indicate positions of virtual sound sources. Two sides extending from an apex indicating a virtual sound source indicate directions in which a sound field spreads.

Note that the sound field A301L and the sound field A301R are represented by a cone in a three-dimensional space. Therefore, the sound field A301L and the sound field A301R each spread in a conical shape in directions which sides of a triangle face from the virtual sound source.

For example, first, the sound field A301L is set to face the right direction at the driver's left ear. The sound field A301R is set to face the left direction at the driver's right ear. Thus, the driver hears a warning sound in the left and right ears.

Then, the sound field A301L rotates clockwise around the face of the driver to the front of the driver as indicated by the arrow. Similarly, the sound field A301R rotates counter-clockwise around the face of the driver to the front of the driver, as indicated by an arrow.

Therefore, after hearing the warning sound in each of the left and right ears, the driver feels that the left and right warning sounds rotate around the face, are finally integrated into one, and are localized in the front direction. Thereafter, a warning message such as "please look forward" is output from the front direction of the driver.

Note that in a case where a direction for calling attention of the driver (for example, a direction in which an obstacle exists) is other than the front direction, the warning sound is localized in the direction for calling attention of the driver. Therefore, the driver feels that the warning sound moves in the direction of calling attention and is localized.

This calls attention of the driver to the danger of obstacles and the like, and can surely recognize the direction in which the danger exists.

Figure 97:
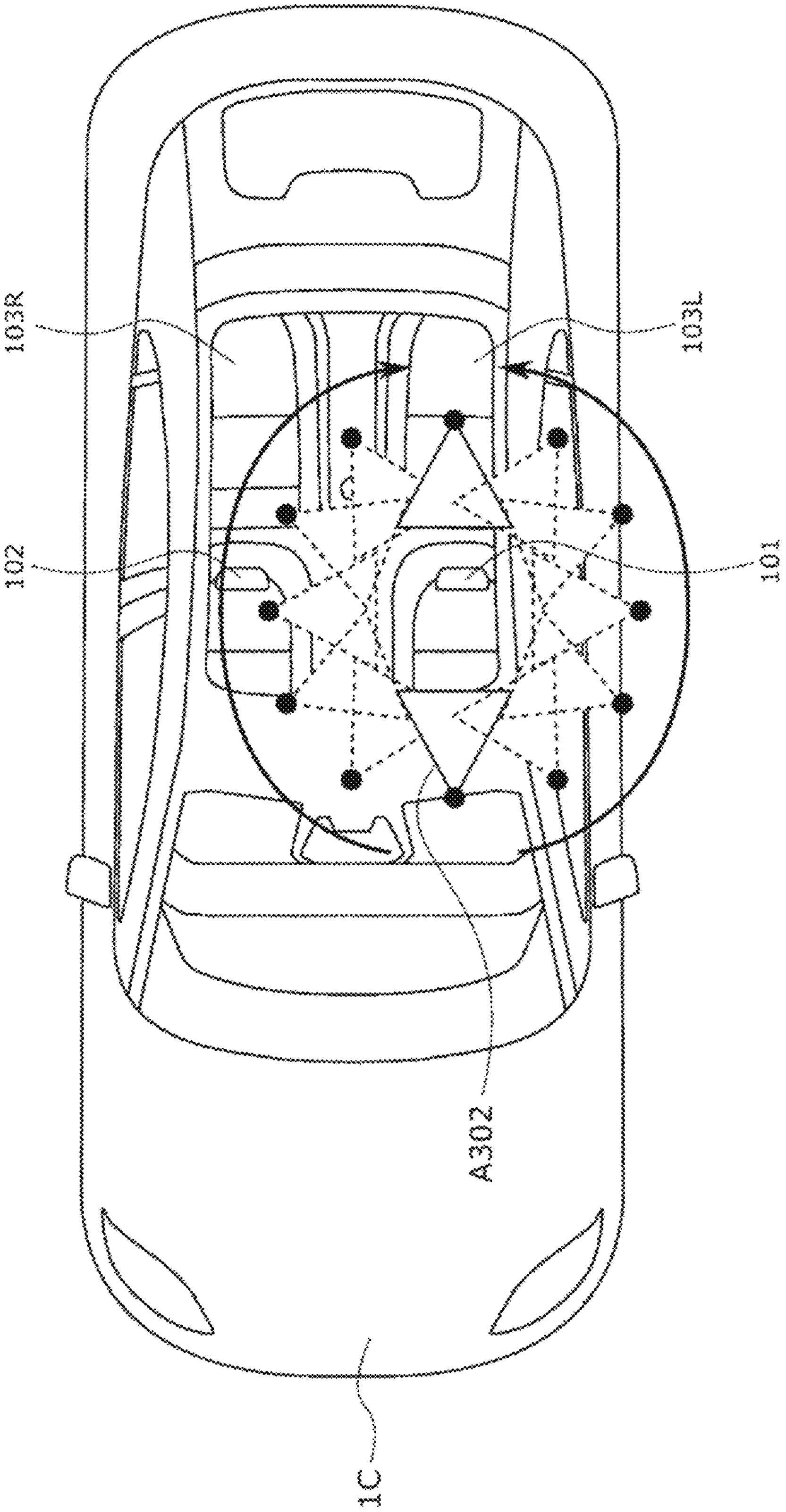
FIG. 97 is a view for describing a method of controlling a sound effect when autonomous driving is started.

FIG. 97 illustrates an example of a method of controlling a sound effect output when autonomous driving is started.

First, a sound field A302 of a sound effect is set to face the direction of the driver from the front of the driver at the height of the driver's ears. Thereafter, the sound field A302 is divided into left and right, one rotating counterclockwise around the face of the driver to just behind the driver, and the other rotating clockwise around the face of the driver to just behind the driver.

Therefore, the driver feels that after the sound effect is output from the front, splits into left and right, rotates around the face, and is finally integrated into one and localized in the rear. Thus, the start of autonomous driving can be effectively produced.

Figure 98:
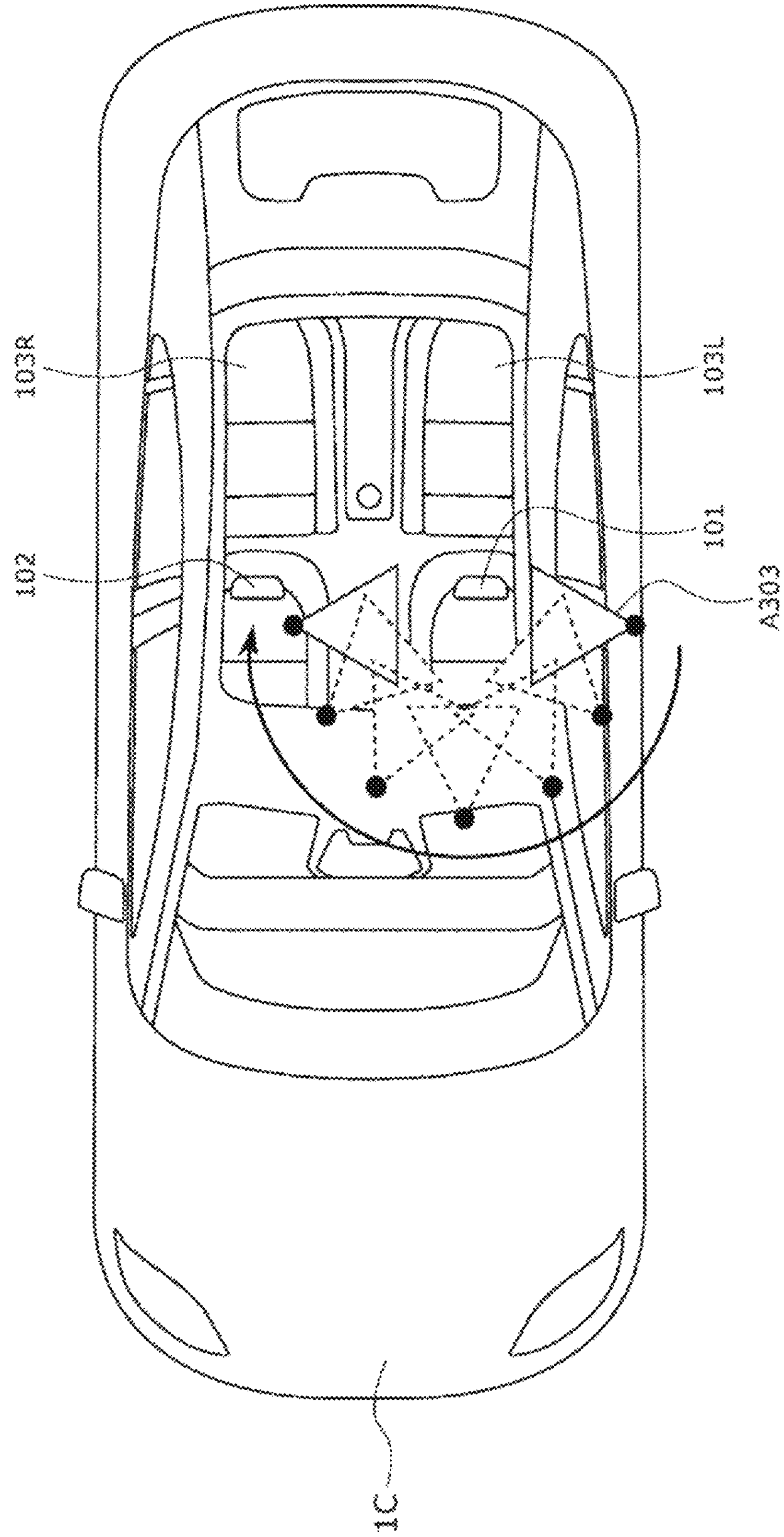
FIG. 98 is a view for describing a method of controlling a sound effect at a time of acceleration during autonomous driving.

FIG. 98 illustrates an example of a method of controlling the sound effect output in a case where the vehicle 1C accelerates during autonomous driving.

First, a sound field A303 of a sound effect is set to face the right direction at the driver's left ear. Thereafter, the sound field A303 rotates clockwise around the face of the driver to a position facing the left direction at the driver's right ear.

Therefore, the driver feels that the sound effect rotates clockwise in front of the face from the left ear to the right ear.

Figure 99:
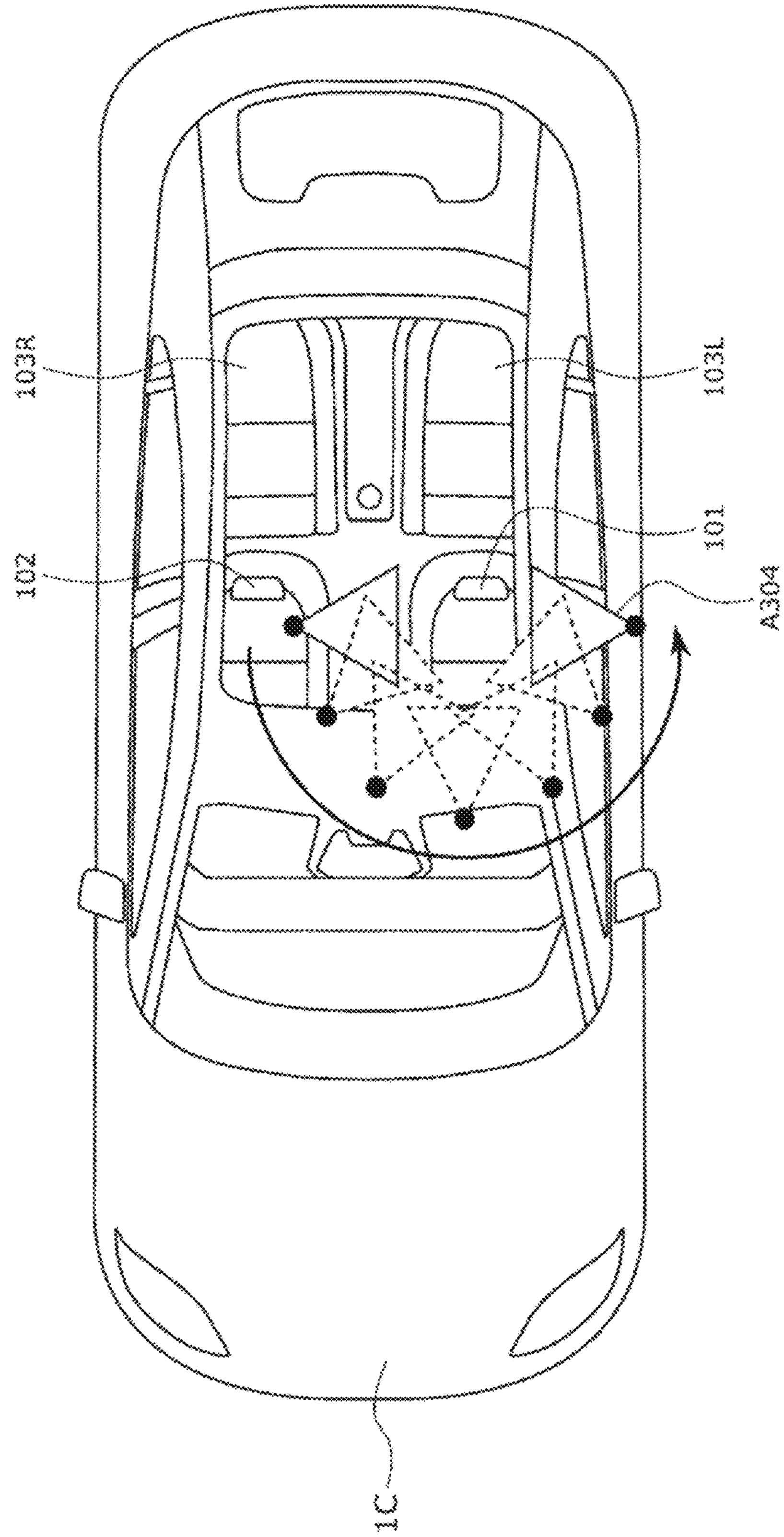
FIG. 99 is a view for describing a method of controlling a sound effect at a time of deceleration during autonomous driving.

FIG. 99 illustrates an example of a method of controlling a sound effect output in a case where the vehicle 1C decelerates during autonomous driving.

First, a sound field A304 of a sound effect is set to face the left direction at the driver's right ear. Thereafter, the sound field A304 rotates counterclockwise around the face of the driver to a position facing the right direction at the driver's left ear.

Therefore, the driver feels that the sound effect rotates counterclockwise in front of the face from the right ear to the left ear.

As described above, the driver can intuitively recognize acceleration and deceleration of the vehicle 1C during autonomous driving by the direction in which the sound effect moves.

Note that, for example, the sound effect for a set value other than the speed of the vehicle 1C may also be controlled as illustrated in FIGS. 98 and 99. For example, a sound effect may be output as illustrated in FIG. 98 in a case where the set value increases, and a sound effect may be output as illustrated in FIG. 99 in a case where the set value decreases.

Figure 100:
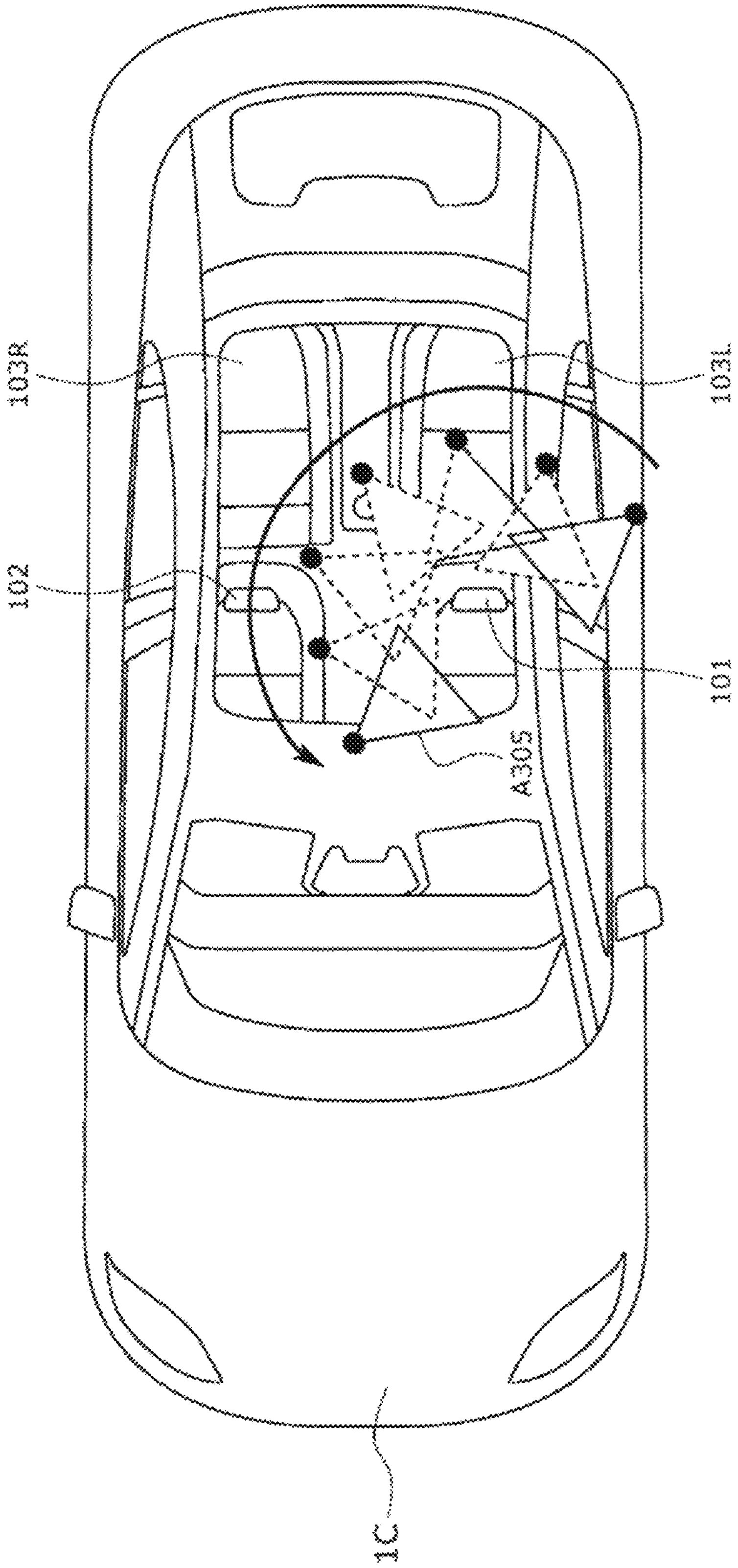
FIG. 100 is a view for describing a method of controlling a sound effect before outputting a voice message.

FIG. 100 illustrates an example of a method of controlling a sound effect that is output before the output of a voice message such as navigation.

First, a sound field A305 of a sound effect is set to face the direction of the driver from diagonally backward left of the driver at the height of the driver's ears. Thereafter, the sound field A305 rotates clockwise around the head of the driver from diagonally forward right of the driver to a position facing the direction of the driver.

Therefore, the driver feels that the sound effect rotates counterclockwise behind the head from diagonally backward left to diagonally forward right around the head. In this manner, the sound effect rotates behind the head of the driver to thereby make it easier for the driver to notice the sound effect than in a case where the sound effect rotates in front of the head of the driver. Therefore, the case where the driver misses a voice message after the sound effect is reduced.

FIGS. 101 to 104 illustrate an example of a method of controlling a warning sound that calls attention to a vehicle 1401 approaching from the rear left.

Figure 101:
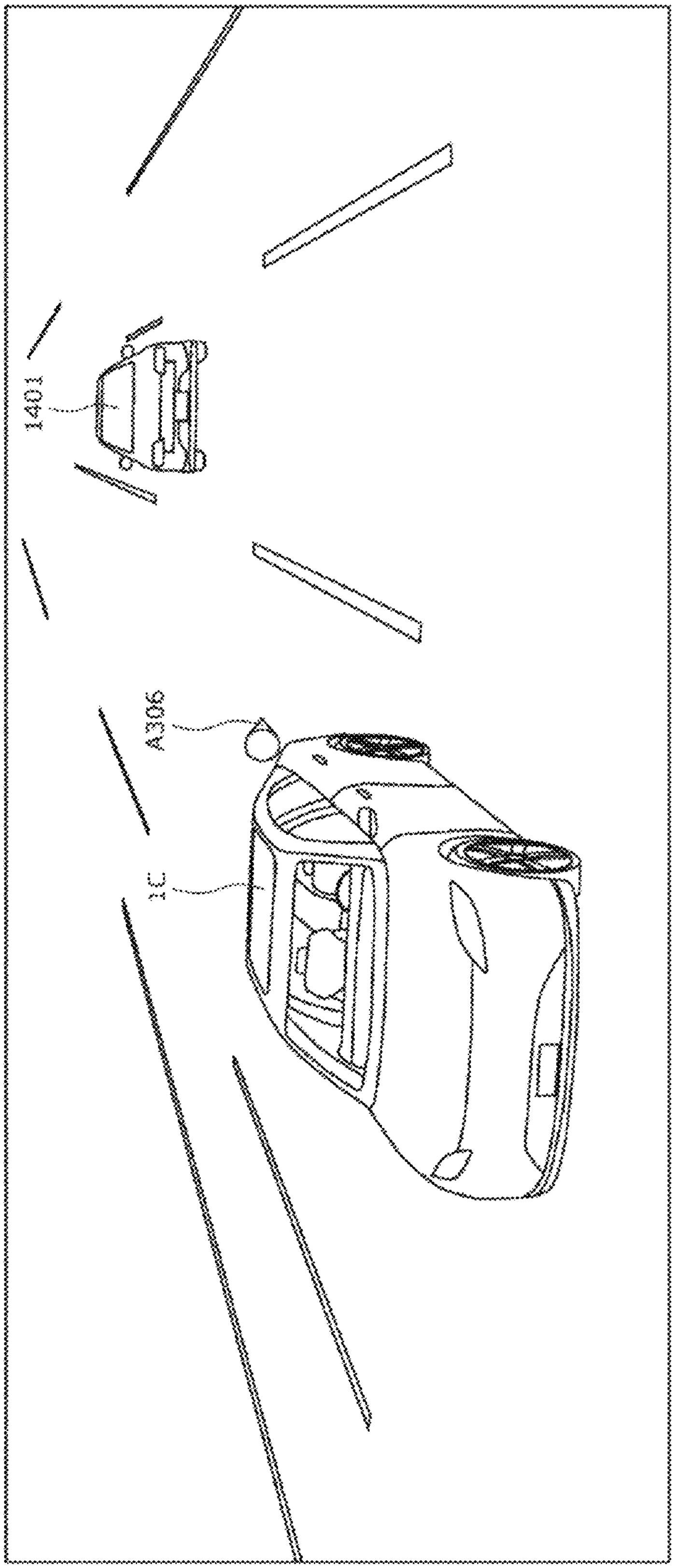
FIG. 101 is a view for describing a method of controlling a warning sound for a vehicle approaching from diagonally backward left.

For example, in a case where the direction indicator in the left direction of the vehicle 1401 is turned on and the distance between the vehicle 1401 and the vehicle 1C is within a predetermined threshold value, output of the warning sound is started. FIG. 101 illustrates a sound field A306 when output of the warning sound is started. The direction of the sound field A306 is set to be substantially equal to a direction in which the head of the driver of the vehicle 1C is viewed from the vehicle 1401. Furthermore, the virtual sound source of the warning sound is set at a position separated by a predetermined distance from the head of the driver in the direction of the vehicle 1401.

Figure 102:
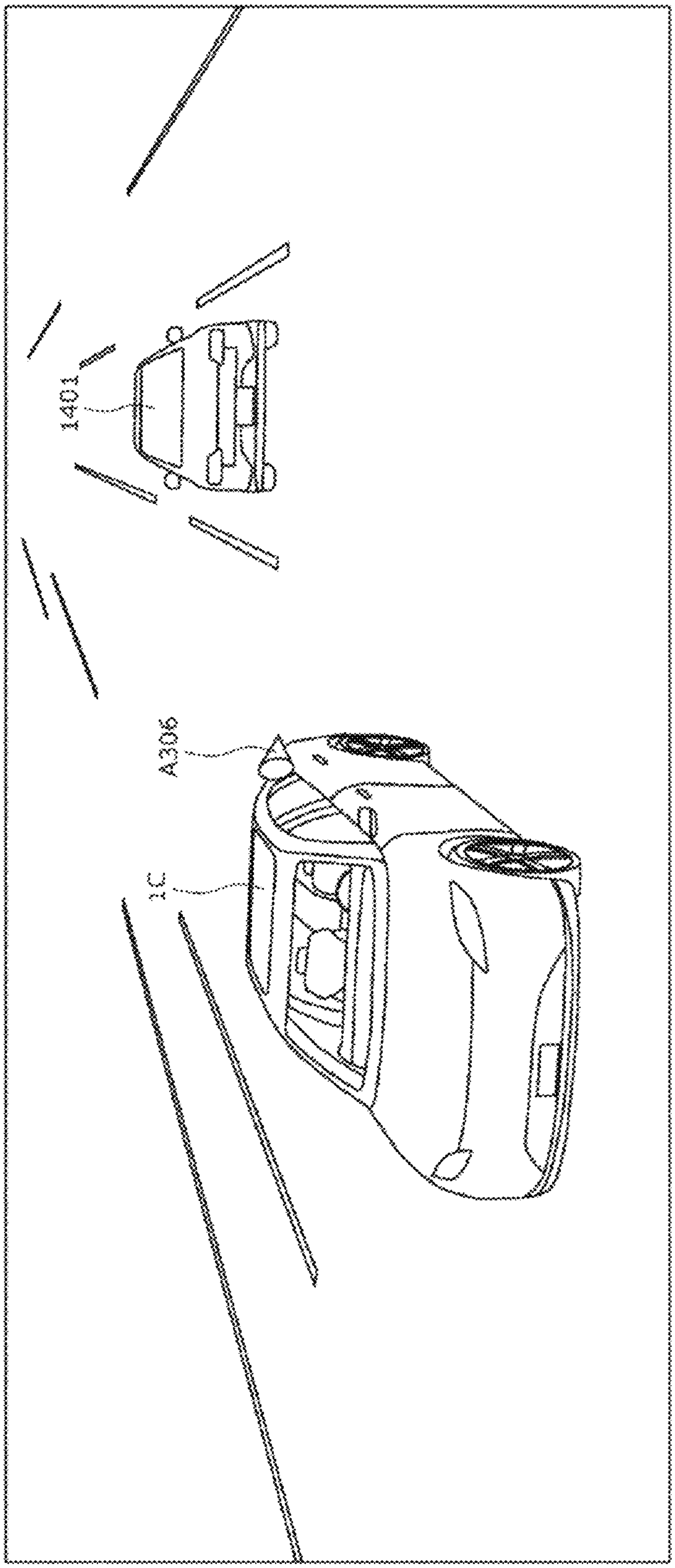
FIG. 102 is a view for describing the method of controlling the warning sound for the vehicle approaching from diagonally backward left.
Figure 103:
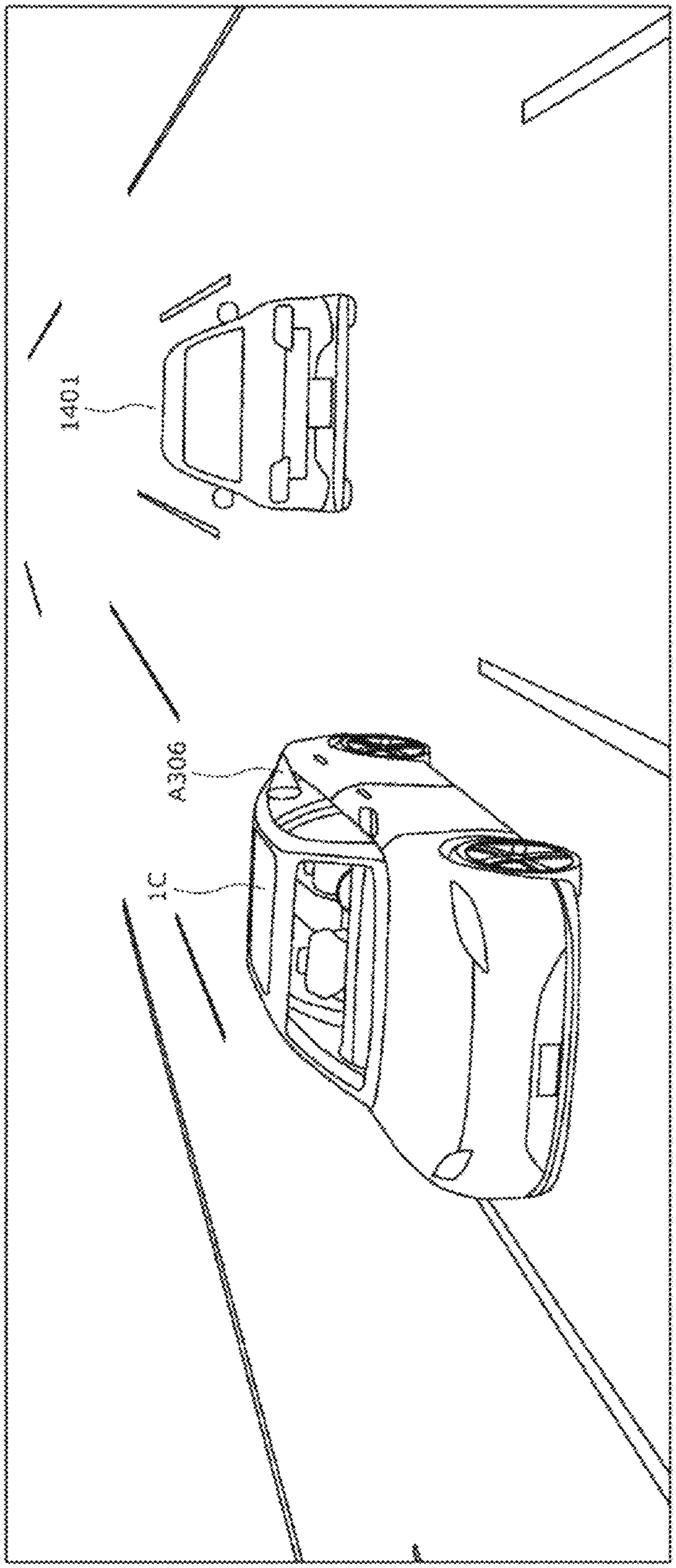
FIG. 103 is a view for describing the method of controlling the warning sound for the vehicle approaching from diagonally backward left.
Figure 104:
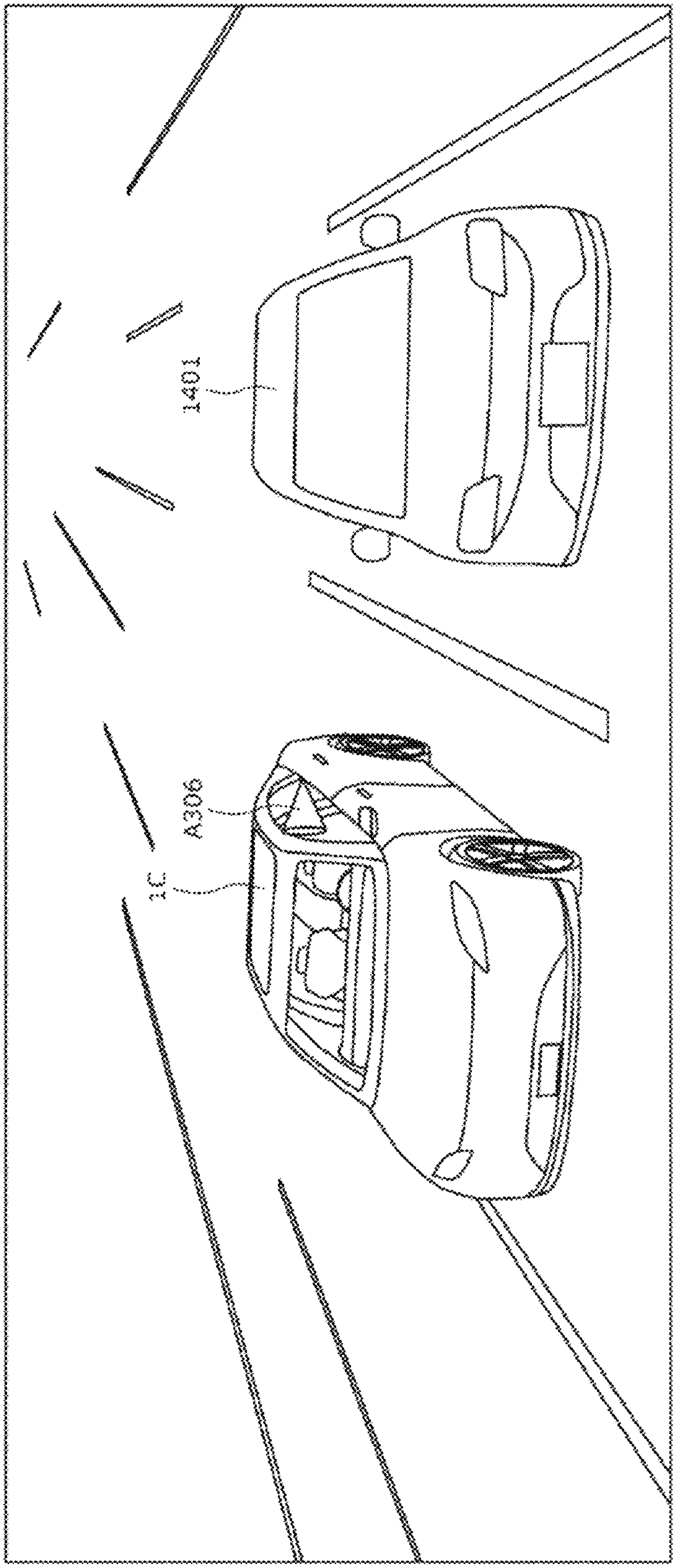
FIG. 104 is a view for describing the method of controlling the warning sound for the vehicle approaching from diagonally backward left.

Thereafter, as illustrated in FIGS. 102 to 104, the sound field A306 moves as the vehicle 1401 approaches the vehicle 1C. Specifically, the sound field A306 moves so as to always face a direction substantially equal to a direction in which the head of the driver of the vehicle 1C is viewed from vehicle 1401. Furthermore, the sound field A306 moves so that the distance between the virtual sound source of the warning sound and the head of the driver is substantially proportional to the distance between the vehicle 1401 and the vehicle 1C.

Therefore, the driver can recognize the approach of the vehicle 1401 by the warning sound. Furthermore, the driver can intuitively recognize the speed, distance, and direction of the vehicle 1401 by movement of the warning sound.

Furthermore, the seat speaker of each seat can be used to individually output sound so that only the occupant on each seat can hear the sound. For example, as illustrated in FIG. 105, the seat speaker 1023L can be used to output sound so that only the occupant sitting in the rear seat 103L can hear the sound.

Using this function, for example, the occupant on each seat can make a voice call or a video call with the outside so as not to be heard by other occupants. Furthermore, for example, a voice chat can be performed between occupants in the vehicle 1C.

<Example on Lip Reading>

As described above, the DMS 30 performs lip reading of the driver on the basis of the image of the camera 1042 of the camera module 1007. As described above, the DMS 30 performs lip reading of the occupant on the rear seat 103L on the basis of the image of the ToF camera P112L. The DMS 30 performs lip reading of the occupant on the rear seat 103R on the basis of the image of the ToF camera P112R. Note that for example, the DMS 30 can also perform lip reading of the occupant on the passenger seat 102 by using the image of the ToF camera P101R.

For example, the DMS 30 can improve accuracy of voice recognition by using lip reading as an aid to voice recognition of the occupant on each seat. Alternatively, for example, the DMS 30 can recognize an utterance content of the occupant on each seat by using only the lip reading.

Thus, in a case where, for example, the inside of the vehicle 1C is noisy and it is difficult to collect voice with a microphone, or in a case where a child is sleeping and it is not possible to make a very loud voice, or the like, the DMS 30 can recognize an utterance content of the occupant on each seat with high accuracy.

Furthermore, for example, the HMI 31 can transmit the utterance content to an occupant on another seat by converting a recognition result of the utterance content of the occupant on one seat into voice and outputting the voice from the seat speaker of the another seat. For example, the HMI 31 can transmit the utterance content to an occupant on another seat by converting a recognition result of the utterance content of the occupant on one seat into text and displaying the text on the display in front of the another seat. This enables communication between occupants on respective seats even in a case where the inside of the vehicle 1C is noisy and it is difficult to convey a voice or a case where it is not possible to make a very loud voice.

Furthermore, for example, the driver can operate the vehicle 1C silently by using the lip reading. Specifically, for example, the driver can operate the vehicle 1C by pressing a predetermined button on the operation unit 1003 or the operation unit 1004 of the steering wheel 1001 and making a mouth movement similar to that in a case of inputting a predetermined voice command. Note that at this time, the driver may or may not speak out.

More specifically, for example, the driver can set the air conditioner in the vehicle 1C by making a mouth movement of a voice command such as "cool the hands", "cool the feet", or "replace the air". For example, the driver can perform an operation to play music by making a mouth movement of a voice command such as "play an eye-opening song", "play a usual song", or "play a song that everyone can sing". For example, the driver can give an instruction such as searching for a destination to a navigation application operating in the vehicle 1C by making a mouth movement of a voice command such as "tell me a restaurant around here", "find a cafe around here", "tell me a nearby charging spot", and the like.

Thus, the driver can operate the vehicle 1C using a voice command even in a case where the inside of the vehicle 1C is noisy or a case where a very loud voice cannot be made.

<Example on Gesture Input>

For example, the DMS 30 can recognize a gesture of the occupant on each seat on the basis of the image of the ToF camera provided for each seat of the vehicle 1C. Thus, each occupant can operate the vehicle 1C by using a gesture.

For example, the occupant can increase the volume of audio of content being played in the vehicle 1C by pointing in the air and turning the index finger clockwise. On the other hand, the occupant can reduce the volume of audio of the content being played in the vehicle 1C by pointing in the air and turning the index finger counterclockwise. For example, the occupant can mute the volume of audio of the content being played in the vehicle 1C by raising the index finger and bringing it closer to the lips.

For example, the occupant can operate the touch panel without touching the touch panel provided on the display by pointing the display in front of the seat with the index finger and moving the index finger. For example, the driver can launch the navigation application by pointing to the display unit 201CC of the center display 201. Furthermore, for example, the driver can cause display of information of the pointed position or set the pointed position as a destination by pointing to a map in the navigation application.

7. Modification Example of Third Embodiment

Hereinafter, a modification example of the third embodiment of the present technology described above will be described.

In the above description, the example in which the vehicle 1C is a left-hand drive vehicle has been illustrated, but the present technology can of course be applied to a right-hand drive vehicle. In a case where the present technology is applied to a right-hand drive vehicle, the layout inside the vehicle described above is appropriately changed according to the right-hand drive vehicle.

Furthermore, the present technology can also be applied to, for example, a mobile apparatus that performs autonomous driving in which an occupant does not perform driving. In this case, the distinction between the driver seat 101 and the passenger seat 102 as described above does not exist, and the various displays described above are arranged in front of seats or the like in the mobile apparatus. Furthermore, for example, the display range or the like of the image displayed on the display is changed on the basis of the line-of-sight direction and posture of the person sitting on a predetermined seat.

Moreover, the type of the vehicle to which the present technology can be applied is not particularly limited. Furthermore, in addition to vehicles, the present technology can also be applied to a mobile apparatus such as personal mobility, airplanes, ships, construction machinery, and agricultural machinery.

8. Others

<Configuration Example of Computer>

The series of processes described above can be executed by hardware or can be executed by software. In a case where a series of processes is executed by software, the programs constituting the software are installed in a computer (for example, the processor 21 or the like).

Note that the program executed by the computer may be a program for processing in time series in the order described in the present description, or a program for processing in parallel or at a necessary timing such as when a call is made.

Furthermore, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Moreover, the embodiments of the present technology are not limited to the above-described embodiments, and various modifications are possible without departing from the gist of the present technology.

For example, the present technology can employ a configuration of cloud computing in which one function is shared by a plurality of devices via a network and processed jointly.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

<Example of Combinations of Configurations>

The present technology can also employ the following configurations.

(1)

A display system including:

a first display that extends in a left-right direction in front of a first seat of a mobile apparatus, in which a left end portion of the first display faces diagonally backward right as viewed from the first seat, a center portion of the first display faces backward as viewed from the first seat, and a right end portion of the first display faces diagonally backward left as viewed from the first seat.

(2)

The display system according to (1) above, in which the left end portion of the first display displays an image of diagonally backward left of the mobile apparatus, and the right end portion of the first display displays an image of diagonally backward right of the mobile apparatus.

(3)

The display system according to (2) above, in which the left end portion and the right end portion of the first display are used as digital outer mirrors.

(4)

The display system according to (2) or (3) above, further including a display control unit that controls display of images at the left end portion and the right end portion of the first display.

(5)

The display system according to (4) above, in which the display control unit controls display ranges of the left end portion and the right end portion of the first display on the basis of at least one of a line-of-sight direction of a person sitting on the first seat, a posture of the person, an operation of a direction indicator, or a shift position.

(6)

The display system according to (5) above, in which in a case where the mobile apparatus is stopped, the display control unit moves the display range of one of the left end portion and the right end portion of the first display that the person has looked into on the basis of an angle at which the person has looked into.

(7)

The display system according to (6) above, in which the display control unit superimposes and displays a visual effect indicating a predetermined range around the mobile apparatus on an image of one of the left end portion and the right end portion of the first display that the person has looked into.

(8)

The display system according to any one of (5) to (7) above, in which the display control unit zooms out the display range of one of the left end portion and the right end portion of the first display that is in a direction in which the direction indicator is turned on.

(9)

The display system according to any one of (5) to (8) above, in which the display control unit zooms out the display ranges in a case where the shift position is set to reverse.

(10)

The display system according to any one of (5) to (9) above, in which the display control unit superimposes and displays a visual effect based on a recognition result of an object at diagonally backward left of the mobile apparatus on an image of the left end portion of the first display, and superimposes and displays a visual effect based on a recognition result of an object at diagonally backward right of the mobile apparatus on an image of the right end portion of the first display.

(11)

The display system according to (10) above, in which the display control unit changes a display mode of the visual effect on the basis of a degree of danger to the object.

(12)

The display system according to (11) above, in which the display control unit changes a display mode of the visual effect at the left end portion of the first display in a case where a direction indicator in a left direction is turned on, and changes a display mode of the visual effect at the right end portion of the first display in a case where a direction indicator in a right direction is turned on.

(13)

The display system according to any one of (10) to (12) above, further including a recognition unit that recognizes an object at diagonally backward left of the mobile apparatus on the basis of an image at diagonally backward left of the mobile apparatus, and recognizes an object at diagonally backward right of the mobile apparatus on the basis of an image at diagonally backward right of the mobile apparatus.

(14)

The display system according to any one of (1) to (13) above, in which the center portion of the first display displays an image around the mobile apparatus.

(15)

The display system according to (14) above, further including a display control unit that controls a display range of an image displayed in the center portion of the first display on the basis of at least one of a line-of-sight direction or a posture of a person sitting on the first seat.

(16)

The display system according to any one of (1) to (15) above, in which the center portion of the first display displays information that supports an operation of the mobile apparatus.

(17)

The display system according to any one of (1) to (16) above, in which the center portion of the first display extends in the left-right direction in front of the first seat and a second seat arranged next to the first seat, and is dividable into a first display area in front of the first seat, a second display area in front of the second seat, and a third display area between the first display area and the second display area.

(18)

The display system according to (17) above, in which the first display area displays information that supports an operation of the mobile apparatus, and the second display area and the third display area display infotainment-related information.

(18A)

The display system according to any one of (1) to (17) above, in which the center portion of the first display faces diagonally upward.

(19)

The display system according to any one of (1) to (18A) above, in which the left end portion and the right end portion of the first display are bent to an inside of the mobile apparatus from the center portion of the first display.

(20)

The display system according to any one of (1) to (19) above, further including a second display that is provided below the first display and faces backward as viewed from the first seat.

(21)

The display system according to (20) above, in which the second display is formed by a two-dimensional or three-dimensional touch panel, and displays an operation screen with respect to information displayed on the first display.

(21A)

The display system according to (20) or (21) above, in which the second display displays an operation screen of an air conditioner of the mobile apparatus.

(21B)

The display system according to any one of (20) to (21A) above, in which the second display faces diagonally upward.

(21C)

The display system according to (21B) above, in which the center portion of the first display faces diagonally upward at an angle substantially similar to an angle of the second display.

(22)

The display system according to any one of (20) to (21C) above, in which the second display is provided in a console between the first seat and the second seat arranged next to the first seat.

(23)

The display system according to any one of (20) to (22) above, further including a display control unit that controls display of images at the left end portion and the right end portion of the first display, in which the left end portion of the first display displays an image of diagonally backward left of the mobile apparatus, the right end portion of the first display displays an image of diagonally backward right of the mobile apparatus, the second display is formed by a two-dimensional or three-dimensional touch panel and displays the operation screen configured to set the display ranges of the left end portion and the right end portion of the first display, and the display control unit changes the display ranges on the basis of an operation on the operation screen.

(24)

The display system according to (23) above, in which on the basis of the operation on the operation screen, the display control unit changes the display range of the left end portion of the first display within a range including a predetermined first area of diagonally backward left of the mobile apparatus, and changes the display range of the right end portion of the first display within a range including a predetermined second area of diagonally backward right of the mobile apparatus.

(25)

The display system according to (23) or (24) above, in which the display control unit makes the left end portion and the right end portion of the first display different in a range in which it is possible to zoom in or zoom out the display range.

(26)

The display system according to any one of (1) to (25) above, further including a third display that is provided in front of the first seat and displays visual information superimposed in a field of view of a person sitting on the first seat.

(27)

The display system according to (26) above, in which the third display displays information that supports an operation of the mobile apparatus.

(28)

The display system according to any one of (1) to (27) above, further including a fourth display that is provided above the first display and faces backward as viewed from the first seat.

(29)

The display system according to (28) above, in which the fourth display is used as a digital rearview mirror.

(30)

The display system according to (29) above, further including a display control unit that controls a display range of an image displayed on the fourth display on the basis of at least one of a line-of-sight direction or a posture of a person sitting on the first seat.

(31)

The display system according to any one of (1) to (30) above, further including a fifth display provided in a center of a steering wheel of the mobile apparatus.

(31A)

The display system according to (31) above, in which the fifth display displays a message for a person sitting on the first seat.

(32)

The display system according to any one of (1) to (31A) above, further including a sixth display provided on a back surface of at least one of the first seat or the second seat arranged next to the first seat.

(33)

The display system according to any one of (1) to (32) above, in which the left end portion of the first display faces diagonally backward right of the mobile apparatus, the center portion of the first display faces backward of the mobile apparatus, and the right end portion of the first display faces diagonally backward left of the mobile apparatus.

(34)

The display system according to any one of (1) to (33) above, in which the first seat is a driver seat.

(35)

A display device including a display that extends in a left-right direction in front of a seat of a mobile apparatus, in which a left end portion of the display faces diagonally backward right as viewed from the seat, a center portion of the display faces backward as viewed from the seat, and a right end portion of the display faces diagonally backward left as viewed from the seat.

(36)

A display method including in a display that extends in a left-right direction in front of a seat of a mobile apparatus and has a left end portion facing diagonally backward right as viewed from the seat, a center portion facing backward as viewed from the seat, and a right end portion facing diagonally backward left as viewed from the seat, displaying an image of diagonally backward left of the mobile apparatus by the left end portion of the display, and displaying an image of diagonally backward right of the mobile apparatus by the right end portion of the display.

(37)

A mobile apparatus including a display that extends in a left-right direction in front of a seat and has a left end portion facing diagonally backward right as viewed from the seat, a center portion facing backward as viewed from the seat, and a right end portion facing diagonally backward left as viewed from the seat.

(38)

A mobile apparatus including:

a metadata addition unit that adds metadata to captured moving image data captured while moving; and an image processing unit that edits the captured moving image data on the basis of the metadata and generates edited moving image data.

(39)

The mobile apparatus according to (38) above, in which the image processing unit extracts frames from a plurality of pieces of the captured moving image data captured by a plurality of cameras on the basis of the metadata, and combines the frames to generate the edited moving image data.

(40)

The mobile apparatus according to (39) above, in which the image processing unit extracts frames from the plurality of pieces of the captured moving image data on the basis of a path of the mobile apparatus and the metadata.

(41)

The mobile apparatus according to (39) or (40) above, in which the captured moving image data is moving image data obtained by capturing an image of surroundings or an interior of the mobile apparatus.

(42)

The mobile apparatus according to (41) above, in which the image processing unit extracts frames of the captured moving image data obtained by capturing an image of the interior on the basis of an activity level in the interior.

(43)

The mobile apparatus according to any one of (38) to (42) above, in which the image processing unit superimposes visual information on a frame of the captured moving image data on the basis of the metadata.

(44)

The mobile apparatus according to any one of (38) to (43) above, in which the image processing unit edits the captured moving image data on the basis of an instruction of a user.

(45)

The mobile apparatus according to any one of (38) to (44) above, in which the metadata addition unit adds the metadata regarding one or more of an image capturing location, image capturing date and time, a situation of the mobile apparatus, a situation of an interior of the mobile apparatus, and a situation of surroundings of the mobile apparatus to the moving image data.

(46)

The mobile apparatus according to any one of (38) to (45) above, in which the metadata addition unit adds the metadata input by a user to the captured moving image data.

(47)

A mobile apparatus including a camera that is installed on a rearview mirror for checking a rear or in a periphery of the rearview mirror and images a direction of a driver seat.

(48)

The mobile apparatus according to (47) above, in which the rearview mirror is installed near a ceiling diagonally in front of the driver seat.

(49)

The mobile apparatus according to (48) above, in which the camera is installed on the ceiling around a position where the rearview mirror is attached.

(50)

The mobile apparatus according to (48) or (49) above, in which the camera is installed closer to the driver seat than the rearview mirror.

(51)

The mobile apparatus according to any one of (47) to (50) above, further including a first recognition unit that performs at least one of recognition of a line-of-sight, posture recognition, action recognition, or personal recognition of a driver on the basis of the image captured by the camera.

(52)

The mobile apparatus according to (51) above, further including a display control unit that controls display of a digital outer mirror of the mobile apparatus on the basis of at least one of a line of sight, a posture, or an action of the driver recognized by the first recognition unit.

(53)

The mobile apparatus according to (52) above, further including a second recognition unit that recognizes an object around a door of the driver seat on the basis of sensing data around the door of the driver seat on an outside of the mobile apparatus, in which in a case where an action of opening the door by the driver is recognized by the first recognition unit and an object around the door is recognized by the second recognition unit, the display control unit superimposes and displays a visual effect based on a recognition result of the object on the image of the digital outer mirror on a side of the driver seat.

(54)

The mobile apparatus according to (52) or (53) above, in which in a case where looking into the digital outer mirror by the driver is recognized by the first recognition unit, the display control unit moves a display range of the digital outer mirror on the basis of an angle at which the driver looks into the digital outer mirror.

(55)

The mobile apparatus according to any one of (52) to (54) above, in which in a case where contact with an operating body of the mobile apparatus by the driver is recognized by the first recognition unit, the display control unit causes information indicating guidance regarding the operating body to be displayed on a display in front of the driver seat.

(56)

The mobile apparatus according to any one of (47) to (55) above, in which the camera is a Time-of-Flight (ToF) camera.

(57)

A mobile apparatus including an operating body that is rod-shaped used to change a shift position, and has an indicator provided on a side surface with a color that changes depending on a set shift position.

(58)

The mobile apparatus according to (57) above, in which a set order of the shift position by the operating body is arranged in an order of reverse, neutral, drive, and autonomous driving.

(59)

The mobile apparatus according to (58) above, in which the operating body includes a lever that switches a shift position by being moved in an up-down direction.

(60)

The mobile apparatus according to (58) above, further including the operating body includes a dial by which the shift position is switched by rotating around an axis.

(61)

The mobile apparatus according to any one of (58) to (60) above, further including a button at a distal end of the operating body, the button being pressable in an axial direction of the operating body and being for setting the shift position to parking.

(62)

The mobile apparatus according to any one of (57) to (61) above, in which the indicator is provided in a circumferential shape on a side surface of the operating body.

(63)

The mobile apparatus according to any one of (57) to (62) above, in which the operating body is provided so as to extend from a steering column in a lateral direction of the mobile apparatus, and the indicator is arranged in at least one of a position visible from a gap between spokes of the steering wheel as viewed from the driver seat or a position outside an outer periphery of the steering wheel as viewed from the driver seat.

(64)

A mobile apparatus including:

a steering wheel that has an illumination having a ring shape with at least one of color, brightness, or a light emitting area being variable and being provided in a center portion; and a light control unit that controls the illumination.

(65)

The mobile apparatus according to (64) above, in which the light control unit turns on or blinks the illumination on the basis of at least one of a situation of the mobile apparatus, a situation around the mobile apparatus, or a situation of the occupant.

(66)

The mobile apparatus according to (65) above, in which the light control unit turns on or blinks the illumination in a pattern according to a situation.

(67)

The mobile apparatus according to (66) above, in which the pattern is defined by at least one of color, brightness, blinking pattern, movement of light, or the light emitting area.

(68)

The mobile apparatus according to (66) or (67) above, in which in a case where the mobile apparatus changes lanes or changes direction, the light control unit turns on or blinks a portion of the illumination corresponding to the direction of changing lanes or changing direction.

(69)

The mobile apparatus according to (68) above, in which the light control unit rotates a portion where the illumination turns on or blinks in a direction opposite to rotation of the steering wheel according to a rotation angle of the steering wheel.

(70)

The mobile apparatus according to any one of (66) to (69) above, in which in a case where at least one of voice recognition or lip reading is executed, the light control unit turns on or blinks the illumination in a predetermined pattern.

(71)

The mobile apparatus according to any one of (64) to (70) above, in which the center portion stores an airbag, and the illumination is arranged so as to avoid a portion where the center portion is split when the airbag is activated.

(72)

A mobile apparatus including a device for a plurality of user interfaces arranged along a loop line that surrounds a periphery of an interior approximately horizontally.

(73)

The mobile apparatus according to (72) above, in which the device for the user interface includes at least one of an output device or an operation device.

(74)

The mobile apparatus according to (73) above, in which the output device includes at least one of a display extending in a left-right direction in a front part of the mobile apparatus or an illumination provided along a periphery of a center portion of a steering wheel.

(75)

The mobile apparatus according to any one of (73) to (74) above, in which the output device includes a speaker provided on a door of the mobile apparatus.

(76)

The mobile apparatus according to any one of (73) to (75) above, in which the operation device includes at least one of a door opener of a door of the mobile apparatus, a device that adjusts a wind direction of an air conditioner, or a device used for setting a headlight.

(77)

The mobile apparatus according to any one of (72) to (76) above, further including a loop light that surrounds at least a part of a periphery of the interior approximately in parallel to the loop line.

(78)

The mobile apparatus according to (77) above, further including a light control unit that performs cooperative control of an external light of the mobile apparatus and the loop light.

(79)

The mobile apparatus according to any one of (72) to (78) above, in which an air vent of an air conditioner is provided along the loop line.

(80)

A mobile apparatus including:

a plurality of seat speakers, which are speakers individually provided in seats; and an output control unit that individually controls output of a sound from each of the seat speakers.

(81)

The mobile apparatus according to (80) above, in which each of the seat speakers is located below a headrest of each of the seats.

(82)

The mobile apparatus according to (80) or (81) above, further including a plurality of line speakers, which are speakers arranged along a loop line that surrounds a periphery of an interior approximately horizontally, in which the output control unit further controls output of a sound from the line speakers.

(83)

The mobile apparatus according to (82) above, in which the output control unit performs control to output a sound from each of the line speakers toward an entire interior and output a sound from each of the seat speakers for each occupant sitting on each of the seats.

(84)

The mobile apparatus according to (80) to (83) above, in which the output control unit moves a sound field of a warning sound to a driver in a direction for calling attention of the driver.

(85)

The mobile apparatus according to any one of (80) to (84) above, in which the output control unit rotates a sound field of a sound effect indicating an increase in a predetermined set value of the mobile apparatus in a first direction around a head of a person sitting on the seat, and rotates a sound field of a sound effect indicating a decrease in the set value around the head of the person in a second direction opposite to the first direction.

(86)

The mobile apparatus according to any one of (80) to (85) above, in which the output control unit rotates a sound field of a sound effect output before a voice message behind a head of a person sitting on the seat.

(87)

The mobile apparatus according to any one of (80) to (86) above, in which the output control unit moves a sound field of a warning sound for an object behind the mobile apparatus in accordance with movement of the object.

(88)

A mobile apparatus including a camera module that is installed on a dashboard and captures an image in a direction of a driver seat diagonally from a front.

(89)

The mobile apparatus according to (88) above, in which the camera module switches between color image-capturing and infrared image-capturing.

(90)

The mobile apparatus according to (89) above, in which the camera module includes a light source that outputs infrared light, and outputs the infrared light in a case of performing infrared image-capturing.

(91)

The mobile apparatus according to (89) or (90) above, in which the camera module switches between color image-capturing and infrared image-capturing on the basis of ambient brightness.

(92)

The mobile apparatus according to any one of (89) to (91) above, further including a recognition unit that performs lip reading of a driver on the basis of an image of the camera module.

Note that the effects described in the present description are merely examples and are not limited, and other effects may be provided.

REFERENCE SIGNS LIST

1 Vehicle
11 Vehicle control system
21 Processor
25 External recognition sensor
26 In-vehicle sensor
30 DMS
31 HMI
51 Camera
52 Radar
53 LiDAR
73 Recognition unit
84 Body system control unit
85 Light control unit
101 Driver seat

102 Passenger seat
103, 103L, 103R Rear seat
104 Windshield
106 Steering wheel
107 Console
108 Controller
109 Operation unit
151FL to 151BR Camera
201 Center display
201C Center portion
201CL to 201CR Display unit
201L Left end portion
201LL Display unit
201R Right end portion
201RR Display unit
202 Console display
203 Display
204 Digital rearview mirror
205 Steering wheel display
206 Rear entertainment display
601 Accessory light
602 Day running light
603 Headlight
604 Turn signal
605 Auxiliary light
606 Tail light
607 Brake light
651 Steering wheel
652 Illumination
653FL to BR Speaker
654 Loop light
655 Stalk lever
656 Button
657 Indicator
658FC to 658FR Air vent
659CL to 659FR Knob
660 Operation unit
661FL, 661FR Door opener
662L, 662R Tablet terminal
663 Mounting portion
701 Information processing unit
711 Image processing unit
712 Metadata addition unit
713 Output control unit
751 Main light
1001 Steering wheel
1002 Illumination
1003, 1004 Operation unit
1007, 1008 Camera module
1021 to 1023R Seat speaker
1042 Camera
1043 LED

The invention claimed is:

1. A display system comprising:

a first display that extends in a left-right direction in front of a first seat of a mobile apparatus, the display being a single display device including a left end portion, a center portion, and a right end portion to form a continuous display surface of the display, wherein the left end portion of the first display faces diagonally backward right as viewed from the first seat, the center portion of the first display faces backward as viewed from the first seat, and the right end portion of the first display faces diagonally backward left as viewed from the first seat, and circuitry that controls display of images at the left end portion and the right end portion of the first display, wherein the circuitry zooms out a display range of one of the left end portion and the right end portion of the first display that is in a direction in which a direction indicator is turned on by increasing a field of view of the image displayed on the one of the left end portion and the right end portion, and the left end portion and the right end portion of the first display are bent to an inside of the mobile apparatus from the center portion of the first display.

2. The display system according to claim 1, wherein the left end portion of the first display displays an image of diagonally backward left of the mobile apparatus, and the right end portion of the first display displays an image of diagonally backward right of the mobile apparatus.

3. The display system according to claim 2, wherein the left end portion and the right end portion of the first display are used as digital outer mirrors.

4. The display system according to claim 1, wherein the circuitry controls display ranges of the left end portion and the right end portion of the first display on a basis of at least one of a line-of-sight direction of a person sitting on the first seat, a posture of the person, or a shift position.

5. The display system according to claim 4, wherein in a case where the mobile apparatus is stopped, the circuitry moves the display range of one of the left end portion and the right end portion of the first display that the person has looked into on a basis of an angle at which the person has looked into.

6. The display system according to claim 5, wherein the circuitry superimposes and displays a visual effect indicating a predetermined range around the mobile apparatus on an image of one of the left end portion and the right end portion of the first display that the person has looked into.

7. The display system according to claim 4, wherein the circuitry zooms out the display ranges in a case where the shift position is set to reverse.

8. The display system according to claim 4, wherein the circuitry superimposes and displays a visual effect based on a recognition result of an object at diagonally backward left of the mobile apparatus on an image of the left end portion of the first display, and superimposes and displays a visual effect based on a recognition result of an object at diagonally backward right of the mobile apparatus on an image of the right end portion of the first display.

9. The display system according to claim 8, wherein the circuitry changes a display mode of the visual effect on a basis of a degree of danger to the object.

10. The display system according to claim 9, wherein the circuitry changes a display mode of the visual effect at the left end portion of the first display in a case where a direction indicator in a left direction is turned on, and changes a display mode of the visual effect at the right end portion of the first display in a case where a direction indicator in a right direction is turned on.

11. The display system according to claim 8, wherein the circuitry recognizes an object at diagonally backward left of the mobile apparatus on a basis of an image at diagonally backward left of the mobile apparatus, and recognizes an object at diagonally backward right of the mobile apparatus on a basis of an image at diagonally backward right of the mobile apparatus.

12. The display system according to claim 1, wherein the center portion of the first display displays an image around the mobile apparatus.

13. The display system according to claim 12, wherein the circuitry controls a display range of an image displayed in the center portion of the first display on a basis of at least one of a line-of-sight direction or a posture of a person sitting on the first seat.

14. The display system according to claim 1, wherein the center portion of the first display displays information that supports an operation of the mobile apparatus.

15. The display system according to claim 1, wherein the center portion of the first display extends in the left-right direction in front of the first seat and a second seat arranged next to the first seat, and is dividable into a first display area in front of the first seat, a second display area in front of the second seat, and a third display area between the first display area and the second display area.

16. The display system according to claim 15, wherein the first display area displays information that supports an operation of the mobile apparatus, and the second display area and the third display area display infotainment-related information.

17. The display system according to claim 1, further comprising:

a second display that is provided below the first display and faces backward as viewed from the first seat.

18. The display system according to claim 17, wherein the second display is formed by a two-dimensional or three-dimensional touch panel, and displays an operation screen with respect to information displayed on the first display.

19. The display system according to claim 17, wherein the second display is provided in a console between the first seat and the second seat arranged next to the first seat.

20. The display system according to claim 17, wherein the circuitry controls display of images at the left end portion and the right end portion of the first display, the left end portion of the first display displays an image of diagonally backward left of the mobile apparatus, the right end portion of the first display displays an image of diagonally backward right of the mobile apparatus, the second display is formed by a two-dimensional or three-dimensional touch panel and displays an operation screen configured to set the display ranges of the left end portion and the right end portion of the first display, and the circuitry changes the display ranges on a basis of the operation on an operation screen.

21. The display system according to claim 20, wherein on a basis of the operation on the operation screen, the circuitry changes the display range of the left end portion of the first display within a range including a predetermined first area of diagonally backward left of the mobile apparatus, and changes the display range of the right end portion of the first display within a range including a predetermined second area of diagonally backward right of the mobile apparatus.

22. The display system according to claim 20, wherein the circuitry makes the left end portion and the right end portion of the first display different in a range in which it is possible to zoom in or zoom out the display range.

23. The display system according to claim 1, further comprising:

a third display that is provided in front of the first seat and displays visual information superimposed in a field of view of a person sitting on the first seat.

24. The display system according to claim 23, wherein the third display displays information that supports an operation of the mobile apparatus.

25. The display system according to claim 1, further comprising:

a fourth display that is provided above the first display and faces backward as viewed from the first seat.

26. The display system according to claim 25, wherein the fourth display is used as a digital rearview mirror.

27. The display system according to claim 26, wherein the circuitry controls a display range of an image displayed on the fourth display on a basis of at least one of a line-of-sight direction or a posture of a person sitting on the first seat.

28. The display system according to claim 1, further comprising:

a fifth display provided in a center of a steering wheel of the mobile apparatus.

29. The display system according to claim 1, further comprising:

a sixth display provided on a back surface of at least one of the first seat or the second seat arranged next to the first seat.

30. The display system according to claim 1, wherein the left end portion of the first display faces diagonally backward right of the mobile apparatus, the center portion of the first display faces backward of the mobile apparatus, and the right end portion of the first display faces diagonally backward left of the mobile apparatus.

31. The display system according to claim 1, wherein the first seat is a driver seat.

32. A display device comprising:

a display that extends in a left-right direction in front of a seat of a mobile apparatus, the display being a single display device including a left end portion, a center portion, and a right end portion to form a continuous display surface of the display, wherein the left end portion faces diagonally backward right as viewed from the seat, the center portion faces backward as viewed from the seat, and the right end portion faces diagonally backward left as viewed from the seat, and circuitry that controls display of images at the left end portion and the right end portion of the first display, wherein the circuitry zooms out a display range of one of the left end portion and the right end portion of the first display that is in a direction in which a direction indicator is turned on by increasing a field of view of the image displayed on the one of the left end portion and the right end portion, and the left end portion and the right end portion of the first display are bent to an inside of the mobile apparatus from the center portion of the first display.

33. A display method comprising:

in a display that extends in a left-right direction in front of a seat of a mobile apparatus, the display being a single display device including a left end portion, a center portion, and a right end portion to form a continuous display surface of the display, the left end portion facing diagonally backward right as viewed from the seat, the center portion facing backward as viewed from the seat, and the right end portion facing diagonally backward left as viewed from the seat, displaying an image of diagonally backward left of the mobile apparatus by the left end portion of the display, and displaying an image of diagonally backward right of the mobile apparatus by the right end portion of the display; and zooming out a display range of one of the left end portion and the right end portion of the first display that is in a direction in which a direction indicator is turned on by increasing a field of view of the image displayed on the one of the left end portion and the right end portion, wherein the left end portion and the right end portion of the first display are bent to an inside of the mobile apparatus from the center portion of the first display.

34. A mobile apparatus comprising:

a display that extends in a left-right direction in front of a seat, the display being a single display device including a left end portion, a center portion, and a right end portion to form a continuous display surface of the display, the left end portion facing diagonally backward right as viewed from the seat, the center portion facing backward as viewed from the seat, and the right end portion facing diagonally backward left as viewed from the seat, and circuitry that controls display of images at the left end portion and the right end portion of the first display, wherein the circuitry zooms out a display range of one of the left end portion and the right end portion of the first display that is in a direction in which a direction indicator is turned on by increasing a field of view of the image displayed on the one of the left end portion and the right end portion, and the left end portion and the right end portion of the first display are bent to an inside of the mobile apparatus from the center portion of the first display.

* * * * *